United States Patent
Hansen et al.

(10) Patent No.: US 7,386,706 B2
(45) Date of Patent: *Jun. 10, 2008

(54) SYSTEM AND SOFTWARE FOR MATCHED ALIGNED AND UNALIGNED STORAGE INSTRUCTIONS

(75) Inventors: Craig Hansen, Los Altos, CA (US); John Moussouris, Palo Alto, CA (US)

(73) Assignee: Microunity Systems Engineering, Inc., Sunnyvale, CA (US)

(*) Notice: Subject to any disclaimer, the term of this patent is extended or adjusted under 35 U.S.C. 154(b) by 325 days.

This patent is subject to a terminal disclaimer.

(21) Appl. No.: 10/716,568

(22) Filed: Nov. 20, 2003

(65) Prior Publication Data

US 2004/0158689 A1 Aug. 12, 2004

Related U.S. Application Data

(60) Continuation of application No. 10/436,340, filed on May 13, 2003, which is a continuation of application No. 09/534,745, filed on Mar. 24, 2000, now Pat. No. 6,643,765, which is a continuation of application No. 09/382,402, filed on Aug. 24, 1999, now Pat. No. 6,295,599, and a continuation-in-part of application No. 09/169,963, filed on Oct. 13, 1998, now Pat. No. 6,006,318, which is a continuation of application No. 08/754,827, filed on Nov. 22, 1996, now Pat. No. 5,822,603, which is a division of application No. 08/516,036, filed on Aug. 16, 1995, now Pat. No. 5,742,840, application No. 10/716,568, which is a continuation of application No. 09/922,319, filed on Aug. 2, 2001, now Pat. No. 6,725,356, which is a continuation of application No. 09/382,402, filed on Aug. 24, 1999, now Pat. No. 6,295,599, and a continuation-in-part of application No. 09/169,963, filed on Oct. 13, 1998, now Pat. No. 6,006,318, which is a continuation of application No. 08/754,827, filed on Nov. 22, 1996, now Pat. No. 5,822,603, which is a division of application No. 08/516,036, filed on Aug. 16, 1995, now Pat. No. 5,742,840.

(60) Provisional application No. 60/097,635, filed on Aug. 24, 1998.

(51) Int. Cl.
*G06F 9/34* (2006.01)

(52) U.S. Cl. ..................... 712/204; 712/225

(58) Field of Classification Search ............... 712/225, 712/201, 212, 210, 204; 711/201, 212

See application file for complete search history.

(56) References Cited

U.S. PATENT DOCUMENTS 4,025,772 A 5/1977 Constant (Continued)

FOREIGN PATENT DOCUMENTS

CA 1 323 451 10/1993

(Continued)

OTHER PUBLICATIONS

IEEE Draft Standard for "Scalable Coherent Interface-Low-Voltage Differential Signal Specifications and Packet Encoding", IEEE Standards Department, P1596.3/D0.15 (Mar. 1992).

(Continued)

*Primary Examiner*—Eric Coleman
(74) *Attorney, Agent, or Firm*—McDermott Will & Emery LLP

(57) ABSTRACT

A system and software for improving the performance of processors by incorporating an execution unit operable to decode and execute single instructions in an instruction set comprising (a) group instructions that operate on a plurality of data elements in partitioned fields of a register to produce a catenated result, (b) aligned memory operations that move data between memory and register where the memory operand is aligned, and (c) unaligned memory operations where the memory operand is unaligned.

26 Claims, 152 Drawing Sheets

U.S. PATENT DOCUMENTS

| | | |
|---|---|---|
| 4,489,393 A | 12/1984 | Kawahara et al. |
| 4,658,349 A | 4/1987 | Tabata et al. |
| 4,701,875 A | 10/1987 | Konishi et al. |
| 4,727,505 A | 2/1988 | Konishi et al. |
| 4,814,976 A | 3/1989 | Hansen et al. |
| 4,852,098 A | 7/1989 | Brechard et al. |
| 4,875,161 A | 10/1989 | Lahti et al. |
| 4,876,660 A | 10/1989 | Owen et al. |
| 4,893,267 A | 1/1990 | Alsup et al. |
| 4,949,294 A | 8/1990 | Wambergue |
| 4,953,073 A | 8/1990 | Moussouris et al. |
| 4,956,801 A | 9/1990 | Priem et al. |
| 4,959,779 A | 9/1990 | Weber et al. |
| 4,969,118 A | 11/1990 | Montoye et al. |
| 4,975,868 A | 12/1990 | Freerksen |
| 5,032,865 A | 7/1991 | Schlunt |
| 5,081,698 A | 1/1992 | Kohn |
| 5,113,506 A | 5/1992 | Moussouris et al. |
| 5,155,816 A | 10/1992 | Kohn |
| 5,157,388 A | 10/1992 | Kohn |
| 5,161,247 A | 11/1992 | Murakami et al. |
| 5,179,651 A | 1/1993 | Taaffe et al. |
| 5,201,056 A | 4/1993 | Daniel et al. |
| 5,208,914 A | 5/1993 | Wilson et al. |
| 5,231,646 A | 7/1993 | Heath et al. |
| 5,233,690 A | 8/1993 | Sherlock et al. |
| 5,241,636 A | 8/1993 | Kohn |
| 5,268,855 A | 12/1993 | Mason et al. |
| 5,268,995 A | 12/1993 | Diefendorff et al. |
| 5,280,598 A | 1/1994 | Osaki et al. |
| 5,347,643 A | 9/1994 | Kondo et al. |
| 5,408,581 A | 4/1995 | Suzuki et al. |
| 5,412,728 A | 5/1995 | Besnard et al. |
| 5,423,051 A | 6/1995 | Fuller et al. |
| 5,426,600 A | 6/1995 | Nakagawa et al. |
| 5,430,660 A | 7/1995 | Hengeveld et al. |
| 5,471,628 A | 11/1995 | Phillips et al. |
| 5,481,719 A * | 1/1996 | Ackerman et al. .......... 718/108 |
| 5,487,024 A | 1/1996 | Girardeau, Jr. |
| 5,500,811 A | 3/1996 | Corry |
| 5,515,520 A | 5/1996 | Hatta et al. |
| 5,533,185 A | 7/1996 | Lentz et al. |
| 5,557,724 A | 9/1996 | Sampat et al. |
| 5,588,152 A | 12/1996 | Dapp et al. |
| 5,590,365 A | 12/1996 | Ide et al. |
| 5,592,405 A | 1/1997 | Gove et al. |
| 5,600,814 A | 2/1997 | Gahan et al. |
| 5,636,351 A | 6/1997 | Lee |
| 5,640,543 A | 6/1997 | Farrell et al. |
| 5,642,306 A | 6/1997 | Mennemeier et al. |
| 5,666,298 A | 9/1997 | Peleg et al. |
| 5,669,010 A | 9/1997 | Duluk, Jr. |
| 5,673,407 A | 9/1997 | Poland et al. |
| 5,675,526 A | 10/1997 | Peleg et al. |
| 5,680,338 A | 10/1997 | Agarwal et al. |
| 5,721,892 A | 2/1998 | Peleg et al. |
| 5,734,874 A | 3/1998 | Van Hook et al. |
| 5,742,840 A | 4/1998 | Hansen et al. |
| 5,757,432 A | 5/1998 | Dulong et al. |
| 5,758,176 A | 5/1998 | Agarwal et al. |
| 5,768,546 A | 6/1998 | Kwon |
| 5,778,412 A | 7/1998 | Gafken |
| 5,802,336 A | 9/1998 | Peleg et al. |
| 5,809,292 A | 9/1998 | Wilkinson et al. |
| 5,818,739 A | 10/1998 | Peleg et al. |
| 5,825,677 A | 10/1998 | Agarwal et al. |
| 5,828,869 A | 10/1998 | Johnson et al. |
| 5,835,782 A | 11/1998 | Lin et al. |
| 5,886,732 A | 3/1999 | Humpleman |
| 5,887,183 A | 3/1999 | Agarwal et al. |
| 5,922,066 A | 7/1999 | Cho et al. |
| 5,983,257 A | 11/1999 | Dulong et al. |
| 5,996,057 A | 11/1999 | Scales, III et al. |
| 6,016,538 A | 1/2000 | Guttag et al. |
| 6,041,404 A | 3/2000 | Roussel et al. |
| 6,052,769 A | 4/2000 | Huff et al. |
| 6,092,094 A | 7/2000 | Ireton |
| 6,173,393 B1 | 1/2001 | Palanca et al. |
| 6,275,834 B1 | 8/2001 | Lin et al. |
| 6,401,194 B1 | 6/2002 | Nguyen et al. |
| 6,425,073 B2 | 7/2002 | Roussel et al. |
| 6,453,368 B2 | 9/2002 | Yamamoto |
| 6,516,406 B1 | 2/2003 | Peleg et al. |
| 6,567,908 B1 | 5/2003 | Furuhashi |
| 6,643,765 B1 | 11/2003 | Hansen et al. |
| 6,725,356 B2 | 4/2004 | Hansen et al. |

FOREIGN PATENT DOCUMENTS

| | | |
|---|---|---|
| EP | 0 468 820 A2 | 1/1992 |
| EP | 0 651 321 A | 5/1995 |
| EP | 0 654 733 A1 | 5/1995 |
| JP | S60-217435 | 10/1985 |
| JP | 3268024 | 11/1991 |
| JP | 6095843 | 4/1994 |
| WO | WO 93/01565 | 1/1993 |
| WO | WO93/11500 | 6/1993 |
| WO | WO 97/07450 | 2/1997 |

OTHER PUBLICATIONS

IEEE Draft Standard for "High-Bandwidth Memory Interface Based on SCI Signaling Technology (RamLink)," IEEE Standards Department, Draft 1.25 IEEE P1596.4-199X (May 1995).

Gerry Kane et al., "MIPS RISC Architecture," Prentice Hall (1995).

IBM, "The PowerPC Architecture: A Specification For A New Family of RISC Processors," 2nd Ed., Morgan Kaufmann Publishers, Inc., (1994).

Hewlett-Packard Co., "PA-RISC 1.1 Architecture and Instruction Set," Manual Part No. 09740-90039, (1990).

MIPS Computer Systems, Inc., "MIPS R4000 User's Manual," Mfg. Part No. M8-00040, (1990).

i860™ Microprocessor Architecture, Neal Margulis, Foreword by Les Kohn.

Gove, "The MVP: A Highly-Integrated Video Compression Chip," IEEE Data Compression Conference, pp. 215-224 (Mar. 1994).

Gove, "The Multimedia Video Processor (MVP): A Chip Architecture for Advanced DSP Applications," IEEE DSP Workshop, pp. 27-30 (Oct. 2-5, 1994).

Guttag et al., "A Single-Chip Multiprocessor for Multimedia: The MVP," IEEE Computer Graphics & Applications, pp. 53-64 (Nov. 1992).

Lee et al., "MediaStation 5000: Integrating Video and Audio," IEEE Multimedia pp. 50-61 (Summer 1994).

TMS320C80 (MVP) Parallel Processor User's Guide, Texas Instruments (Mar. 1995).

TMS320C80 (MVP) Master Processor User's Guide, Texas Instruments (Mar. 1995).

Bass et al., "The PA 7100LC Microprocessor: A Case Study of IC Design Decisions in a Competitive Environment," Hewlett-Packard Journal, vol. 46, No. 2, pp. 12-22 (April 1995).

Bowers et al., "Development of a Low-Cost, High Performance, Multiuser Business Server System," Hewlett-Packard Journal, vol. 46, No. 2, p. 79 (Apr. 1995).

Gwennap, "New PA-RISC Processor Decodes MPEG Video: Hewlett-Packard's PA-7100LC Uses New Instructions to Eliminate Decoder Chip," Microprocessor Report, pp. 16-17 (Jan. 24, 1994).

Gwennap, "Digital MIPS Add Multimedia Extensions," Microdesign Resources, pp. 24-28 (Nov. 18, 1996).

Kurpanek et al., "PA7200: A PA-RISC Processor with Integrated High Performance MP Bus Interface," IEEE COMPCON '94, pp. 375-382 (Feb. 28-Mar. 4, 1994).

Lee et al., "Pathlength Reduction Features in the PA-RISC Architecture," IEEE COMPCON, pp. 129-135 (Feb. 24-28, 1992).

Lee et al., "Real-Time Software MPEG Video Decoder on Multimedia-Enhanced PA 7100LC Processors," Hewlett-Packard Journal, vol. 46, No. 2, pp. 60-68 (Apr. 1995).
Lee, "Realtime MPEG Video via Software Decompression on a PA-RISC Processor," IEEE, pp. 186-192 (1995).
Martin, "An Integrated Graphics Accelerator for a Low-Cost Multimedia Workstation," Hewlett-Packard Journal, vol. 46, No. 2, pp. 43-50 (Apr. 1995).
Undy et al., "A Low-Cost Graphics and Multimedia Workstation Chip Set," IEEE Micro, pp. 10-22 (Apr. 1994).
HP 9000 Series 700 Workstations Technical Reference Manual: Model 712, Hewlett-Packard (Jan. 1994).
PA-RISC 1.1 Architecture and Instruction Set Reference Manual, Third Edition, Hewlett-Packard (Feb. 1994).
Ang, "StarT Next Generation: Integrating Global Caches and Dataflow Architecture," Proceedings of the ISCA 1992 Dataflow Workshop (1992).
Beckerle, "Overview of the StarT (*T) Multithreaded Computer," IEEE COMPCON '93, pp. 148-156 (Feb. 22-26, 1993).
Diefendorff et al., "The Motorola 88110 Superscalar RISC Microprocessor," IEEE pp. 157-162 (1992).
Gipper, "Designing Systems for Flexibility, Functionality, and Performance with the 88110 Symmetric Superscalar Microprocessor," IEEE (1992).
Nikhil et al., "*T: A Multithreaded Massively Parallel Architecture," Computation Structures Group Memo 325-2, Laboratory for Computer Science, Massachusetts Institute of Technology (Mar. 5, 1992).
Papadopoulos et al., "*T: Integrated Building Blocks for Parallel Computing," ACM, pp. 624-635 (1993).
Patterson, "Motorola Announces First High Performance Single Board Computer Using Superscalar Chip," Motorola Computer Group (Sep. 1992).
M. Phillip, "Performance Issues for 88110 RISC Microprocessor," IEEE, 1992.
M. Smotherman et al., "Instruction Scheduling for the Motorola 88110," IEEE, 1993.
R. Mueller, "The MC88110 Instruction Sequencer," Northcon, 1992.
J. Arends, "88110: Memory System and Bus Interface," Northcon, 1992.
K. Pepe, "The MC88110's High Performance Load/Store Unit," Northcon, 1992.
J. Maguire, "MC88110: Datpath," Northcon, 1992.
Abel et al., "Extensions to FORTRAN for Array Processing," ILLIAC IV Document No. 235, Department of Computer Science, University of Illinois at Urbana-Champaign (Sep. 1, 1970).
Barnes et al., "The ILLIAC IV Computer," IEEE Transactions on Computers, vol. C-17, No. 8, pp. 746-757 (Aug. 1968).
Knapp et al., "Bulk Storage Applications in the ILLIAC IV System," ILLIAC IV Document No. 250, Center for Advanced Computation, University of Illinois at Urbana-Champaign (Aug. 3, 1971).
Awaga et al., "The µ VP 64-bit Vector Coprocessor: A New Implementation of High-Performance Numerical Computation," IEEE Micro, vol. 13, No. 5, pp. 24-36 (Oct. 1993).
Takahashi et al., "A 289 MFLOPS Single Chip Vector Processing Unit," The Institute of Electronics, Information, and Communication Engineers Technical Research Report, pp. 17-22 (May 28, 1992).
Uchiyama et al., "The Gmicro/500 Superscalar Microprocessor with Branch Buffers," IEEE Micro (Oct. 1993).
Broughton et al., "The S-1 Project: Top-End Computer Systems for National Security Applications," (Oct. 24, 1985).
Farmwald et al., "Signal Processing Aspects of the S-1 Multiprocessor Project," SPIE vol. 241, Real-Time Signal Processing (1980).
Farmwald, "High Bandwidth Evaluation of Elementary Functions," IEEE Proceedings, 5th Symposium on Computer Arithmetic (1981).
Gilbert, "An Investigation of the Partitioning of Algorithms Across an MIMD Computing System," (Feb. 1980).
Widdoes, "The S-1 Project: Developing High-Performance Digital Computers," IEEE Computer Society COMPCON Spring 1980 (Dec. 11, 1979).
Cornell, S-1 Uniprocessor Architecture SMA-4.
The S-1 Project, Jan. 1985, S-1 Technical Staff.
S-1 Architecture and Assembler SMA-4 Manual, Dec. 19, 1979 (Preliminary Version).
Michielse, "Performing the Convex Exemplar Series SPP System," Proceedings of Parallel Scientific Computing, First Intl Workshop, PARA '94, pp. 375-82 (Jun. 20-23, 1994).
Wadleigh et al., "High Performance FFT Algorithms for the Convex C4/XA Supercomputer," Poster, Conference on Supercomputing, Washington, D.C. (Nov. 1994).
C4 Technical Overview (Sep. 23, 1993).
Saturn Assembly Level Performance Tuning Guide (Jan. 1, 1994).
Saturn Differences from C Series (Feb. 6, 1994).
"Convex Adds GaAs System," Electronic News (Jun. 20, 1994).
Convex Architecture Reference Manual, Sixth Edition (1992).
Convex Assembly Language Reference Manual, First Edition (Dec. 1991).
Convex Data Sheet C4/XA Systems, Convex Computer Corporation.
Saturn Overview (Nov. 12, 1993).
Convex Notebook containing various "Machine Descriptions".
"Convex C4/XA Offer 1 GFLOPS from GaAs Uniprocessor," Computergram International, Jun. 15, 1994.
Excerpt from Convex C4600 Assembly Language Manual, 1995.
Excerpt from "Advanced Computer Architectures—A Design Space Approach," Chapter 14.8, "The Convex C4/XA System".
Convex C4600 Assembly Language Manual, First Edition, May 1995.
Alvarez et al., "A 450MHz PowerPC Microprocessor with Enhanced Instruction Set and Copper Interconnect," ISSCC (Feb. 1999).
Tyler et al., "AltiVec™: Bringing Vector Technology to the PowerPC™ Processor Family," IEEE (Feb. 1999).
AltiVec™ Technology Programming Environments Manual (1998).
Atkins, "Performance and the i860 Microprocessor," IEEE Micro, pp. 24-27, 72-78 (Oct. 1991).
Grimes et al., "A New Processor with 3-D Graphics Capabilities," NCGA '89 Conference Proceedings vol. 1, pp. 275-284 (Apr. 17-20, 1989).
Grimes et al., "The Intel i860 64-Bit Processor: A General-Purpose CPU with 3D Graphics Capabilities," IEEE Computer Graphics & Applications, pp. 85-94 (Jul. 1989).
Kohn et al., "A 1,000,000 Transistor Microprocessor," 1989 IEEE International Solid-State Circuits Conference Digest of Technical Papers, pp. 54-55, 290 (Feb. 15, 1989).
Kohn et al., "A New Microprocessor with Vector Processing Capabilities," Electro/89 Conference Record, pp. 1-6 (Apr. 11-13, 1989).
Kohn et al., "Introducing the Intel i860 64-Bit Microprocessor," IEEE Micro, pp. 15-30 (Aug. 1989).
Kohn et al., "The i860 64-Bit Supercomputing Microprocessor," AMC, pp. 450-456 (1989).
Margulis, "i860 Microprocessor Architecture," Intel Corporation (1990).
Mittal et al., "MMX Technology Architecture Overview," Intel Technology Journal Q3 '97, pp. 1-12 (1997).
Patel et al., "Architectural Features of the i860—Microprocessor RISC Core and On-Chip Caches," IEEE, pp. 385-390 (1989).
Rhodehamel, "The Bus Interface and Paging Units of the i860 Microprocessor," IEEE, pp. 380-384 (1989).
Perry, "Intel's Secret is Out," IEEE Spectrum, pp. 22-28 (Apr. 1989).
Sit et al., "An 80 MFLOPS Floating-Point Engine in the Intel i860 Processor," IEEE, pp. 374-379 (1989).
i860 XP Microprocessor Data Book, Intel Corporation (May 1991).
Paragon User's Guide, Intel Corporation (Oct. 1993).
N15 Micro Architecture Specification, dated April 29, 1991.
N15 External Architecture Specification, dated Oct. 17, 1990.
N15 External Architecture Specification, dated Dec. 14, 1990.
N15 Product Requirements Document, dated Dec. 21, 1990.
N15 Product Implementation Plan, dated Dec. 21, 1990.
N12 Performance Analysis document version 2.0, dated Sep. 21, 1990.

Hansen, "Architecture of a Broadband Mediaprocessor," IEEE COMPCON 96 (Feb. 25-29, 1996).

Moussouris et al., "Architecture of a Broadband MediaProcessor," Microprocessor Forum (1995).

Arnould et al., "The Design of Nectar: A Network Backplane for Heterogeneous Multicomputers," ACM (1989).

Bell, "Ultracomputers: A Teraflop Before Its Time," Communications of the ACM, (Aug. 1992) pp. 27-47.

Broomell et al., "Classification Categories and Historical Development of Circuit Switching Topologies," Computing Surveys, vol. 15, No. 2, pp. 95-133 (Jun. 1983).

Culler et al., "Analysis of Multithreaded Microprocessors Under Multiprogramming," Report No. UCB/CSD 92/687 (May 1992).

Donovan et al., "Pixel Processing in a Memory Controller," IEEE Computer Graphics and Applications, pp. 51-61 (Jan. 1995).

Fields, "Hunting for Wasted Computing Power: New Software for Computing Networks Puts Idle PC's to Work," Univ. of Wisconsin-Madison, http://www.cs.wisc.edu/condor/doc/WiscIdea.html (1993).

Geist, "Cluster Computing: The Wave of the Future?," Oak Ridge National Laboratory, 84OR21400 (May 30, 1994).

Ghafoor, "Systolic Architecture for Finite Field Exponentiation," IEEE Proceedings, vol. 136 (Nov. 1989).

Giloi, "Parallel Programming Models and their Interdependence with Parallel Architectures," IEEE Proceedings (Sep. 1993).

Hwang et al., "Parallel Processing for Supercomputers and Artificial Intelligence," (1993).

Hwang, "Advanced Computer Architecture: Parallelism, Scalability, Programmability," (1993).

Hwang, "Computer Architecture and Parallel Processing," McGraw Hill (1984).

Iwaki, "Architecture of a High Speed Reed-Solomon Decoder," IEEE Consumer Electronics (Jan. 1994).

Jain et al., "Square-Root, Reciprocal, SINE/COSINE, Arctangent Cell for Signal and Image Processing," IEEE ICASSP '94, pp. II-521-II-524 (Apr. 1994).

Laudon et al., "Architectural and Implementation Tradeoffs in the Design of Multiple-Context Processors," Technical Report: CSL-TR-92-523 (May 1992).

Lawrie, "Access and Alignment of Data in an Array Processor," IEEE Transactions on Computers, vol. C-24, No. 12, pp. 99-109 (Dec. 1975).

Le-Ngoc, "A Gate-Array-Based Programmable Reed-Solomon Codec: Structure-Implementation-Applications," IEEE Military Communications (1990).

Litzkow et al., "Condor—A Hunter of Idle Workstations," IEEE (1988).

Markstein, "Computation of Elementary Functions on the IBM RISC System/6000 Processor," IBM J. Res. Develop., vol. 34, No. 1, pp. 111-119 (Jan. 1990).

Nienhaus, "A Fast Square Rooter Combining Algorithmic and Table Lookup Techniques," IEEE Proceedings Southeastcon, pp. 1103-1105 (1989).

Renwick, "Building a Practical HIPPI LAN," IEEE, pp. 355-360 (1992).

Rohrbacher et al., "Image Processing with the Staran Parallel Computer," IEEE Computer, vol. 10, No. 8, pp. 54-59 (Aug. 1977) (reprinted version pp. 119-124).

Ryne, "Advanced Computers and Simulation," IEEE, pp. 3229-3233 (1993).

Siegel, "Interconnection Networks for SIMD Machines," IEEE Computer, vol. 12, No. 6 (Jun. 1979) (reprinted version pp. 110 118).

Singh et al., "A Programmable HIPPI Interface for a Graphics Supercomputer," ACM (1993).

Smith, "Cache Memories," Computing Surveys, vol. 14, No. 3 (Sep. 1982).

Tenbrink et al., "HIPPI: The First Standard for High-Performance Networking," Los Alamos Science (1994).

Tolmie, "Gigabit LAN Issues: HIPPI, Fibre Channel, or ATM," Los Alamos National Laboratory Report No. LA-UR 94-3994 (1994).

Tolmie, "HIPPI: It's Not Just for Supercomputers Anymore," Data Communications (May 8, 1995).

Toyokura et al., "A Video DSP with a Macroblock-Level-Pipeline and a SIMD Type Vector-Pipelined Architecture for MPEG2 CODEC," ISSCC94, Section 4, Video and Communications Signal Processors, Paper WP 4.5, pp. 74-75 (1994).

Tullsen et al., "Simultaneous Multithreading: Maximizing On-Chip Parallelism," Proceedings of the 22nd Annual International Symposium on Computer Architecture (Jun. 1995).

Turcotte, "A Survey of Software Environments for Exploiting Networked Computing Resources," Engineering Research Center for Computational Field Simulation (June 11, 1993).

Vetter et al., "Network Supercomputing: Connecting Cray Supercomputers with a HIPPI Network Provides Impressively High Execution Rates," IEEE Network (May 1992).

Wang, "Bit-Level Systolic Array for Fast Exponentiation in GF(2m)," IEEE Transactions on Computers, vol. 43, No. 7, pp. 838-841 (Jul. 1994).

Ware et al., "64 Bit Monolithic Floating Point Processors," IEEE Journal of Solid-State Circuits, vol. Sc-17, No. 5 (Oct. 1982).

"Bit Manipulator," IBM Technical Disclosure Bulletin, pp. 1575-1576 (Nov. 1974).

Finney et al., "Using a Common Barrel Shifter for Operand Normalization, Operand Alignment and Operand Unpack and Pack in Floating Point," IBM Technical Disclosure Bulletin, pp. 699-701 (Jul. 1986).

Data General AViiON AV500, 550, 4500 and 5500 Servers.

Jovanovic et al., "Computational Science: Advances Through Collaboration," San Diego Supercomputer Center Science Report (1993).

High Performance Computing and Communications: Toward a National Information Infrastructure, National Science Foundation (NSF) (1994).

National Coordination Office for High Performance Computing and Communications, "High Performance Computing and Communications: Foundation for America's Information Future" (1996).

Wilson, "The History of the Development of Parallel Computing," http://ei.cs.vt.edu/~history/Parallel.html.

IEEE Standard 754 (ANSI/IEEE Std. 754-1985).

Original Complaint for Patent Infringement, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Mar. 26, 2004.

Amended Complaint for Patent Infringement, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Apr. 20, 2004.

Expert Witness Report of Richard A. Killworth, Esq., *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 12, 2005.

Declaration and Expert Witness Report of Ray Mercer Regarding Written Description and Enablement Issues, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 12, 2005.

Corrected Expert Report of Dr. Stephen B. Wicker Regarding Invalidity of U.S. Patent Nos. 5,742,840; 5,794,060; 5,764,061; 5,809,321; 6,584,482; 6,643,765; 6,725,356 and Exhibits A-1; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Oct. 6, 2005.

Defendants Intel and Dell's Invalidity Contentions with Exhibits A-G; *MicroUnity Systems Engineering, Inc. v. Dell, Inc. f/k/a/ Dell Computer and Intel Corporation*; C.A. No. 2-04CV-120; In the United States District Court of the Eastern Distict of Texas, Marshall Division filed Sep. 19, 2005.

Defendants Dell Inc. and Intel Corporation's Identification of Prior Art Pursuant to 35 USC {282; *MicroUnity Systems Engineering, Inc. v. Dell, Inc. f/k/a/ Dell Computer and Intel Corporation*; C.A.

No. 2-04CV-120; In the United States District Court of the Eastern District of Texas, Marshall Division filed Oct. 7, 2005.
Request for *Inter Partes* Reexamination Under 35 USC {{ 311-318 of U.S. Appl. No. 6,725,356 filed on Jun. 28, 2005.
Deposition of Larry Mennemeier on Sep. 22, 2005 and Exhibit 501; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division.
Deposition of Leslie Kohn on Sep. 22, 2005; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division.
Intel Article, "*Intel Announces Record Revenue of 9.96 Billion*", Oct. 18, 2005.
The New York Times Article, "*Intel Posts 5% Profit Increase on Demand for Notebook Chips*", Oct. 19, 2005.
USA Today Article, "*Intel's Revenue Grew 18% In Robust Quarter for Tech*", Oct. 19, 2005.
The Wall Street Journal Article, "*Intel Says Chip Demand May Slow*", Oct. 19, 2005.
The New York Times Article, "*Intel Settlement Revives A Fading Chip Designer*", Oct. 20, 2005.
Markoff, John, "Intel Settlement Revives a Fading Chip Designer," The New York Times (Oct. 20, 2005).
Intel Press Release, "Intel Announces Record Revenue of $9.96 Billion," Santa Clara, CA, Oct. 18, 2005.
L. Kohn et al. "The Visual Instruction Set (VIS) in UltraSPARC" IEEE. 1995. 462-469.
D. Shaver. "A General-Purpose Array Processor for Seismic Processing" (Nov.-Dec. 1984) Jan.-Mar. 1998. 15th Anniversary Issue. 5-26.
R. Lee. "Accelerating Multimedia with Enhanced Microprocessors" IEEE Micro. Apr. 1995. 22-32.
N. Margulis. "i860 Microprocessor Architecture" 1990. 8-10, 171-175, 182-183.
A. Levinthal et al. "Parallel Computers for Graphics Applications" 1987. 193-198.
K. Diefendorff et al. "Organization of the Motorola 88110 Superscalar RISC Microprocessor" IEEE Micro. Apr. 1992. 40-63.
L. Gwennap. "IBM Regains Performance Lead with Power2" Microprocessor Report. Oct. 4, 1993. vol. 7, No. 13. 1,6-10.
L. Gwennap. "IBM Creates Power PC Processors for AS/400"Microprocessor Report. Jul. 31, 1995. 15-16.
Ide, et al., "A 320-MFLOPS CMOS Floating-point Processing Unit for Superscalar Processors," p. 12-21, Mar. 28, 1993, IEEE J. of Solid-State Circuits.
K. Uchiyama et al., The Gmicro/500 Superscalar Microprocessor with. Branch Buffers, IEEE Micro, Oct. 1993, p. 12-21.
Ruby B. Lee, Realtime MPEG Video Via Software Decompression on a PA-RISC Processor, IEEE (1995).
Karl M. Guttag et al. "The TMS34010: An Embedded Microprocessor", IEEE Jun. 1988, p. 186-190.
M. Awaga et al., "The µ VP 64-bit Vector Coprocessor: A New Implementation of High-Performance Numerical Computation", IEEE Micro, vol. 13, No. 5, Oct. 1993, p. 24-36.
Tom Asprey et al., "Performance Features of the PA7100 Microprocessor", IEEE Micro (Jun. 1993), p. 22-35.
Gove, Robert J., "The MVP: A Highly-Integrated Video Compression Chip," IEEE Data Compression Conf., Mar. (1994), pp. 215-224.
Woobin Lee, et al., "Mediastation 5000: Integrating Video and Audio," IEEE Multimedia, 1994, pp. 50-61.
Karl, Guttag et. al "A Single-Chip Multiprocessor for Multimedia: The MVP," IEEE Computer Graphics & Applications, Nov. 1992, p. 53-64.
TMS32OC8O (MVP) Master Processor User's Guide, Texas Instruments, Mar. 1995, p. 1-33.
TMS320C80 (MVP) Parallel Processor User's Guide ["PP"]; Texas Instruments Mar. 1995, p. 1-80.
Shipnes, Julie, "Graphics Processing with the 88110 RISC Microprocessor," IEEE COMPCOM, (Spring, 1992) pp. 169-174.

ILLIAC IV: Systems Characteristics and Programming Manual, May 1, 1972, p. 1-78.
N. Abel et al., ILLIAC IV Doc. No. 233, Language Specifications for a Fortran-Like Higher Level Language for ILLIAV IV, Aug. 28, 1970, p. 1-51.
ILLIAC IV Quarterly Progress Report: Oct., Nov., Dec. 1969; Published Jan. 15, 1970, pp. 1-15.
N.E. Abel et al., Extensions to Fortran for Array Processing (1970) pp. 1-16.
Morris A, Knapp et al.ILLIAC IV Systems Characteristics and Programming Manual (1972) "Bulk Storage Applications in the ILLIAC IV System," p. 1-10.
Rohrbacher, Donald, et al., "Image Processing with the Staran Parallel Computer," IEEE Computer, vol. 10, No. 8, pp. 54-59 (Aug. 1977) (reprinted version pp. 119-124).
Siegel, Howard Jay, "Interconnection Networks for SIMD Machines," IEEE Computer, vol. 12, No. 6, (Jun. 1979) (reprinted version pp. 110-118).
Mike Chastain, et. al., "The Convex C240 Architecture", Conference of Supercomputing, IEEE 1988, p. 321-329.
Gwennap, Linley, "New PA-RISC Processor Decodes MPEG Video: HP's PA-71 00LC Uses New Instructions to Eliminate Decoder Chip," Microprocessor Report, (Jan. 24, 1994) pp. 16-17.
Patrick Knebel et al., "HP's PA7100LC: A Low-Cost Superscalar PARISC Processor," IEEE (1993), pp. 441-447.
Kurpanek et al., "PA7200: A PA-RISC Processor with Integrated High Performance MP Bus Interface," EEEE (1994), pp. 375-382.
Hewlett Packard, PA-RISC 1.1 Architecture and Instruction Set Reference Manual, 3rd ed. Feb. 1994, pp. 1-424.
Margaret Simmons, et. al "A Performance Comparison of Three Supercomputers—Fujitsu VP-2600, NEC SX-3, and Cray Y-MP",. 1991 ACM, p. 150-157.
Smith, J. E., "Dynamic Instruction Scheduling and the Astronautics ZS-1," Computer, vol. 22, No. 7, Jul. 1989, at 21-35 and/or the Astronautics ZS- 1 computers made used, and/or sold in the United States, pp. 159-173.
Nikhil et al., "T: A Multithreaded Massively Parallel Architecture" Computation Structures Group Memo 325-2 (Mar. 5, 1992) , pp. 1-13.
Undy, et al., "A Low-Cost Graphics and Multimedia Workstation Chip Set," IEEE pp. 10-22 (1994).
Feng, Tse-Yun, "Data Manipulating Functions in Parallel Processors and Their Implementations," IEEE Transactions on Computers, vol. C-23, No. 3, Mar. 1974 (reprinted version pp. 89-98.
Lawrie, Duncan H., "Access and Alignment of Data in an Array Processor," IEEE Transactions on Computers, vol. c-24, No. 12, Dec. 1975 pp. 99-109.
Broomell, George, et al., "Classification Categories and Historical Development of Circuit Switching Topologies," Computing Surveys, vol. 15, No. 2, Jun. 1983 pp. 95-133.
Jain, Vijay, K., "Square-Root, Reciprocal, SINE/COSINE, Arctangent Cell for Signal and Image Processing," IEEEICASSP'94 Apr. 1994 , pp. II-521-II-524.
Spaderna et al., "An Integrated Floating Point Vector Processor for DSP and Scientific Computing", 1989 IEEE, ICCD, Oct. 1989 p. 8-13.
Gwennap, Linley, "Digital, MIPS Add Multimedia Extensions," Microdesign Resources Nov. 18, 1996 pp. 24-28.
Toyokura, M., "A Video DSP with a Macroblock-Level-Pipeline and a SIMD Type Vector-Pipeline Architecture for MPEG2 CODEC," ISSCC94, Section 4, Video and Communications Signal Processors, Paper WP 4.5, 1994 pp. 74-75.
Ide, et al., "A 320-MFLOPS CMOS Floating-point Processing Unit for Superscalar Processors," Nobuhiro Ide, et. Al. IEEE Tokyo Section, Denshe Tokyo No. 32, 1993, p. 103-109.
Papadopoulos et al., "*T: Integrated Building Blocks for Parallel Computing," ACM (1993) p. 824- and p. 625-63.5.
Ruby B. Lee, "Accelerating Multimedia with Enhanced Microprocessors," IEEE Micro Apr. 1995 p. 22-32.
Ruby B. Lee, "Realtime MPEG Video Via Software Decompression on a PA-RISC Processor," IEEE (1995), pp. 186-190.
K. Diefendorff , M. Allen, The Motorola 88110 Superscalar RISC Microprocessor, IEEE Micro, Apr. 1992, p. 157-162.

Kristen Davidson, Declaration of Kristen Davidson, p. 1 and H. Takahashi et al., A 289 MFLOPS Single Chip Vector Processing Unit, The Institute of Electronics, Information, and Communication Engineers Technical Research Report, May 28, 1992, pp. 17-22.

Kristen Davidson, Declaration of Kristen Davidson, p. 1 and M. Kimura et al., Development of Ginicro 32-bit Family of Microprocessors, Fujitsu Semiconductor Special Part 2, vol. 43, No. 2, Feb. 1992.

Bit Manipulator, IBM Technical Disclosure Bulletin, Nov. 1974, pp. 1576-1576 https://www.delphion.com/tdbs/tdb?order=75C+0016.

"Using a Common Barrel Shifter for Operand Normalization, Operand Alignment and Operand Unpack and Pack in Floating Point," IBM Technical Disclosure Bulletin, Jul. 1986, p. 699-701 https://www.delphion.com/tdbs/tdb?order=86A+61578.

Motorola MC88110 Second Generation RISC Microprocessor User's Manual (1991).

Berkerele, Michael J., "Overview of the START (*T) Multithreaded Computer" IEEE Jan. 1993, p. 148-1 56.

Diefendorff, et al., "Organization of the Motorola 88110 Superscalar RISC Microprocessor" IEEE Micro Apr. 1992, p. 39-63.

Barnes, et al., The ILLIAC IV Computer, IEEE Transactions on Computers, vol. C-17, No. 8, Aug. 1968.

Ruby B. Lee et al., Real-Time Software MPEG Video Decoder on Multimedia-Enhanced PA 7 100LC Processors, Hewlett-Packard J. Apr. 1995, p. 60-68.

Ruby B. Lee, "Realtime MPEG Video Via Software Decompression on a PA-RISC Processor," IEEE 1995, p. 186-192.

"The Multimedia Video Processor (MVP): A Chip Architecture for Advanced DSP Applications," Robert J. Gove, IEEE DSP Workshop (1994).

Convex Assembly Language Reference Manual, First Ed., Dec. 1991.

Convex Architecture Reference Manual (C Series), Sixth Edition, Convex Computer Corporation (Apr. 1992).

Manferdelli, et al., "Signal Processing Aspects of the S-1 Multiprocessor Project," submitted to SPIE Annual International Technical Symposium, Sm Diego, Society of Photo Optical Instrumentation Engineers, Jul. 30, 1980, p. 1-8.

Paul Michael Farmwald, Ph.D. "On the Design of High-Performance Digital Arithmetic Units," Thesis, Aug. 1981, p. 1-95.

GsAs Supercomputer Vendors Hit Hard,, Electronic News, Jan. 31, 1994, 1991, pp. 32.

Convex Adds GaAs System, Electronic News, Jun. 20, 1994.

Kevin Wadleigh et al., High-Performance FFT Algorithms for the Convex C4/XA Supercomputer, Journal of Super Computing, vol. 9, pp. 163-178 (1995).

Peter Michielse, Programming the Convex Exemplar Series SPP System, Parallel Scientific Computing, First Intl Workshop, PARA '94, Jun. 20-23, 1994, pp. 375-382.

Ryne, Robert D., "Advanced Computers and Simulation," Los Alamos National Laboratory IEEE 1 933, p. 3229-3233.

Singh et al., "A Programmable HIPPI Interface for a Graphics Supercomputer," ACM (1993) p. 124-132.

Bell, Gordon, "Ultracomputers: A Teraflop Before its Time," Comm.'s of the ACM Aug. 1992 pp. 27-47.

Geist, G. A., "Cluster Computing: The Wave of the Future?" Oak Ridge National Laboratory, 84OR2 1400 May 30, 1994, p. 236-246.

Vetter et al., "Network Supercomputing," IEEE Network May 1992, p. 38-44.

Renwick, John K. "Building a Practical HIPPI LAN," IEEE 1992, p. 355-360.

Tenbrink, et al., "HIPPI: The First Standard for High-Performance Networking," Los Alamos Science 1994 p. 1-4.

Arnould et al., "The Design of Nectar: A Network Backplane for Heterogeneous Multicomputers," ACM 1989 p. 1-12.

Watkins, John, et al., "A Memory Controller with an Integrated Graphics Processor," IEEE 1993 p. 324-336.

Control Data *6400/6500/ 6600* Computer Systems, Instant SMM Maintenance Manual.

Control Data *6400/6500/ 6600* Computer Systems, SCOPE Reference Manual, Sep. 1966.

Control Data *6400/6500/ 6600* Computer Systems, COMPASS Reference Manual, 1969.

Tolmie, Don, "Gigabit LAN Issues: HIPPI, Fibre Channel, or ATM?" Los Alamos National Laboratory Rep. No. LA-UR 94-3994 (1994).

ILLIAC IV: Systems Characteristics and Programming Manual, May 1, 1972.

1979 Annual Report: The S-1 Project vol. 1 Architechture 1979.

1979 Annual Report: The S-1 Project vol. 2 Hardware 1979.

S-1 Uniprocessor Architecture, Apr. 21, 1983 (UCID 19782) *See also* S-1 Uniprocessor Architecture (SMA-4), Steven Cornell.

Broughton, et al., The S-1 Project: Top-End Computer Systems for National Security Applications, Oct. 24, 1985.

Convex Data Sheet C4/XA High Performance Programming Environment, Convex Computer Corporation.

Bowers et al., "Development of a Low-Cost, High Performance, Multiuser Business Server System," Hewlett-Packard J. Apr. 1995 p. 79-84.

Mick Bass et al., The PA 7100LC Microprocessor: A Case Study of Design Decisions in a Competitive Environment Hewlett-Packard J. Apr. 1995, p. 12-18.

Mick Bass, et. al. "Design Methodologies for the PA 7100LC Microprocessor", Hewlett Packard Journal Apr. 1995 p. 23-35.

Wang, Chin-Liang, "Bit-Level Systolic Array for Fast Exponentiation in GF (2Am)," IEEE Transactions on Computers, vol. 43, No. 7, Jul. 1994 p. 838-841.

Markstein, P.W., "Computation of Elementary Functions on the IBM RISC System/6000 Processor," IBM J. Res. Develop., vol. 34, No. 1, Jan. 1990 p. 111-119.

Donovan, Walt, et al., "Pixel Processing in a Memory Controller," IEEE Computer Graphics and Applications, Jan. 1995 p. 51-61.

Ware et al., 64 Bit Monolithic Floating Point Processors, IEEE Journal Of Solid-state Circuits, vol. Sc-17, No. 5, Oct. 1982, pp. 898-907.

Hwang, "Advanced Computer Architecture: Parallelism, Scalability, Programmability" (1 993) at 475, p. 898-907.

Hwang & Degroot, "Parallel Processing for Supercomputers & Artificial Intelligence," 1993.

Nienhaus, Harry A., "A Fast Square Rooter Combining Algorithmic and Table Lookup Techniques," IEEE Proceedings Southeastcon, 1989 pp. 1103-1105.

Eisig, David, et al., "The Design of a 64-Bit Integer Multiplier/ Divider Unit," IEEE 1993 pp. 171-178.

Margulis, Neal, "i860 Microprocessor Architecture," Intel Corporation 1990.

Intel Corporation, 3860 XP Microprocessor Data Book (May 1991).

Hewlett-Packard, "HP 9000 Series 700 Workstations Technical Reference Manual Model 712 (System)" Jan. 1 994.

Ruby Lee, et al., Pathlength Reduction Features in the PA-RISC Architecture Feb. 24-28, 1992 p. 129-135.

Kevin Wadleigh et al., High Performance FFT Algorithms for the Convex C4/XA Supercomputer, Poster, Conference on Supercomputing, Washington, D.C., Nov. 1994.

Fields, Scott, "Hunting for Wasted Computing Power: New Software for Computing Networks Puts Idle PC's to Work," Univ. of Wisconsin- Madison 1993 p. 1-8.

Litzkow et al., "Condor—A Hunter of Idle Workstations," IEEE (1 988) p. 104-111.

Gregory Wilson, The History of the Development of Parallel Computing http://ei.cs.vt.edu/-history/Parallel.html, p. 1-38.

Marsha Jovanovic and Kimberly Claffy, Computational Science: Advances Through Collaboration "Network Behavior" San Diego Supercomputer Center 1993 Science Report, p. 1-11 [http://www.sdsc.edu/Publications/SR93/network_behavior.html].

National Science Foundation (NSF) [www.itrd.gov/pubs/blue94/section.4.2.html] 1994.

Intel Corporation, "Paragon User's Guide" (Oct. 1993).

Turcotte, Louis H., "A Survey of Software Environments for Exploiting Networked Computing Resources" Engineering Research Center for Computational Field Simulation Jun. 11, 1993, p. 1-150.

Patterson, Barbara, "Motorola Announces First High Performance Single Board Computer Using Superscalar Chip" Motorola Computer Group, p. 1-3 [http://badabada.org/misc/mvme197_announce.txt].

Culler, David E., et al., "Analysis Of Multithreaded Microprocessors Under Multiprogramming", Report No. UCBICSD 921687, May 1992 p. 1-17.

James Laudon et al., "Architectural And Implementation Tradeoffs In The Design Of Multiple-Context Processors", CSL-TR-92-523, May 1992 p. 1-24.

Ide, et al., "A 320-MFLOPS CMOS Floating-point Processing Unit for Superscalar Processors," 28 IEEE Custom Integrated Circuits Conference, 1992, p. 30.2.1-30.2.4.

High Speed DRAMs, Special Report, IEEE Spectrum, vol. 29, No. 10, Oct. 1992.

Moyer, Steven A., "Access Ordering Algorithms for a Multicopy Memory," IPC-TR-92-0 1 3, Dec. 18, 1992.

Moyer, Steven A., "Access Ordering and Effective Memory Bandwidth," Ph.D. dissertation, University of Virginia, Apr. 5, 1993.

"Hardware Support for Dynamic Access Ordering: Performance of Some Design Options", Sally McKee, Computer Science Report No. CS-93-08, Aug. 9, 1993.

McGee et al., "Design of a Processor Bus Interface ASIC for the Stream Memory Controller" p. 462-465.

McKee et al., "Experimental Implementation of Dynamic Access Ordering ," Aug. 1, 1993, p. 1-10.

McKee et al., Increasing Memory Bandwidth for Vector Computations, Technical Report CS-93-34 Aug. 1, 1993, p. 1-18.

Sally A. McKee et al., "Access Order and Memory-Conscious Cache Utilization" Computer Science Report No. CS-94- 10, Mar. 1 1994, p. 1-17.

McKee, et. al., "Bounds on Memory Bandwidth in Streamed Computations," Computer Science Report CS-95-32, Mar. 1, 1995.

McKee, Sally A., "Maximizing Memory Bandwidth for Streamed Computations," A Dissertation Presented to the Faculty of the School of Engineering and Applied Science at the University of Virginia, May 1995.

A Systematic Approach to Optimizing and Verifying Synthesized High-Speed ASICs, Trevor Landon, et. Al. , Computer Science Report No. CS-95-51, Dec. 11, 1995.

"Control Data *6400/6500/ 6600* Computer Systems Reference Manuals" 1969 available at http:/led-thelen.org/comp-hist/CDC-6600-R-M.html ("CDC 6600 Manuals").

"Where now for Media processors?", Nick Flaherty, Electronics Times, Aug. 24, 1998.

George H. Barnes et al., The ILLIAC IV Computer[1] , [1]IEEE Trans., C-17 vol. 8, pp. 746-757, Aug. 1968.

J.E. Thornton, Design of a Computer—The Control Data *6600* (1970).

Gerry Kane, PA-RISC 2.0 Architecture, Chp. 6 Instruction Set Overview, Prentice Hall isbn 0-13-182734-0, p. 6-1-6-26.

Cosoroaba, A.B., "Synchronous DRAM products revolutionize memory system design," Fujitsu Microelectronics, Southcod95 May 709 1995 .

Intel 450KX/GX PCIset, Inetel Corporation, 1996.

Baland, Granito, Marcotte, Messina, Smith, "The IBM System 1360 Model 91 : Storage System" IBM System Journal, January, 1967, pp. 54-68.

U.S. Appl. No. 08/340,740, filed Nov. 16, 1994.

U.S. Appl. No. 07/663,314, filed Mar. 1, 1991.

S.S. Reddi et. al. "A Conceptual Framework for Computer Architecture" Computing Surveys,. vol. 8, No. 2, Jun. 1976.

Yulun Wang, et al, The 3DP: A processor Architecture for Three-Dimensional Applications, Jan. 1992, p. 25-36.

"IEEE Draft Standard for High-Bandwidth Memory Interface Based on SCI Signaling Technology (RamLink)", 1995, pp. 1-104, IEEE.

Gerry Kane and Joe Heinrich, "MIPS RISC Architecture" 1992, Publisher: Prentice-Hall Inc., A Simon & Shuster Company, Upper Saddle River New Jersey.

Cathy May et al."The Power PC Architecture: A Specification For A New Family of Risc Processors" Second Edition May 1994, pp. 1-518, Morgan Kaufmann Publishers, Inc. San Francisco CA, IBM International Business Machines, Inc.

"IEEE Standard for Scalable Coherent Interface (SCI)", Published by the Institute of Electrical and Electronics Engineers, Inc. Aug. 2, 2003, pp. 1-248.

Don Tolmie and Don Flanagan, "HIPPI: It's Not Just for Supercomputers Anymore" Data Communications published May 8, 1995.

IEEE Draft Standard for "High-Bandwidth Memory Interface Based on SCI Signaling Technology (RamLink)", IEEE Standards Department, Draft 1.25 IEEE P1596.4-199X May 1995.

Joe Heinrich, "MIPS R4000 Microprocessor User's Manual Second Edition"1994 MIPS Technologies, Inc. pp. 1-754.

Litigation proceedings in the matter of *Microunity Systems Engineering, Inc.* v. *Dell, Inc.* et al., Corrected Preliminary Invalidity Contentions and Exhibits, filed Jan. 12, 2005, Civil Action No. 2:04-CV-120(TJW), U.S. District Court for the Eastern District of Texas Marshall Division.

Ang, StarT Next Generation: Integrating Global Caches and Dataflow Architecture, Proceedings of the ISCA 1992.

Saturn Architecture Specification, published Apr. 29, 1993.

C4/XA Architecture Overview, Convex Technical Marketing presentation dated Nov. 11, 1993 and Feb. 4, 1994.

Convex 3400 Supercomputer System Overview, published Jul. 24, 1991.

Giloi, Parallel Programming Models and Their Interdependence with Parallel Architectures, IEEE Proceedings published Sep. 1993.

PCT International Search Report and Written Opinion dated Mar. 11, 2005, corresponding to PCT/US04/22126.

Supplementary European Search Report dated Mar. 18, 2005, corresponding to Application No. 96928129.4.

Jun. 27, 2007 Declaration of Richard A. Belgard in Support of MicroUnity's Claim Construction, with Exhibits A-C (MU's Supporting Evidence - Reference #7 - for Joint Claim Construction (PR 4-3 Disclosures)) (MicroUnity Systems Engineering, Inc. v. Sony Entertainment America, Inc., 2:05-cv-505, U.S.D.C., E.D. Texas, Marshall Division).

Jun. 29, 2007 Joint Motion to Dismiss Claims Regarding U.S. Patent No. 5,630,096 (MicroUnity Systems Engineering, Inc. v. Sony Computer Entertainment America, Inc., 2:05-cv-505, U.S.D. C., E.D. texas, Marshall Division).

Jul. 5, 2007 Order Granting Joint Motion to Dismiss Claims Regarding U.S. Patent No. 5,630,096 (MicroUnity Systems Engineering, Inc. v. Sony Computer Entertainment America, Inc., 2:05-cv-505, U.S.D.C., E.D. Texas, Marshall Division).

Jul. 11, 2007 SCEA's Second Amended Answer, Affirmative Defenses, and Counterclaims to MicroUnity's First Amended Complaint (MicroUnity Systems Engineering, Inc. v. Sony Computer Entertainment America, Inc., 2:05-cv-505, U.S.D.C., E.D. Texas, Marshall Division).

Jul. 11, 2007 P.R. 4-3 Joint Claim Construction Statement (MicroUnity Systems Engineering, Inc. v. Sony Computer Entertainment America, Inc., 2:05-cv-505, U.S.D.C., E.D. Texas, Marshall Division).

Jul. 11, 2007 P.R. 4-3 Joint Claim Construction Statement - SCEA's Supporting Evidence - Reference #1: Definitions of "finite group" and "ring", McGraw-Hill dictionary of Scientific and Technical Terms, 5th ed. (McGraw-Hill, Inc. 1994), pp. 757 and 1716 (SCEA-1723177-180) (MicroUnity Systems Engineering, Inc. v. Sony Computer Entertainment America, Inc., 2:05-cv-505, U.S.D.C., E.D. Texas, Marshall Division).

Jul. 11, 2007 P.R. 4-3 Joint Claim Construction Statement - MU's Supporting Evidence - Reference #1: Aug. 26, 2005 Memo and Order re Claim Construction (*Markman*ruling) in *MicroUnity Systems Engineering, Inc. v. Dell, Inc. and Intel Corporation*, No. 2-04 CV-120 (U.S.D.C., E.D. Tex.) (MicroUnity Systems Engineering, Inc. v. Sony Computer Entertainment America, Inc., 2:05-cv-505, U.S.D.C., E.D. Texas, Marshall Division).

Jul. 11, 2007 P.R. 4-3 Joint Claim Construction Statement - MU's Supporting Evidence - Reference #2: Definitions of "excution" and "general purpose computer", The IEEE Standard Dictionary of Electrical and Electronics Terms, 6th ed. (IEEE 1996), pp. 379, 451 and 1232 (MicroUnity Systems Engineering, Inc. v. Sony Entertainment America, Inc., 2:05-cv-505, U.S.D.C., E.D. Texas, Marshall Division.

Jul. 11, 2007 P.R. 4-3 Joint Claim Construction Statement - MU's Supporting Evidence - Reference #3: Definition of "execution", Modern Dictionary of Electronics, 6th revised and updated (Newnes/

Butterworth-Heinemann 1997), p. 355 (MicroUnity Systems engineering, Inc. v. Sony Computer Entertainment America, inc., 2:05-cv-505, U.S.D.C., E.D. Texas, Marshall Division).

Jul. 11, 2007 P.R. 4-3 Joint Claim Construction Statement - MU's Supporting Evidence - Reference #4: Definition of "unique", Merriam-Webster Online Dictionary 2005, http://www.m-w.com (Jul. 19, 2007) (MicroUnity Systems Engineering, Inc. v. Sony Computer Entertainment America, Inc., 2:05-cv-505, U.S.D.C., E.D. Texas, Marshall Division.

Jul. 11, 2007 P.R. 4-3 Joint Claim Construction Statement - MU's Supporting Evidence - Reference #5: Mar. 9, 2005 Joint Claim Construction and Prehearing Statement in *MicroUnity Engineering Systems, Inc. v. Dell, Inc. and Intel Corporation*, No. 2-04-CV-120 (U.S.D.C., E.D. Texas) (MicroUnity Systems Engineering, Inc. v. Sony Computer Entertainment America, inc., 2:05-cv-505, U.S.D.C., E.D. Texas, Marshall Division).

Jul. 11, 2007P.R. 4-3 Joint Claim Construction Statement - MU's Supporting Evidence - Reference #6: Rudolf Lidl & Harald Niederreiter, *Introduction to Finite Fields and Their Applications*(1994), pp. 2-19 (MicroUnity Systems Engineering, Inc. v. Sony Computer Entertainment America, Inc., 2:05-cv-505, U.S.D.C., E.D. Texas, Marshall Division).

Jul. 16, 2007 Joint Motion to Dismiss Claims regarding U.S. Patent No. 5,867,735 (MicroUnity Systems Engineering, Inc. v. Sony Computer Entertainment America, Inc., 2:05-cv-505, U.S.D.C., E.D. Texas, Marshall Division).

Jul. 19, 2007 Order Granting Joint Motion to Dismiss Claims Regarding U.S. Patent No. 5,867,735 ( MicroUnity Systems Engineering, Inc. v. Sony Computer Entertainment America, Inc., 2:05-cv-505, U.S.D.C., E.D. Texas, Marshall Division).

Jul. 25, 2007 MU's Answer to SCEA's Second Amended Counterclaim in Response to MU's First Amended Complaint (MicroUnity Systems Engineering, Inc. v. Sony Computer Entertainment America, Inc., 2:05-cv-505, U.S.D.C., E.D. Texas, Marshall Division).

May 21, 2007 Motion For a Stay of Action Pending Reexamination by AMD (Attachments: #(1) Appendix A to Motion to Stay, #(2) Declaration of Michael Sapoznikow, #(3) Exhibits 1-9, #(4) Text of Proposed Order (MicroUnity Systems Engineering, Inc. v. Advanced Micro Devices, Inc., 2:06-cv-486, U.S.D.C., E.D. Texas, Marshall Division).

Jun. 8, 2007 MicroUnity's Opposition to Defendant's Motion for a Stay of Action Pending Reexamination and Declaration of Stuart Bartow (Attachments: Exhibits 1 & 2) (MicroUnity Systems Engineering, Inc. v. Advanced Micro Devices, Inc., 2:06-cv-486, U.S.D.C., E.D. Texas, Marshall Division).

Jun. 18, 2007 AMD's Reply Memorandum in Support of Motion For a Stay of Action Pending Reexamination (MicroUnity Systems Engineering, Inc. v. Advanced Micro Devices, Inc., 2:06-cv-486, U.S.D.C., E.D. Texas, Marshall Division).

Order Granting Agreed Motion to Enter the Stipulation of the Parties Concerning Modificationto the Docket Control Order and Agreed Motion ot Allow the Plaintiff to Amend its Orginal Complaint (Dismissals with Prejudice) (MicroUnity Systems Engineering, Inc. v. Advanced Micro Devices, Inc., 2:06-cv-486, U.S.D.C., E.D. Texas, Marshall Division).

\* cited by examiner

☐ wmc.c contents
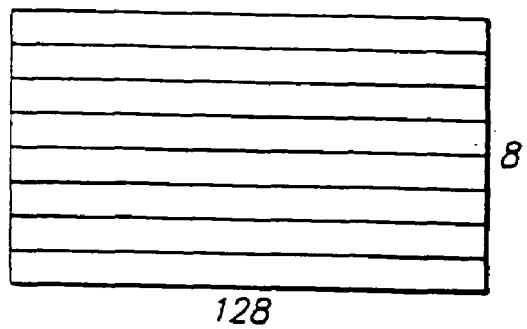
128 8
☐ wmc.pa-physical address
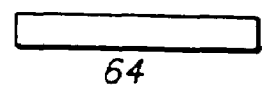
64
☐ wmc.size-size of contents
10
☐ wmc.cv-contents valid
1
☐ wmc.th-thread last used
2
☐ wmc.reg-register last used
6
☐ wmc.rtv-register & thread valid
1
FIG. 9

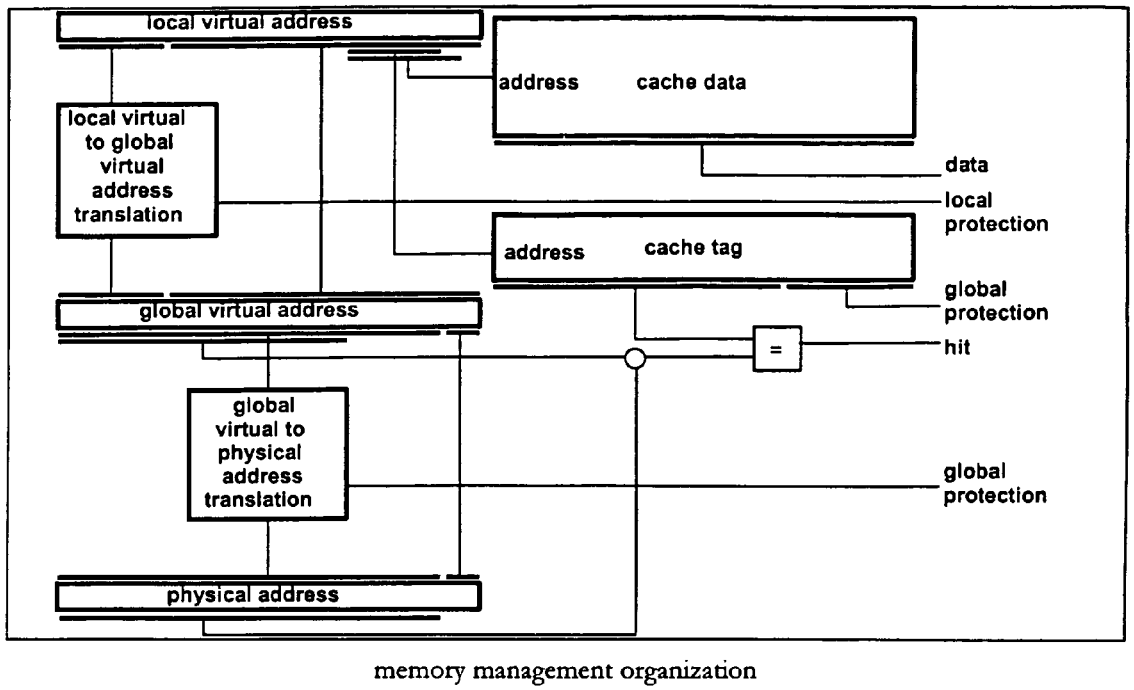
memory management organization
Fig. 14
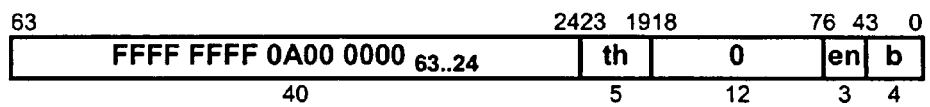
Fig. 15
```
def data,flags ← AccessPhysicalLTB(pa,op,wdata) as
    th ← pa_{23..19}
    en ← pa_{6..4}
    if (en < (1 || 0^{LE})) and (th < T) and (pa_{18..6}=0) then
        case op of
            R:
                data ← 0^{64} || LTBArray[th][en]
            W:
                LocalTB[th][en] ← wdata_{63..0}
        endcase
    else
        data ← 0
    endif
enddef
```
Fig. 16

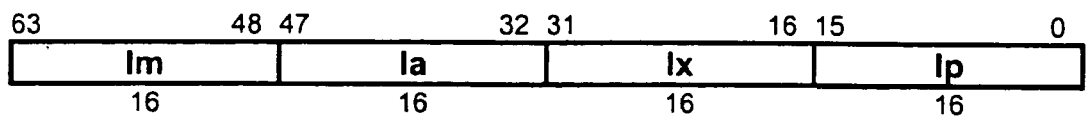
Fig. 17
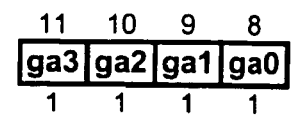
Fig. 18
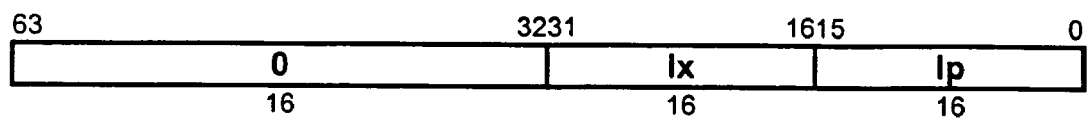
Fig. 19
Fig. 20
lp0: 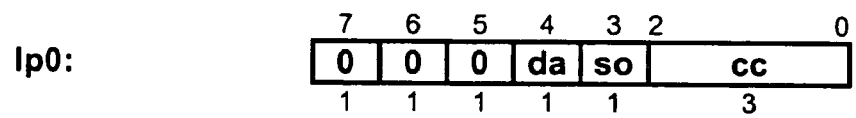
lp1: 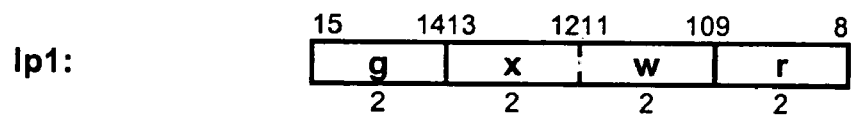
Fig. 21

```
def ga,LocalProtect ← LocalTranslation(th,ba,la,pl) as
    if LB & (ba63..48 ⊙ la63..48) then
        raise AccessDisallowedByVirtualAddress
    endif
    me ← NONE
    for i ← 0 to (1 || 0^LE)-1
        if (la63..48 & ~LocalTB[th][i]63..48) = LocalTB[th][i]47..32 then
            me ← i
        endif
    endfor
    if me = NONE then
        if ~ControlRegister_pl+8 then
            raise LocalTBMiss
        endif
        ga ← la
        LocalProtect ← 0
    else
        ga ← (va63..48 ^ LocalTB[th][me]31..16) || va47..0
        LocalProtect ← LocalTB[th][me]15..0
    endif
enddef
```

Fig. 22

| 63 | | 2423 | 1918 | | 43 0 |
|---|---|---|---|---|---|
| FFFF FFFF 0C00 0000 $_{63..24}$ | | th | en | | b |
| 40 | | 5 | 15 | | 4 |

Fig. 23

```
def data,flags ← AccessPhysicalGTB(pa,op,wdata) as
    th ← pa23..19+GT || 0^GT
    en ← pa18..4
    if (en < (1 || 0^G)) and (th < T) and (pa18+GT..19 = 0) then
        case op of
            R:
                data ← GTBArray[th5..GT][en]
            W:
                GTBArray[th5..GT][en] ← wdata
        endcase
    else
        data ← 0
    endif
enddef
```

Fig. 24

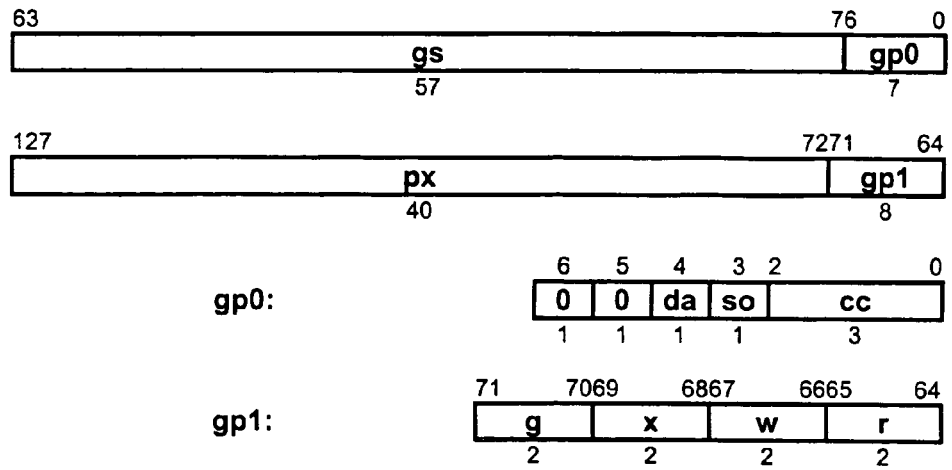

Fig. 25

```
def pa,GlobalProtect ← GlobalAddressTranslation(th,ga,pl,lda) as
    me ← NONE
    for i ← 0 to (1 || 0^G) −1
        if GlobalTB[th_5..GT][i] ≠ 0 then
            size ← (GlobalTB[th_5..GT][i]_63..7 and (0^64-GlobalTB(th_5..GT][i]_63..7)) || 0^8
            if ((ga_63..8||0^8) ^ (GlobalTB[th_5..GT][i]_63..8||0^8)) and (0^64-size)) = 0 then
                me ← GlobalTB[th_5..GT][i]
            endif
        endif
    endfor
    if me = NONE then
        if lda then
            PerformAccessDetail(AccessDetailRequiredByLocalTB)
        endif
        raise GlobalTBMiss
    else
        pa ← (ga_63..8 ^ GlobalTB[th_5..GT][me]_127..72) || ga_7..0
        GlobalProtect ← GlobalTB[th_5..GT][me]_71..64 || 0^1 || GlobalTB[th_5..GT][me]_6..0
    endif
enddef
```

Fig. 26

```
def GTBUpdateWrite(th,fill,data) as
    me ← NONE
    for i ← 0 to (1 || 0^G) -1
        size ← (GlobalTB[th_5..GT][i]_63..7 and (0^64-GlobalTB(th_5..GT)[i]_63..7)) || 0^8
        if ((data_63..8||0^8) ^ (GlobalTB[th_5..GT][i]_63..8||0^8)) and (0^64-size) = 0 then
            me ← i
        endif
    endfor
    if me = NONE then
        if fill then
            GlobalTB[th_5..GT][GTBLast[th_5..GT]] ← data
            GTBLast[th_5..GT] ← (GTBLast[th_5..GT] + 1)_G-1..0
            if GTBLast[th_5..GT] = 0 then
                GTBLast[th_5..GT] ← GTBFirst[th_5..GT]
                GTBBump[th_5..GT] ← 1
            endif
        endif
    else
        GlobalTB[th_5..GT][me] ← data
    endif
enddef
```

Fig. 27

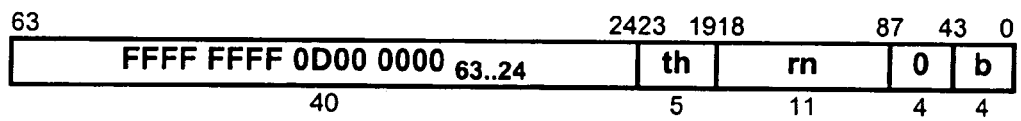

Fig. 28

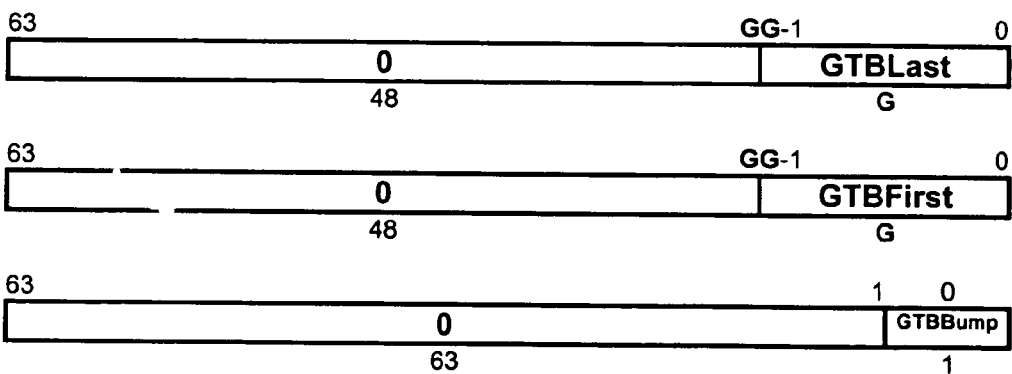

Fig. 29

```
def data,flags ← AccessPhysicalGTBRegisters(pa,op,wdata) as
    th ← pa_{23..19+GT} || 0^{GT}
    rn ← pa_{18..8}
    if (rn < 5) and (th < T) and (pa_{18+GT..19} = 0) and (pa_{7..4} = 0) then
        case rn || op of
            0 || R, 1 || R:
                data ← 0
            0 || W, 1 || W:
                GTBUpdateWrite(th,rn_0,wdata)
            2 || R:
                data ← 0^{64-G} || GTBLast[th_{5..GT}]
            2 || W:
                GTBLast[th_{5..GT}] ← wdata_{G-1..0}
            3 || R:
                data ← 0^{64-G} || GTBFirst[th_{5..GT}]
            3 || W:
                GTBFirst[th_{5..GT}] ← wdata_{G-1..0}
            3 || R:
                data ← 0^{63} || GTBBump[th_{5..GT}]
            3 || W:
                GTBBump[th_{5..GT}] ← wdata_0
        endcase
    else
        data ← 0
    endif
enddef
```

Fig. 30

| G.BOOLEAN | Group Boolean |

Equivalencies

| G.AAA | Group three-way and |
|---|---|
| G.AAA.1 | Group add add add bits |
| G.AAS.1 | Group add add subtract bits |
| G.ADD.1 | Group add bits |
| G.AND | Group and |
| G.ANDN | Group and not |
| G.COPY | Group copy |
| G.NAAA | Group three-way nand |
| G.NAND | Group nand |
| G.NOOO | Group three-way nor |
| G.NOR | Group nor |
| G.NOT | Group not |
| G.NXXX | Group three-way exclusive-nor |
| G.OOO | Group three-way or |
| G.OR | Group or |
| G.ORN | Group or not |
| G.SAA.1 | Group subtract add add bits |
| G.SAS.1 | Group subtract add subtract bits |
| G.SET | Group set |
| G.SET.AND.E.1 | Group set and equal zero bits |
| G.SET.AND.NE.1 | Group set and not equal zero bits |
| G.SET.E.1 | Group set equal bits |
| G.SET.G.1 | Group set greater signed bits |
| G.SET.G.U.1 | Group set greater unsigned bits |
| G.SET.G.Z.1 | Group set greater zero signed bits |
| G.SET.GE.1 | Group set greater equal signed bits |
| G.SET.GE.Z.1 | Group set greater equal zero signed bits |
| G.SET.L.1 | Group set less signed bits |
| G.SET.L.Z.1 | Group set less zero signed bits |
| G.SET.LE.1 | Group set less equal signed bits |
| G.SET.LE.U.1 | Group set less equal unsigned bits |
| G.SET.LE.Z.1 | Group set less equal zero signed bits |
| G.SET.NE.1 | Group set not equal bits |
| G.SET.GE.U.1 | Group set greater equal unsigned bits |
| G.SET.L.U.1 | Group set less unsigned bits |

Fig. 31A

| | |
|---|---|
| G.SSA.1 | Group subtract subtract add bits |
| G.SSS.1 | Group subtract subtract subtract bits |
| G.SUB.1 | Group subtract bits |
| G.XNOR | Group exclusive-nor |
| G.XOR | Group exclusive-or |
| G.XXX | Group three-way exclusive-or |
| G.ZERO | Group zero |

| | | |
|---|---|---|
| G.AAA rd@rc,rb | ← | G.BOOLEAN rd@rc,rb,0b10000000 |
| G.AAA.1 rd@rc,rb | → | G.XXX rd@rc,rb |
| G.AAS.1 rd@rc,rb | → | G.XXX rd@rc,rb |
| G.ADD.1 rd=rc,rb | → | G.XOR rd=rc,rb |
| G.AND rd=rc,rb | ← | G.BOOLEAN rd@rc,rb,0b10001000 |
| G.ANDN rd=rc,rb | ← | G.BOOLEAN rd@rc,rb,0b01000100 |
| G.BOOLEAN rd@rb,rc,i | → | G.BOOLEAN rd@rc,rb,$i_7 i_5 i_6 i_4 i_3 i_1 i_2 i_0$ |
| G.COPY rd=rc | ← | G.BOOLEAN rd@rc,rc,0b10001000 |
| G.NAAA. rd@rc,rb | ← | G.BOOLEAN rd@rc,rb,0b01111111 |
| G.NAND rd=rc,rb | ← | G.BOOLEAN rd@rc,rb,0b01110111 |
| G.NOOO rd@rc,rb | ← | G.BOOLEAN rd@rc,rb,0b00000001 |
| G.NOR rd=rc,rb | ← | G.BOOLEAN rd@rc,rb,0b00010001 |
| G.NOT rd=rc | ← | G.BOOLEAN rd@rc,rc,0b00010001 |
| G.NXXX rd@rc,rb | ← | G.BOOLEAN rd@rc,rb,0b01101001 |
| G.OOO rd@rc,rb | ← | G.BOOLEAN rd@rc,rb,0b11111110 |
| G.OR rd=rc,rb | ← | G.BOOLEAN rd@rc,rb,0b11101110 |
| G.ORN rd=rc,rb | ← | G.BOOLEAN rd@rc,rb,0b11011101 |
| G.SAA.1 rd@rc,rb | → | G.XXX rd@rc,rb |
| G.SAS.1 rd@rc,rb | → | G.XXX rd@rc,rb |
| G.SET rd | ← | G.BOOLEAN rd@rd,rd,0b10000001 |
| G.SET.AND.E.1 rd=rb,rc | → | G.NAND rd=rc,rb |
| G.SET.AND.NE.1 rd=rb,rc | → | G.AND rd=rc,rb |
| G.SET.E.1 rd=rb,rc | → | G.XNOR rd=rc,rb |
| G.SET.G.1 rd=rb,rc | → | G.ANDN rd=rc,rb |
| G.SET.G.U.1 rd=rb,rc | → | G.ANDN rd=rb,rc |
| G.SET.G.Z.1 rd=rc | → | G.ZERO rd |
| G.SET.GE.1 rd=rb,rc | → | G.ORN rd=rc,rb |
| G.SET.GE.Z.1 rd=rc | → | G.NOT rd=rc |

Fig. 31A (cont'd)

| | | |
|---|---|---|
| G.SET.L.1 rd=rb,rc | → | G.ANDN rd=rb,rc |
| G.SET.L.Z.1 rd=rc | → | G.COPY rd=rc |
| G.SET.LE.1 rd=rb,rc | → | G.ORN rd=rb,rc |
| G.SET.LE.U.1 rd=rb,rc | → | G.ORN rd=rc,rb |
| G.SET.LE.Z.1 rd=rc | → | G.SET rd |
| G.SET.NE.1 rd=rb,rc | → | G.XOR rd=rc,rb |
| G.SET.GE.U.1 rd=rb,rc | → | G.ORN rd=rb,rc |
| G.SET.L.U.1 rd=rb,rc | → | G.ANDN rd=rc,rb |
| G.SSA.1 rd@rc,rb | → | G.XXX rd@rc,rb |
| G.SSS.1 rd@rc,rb | → | G.XXX rd@rc,rb |
| G.SUB.1 rd=rc,rb | → | G.XOR rd=rc,rb |
| G.XNOR rd=rc,rb | ← | G.BOOLEAN rd@rc,rb,0b10011001 |
| G.XOR rd=rc,rb | ← | G.BOOLEAN rd@rc,rb,0b01100110 |
| G.XXX rd@rc,rb | ← | G.BOOLEAN rd@rc,rb,0b10010110 |
| G.ZERO rd | ← | G.BOOLEAN rd@rd,rd,0b00000000 |

Selection

| operation | function (binary) | function (decimal) |
|---|---|---|
| d | 11110000 | 240 |
| c | 11001100 | 204 |
| b | 10101010 | 176 |
| d&c&b | 10000000 | 128 |
| (d&c)|b | 11101010 | 234 |
| d|c|b | 11111110 | 254 |
| d?c:b | 11001010 | 202 |
| d^c^b | 10010110 | 150 |
| ~d^c^b | 01101001 | 105 |
| 0 | 00000000 | 0 |

Fig. 31A (cont'd)

Format

G.BOOLEAN rd@trc,trb,f rd=gbooleani(rd,rc,rb,f)

| 31 | 25 24 | 23 | 18 17 | 12 11 | 6 5 | 0 |
|---|---|---|---|---|---|---|
| G.BOOLEAN | ih | rd | rc | rb | il |
| 7 | 1 | 6 | 6 | 6 | 6 | if $f_6=f_5$ then
    if $f_2=f_1$ then
        if $f_2$ then
            rc ← max(trc,trb)
            rb ← min(trc,trb)
        else
            rc ← min(trc,trb)
            rb ← max(trc,trb)
        endif
        ih ← 0
        il ← 0 || $f_6$ || $f_7$ || $f_4$ || $f_3$ || $f_0$
    else
        if $f_2$ then
            rc ← trb
            rb ← trc
        else
            rc ← trc
            rb ← trb
        endif
        ih ← 0
        il ← 1 || $f_6$ || $f_7$ || $f_4$ || $f_3$ || $f_0$
    endif
else
    ih ← 1
    if $f_6$ then
        rc ← trb
        rb ← trc
        il ← $f_1$ || $f_2$ || $f_7$ || $f_4$ || $f_3$ || $f_0$
    else
        rc ← trc
        rb ← trb
        il ← $f_2$ || $f_1$ || $f_7$ || $f_4$ || $f_3$ || $f_0$
    endif
endif

Fig. 31B

Definition def GroupBoolean (ih,rd,rc,rb,il)
    d ← RegRead(rd, 128)
    c ← RegRead(rc, 128)
    b ← RegRead(rb, 128)
    if ih=0 then
        if $il_5$=0 then
            f ← $il_3 \parallel il_4 \parallel il_4 \parallel il_2 \parallel il_1 \parallel (rc>rb)^2 \parallel il_0$
        else
            f ← $il_3 \parallel il_4 \parallel il_4 \parallel il_2 \parallel il_1 \parallel 0 \parallel 1 \parallel il_0$
        endif
    else
        f ← $il_3 \parallel 0 \parallel 1 \parallel il_2 \parallel il_1 \parallel il_5 \parallel il_4 \parallel il_0$
    endif
    for i ← 0 to 127 by size
        $a_i$ ← $f_{(d_i \parallel c_i \parallel b_i)}$
    endfor
    RegWrite(rd, 128, a)
enddef

Exceptions
none

Fig. 31C

Operation codes

| G.MUX | Group multiplex |
|---|---|

Redundancies

| G.MUX ra=rd,rc,rc | ⇔ | G.COPY ra=rc |
|---|---|---|
| G.MUX ra=ra,rc,rb | ⇔ | G.BOOLEAN ra@rc,rb,0x11001010 |
| G.MUX ra=rd,ra,rb | ⇔ | G.BOOLEAN ra@rd,rb,0x11100010 |
| G.MUX ra=rd,rc,ra | ⇔ | G.BOOLEAN ra@rd,rc,0x11011000 |
| G.MUX ra=rd,rd,rb | ⇔ | G.OR ra=rd,rb |
| G.MUX ra=rd,rc,rd | ⇔ | G.AND ra=rd,rc |

Format

G.MUX    ra=rd,rc,rb ra=gmux(rd,rc,rb)

| 31 | 24 23 | 18 17 | 12 11 | 6 5 | 0 |
|---|---|---|---|---|---|
| G.MUX | rd | rc | rb | ra | |
| 8 | 6 | 6 | 6 | 6 | |

Fig. 31D

Definition

```
def GroupTernary(op,size,rd,rc,rb,ra) as
     d ← RegRead(rd, 128)
     c ← RegRead(rc, 128)
     b ← RegRead(rb, 128)
     case op of
          G.MUX:
                a ← (c and d) or (b and not d)
     endcase
     RegWrite(ra, 128, a)
enddef
```

Exceptions none

Fig. 31 E

| | |
|---|---|
| G.ADD.8 | Group add bytes |
| G.ADD.16 | Group add doublets |
| G.ADD.32 | Group add quadlets |
| G.ADD.64 | Group add octlets |
| G.ADD.128 | Group add hexlet |
| G.ADD.L.8 | Group add limit signed bytes |
| G.ADD.L.16 | Group add limit signed doublets |
| G.ADD.L.32 | Group add limit signed quadlets |
| G.ADD.L.64 | Group add limit signed octlets |
| G.ADD.L.128 | Group add limit signed hexlet |
| G.ADD.L.U.8 | Group add limit unsigned bytes |
| G.ADD.L.U.16 | Group add limit unsigned doublets |
| G.ADD.L.U.32 | Group add limit unsigned quadlets |
| G.ADD.L.U.64 | Group add limit unsigned octlets |
| G.ADD.L.U.128 | Group add limit unsigned hexlet |
| G.ADD.8.O | Group add signed bytes check overflow |
| G.ADD.16.O | Group add signed doublets check overflow |
| G.ADD.32.O | Group add signed quadlets check overflow |
| G.ADD.64.O | Group add signed octlets check overflow |
| G.ADD.128.O | Group add signed hexlet check overflow |
| G.ADD.U.8.O | Group add unsigned bytes check overflow |
| G.ADD.U.16.O | Group add unsigned doublets check overflow |
| G.ADD.U.32.O | Group add unsigned quadlets check overflow |
| G.ADD.U.64.O | Group add unsigned octlets check overflow |
| G.ADD.U.128.O | Group add unsigned hexlet check overflow |

Fig. 32A

Format

G.op.size     rd=rc,rb rd=gopsize(rc,rb)

Definition

```
def Group(op,size,rd,rc,rb)
    c ← RegRead(rc, 128)
    b ← RegRead(rb, 128)
    case op of
        G.ADD:
            for i ← 0 to 128-size by size
                a_{i+size-1..i} ← c_{i+size-1..i} + b_{i+size-1..i}
            endfor
        G.ADD.L:
            for i ← 0 to 128-size by size
                t ← (c_{i+size-1} || c_{i+size-1..i}) + (b_{i+size-1} || b_{i+size-1..i})
                a_{i+size-1..i} ← (t_size ≠ t_{size-1}) ? (t_size || t_{size-1}^{size-1}) : t_{size-1..0}
            endfor
        G.ADD.L.U:
            for i ← 0 to 128-size by size
                t ← (0^1 || c_{i+size-1..i}) + (0^1 || b_{i+size-1..i})
                a_{i+size-1..i} ← (t_size ≠ 0) ? (1^{size}) : t_{size-1..0}
            endfor
        G.ADD.O:
            for i ← 0 to 128-size by size
                t ← (c_{i+size-1} || c_{i+size-1..i}) + (b_{i+size-1} || b_{i+size-1..i})
                if t_size ≠ t_{size-1} then
                    raise FixedPointArithmetic
                endif
                a_{i+size-1..i} ← t_{size-1..0}
            endfor
        G.ADD.U.O:
            for i ← 0 to 128-size by size
                t ← (0^1 || c_{i+size-1..i}) + (0^1 || b_{i+size-1..i})
                if t_size ≠ 0 then
                    raise FixedPointArithmetic
                endif
                a_{i+size-1..i} ← t_{size-1..0}
            endfor
    endcase
    RegWrite(rd, 128, a)
enddef
```

Exceptions

Fixed-point arithmetic

Fig. 32C

Operation codes

| | |
|---|---|
| G.SET.AND.E.8 | Group set and equal zero bytes |
| G.SET.AND.E.16 | Group set and equal zero doublets |
| G.SET.AND.E.32 | Group set and equal zero quadlets |
| G.SET.AND.E.64 | Group set and equal zero octlets |
| G.SET.AND.E.128 | Group set and equal zero hexlet |
| G.SET.AND.NE.8 | Group set and not equal zero bytes |
| G.SET.AND.NE.16 | Group set and not equal zero doublets |
| G.SET.AND.NE.32 | Group set and not equal zero quadlets |
| G.SET.AND.NE.64 | Group set and not equal zero octlets |
| G.SET.AND.NE.128 | Group set and not equal zero hexlet |
| G.SET.E.8 | Group set equal bytes |
| G.SET.E.16 | Group set equal doublets |
| G.SET.E.32 | Group set equal quadlets |
| G.SET.E.64 | Group set equal octlets |
| G.SET.E.128 | Group set equal hexlet |
| G.SET.GE.8 | Group set greater equal signed bytes |
| G.SET.GE.16 | Group set greater equal signed doublets |
| G.SET.GE.32 | Group set greater equal signed quadlets |
| G.SET.GE.64 | Group set greater equal signed octlets |
| G.SET.GE.128 | Group set greater equal signed hexlet |
| G.SET.GE.U.8 | Group set greater equal unsigned bytes |
| G.SET.GE.U.16 | Group set greater equal unsigned doublets |
| G.SET.GE.U.32 | Group set greater equal unsigned quadlets |
| G.SET.GE.U.64 | Group set greater equal unsigned octlets |
| G.SET.GE.U.128 | Group set greater equal unsigned hexlet |
| G.SET.L.8 | Group set signed less bytes |
| G.SET.L.16 | Group set signed less doublets |
| G.SET.L.32 | Group set signed less quadlets |
| G.SET.L.64 | Group set signed less octlets |
| G.SET.L.128 | Group set signed less hexlet |
| G.SET.L.U.8 | Group set less unsigned bytes |
| G.SET.L.U.16 | Group set less unsigned doublets |
| G.SET.L.U.32 | Group set less unsigned quadlets |
| G.SET.L.U.64 | Group set less unsigned octlets |
| G.SET.L.U.128 | Group set less unsigned hexlet |
| G.SET.NE.8 | Group set not equal bytes |
| G.SET.NE.16 | Group set not equal doublets |

Fig. 33A

| | |
|---|---|
| G.SET.NE.32 | Group set not equal quadlets |
| G.SET.NE.64 | Group set not equal octlets |
| G.SET.NE.128 | Group set not equal hexlet |
| G.SUB.8 | Group subtract bytes |
| G.SUB.8.O | Group subtract signed bytes check overflow |
| G.SUB.16 | Group subtract doublets |
| G.SUB.16.O | Group subtract signed doublets check overflow |
| G.SUB.32 | Group subtract quadlets |
| G.SUB.32.O | Group subtract signed quadlets check overflow |
| G.SUB.64 | Group subtract octlets |
| G.SUB.64.O | Group subtract signed octlets check overflow |
| G.SUB.128 | Group subtract hexlet |
| G.SUB.128.O | Group subtract signed hexlet check overflow |
| G.SUB.L.8 | Group subtract limit signed bytes |
| G.SUB.L.16 | Group subtract limit signed doublets |
| G.SUB.L.32 | Group subtract limit signed quadlets |
| G.SUB.L.64 | Group subtract limit signed octlets |
| G.SUB.L.128 | Group subtract limit signed hexlet |
| G.SUB.L.U.8 | Group subtract limit unsigned bytes |
| G.SUB.L.U.16 | Group subtract limit unsigned doublets |
| G.SUB.L.U.32 | Group subtract limit unsigned quadlets |
| G.SUB.L.U.64 | Group subtract limit unsigned octlets |
| G.SUB.L.U.128 | Group subtract limit unsigned hexlet |
| G.SUB.U.8.O | Group subtract unsigned bytes check overflow |
| G.SUB.U.16.O | Group subtract unsigned doublets check overflow |
| G.SUB.U.32.O | Group subtract unsigned quadlets check overflow |
| G.SUB.U.64.O | Group subtract unsigned octlets check overflow |
| G.SUB.U.128.O | Group subtract unsigned hexlet check overflow |

Fig. 33A (cont'd)

Equivalencies

| | |
|---|---|
| G.SET.E.Z.8 | Group set equal zero bytes |
| G.SET.E.Z.16 | Group set equal zero doublets |
| G.SET.E.Z.32 | Group set equal zero quadlets |
| G.SET.E.Z.64 | Group set equal zero octlets |
| G.SET.E.Z.128 | Group set equal zero hexlet |
| G.SET.G.Z.8 | Group set greater zero signed bytes |
| G.SET.G.Z.16 | Group set greater zero signed doublets |
| G.SET.G.Z.32 | Group set greater zero signed quadlets |
| G.SET.G.Z.64 | Group set greater zero signed octlets |
| G.SET.G.Z.128 | Group set greater zero signed hexlet |
| G.SET.GE.Z.8 | Group set greater equal zero signed bytes |
| G.SET.GE.Z.16 | Group set greater equal zero signed doublets |
| G.SET.GE.Z.32 | Group set greater equal zero signed quadlets |
| G.SET.GE.Z.64 | Group set greater equal zero signed octlets |
| G.SET.GE.Z.128 | Group set greater equal zero signed hexlet |
| G.SET.L.Z.8 | Group set less zero signed bytes |
| G.SET.L.Z.16 | Group set less zero signed doublets |
| G.SET.L.Z.32 | Group set less zero signed quadlets |
| G.SET.L.Z.64 | Group set less zero signed octlets |
| G.SET.L.Z.128 | Group set less zero signed hexlet |
| G.SET.LE.Z.8 | Group set less equal zero signed bytes |
| G.SET.LE.Z.16 | Group set less equal zero signed doublets |
| G.SET.LE.Z.32 | Group set less equal zero signed quadlets |
| G.SET.LE.Z.64 | Group set less equal zero signed octlets |
| G.SET.LE.Z.128 | Group set less equal zero signed hexlet |
| G.SET.NE.Z.8 | Group set not equal zero bytes |
| G.SET.NE.Z.16 | Group set not equal zero doublets |
| G.SET.NE.Z.32 | Group set not equal zero quadlets |
| G.SET.NE.Z.64 | Group set not equal zero octlets |
| G.SET.NE.Z.128 | Group set not equal zero hexlet |

Fig. 33A (cont'd)

| | |
|---|---|
| *G.SET.LE.8* | Group set less equal signed bytes |
| *G.SET.LE.16* | Group set less equal signed doublets |
| *G.SET.LE.32* | Group set less equal signed quadlets |
| *G.SET.LE.64* | Group set less equal signed octlets |
| *G.SET.LE.128* | Group set less equal signed hexlet |
| *G.SET.LE.U.8* | Group set less equal unsigned bytes |
| *G.SET.LE.U.16* | Group set less equal unsigned doublets |
| *G.SET.LE.U.32* | Group set less equal unsigned quadlets |
| *G.SET.LE.U.64* | Group set less equal unsigned octlets |
| *G.SET.LE.U.128* | Group set less equal unsigned hexlet |
| *G.SET.G.8* | Group set signed greater bytes |
| *G.SET.G.16* | Group set signed greater doublets |
| *G.SET.G.32* | Group set signed greater quadlets |
| *G.SET.G.64* | Group set signed greater octlets |
| *G.SET.G.128* | Group set signed greater hexlet |
| *G.SET.G.U.8* | Group set greater unsigned bytes |
| *G.SET.G.U.16* | Group set greater unsigned doublets |
| *G.SET.G.U.32* | Group set greater unsigned quadlets |
| *G.SET.G.U.64* | Group set greater unsigned octlets |
| *G.SET.G.U.128* | Group set greater unsigned hexlet |

| | | |
|---|---|---|
| *G.SET.E.Z.size rd=rc* | ← | G.SET.AND.E.size rd=rc,rc |
| *G.SET.G.Z.size rd=rc* | ⇐ | G.SET.L.U.size rd=rc,rc |
| *G.SET.GE.Z.size rd=rc* | ⇐ | G.SET.GE.size rd=rc,rc |
| *G.SET.L.Z.size rd=rc* | ⇐ | G.SET.L.size rd=rc,rc |
| *G.SET.LE.Z.size rd=rc* | ⇐ | G.SET.GE.U.size rd=rc,rc |
| *G.SET.NE.Z.size rd=rc* | ← | G.SET.AND.NE.size rd=rc,rc |
| *G.SET.G.size rd=rb,rc* | → | G.SET.L.size rd=rc,rb |
| *G.SET.G.U.size rd=rb,rc* | → | G.SET.L.U.size rd=rc,rb |
| *G.SET.LE.size rd=rb,rc* | → | G.SET.GE.size rd=rc,rb |
| *G.SET.LE.U.size rd=rb,rc* | → | G.SET.GE.U.size rd=rc,rb |

Fig. 33A (cont'd)

Format

G.op.size    rd=rb,rc rd=gopsize(rb,rc)

Definition

```
def GroupReversed(op,size,rd,rc,rb)
    c ← RegRead(rc, 128)
    b ← RegRead(rb, 128)
    case op of
        G.SUB:
            for i ← 0 to 128-size by size
                a_{i+size-1..i} ← b_{i+size-1..i} - c_{i+size-1..i}
            endfor
        G.SUB.L:
            for i ← 0 to 128-size by size
                t ← (b_{i+size-1} ∥ b_{i+size-1..i}) - (c_{i+size-1} ∥ c_{i+size-1..i})
                a_{i+size-1..i} ← (t_size ≠ t_{size-1}) ? (t_size ∥ t^{size-1}) : t_{size-1..0}
            endfor
        G.SUB.LU:
            for i ← 0 to 128-size by size
                t ← (0^1 ∥ b_{i+size-1..i}) - (0^1 ∥ c_{i+size-1..i})
                a_{i+size-1..i} ← (t_size ≠ 0) ? 0^{size} : t_{size-1..0}
            endfor
        G.SUB.O:
            for i ← 0 to 128-size by size
                t ← (b_{i+size-1} ∥ b_{i+size-1..i}) - (c_{i+size-1} ∥ c_{i+size-1..i})
                if (t_size ≠ t_{size-1}) then
                    raise FixedPointArithmetic
                endif
                a_{i+size-1..i} ← t_{size-1..0}
            endfor
        G.SUB.U.O:
            for i ← 0 to 128-size by size
                t ← (0^1 ∥ b_{i+size-1..i}) - (0^1 ∥ c_{i+size-1..i})
                if (t_size ≠ 0) then
                    raise FixedPointArithmetic
                endif
                a_{i+size-1..i} ← t_{size-1..0}
            endfor
        G.SET.E:
            for i ← 0 to 128-size by size
                a_{i+size-1..i} ← (b_{i+size-1..i} = c_{i+size-1..i})^{size}
            endfor
        G.SET.NE:
            for i ← 0 to 128-size by size
                a_{i+size-1..i} ← (b_{i+size-1..i} ≠ c_{i+size-1..i})^{size}
            endfor
        G.SET.AND.E:
            for i ← 0 to 128-size by size
                a_{i+size-1..i} ← ((b_{i+size-1..i} and c_{i+size-1..i}) = 0)^{size}
            endfor
```

Fig. 33C

G.SET.AND.NE:
    for i ← 0 to 128-size by size
        $a_{i+size-1..i}$ ← $((b_{i+size-1..i}$ and $c_{i+size-1..i}) \neq 0)^{size}$
    endfor
G.SET.L:
    for i ← 0 to 128-size by size
        $a_{i+size-1..i}$ ← $((rc = rb)$ ? $(b_{i+size-1..i} < 0)$ : $(b_{i+size-1..i} < c_{i+size-1..i}))^{size}$
    endfor
G.SET.GE:
    for i ← 0 to 128-size by size
        $a_{i+size-1..i}$ ← $((rc = rb)$ ? $(b_{i+size-1..i} \geq 0)$ : $(b_{i+size-1..i} \geq c_{i+size-1..i}))^{size}$
    endfor
G.SET.L.U:
    for i ← 0 to 128-size by size
        $a_{i+size-1..i}$ ← $((rc = rb)$ ? $(b_{i+size-1..i} > 0)$ :
            $((0 \parallel b_{i+size-1..i}) < (0 \parallel c_{i+size-1..i})))^{size}$
    endfor
G.SET.GE.U:
    for i ← 0 to 128-size by size
        $a_{i+size-1..i}$ ← $((rc = rb)$ ? $(b_{i+size-1..i} \leq 0)$ :
            $((0 \parallel b_{i+size-1..i}) \geq (0 \parallel c_{i+size-1..i})))^{size}$
    endfor
  endcase
  RegWrite(rd, 128, a)
enddef

Exceptions
Fixed-point arithmetic

Fig. 33C (cont'd)

| E.DIV.64 | Ensemble divide signed octlets |
|---|---|
| E.DIV.U.64 | Ensemble divide unsigned octlets |
| E.MUL.8 | Ensemble multiply signed bytes |
| E.MUL.16 | Ensemble multiply signed doublets |
| E.MUL.32 | Ensemble multiply signed quadlets |
| E.MUL.64 | Ensemble multiply signed octlets |
| E.MUL.SUM.8 | Ensemble multiply sum signed bytes |
| E.MUL.SUM.16 | Ensemble multiply sum signed doublets |
| E.MUL.SUM.32 | Ensemble multiply sum signed quadlets |
| E.MUL.SUM.64 | Ensemble multiply sum signed octlets |
| E.MUL.C.8 | Ensemble complex multiply bytes |
| E.MUL.C.16 | Ensemble complex multiply doublets |
| E.MUL.C.32 | Ensemble complex multiply quadlets |
| E.MUL.M.8 | Ensemble multiply mixed-signed bytes |
| E.MUL.M.16 | Ensemble multiply mixed-signed doublets |
| E.MUL.M.32 | Ensemble multiply mixed-signed quadlets |
| E.MUL.M.64 | Ensemble multiply mixed-signed octlets |
| E.MUL.P.8 | Ensemble multiply polynomial bytes |
| E.MUL.P.16 | Ensemble multiply polynomial doublets |
| E.MUL.P.32 | Ensemble multiply polynomial quadlets |
| E.MUL.P.64 | Ensemble multiply polynomial octlets |
| E.MUL.SUM.C.8 | Ensemble multiply sum complex bytes |
| E.MUL.SUM.C.16 | Ensemble multiply sum complex doublets |
| E.MUL.SUM.C.32 | Ensemble multiply sum complex quadlets |
| E.MUL.SUM.M.8 | Ensemble multiply sum mixed-signed bytes |
| E.MUL.SUM.M.16 | Ensemble multiply sum mixed-signed doublets |
| E.MUL.SUM.M.32 | Ensemble multiply sum mixed-signed quadlets |
| E.MUL.SUM.M.64 | Ensemble multiply sum mixed-signed octlets |
| E.MUL.SUM.U.8 | Ensemble multiply sum unsigned bytes |
| E.MUL.SUM.U.16 | Ensemble multiply sum unsigned doublets |
| E.MUL.SUM.U.32 | Ensemble multiply sum unsigned quadlets |
| E.MUL.SUM.U.64 | Ensemble multiply sum unsigned octlets |
| E.MUL.U.8 | Ensemble multiply unsigned bytes |
| E.MUL.U.16 | Ensemble multiply unsigned doublets |
| E.MUL.U.32 | Ensemble multiply unsigned quadlets |
| E.MUL.U.64 | Ensemble multiply unsigned octlets |

Fig. 34A

Format

E.op.size    rd=rc,rb rd=eopsize(rc,rb)

Definition def mul(size,h,vs,v,i,ws,w,j) as
    mul ← ((vs&$v_{size-1+i}$)$^{h-size}$ || $v_{size-1+i..i}$) * ((ws&$w_{size-1+j}$)$^{h-size}$ || $w_{size-1+j..j}$)
enddef def c ← PolyMultiply(size,a,b) as
    p[0] ← $0^{2*size}$
    for k ← 0 to size-1
        p[k+1] ← p[k] ^ $a_k$ ? ($0^{size-k}$ || b || $0^k$) : $0^{2*size}$
    endfor
    c ← p[size]
enddef def Ensemble(op,size,rd,rc,rb)
    c ← RegRead(rc, 128)
    b ← RegRead(rb, 128)
    case op of
        E.MUL:, E.MUL.C:, EMUL.SUM, E.MUL.SUM.C, E.CON, E.CON.C, E.DIV:
            cs ← bs ← 1
        E.MUL.M:, EMUL.SUM.M, E.CON.M:
            cs ← 0
            bs ← 1
        E.MUL.U:, EMUL.SUM.U, E.CON.U, E.DIV.U, E.MUL.P:
            cs ← bs ← 0
    endcase
    case op of
        E.MUL, E.MUL.U, E.MUL.M:
            for i ← 0 to 64-size by size
                $d_{2*(i+size)-1..2*i}$ ← mul(size,2*size,cs,c,i,bs,b,i)
            endfor
        E.MUL.P:
            for i ← 0 to 64-size by size
                $d_{2*(i+size)-1..2*i}$ ← PolyMultiply(size,$c_{size-1+i..i}$,$b_{size-1+i..i}$)
            endfor
        E.MUL.C:
            for i ← 0 to 64-size by size
                if (i and size) = 0 then
                      p ← mul(size,2*size,1,c,i,1,b,i) - mul(size,2*size,1,c,i+size,1,b,i+size)
                else
                      p ← mul(size,2*size,1,c,i,1,b,i+size) + mul(size,2*size,1,c,i,1,b,i+size)
                endif
                $d_{2*(i+size)-1..2*i}$ ← p
            endfor
        E.MUL.SUM, E.MUL.SUM.U, E.MUL.SUM.M:
            p[0] ← $0^{128}$
            for i ← 0 to 128-size by size
                p[i+size] ← p[i] + mul(size,128,cs,c,i,bs,b,i)
            endfor
            a ← p[128]
        E.MUL.SUM.C:
            p[0] ← $0^{64}$
            p[size] ← $0^{64}$
            for i ← 0 to 128-size by size
                if (i and size) = 0 then
                      p[i+2*size] ← p[i] + mul(size,64,1,c,i,1,b,i)
                                    - mul(size,64,1,c,i+size,1,b,i+size)
                else
                      p[i+2*size] ← p[i] + mul(size,64,1,c,i,1,b,i+size)
                                    + mul(size,64,1,c,i+size,1,b,i)
                endif
            endfor
            a ← p[128+size] || p[128]

Fig. 34C

E.CON, E.CON.U, E.CON.M:
    $p[0] \leftarrow 0^{128}$
    for j ← 0 to 64-size by size
        for i ← 0 to 64-size by size
            $p[j+size]_{2*(i+size)-1..2*i} \leftarrow p[j]_{2*(i+size)-1..2*i}$ +
                mul(size,2*size,cs,c,i+64-j,bs,b,j)
        endfor
    endfor
    a ← p[64]
E.CON.C:
    $p[0] \leftarrow 0^{128}$
    for j ← 0 to 64-size by size
        for i ← 0 to 64-size by size
            if ((~i) and j and size) = 0 then
                $p[j+size]_{2*(i+size)-1..2*i} \leftarrow p[j]_{2*(i+size)-1..2*i}$ +
                    mul(size,2*size,1,c,i+64-j,1,b,j)
            else
                $p[j+size]_{2*(i+size)-1..2*i} \leftarrow p[j]_{2*(i+size)-1..2*i}$ -
                    mul(size,2*size,1,c,i+64-j+2*size,1,b,j)
            endif
        endfor
    endfor
    a ← p[64]
E.DIV:
    if (b = 0) or ( (c = ($1 \| 0^{63}$)) and (b = $1^{64}$) ) then
        a ← undefined
    else
        q ← c / b
        r ← c - q*b
        a ← $r_{63..0} \| q_{63..0}$
    endif
E.DIV.U:
    if b = 0 then
        a ← undefined
    else
        q ← (0 $\|$ c) / (0 $\|$ b)
        r ← c - (0 $\|$ q)*(0 $\|$ b)
        a ← $r_{63..0} \| q_{63..0}$
    endif
    endcase
    RegWrite(rd, 128, a)
enddef

Exceptions
none

Fig. 34C (cont'd)

| | |
|---|---|
| G.COM.AND.E.8 | Group compare and equal zero bytes |
| G.COM.AND.E.16 | Group compare and equal zero doublets |
| G.COM.AND.E.32 | Group compare and equal zero quadlets |
| G.COM.AND.E.64 | Group compare and equal zero octlets |
| G.COM.AND.E.128 | Group compare and equal zero hexlet |
| G.COM.AND.NE.8 | Group compare and not equal zero bytes |
| G.COM.AND.NE.16 | Group compare and not equal zero doublets |
| G.COM.AND.NE.32 | Group compare and not equal zero quadlets |
| G.COM.AND.NE.64 | Group compare and not equal zero octlets |
| G.COM.AND.NE.128 | Group compare and not equal zero hexlet |
| G.COM.E.8 | Group compare equal bytes |
| G.COM.E.16 | Group compare equal doublets |
| G.COM.E.32 | Group compare equal quadlets |
| G.COM.E.64 | Group compare equal octlets |
| G.COM.E.128 | Group compare equal hexlet |
| G.COM.GE.8 | Group compare greater equal signed bytes |
| G.COM.GE.16 | Group compare greater equal signed doublets |
| G.COM.GE.32 | Group compare greater equal signed quadlets |
| G.COM.GE.64 | Group compare greater equal signed octlets |
| G.COM.GE.128 | Group compare greater equal signed hexlet |
| G.COM.GE.U.8 | Group compare greater equal unsigned bytes |
| G.COM.GE.U.16 | Group compare greater equal unsigned doublets |
| G.COM.GE.U.32 | Group compare greater equal unsigned quadlets |
| G.COM.GE.U.64 | Group compare greater equal unsigned octlets |
| G.COM.GE.U.128 | Group compare greater equal unsigned hexlet |
| G.COM.L.8 | Group compare signed less bytes |
| G.COM.L.16 | Group compare signed less doublets |
| G.COM.L.32 | Group compare signed less quadlets |
| G.COM.L.64 | Group compare signed less octlets |
| G.COM.L.128 | Group compare signed less hexlet |
| G.COM.L.U.8 | Group compare less unsigned bytes |
| G.COM.L.U.16 | Group compare less unsigned doublets |
| G.COM.L.U.32 | Group compare less unsigned quadlets |
| G.COM.L.U.64 | Group compare less unsigned octlets |
| G.COM.L.U.128 | Group compare less unsigned hexlet |
| G.COM.NE.8 | Group compare not equal bytes |
| G.COM.NE.16 | Group compare not equal doublets |
| G.COM.NE.32 | Group compare not equal quadlets |
| G.COM.NE.64 | Group compare not equal octlets |
| G.COM.NE.128 | Group compare not equal hexlet |

Fig. 35A

Format

G.COM.op.size     rd,rc
G.COM.opz.size     rcd gcomopsize(rd,rc)

Definition

```
def GroupCompare(op,size,rd,rc)
    d ← RegRead(rd, 128)
    c ← RegRead(rc, 128)
    case op of
        G.COM.E:
            for i ← 0 to 128-size by size
```
$$a_{i+size-1..i} \leftarrow (d_{i+size-1..i} = c_{i+size-1..i})^{size}$$
```
            endfor
        G.COM.NE:
            for i ← 0 to 128-size by size
```
$$a_{i+size-1..i} \leftarrow (d_{i+size-1..i} \neq c_{i+size-1..i})^{size}$$
```
            endfor
        G.COM.AND.E:
            for i ← 0 to 128-size by size
```
$$a_{i+size-1..i} \leftarrow ((c_{i+size-1..i} \text{ and } d_{i+size-1..i}) = 0)^{size}$$
```
            endfor
        G.COM.AND.NE:
            for i ← 0 to 128-size by size
```
$$a_{i+size-1..i} \leftarrow ((c_{i+size-1..i} \text{ and } d_{i+size-1..i}) \neq 0)^{size}$$
```
            endfor
        G.COM.L:
            for i ← 0 to 128-size by size
```
$$a_{i+size-1..i} \leftarrow ((rd = rc) \text{ ? } (c_{i+size-1..i} < 0) : (d_{i+size-1..i} < c_{i+size-1..i}))^{size}$$
```
            endfor
        G.COM.GE:
            for i ← 0 to 128-size by size
```
$$a_{i+size-1..i} \leftarrow ((rd = rc) \text{ ? } (c_{i+size-1..i} \geq 0) : (d_{i+size-1..i} \geq c_{i+size-1..i}))^{size}$$
```
            endfor
        G.COM.L.U:
            for i ← 0 to 128-size by size
```
$$a_{i+size-1..i} \leftarrow ((rd = rc) \text{ ? } (c_{i+size-1..i} > 0) :$$
$$((0 \parallel d_{+size-1..i}) < (0 \parallel c_{i+size-1..i})))^{size}$$
```
            endfor
        G.COM.GE.U:
            for i ← 0 to 128-size by size
```
$$a_{i+size-1..i} \leftarrow ((rd = rc) \text{ ? } (c_{i+size-1..i} \leq 0) :$$
$$((0 \parallel d_{i+size-1..i}) \geq (0 \parallel c_{i+size-1..i})))^{size}$$
```
            endfor
    endcase
    if (a ≠ 0) then
        raise FixedPointArithmetic
    endif
enddef
```

Exceptions

Fixed-point arithmetic

Fig. 35C

| | |
|---|---|
| E.LOG.MOST.8 | Ensemble log of most significant bit signed bytes |
| E.LOG.MOST.16 | Ensemble log of most significant bit signed doublets |
| E.LOG.MOST.32 | Ensemble log of most significant bit signed quadlets |
| E.LOG.MOST.64 | Ensemble log of most significant bit signed octlets |
| E.LOG.MOST.128 | Ensemble log of most significant bit signed hexlet |
| E.LOG.MOST.U.8 | Ensemble log of most significant bit unsigned bytes |
| E.LOG.MOST.U.16 | Ensemble log of most significant bit unsigned doublets |
| E.LOG.MOST.U.32 | Ensemble log of most significant bit unsigned quadlets |
| E.LOG.MOST.U.64 | Ensemble log of most significant bit unsigned octlets |
| E.LOG.MOST.U.128 | Ensemble log of most significant bit unsigned hexlet |
| E.SUM.8 | Ensemble sum signed bytes |
| E.SUM.16 | Ensemble sum signed doublets |
| E.SUM.32 | Ensemble sum signed quadlets |
| E.SUM.64 | Ensemble sum signed octlets |
| E.SUM.U.1 | Ensemble sum unsigned bits |
| E.SUM.U.8 | Ensemble sum unsigned bytes |
| E.SUM.U.16 | Ensemble sum unsigned doublets |
| E.SUM.U.32 | Ensemble sum unsigned quadlets |
| E.SUM.U.64 | Ensemble sum unsigned octlets |

Selection

| class | op | | size |
|---|---|---|---|
| sum | SUM | | 8 16 32 64 |
| | SUM.U | | 1 8 16 32 64 |
| log most significant bit | LOG.MOST | LOG.MOST.U | 8 16 32 64 128 |

Fig. 36A

Format

E.op.size    rd=rc rd=eopsize(rc)

Definition

```
def EnsembleUnary(op,size,rd,rc)
    c ← RegRead(rc, 128)
    case op of
        E.LOG.MOST:
            for i ← 0 to 128-size by size
                if (c_{i+size-1..i} =0) then
                    a_{i+size-1..i} ← -1
                else
                    for j ← 0 to size-1
                        if c_{size-1+i..j+i} = (c_{size-1+i}^{size-1-j} || not c_{size-1+i}) then
                            a_{i+size-1..i} ← j
                        endif
                    endfor
                endif
            endfor
        E.LOG.MOSTU:
            for i ← 0 to 128-size by size
                if (c_{i+size-1..i} =0) then
                    a_{i+size-1..i} ← -1
                else
                    for j ← 0 to size-1
                        if c_{size-1+i..j+i} = (0^{size-1-j} || 1) then
                            a_{i+size-1..i} ← j
                        endif
                    endfor
                endif
            endfor
        E.SUM:
            p[0] ← 0^{128}
            for i ← 0 to 128-size by size
                p[i+size] ← p[i] + (c_{size-1+i}^{128-size} || c_{size-1+i..i})
            endfor
            a ← p[128]
        E.SUMU:
            p[0] ← 0^{128}
            for i ← 0 to 128-size by size
                p[i+size] ← p[i] + (0^{128-size} || c_{size-1+i..i})
            endfor
            a ← p[128]
    endcase
    RegWrite(rd, 128, a)
enddef
```

Exceptions
none

Fig. 36C

Floating-point function Definitions

```
def eb ← ebits(prec) as
    case pref of
        16:
            eb ← 5
        32:
            eb ← 8
        64:
            eb ← 11
        128:
            eb ← 15
    endcase
enddef def eb ← ebias(prec) as
    eb ← 0 || 1^{ebits(prec)-1}
enddef def fb ← fbits(prec) as
    fb ← prec - 1 - eb
enddef def a ← F(prec, ai) as
    a.s ← ai_{prec-1}
    ae ← ai_{prec-2..fbits(prec)}
    af ← ai_{fbits(prec)-1..0}
    if ae = 1^{ebits(prec)} then
        if af = 0 then
            a.t ← INFINITY
        elseif af_{fbits(prec)-1} then
            a.t ← SNaN
            a.e ← -fbits(prec)
            a.f ← 1 || af_{fbits(prec)-2..0}
        else
            a.t ← QNaN
            a.e ← -fbits(prec)
            a.f ← af
        endif
```

Fig. 37

```
        elseif ae = 0 then
                if af = 0 then
                        a.t ← ZERO
                else
                        a.t ← NORM
                        a.e ← 1-ebias(prec)-fbits(prec)
                        a.f ← 0 || af
                endif
        else
                a.t ← NORM
                a.e ← ae-ebias(prec)-fbits(prec)
                a.f ← 1 || af
        endif
enddef def a ← DEFAULTQNAN as
        a.s ← 0
        a.t ← QNAN
        a.e ← -1
        a.f ← 1
enddef def a ← DEFAULTSNAN as
        a.s ← 0
        a.t ← SNAN
        a.e ← -1
        a.f ← 1
enddef def fadd(a,b) as faddr(a,b,N) enddef def c ← faddr(a,b,round) as
        if a.t=NORM and b.t=NORM then
                // d,e are a,b with exponent aligned and fraction adjusted
                if a.e > b.e then
                        d ← a
                        e.t ← b.t
                        e.s ← b.s
                        e.e ← a.e
                        e.f ← b.f || 0^(a.e-b.e)
                else if a.e < b.e then
                        d.t ← a.t
                        d.s ← a.s
                        d.e ← b.e
                        d.f ← a.f || 0^(b.e-a.e)
                        e ← b
                endif
                c.t ← d.t
                c.e ← d.e
                if d.s = e.s then
                        c.s ← d.s
                        c.f ← d.f + e.f
                elseif d.f > e.f then
                        c.s ← d.s
                        c.f ← d.f - e.f
```

Fig. 37 (c nt'd)

```
            elseif d.f < e.f then
                    c.s ← e.s
                    c.f ← e.f − d.f
            else
                    c.s ← r=F
                    c.t ← ZERO
            endif
    // priority is given to b operand for NaN propagation
    elseif (b.t=SNAN) or (b.t=QNAN) then
            c ← b
    elseif (a.t=SNAN) or (a.t=QNAN) then
            c ← a
    elseif a.t=ZERO and b.t=ZERO then
            c.t ← ZERO
            c.s ← (a.s and b.s) or (round=F and (a.s or b.s))
    // NULL values are like zero, but do not combine with ZERO to alter sign
    elseif a.t=ZERO or a.t=NULL then
            c ← b
    elseif b.t=ZERO or b.t=NULL then
            c ← a
    elseif a.t=INFINITY and b.t=INFINITY then
            if a.s ≠ b.s then
                    c ← DEFAULTSNAN // Invalid
            else
                    c ← a
            endif
    elseif a.t=INFINITY then
            c ← a
    elseif b.t=INFINITY then
            c ← b
    else
            assert FALSE // should have covered all the cases above
    endif
enddef def b ← fneg(a) as
        b.s ← ~a.s
        b.t ← a.t
        b.e ← a.e
        b.f ← a.f
enddef def fsub(a,b) as fsubr(a,b,N) enddef def fsubr(a,b,round) as faddr(a,fneg(b),round) enddef def frsub(a,b) as frsubr(a,b,N) enddef def frsubr(a,b,round) as faddr(fneg(a),b,round) enddef def c ← fcom(a,b) as
        if (a.t=SNAN) or (a.t=QNAN) or (b.t=SNAN) or (b.t=QNAN) then
                c ← U
        elseif a.t=INFINITY and b.t=INFINITY then
                if a.s ≠ b.s then
                        c ← (a.s=0) ? G: L
```

Fig. 37 (cont'd)

```
        else
                c ← E
        endif
elseif a.t=INFINITY then
        c ← (a.s=0) ? G: L
elseif b.t=INFINITY then
        c ← (b.s=0) ? G: L
elseif a.t=NORM and b.t=NORM then
        if a.s ≠ b.s then
                c ← (a.s=0) ? G: L
        else
                if a.e > b.e then
                        af ← a.f
                        bf ← b.f || 0^(a.e-b.e)
                else
                        af ← a.f || 0^(b.e-a.e)
                        bf ← b.f
                endif
                if af = bf then
                        c ← E
                else
                        c ← ((a.s=0) ^ (af > bf)) ? G : L
                endif
        endif
elseif a.t=NORM then
        c ← (a.s=0) ? G: L
elseif b.t=NORM then
        c ← (b.s=0) ? G: L
elseif a.t=ZERO and b.t=ZERO then
        c ← E
else
        assert FALSE // should have covered al the cases above
endif
enddef def c ← fmul(a,b) as
        if a.t=NORM and b.t=NORM then
                c.s ← a.s ^ b.s
                c.t ← NORM
                c.e ← a.e + b.e
                c.f ← a.f * b.f
        // priority is given to b operand for NaN propagation
        elseif (b.t=SNAN) or (b.t=QNAN) then
                c.s ← a.s ^ b.s
                c.t ← b.t
                c.e ← b.e
                c.f ← b.f
        elseif (a.t=SNAN) or (a.t=QNAN) then
                c.s ← a.s ^ b.s
                c.t ← a.t
                c.e ← a.e
                c.f ← a.f
        elseif a.t=ZERO and b.t=INFINITY then
                c ← DEFAULTSNAN // Invalid
        elseif a.t=INFINITY and b.t=ZERO then
                c ← DEFAULTSNAN // Invalid
```

Fig. 37 (cont'd)

```
        elseif a.t=ZERO or b.t=ZERO then
                c.s ← a.s ^ b.s
                c.t ← ZERO
        else
                assert FALSE // should have covered al the cases above
        endif
enddef def c ← fdivr(a,b) as
        if a.t=NORM and b.t=NORM then
                c.s ← a.s ^ b.s
                c.t ← NORM
                c.e ← a.e - b.e + 256
                c.f ← (a.f || 0^256) / b.f
        // priority is given to b operand for NaN propagation
        elseif (b.t=SNAN) or (b.t=QNAN) then
                c.s ← a.s ^ b.s
                c.t ← b.t
                c.e ← b.e
                c.f ← b.f
        elseif (a.t=SNAN) or (a.t=QNAN) then
                c.s ← a.s ^ b.s
                c.t ← a.t
                c.e ← a.e
                c.f ← a.f
        elseif a.t=ZERO and b.t=ZERO then
                c ← DEFAULTSNAN // Invalid
        elseif a.t=INFINITY and b.t=INFINITY then
                c ← DEFAULTSNAN // Invalid
        elseif a.t=ZERO then
                c.s ← a.s ^ b.s
                c.t ← ZERO
        elseif a.t=INFINITY then
                c.s ← a.s ^ b.s
                c.t ← INFINITY
        else
                assert FALSE // should have covered al the cases above
        endif
enddef def msb ← findmsb(a) as
        MAXF ← 2^18 // Largest possible f value after matrix multiply
        for j ← 0 to MAXF
                if a_{MAXF-1..j} = (0^{MAXF-1-j} || 1) then
                        msb ← j
                endif
        endfor
enddef def ai ← PackF(prec,a,round) as
        case a.t of
                NORM:
                        msb ← findmsb(a.f)
                        rn ← msb-1-fbits(prec) // lsb for normal
                        rdn ← -ebias(prec)-a.e-1-fbits(prec) // lsb if a denormal
                        rb ← (rn > rdn) ? rn : rdn
```

Fig. 37 (cont'd)

```
if rb ≤ 0 then
        aifr ← a.f_{msb-1..0} || 0^{-rb}
        eadj ← 0
else
        case round of
                C:
                        s ← 0^{msb-rb} || (~a.s)^{rb}
                F:
                        s ← 0^{msb-rb} || (a.s)^{rb}
                N, NONE:
                        s ← 0^{msb-rb} || ~a.f_{rb} || a.f_{rb}^{rb-1}
                X:
                        if a.f_{rb-1..0} ≠ 0 then
                                raise FloatingPointArithmetic // Inexact
                        endif
                        s ← 0
                Z:
                        s ← 0
        endcase
        v ← (0||a.f_{msb..0}) + (0||s)
        if v_{msb} = 1 then
                aifr ← v_{msb-1..rb}
                eadj ← 0
        else
                aifr ← 0^{fbits(prec)}
                eadj ← 1
        endif
endif
aien ← a.e + msb − 1 + eadj + ebias(prec)
if aien ≤ 0 then
        if round = NONE then
                ai ← a.s || 0^{ebits(prec)} || aifr
        else
                raise FloatingPointArithmetic //Underflow
        endif
elseif aien ≥ 1^{ebits(prec)} then
        if round = NONE then
                //default: round-to-nearest overflow handling
                ai ← a.s || 1^{ebits(prec)} || 0^{fbits(prec)}
        else
                raise FloatingPointArithmetic //Underflow
        endif
else
        ai ← a.s || aien_{ebits(prec)-1..0} || aifr
endif
SNAN:
        if round ≠ NONE then
                raise FloatingPointArithmetic //Invalid
        endif
        if −a.e < fbits(prec) then
                ai ← a.s || 1^{ebits(prec)} || a.f_{-a.e-1..0} || 0^{fbits(prec)+a.e}
```

Fig. 37 (cont'd)

```
            else
                    lsb ← a.f_{-a.e-1-fbits(prec)+1..0} ≠ 0
                    ai ← a.s || 1^{ebits(prec)} || a.f_{-a.e-1..-a.e-1-fbits(prec)+2} || lsb
            endif
        QNAN:
            if -a.e < fbits(prec) then
                    ai ← a.s || 1^{ebits(prec)} || a.f_{-a.e-1..0} || 0^{fbits(prec)+a.e}
            else
                    lsb ← a.f_{-a.e-1-fbits(prec)+1..0} ≠ 0
                    ai ← a.s || 1^{ebits(prec)} || a.f_{-a.e-1..-a.e-1-fbits(prec)+2} || lsb
            endif
        ZERO:
                    ai ← a.s || 0^{ebits(prec)} || 0^{fbits(prec)}
        INFINITY:
                    ai ← a.s || 1^{ebits(prec)} || 0^{fbits(prec)}
        endcase
defdef def ai ← fsinkr(prec, a, round) as
    case a.t of
        NORM:
            msb ← findmsb(a.f)
            rb ← -a.e
            if rb ≤ 0 then
                    aifr ← a.f_{msb..0} || 0^{-rb}
                    aims ← msb - rb
            else
                    case round of
                        C, C.D:
                                s ← 0^{msb-rb} || (~ai.s)^{rb}
                        F, F.D:
                                s ← 0^{msb-rb} || (ai.s)^{rb}
                        N, NONE:
                                s ← 0^{msb-rb} || ~ai.f_{rb} || ai.f_{rb}^{rb-1}
                        X:
                                if ai.f_{rb-1..0} ≠ 0 then
                                        raise FloatingPointArithmetic // Inexact
                                endif
                                s ← 0
                        Z, Z.D:
                                s ← 0
                    endcase
                    v ← (0||a.f_{msb..0}) + (0||s)
                    if v_{msb} = 1 then
                            aims ← msb + 1 - rb
                    else
                            aims ← msb - rb
                    endif
                    aifr ← v_{aims..rb}
            endif
            if aims > prec then
                    case round of
                        C.D, F.D, NONE, Z.D:
                                ai ← a.s || (~as)^{prec-1}
```

Fig. 37 (cont'd)

```
                        C, F, N, X, Z:
                              raise FloatingPointArithmetic // Overflow
                        endcase
                  elseif a.s = 0 then
                        ai ← aifr
                  else
                        ai ← -aifr
                  endif
      ZERO:
            ai ← 0^{prec}
      SNAN, QNAN:
            case round of
                  C.D, F.D, NONE, Z.D:
                        ai ← 0^{prec}
                  C, F, N, X, Z:
                        raise FloatingPointArithmetic // Invalid
            endcase
      INFINITY:
            case round of
                  C.D, F.D, NONE, Z.D:
                        ai ← a.s || (~as)^{prec-1}
                  C, F, N, X, Z:
                        raise FloatingPointArithmetic // Invalid
            endcase
      endcase
enddef def c ← frecrest(a) as
      b.s ← 0
      b.t ← NORM
      b.e ← 0
      b.f ← 1
      c ← fest(fdiv(b,a))
enddef def c ← frsqrest(a) as
      b.s ← 0
      b.t ← NORM
      b.e ← 0
      b.f ← 1
      c ← fest(fsqr(fdiv(b,a)))
enddef def c ← fest(a) as
      if (a.t=NORM) then
            msb ← findmsb(a.f)
            a.e ← a.e + msb - 13
            a.f ← a.f_{msb..msb-12} || 1
      else
            c ← a
      endif
enddef def c ← fsqr(a) as
      if (a.t=NORM) and (a.s=0) then
            c.s ← 0
            c.t ← NORM
            if (a.e_0 = 1) then
```

Fig. 37 (cont'd)

```
                c.e ← (a.e-127) / 2
                c.f ← sqr(a.f || 0^127)
            else
                c.e ← (a.e-128) / 2
                c.f ← sqr(a.f || 0^128)
            endif
        elseif (a.t=SNAN) or (a.t=QNAN) or a.t=ZERO or ((a.t=INFINITY) and (a.s=0)) then
            c ← a
        elseif ((a.t=NORM) or (a.t=INFINITY)) and (a.s=1) then
            c ← DEFAULTSNAN // Invalid
        else
            assert FALSE // should have covered al the cases above
        endif
enddef
```

Fig. 37 (cont'd)

| E.ADD.F.16 | Ensemble add floating-point half |
|---|---|
| E.ADD.F.16.C | Ensemble add floating-point half ceiling |
| E.ADD.F.16.F | Ensemble add floating-point half floor |
| E.ADD.F.16.N | Ensemble add floating-point half nearest |
| E.ADD.F.16.X | Ensemble add floating-point half exact |
| E.ADD.F.16.Z | Ensemble add floating-point half zero |
| E.ADD.F.32 | Ensemble add floating-point single |
| E.ADD.F.32.C | Ensemble add floating-point single ceiling |
| E.ADD.F.32.F | Ensemble add floating-point single floor |
| E.ADD.F.32.N | Ensemble add floating-point single nearest |
| E.ADD.F.32.X | Ensemble add floating-point single exact |
| E.ADD.F.32.Z | Ensemble add floating-point single zero |
| E.ADD.F.64 | Ensemble add floating-point double |
| E.ADD.F.64.C | Ensemble add floating-point double ceiling |
| E.ADD.F.64.F | Ensemble add floating-point double floor |
| E.ADD.F.64.N | Ensemble add floating-point double nearest |
| E.ADD.F.64.X | Ensemble add floating-point double exact |
| E.ADD.F.64.Z | Ensemble add floating-point double zero |
| E.ADD.F.128 | Ensemble add floating-point quad |
| E.ADD.F.128.C | Ensemble add floating-point quad ceiling |
| E.ADD.F.128.F | Ensemble add floating-point quad floor |
| E.ADD.F.128.N | Ensemble add floating-point quad nearest |
| E.ADD.F.128.X | Ensemble add floating-point quad exact |
| E.ADD.F.128.Z | Ensemble add floating-point quad zero |
| E.DIV.F.16 | Ensemble divide floating-point half |
| E.DIV.F.16.C | Ensemble divide floating-point half ceiling |
| E.DIV.F.16.F | Ensemble divide floating-point half floor |
| E.DIV.F.16.N | Ensemble divide floating-point half nearest |
| E.DIV.F.16.X | Ensemble divide floating-point half exact |
| E.DIV.F.16.Z | Ensemble divide floating-point half zero |
| E.DIV.F.32 | Ensemble divide floating-point single |
| E.DIV.F.32.C | Ensemble divide floating-point single ceiling |
| E.DIV.F.32.F | Ensemble divide floating-point single floor |
| E.DIV.F.32.N | Ensemble divide floating-point single nearest |
| E.DIV.F.32.X | Ensemble divide floating-point single exact |
| E.DIV.F.32.Z | Ensemble divide floating-point single zero |
| E.DIV.F.64 | Ensemble divide floating-point double |

Fig. 38A

| E.DIV.F.64.C | Ensemble divide floating-point double ceiling |
|---|---|
| E.DIV.F.64.F | Ensemble divide floating-point double floor |
| E.DIV.F.64.N | Ensemble divide floating-point double nearest |
| E.DIV.F.64.X | Ensemble divide floating-point double exact |
| E.DIV.F.64.Z | Ensemble divide floating-point double zero |
| E.DIV.F.128 | Ensemble divide floating-point quad |
| E.DIV.F.128.C | Ensemble divide floating-point quad ceiling |
| E.DIV.F.128.F | Ensemble divide floating-point quad floor |
| E.DIV.F.128.N | Ensemble divide floating-point quad nearest |
| E.DIV.F.128.X | Ensemble divide floating-point quad exact |
| E.DIV.F.128.Z | Ensemble divide floating-point quad zero |
| E.MUL.C.F.16 | Ensemble multiply complex floating-point half |
| E.MUL.C.F.32 | Ensemble multiply complex floating-point single |
| E.MUL.C.F.64 | Ensemble multiply complex floating-point double |
| E.MUL.F.16 | Ensemble multiply floating-point half |
| E.MUL.F.16.C | Ensemble multiply floating-point half ceiling |
| E.MUL.F.16.F | Ensemble multiply floating-point half floor |
| E.MUL.F.16.N | Ensemble multiply floating-point half nearest |
| E.MUL.F.16.X | Ensemble multiply floating-point half exact |
| E.MUL.F.16.Z | Ensemble multiply floating-point half zero |
| E.MUL.F.32 | Ensemble multiply floating-point single |
| E.MUL.F.32.C | Ensemble multiply floating-point single ceiling |
| E.MUL.F.32.F | Ensemble multiply floating-point single floor |
| E.MUL.F.32.N | Ensemble multiply floating-point single nearest |
| E.MUL.F.32.X | Ensemble multiply floating-point single exact |
| E.MUL.F.32.Z | Ensemble multiply floating-point single zero |
| E.MUL.F.64 | Ensemble multiply floating-point double |
| E.MUL.F.64.C | Ensemble multiply floating-point double ceiling |
| E.MUL.F.64.F | Ensemble multiply floating-point double floor |
| E.MUL.F.64.N | Ensemble multiply floating-point double nearest |
| E.MUL.F.64.X | Ensemble multiply floating-point double exact |
| E.MUL.F.64.Z | Ensemble multiply floating-point double zero |
| E.MUL.F.128 | Ensemble multiply floating-point quad |
| E.MUL.F.128.C | Ensemble multiply floating-point quad ceiling |
| E.MUL.F.128.F | Ensemble multiply floating-point quad floor |
| E.MUL.F.128.N | Ensemble multiply floating-point quad nearest |
| E.MUL.F.128.X | Ensemble multiply floating-point quad exact |
| E.MUL.F.128.Z | Ensemble multiply floating-point quad zero |

Fig. 38A (cont'd)

Selection

| class | op | prec | | | | round/trap |
|---|---|---|---|---|---|---|
| add | EADDF | 16 | 32 | 64 | 128 | NONE C F N X Z |
| divide | EDIVF | 16 | 32 | 64 | 128 | NONE C F N X Z |
| multiply | EMULF | 16 | 32 | 64 | 128 | NONE C F N X Z |
| complex multiply | EMUL.CF | 16 | 32 | 64 | | NONE |

Format

E.op.prec.round      rd=rc,rb rd=eopprecround(rc,rb)

Definition

```
def mul(size,v,i,w,j) as
    mul ← fmul(F(size,v_{size-1+i..i}),F(size,w_{size-1+j..j}))
enddef def EnsembleFloatingPoint(op,prec,round,ra,rb,rc) as
    c ← RegRead(rc, 128)
    b ← RegRead(rb, 128)
    for i ← 0 to 128-prec by prec
        ci ← F(prec,c_{i+prec-1..i})
        bi ← F(prec,b_{i+prec-1..i})
        case op of
            E.ADD.F:
                ai ← faddr(ci,bi,round)
            E.MUL.F:
                ai ← fmul(ci,bi)
            E.MUL.C.F:
                if (i and prec) then
                    ai ← fadd(mul(prec,c,i,b,i-prec), mul(prec,c,i-prec,b,i))
                else
                    ai ← fsub(mul(prec,c,l,b,l), mul(prec,c,i+prec,b,i+prec))
                endif
            E.DIV.F.:
                ai ← fdiv(ci,bi)
        endcase
        a_{i+prec-1..i} ← PackF(prec, ai, round)
    endfor
    RegWrite(rd, 128, a)
enddef
```

Exceptions
Floating-point arithmetic

Fig. 38C

Operation codes

| | |
|---|---|
| E.MUL.ADD.C.F.16 | Ensemble multiply add complex floating-point half |
| E.MUL.ADD.C.F.32 | Ensemble multiply add complex floating-point single |
| E.MUL.ADD.C.F.64 | Ensemble multiply add complex floating-point double |
| E.MUL.ADD.F.16 | Ensemble multiply add floating-point half |
| E.MUL.ADD.F.16.C | Ensemble multiply add floating-point half ceiling |
| E.MUL.ADD.F.16.F | Ensemble multiply add floating-point half floor |
| E.MUL.ADD.F.16.N | Ensemble multiply add floating-point half nearest |
| E.MUL.ADD.F.16.X | Ensemble multiply add floating-point half exact |
| E.MUL.ADD.F.16.Z | Ensemble multiply add floating-point half zero |
| E.MUL.ADD.F.32 | Ensemble multiply add floating-point single |
| E.MUL.ADD.F.32.C | Ensemble multiply add floating-point single ceiling |
| E.MUL.ADD.F.32.F | Ensemble multiply add floating-point single floor |
| E.MUL.ADD.F.32.N | Ensemble multiply add floating-point single nearest |
| E.MUL.ADD.F.32.X | Ensemble multiply add floating-point single exact |
| E.MUL.ADD.F.32.Z | Ensemble multiply add floating-point single zero |
| E.MUL.ADD.F.64 | Ensemble multiply add floating-point double |
| E.MUL.ADD.F.64.C | Ensemble multiply add floating-point double ceiling |
| E.MUL.ADD.F.64.F | Ensemble multiply add floating-point double floor |
| E.MUL.ADD.F.64.N | Ensemble multiply add floating-point double nearest |
| E.MUL.ADD.F.64.X | Ensemble multiply add floating-point double exact |
| E.MUL.ADD.F.64.Z | Ensemble multiply add floating-point double zero |
| E.MUL.ADD.F.128 | Ensemble multiply add floating-point quad |
| E.MUL.ADD.F.128.C | Ensemble multiply add floating-point quad ceiling |
| E.MUL.ADD.F.128.F | Ensemble multiply add floating-point quad floor |
| E.MUL.ADD.F.128.N | Ensemble multiply add floating-point quad nearest |
| E.MUL.ADD.F.128.X | Ensemble multiply add floating-point quad exact |
| E.MUL.ADD.F.128.Z | Ensemble multiply add floating-point quad zero |
| E.MUL.SUB.C.F.16 | Ensemble multiply subtract complex floating-point half |
| E.MUL.SUB.C.F.32 | Ensemble multiply subtract complex floating-point single |
| E.MUL.SUB.C.F.64 | Ensemble multiply subtract complex floating-point double |
| E.MUL.SUB.F.16 | Ensemble multiply subtract floating-point half |
| E.MUL.SUB.F.32 | Ensemble multiply subtract floating-point single |
| E.MUL.SUB.F.64 | Ensemble multiply subtract floating-point double |
| E.MUL.SUB.F.128 | Ensemble multiply subtract floating-point quad |

Fig. 38D

Selection

| class | op | type | prec | round/trap |
|---|---|---|---|---|
| multiply add | E.MUL.ADD | F | 16 32 64 128 | NONE C F N X Z |
| | | C.F | 16 32 64 | NONE |
| multiply subtract | E.MUL.SUB | F | 16 32 64 128 | NONE |
| | | C.F | 16 32 64 | NONE |

Format

E.op.size     rd@rc,rb rd=eopsize(rd,rc,rb)

Definition def mul(size,v,i,w,j) as
    mul ← fmul(F(size,$v_{size-1+i..i}$),F(size,$w_{size-1+j..j}$))
enddef def EnsembleInplaceFloatingPoint(op,size,rd,rc,rb) as
    d ← RegRead(rd, 128)
    c ← RegRead(rc, 128)
    b ← RegRead(rb, 128)
    for i ← 0 to 128-size by size
        di ← F(prec,$d_{i+prec-1..i}$)
        case op of
            E.MUL.ADD.F:
                ai ← fadd(di, mul(prec,c,i,b,i))
            E.MUL.ADD.C.F:
                if (i and prec) then
                    ai ← fadd(di, fadd(mul(prec,c,i,b,i-prec), mul(c,i-prec,b,i)))
                else
                    ai ← fadd(di, fsub(mul(prec,c,i,b,i), mul(prec,c,i+prec,b,i+prec)))
                endif
            E.MUL.SUB.F:
                ai ← frsub(di, mul(prec,c,i,b,i))
            E.MUL.SUB.C.F:
                if (i and prec) then
                    ai ← frsub(di, fadd(mul(prec,c,i,b,i-prec), mul(c,i-prec,b,i)))
                else
                    ai ← frsub(di, fsub(mul(prec,c,i,b,i), mul(prec,c,i+prec,b,i+prec)))
                endif
        endcase
        $a_{i+prec-1..i}$ ← PackF(prec, ai, round)
    endfor
    RegWrite(rd, 128, a)
enddef

Exceptions none

Fig. 38F

Operation codes

| | |
|---|---|
| E.SCAL.ADD.F.16 | Ensemble scale add floating-point half |
| E.SCAL.ADD.F.32 | Ensemble scale add floating-point single |
| E.SCAL.ADD.F.64 | Ensemble scale add floating-point double |

Fig. 38G

Selection

| class | op | prec | | |
|---|---|---|---|---|
| scale add | E.SCAL.ADD.F | 16 | 32 | 64 |

Format

E.SCAL.ADD.F.size ra=rd,rc,rb ra=escaladdfsize(rd,rc,rb)

Definition

```
def EnsembleFloatingPointTernary(op,prec,rd,rc,rb,ra) as
    d ← RegRead(rd, 128)
    c ← RegRead(rc, 128)
    b ← RegRead(rb, 128)
    for i ← 0 to 128-prec by prec
        di ← F(prec,d_{i+prec-1..i})
        ci ← F(prec,c_{i+prec-1..i})
        ai ← fadd(fmul(di, F(prec,b_{prec-1..0})), fmul(ci, F(prec,b_{2*prec-1..prec})))
        a_{i+prec-1..i} ← PackF(prec, ai, none)
    endfor
    RegWrite(ra, 128, a)
enddef
```

Exceptions none

Fig. 38I

| | |
|---|---|
| E.SUB.F.16 | Ensemble subtract floating-point half |
| E.SUB.F.16.C | Ensemble subtract floating-point half ceiling |
| E.SUB.F.16.F | Ensemble subtract floating-point half floor |
| E.SUB.F.16.N | Ensemble subtract floating-point half nearest |
| E.SUB.F.16.Z | Ensemble subtract floating-point half zero |
| E.SUB.F.16.X | Ensemble subtract floating-point half exact |
| E.SUB.F.32 | Ensemble subtract floating-point single |
| E.SUB.F.32.C | Ensemble subtract floating-point single ceiling |
| E.SUB.F.32.F | Ensemble subtract floating-point single floor |
| E.SUB.F.32.N | Ensemble subtract floating-point single nearest |
| E.SUB.F.32.Z | Ensemble subtract floating-point single zero |
| E.SUB.F.32.X | Ensemble subtract floating-point single exact |
| E.SUB.F.64 | Ensemble subtract floating-point double |
| E.SUB.F.64.C | Ensemble subtract floating-point double ceiling |
| E.SUB.F.64.F | Ensemble subtract floating-point double floor |
| E.SUB.F.64.N | Ensemble subtract floating-point double nearest |
| E.SUB.F.64.Z | Ensemble subtract floating-point double zero |
| E.SUB.F.64.X | Ensemble subtract floating-point double exact |
| E.SUB.F.128 | Ensemble subtract floating-point quad |
| E.SUB.F.128.C | Ensemble subtract floating-point quad ceiling |
| E.SUB.F.128.F | Ensemble subtract floating-point quad floor |
| E.SUB.F.128.N | Ensemble subtract floating-point quad nearest |
| E.SUB.F.128.Z | Ensemble subtract floating-point quad zero |
| E.SUB.F.128.X | Ensemble subtract floating-point quad exact |

Fig. 39A

Selection

| class | op | prec | | | | round/trap | |
|---|---|---|---|---|---|---|---|
| set | SET. E LG L GE | 16 | 32 | 64 | 128 | NONE | X |
| subtract | SUB | 16 | 32 | 64 | 128 | NONE | C F N X Z |

Format

E.op.prec.round    rd=rb,rc rd=eopprecround(rb,rc)

| 31 | 24 23 | 18 17 | 12 11 | 6 5 | 0 |
|---|---|---|---|---|---|
| E.prec | rd | rc | rb | op.round |
| 8 | 6 | 6 | 6 | 6 |

Definition def EnsembleReversedFloatingPoint(op,prec,round,rd,rc,rb) as
    c ← RegRead(rc, 128)
    b ← RegRead(rb, 128)
    for i ← 0 to 128-prec by prec
        ci ← F(prec,$c_{i+prec-1..i}$)
        bi ← F(prec,$b_{i+prec-1..i}$)
        ai ← frsubr(ci,-bi, round)
        $a_{i+prec-1..i}$ ← PackF(prec, ai, round)
    endfor
    RegWrite(rd, 128, a)
enddef

Exceptions
Floating-point arithmetic

Fig. 39C

Operation codes

| | |
|---|---|
| G.SET.E.F.16 | Group set equal floating-point half |
| G.SET.E.F.16.X | Group set equal floating-point half exact |
| G.SET.E.F.32 | Group set equal floating-point single |
| G.SET.E.F.32.X | Group set equal floating-point single exact |
| G.SET.E.F.64 | Group set equal floating-point double |
| G.SET.E.F.64.X | Group set equal floating-point double exact |
| G.SET.E.F.128 | Group set equal floating-point quad |
| G.SET.E.F.128.X | Group set equal floating-point quad exact |
| G.SET.GE.F.16.X | Group set greater equal floating-point half exact |
| G.SET.GE.F.32.X | Group set greater equal floating-point single exact |
| G.SET.GE.F.64.X | Group set greater equal floating-point double exact |
| G.SET.GE.F.128.X | Group set greater equal floating-point quad exact |
| G.SET.LG.F.16 | Group set less greater floating-point half |
| G.SET.LG.F.16.X | Group set less greater floating-point half exact |
| G.SET.LG.F.32 | Group set less greater floating-point single |
| G.SET.LG.F.32.X | Group set less greater floating-point single exact |
| G.SET.LG.F.64 | Group set less greater floating-point double |
| G.SET.LG.F.64.X | Group set less greater floating-point double exact |
| G.SET.LG.F.128 | Group set less greater floating-point quad |
| G.SET.LG.F.128.X | Group set less greater floating-point quad exact |
| G.SET.L.F.16 | Group set less floating-point half |
| G.SET.L.F.16.X | Group set less floating-point half exact |
| G.SET.L.F.32 | Group set less floating-point single |
| G.SET.L.F.32.X | Group set less floating-point single exact |
| G.SET.L.F.64 | Group set less floating-point double |
| G.SET.L.F.64.X | Group set less floating-point double exact |
| G.SET.L.F.128 | Group set less floating-point quad |
| G.SET.L.F.128.X | Group set less floating-point quad exact |
| G.SET.GE.F.16 | Group set greater equal floating-point half |
| G.SET.GE.F.32 | Group set greater equal floating-point single |
| G.SET.GE.F.64 | Group set greater equal floating-point double |
| G.SET.GE.F.128 | Group set greater equal floating-point quad |

Fig. 39D

Equivalencies

| | |
|---|---|
| G.SET.LE.F.16.X | Group set less equal floating-point half exact |
| G.SET.LE.F.32.X | Group set less equal floating-point single exact |
| G.SET.LE.F.64.X | Group set less equal floating-point double exact |
| G.SET.LE.F.128.X | Group set less equal floating-point quad exact |
| G.SET.G.F.16 | Group set greater floating-point half |
| G.SET.G.F.16.X | Group set greater floating-point half exact |
| G.SET.G.F.32 | Group set greater floating-point single |
| G.SET.G.F.32.X | Group set greater floating-point single exact |
| G.SET.G.F.64 | Group set greater floating-point double |
| G.SET.G.F.64.X | Group set greater floating-point double exact |
| G.SET.G.F.128 | Group set greater floating-point quad |
| G.SET.G.F.128.X | Group set greater floating-point quad exact |
| G.SET.LE.F.16 | Group set less equal floating-point half |
| G.SET.LE.F.32 | Group set less equal floating-point single |
| G.SET.LE.F.64 | Group set less equal floating-point double |
| G.SET.LE.F.128 | Group set less equal floating-point quad |

| | |
|---|---|
| G.SET.G.F.prec rd=rb,rc | → G.SET.L.F.prec rd=rc,rb |
| G.SET.G.F.prec.X rd=rb,rc | → G.SET.L.F.prec.X rd=rc,rb |
| G.SET.LE.F.prec rd=rb,rc | → G.SET.GE.F.prec rd=rc,rb |
| G.SET.LE.F.prec.X rd=rb,rc | → G.SET.GE.F.prec.X rd=rc,rb |

Fig. 39E

Selection

| class | op | prec | round/trap |
|-------|----|----|------|
| set | SET. | 16  32  64  128 | NONE X |
|     | E     LG |  |  |
|     | L     GE |  |  |
|     | G     LE |  |  |

Format

G.op.prec.round     rd=rb,rc rc=gopprecround(rb,ra)

Definition

```
def GroupFloatingPointReversed(op,prec,round,rd,rc,rb) as
    c ← RegRead(rc, 128)
    b ← RegRead(rb, 128)
    for i ← 0 to 128-prec by prec
        ci ← F(prec,c_{i+prec-1..i})
        bi ← F(prec,b_{i+prec-1..i})
        if round≠NONE then
                if (di.t = SNAN) or (ci.t = SNAN) then
                        raise FloatingPointArithmetic
                endif
                case op of
                        G.SET.L.F, G.SET.GE.F:
                                if (di.t = QNAN) or (ci.t = QNAN) then
                                        raise FloatingPointArithmetic
                                endif
                        others: //nothing
                endcase
        endif
        case op of
                G.SET.L.F:
                        ai ← bi?≥ci
                G.SET.GE.F:
                        ai ← bi!?<ci
                G.SET.E.F:
                        ai ← bi=ci
                G.SET.LG.F:
                        ai ← bi≠ci
        endcase
        a_{i+prec-1..i} ← ai^{prec}
    endfor
    RegWrite(rd, 128, a)
enddef
```

Exceptions

Floating-point arithmetic

Fig. 39G

| | |
|---|---|
| G.COM.E.F.16 | Group compare equal floating-point half |
| G.COM.E.F.16.X | Group compare equal floating-point half exact |
| G.COM.E.F.32 | Group compare equal floating-point single |
| G.COM.E.F.32.X | Group compare equal floating-point single exact |
| G.COM.E.F.64 | Group compare equal floating-point double |
| G.COM.E.F.64.X | Group compare equal floating-point double exact |
| G.COM.E.F.128 | Group compare equal floating-point quad |
| G.COM.E.F.128.X | Group compare equal floating-point quad exact |
| G.COM.GE.F.16 | Group compare greater or equal floating-point half |
| G.COM.GE.F.16.X | Group compare greater or equal floating-point half exact |
| G.COM.GE.F.32 | Group compare greater or equal floating-point single |
| G.COM.GE.F.32.X | Group compare greater or equal floating-point single exact |
| G.COM.GE.F.64 | Group compare greater or equal floating-point double |
| G.COM.GE.F.64.X | Group compare greater or equal floating-point double exact |
| G.COM.GE.F.128 | Group compare greater or equal floating-point quad |
| G.COM.GE.F.128.X | Group compare greater or equal floating-point quad exact |
| G.COM.L.F.16 | Group compare less floating-point half |
| G.COM.L.F.16.X | Group compare less floating-point half exact |
| G.COM.L.F.32 | Group compare less floating-point single |
| G.COM.L.F.32.X | Group compare less floating-point single exact |
| G.COM.L.F.64 | Group compare less floating-point double |
| G.COM.L.F.64.X | Group compare less floating-point double exact |
| G.COM.L.F.128 | Group compare less floating-point quad |
| G.COM.L.F.128.X | Group compare less floating-point quad exact |
| G.COM.LG.F.16 | Group compare less or greater floating-point half |
| G.COM.LG.F.16.X | Group compare less or greater floating-point half exact |
| G.COM.LG.F.32 | Group compare less or greater floating-point single |
| G.COM.LG.F.32.X | Group compare less or greater floating-point single exact |
| G.COM.LG.F.64 | Group compare less or greater floating-point double |
| G.COM.LG.F.64.X | Group compare less or greater floating-point double exact |
| G.COM.LG.F.128 | Group compare less or greater floating-point quad |
| G.COM.LG.F.128.X | Group compare less or greater floating-point quad exact |

Fig. 40A

Format

G.COM.op.prec.round    rd,rc rc=gcomopprecround(rd,rc)

Definition

```
def GroupCompareFloatingPoint(op,prec,round,rd,rc) as
    d ← RegRead(rd, 128)
    c ← RegRead(rc, 128)
    for i ← 0 to 128-prec by prec
        di ← F(prec,d_{i+prec-1..i})
        ci ← F(prec,c_{i+prec-1..i})
        if round≠NONE then
            if (di.t = SNAN) or (ci.t = SNAN) then
                raise FloatingPointArithmetic
            endif
            case op of
                G.COM.L.F, G.COM.GE.F:
                    if (di.t = QNAN) or (ci.t = QNAN) then
                        raise FloatingPointArithmetic
                    endif
                others: //nothing
            endcase
        endif
        case op of
            G.COM.L.F:
                ai ← di?≥ci
            G.COM.GE.F:
                ai ← di!?<ci
            G.COM.E.F:
                ai ← di=ci
            G.COM.LG.F:
                ai ← di≠ci
        endcase
        a_{i+prec-1..i} ← ai
    endfor
    if (a ≠ 0) then
        raise FloatingPointArithmetic
    endif
enddef
```

Exceptions

Floating-point arithmetic

Fig. 40C

| | |
|---|---|
| E.ABS.F.16 | Ensemble absolute value floating-point half |
| E.ABS.F.16.X | Ensemble absolute value floating-point half exception |
| E.ABS.F.32 | Ensemble absolute value floating-point single |
| E.ABS.F.32.X | Ensemble absolute value floating-point single exception |
| E.ABS.F.64 | Ensemble absolute value floating-point double |
| E.ABS.F.64.X | Ensemble absolute value floating-point double exception |
| E.ABS.F.128 | Ensemble absolute value floating-point quad |
| E.ABS.F.128.X | Ensemble absolute value floating-point quad exception |
| E.COPY.F.16 | Ensemble copy floating-point half |
| E.COPY.F.16.X | Ensemble copy floating-point half exception |
| E.COPY.F.32 | Ensemble copy floating-point single |
| E.COPY.F.32.X | Ensemble copy floating-point single exception |
| E.COPY.F.64 | Ensemble copy floating-point double |
| E.COPY.F.64.X | Ensemble copy floating-point double exception |
| E.COPY.F.128 | Ensemble copy floating-point quad |
| E.COPY.F.128.X | Ensemble copy floating-point quad exception |
| E.DEFLATE.F.32 | Ensemble convert floating-point half from single |
| E.DEFLATE.F.32.C | Ensemble convert floating-point half from single ceiling |
| E.DEFLATE.F.32.F | Ensemble convert floating-point half from single floor |
| E.DEFLATE.F.32.N | Ensemble convert floating-point half from single nearest |
| E.DEFLATE.F.32.X | Ensemble convert floating-point half from single exact |
| E.DEFLATE.F.32.Z | Ensemble convert floating-point half from single zero |
| E.DEFLATE.F.64 | Ensemble convert floating-point single from double |
| E.DEFLATE.F.64.C | Ensemble convert floating-point single from double ceiling |
| E.DEFLATE.F.64.F | Ensemble convert floating-point single from double floor |
| E.DEFLATE.F.64.N | Ensemble convert floating-point single from double nearest |
| E.DEFLATE.F.64.X | Ensemble convert floating-point single from double exact |
| E.DEFLATE.F.64.Z | Ensemble convert floating-point single from double zero |
| E.DEFLATE.F.128 | Ensemble convert floating-point double from quad |
| E.DEFLATE.F.128.C | Ensemble convert floating-point double from quad ceiling |
| E.DEFLATE.F.128.F | Ensemble convert floating-point double from quad floor |
| E.DEFLATE.F.128.N | Ensemble convert floating-point double from quad nearest |
| E.DEFLATE.F.128.X | Ensemble convert floating-point double from quad exact |
| E.DEFLATE.F.128.Z | Ensemble convert floating-point double from quad zero |
| E.FLOAT.F.16 | Ensemble convert floating-point half from doublets |
| E.FLOAT.F.16.C | Ensemble convert floating-point half from doublets ceiling |
| E.FLOAT.F.16.F | Ensemble convert floating-point half from doublets floor |
| E.FLOAT.F.16.N | Ensemble convert floating-point half from doublets nearest |
| E.FLOAT.F.16.X | Ensemble convert floating-point half from doublets exact |
| E.FLOAT.F.16.Z | Ensemble convert floating-point half from doublets zero |

Fig. 41A

| | |
|---|---|
| E.FLOAT.F.32 | Ensemble convert floating-point single from quadlets |
| E.FLOAT.F.32.C | Ensemble convert floating-point single from quadlets ceiling |
| E.FLOAT.F.32.F | Ensemble convert floating-point single from quadlets floor |
| E.FLOAT.F.32.N | Ensemble convert floating-point single from quadlets nearest |
| E.FLOAT.F.32.X | Ensemble convert floating-point single from quadlets exact |
| E.FLOAT.F.32.Z | Ensemble convert floating-point single from quadlets zero |
| E.FLOAT.F.64 | Ensemble convert floating-point double from octlets |
| E.FLOAT.F.64.C | Ensemble convert floating-point double from octlets ceiling |
| E.FLOAT.F.64.F | Ensemble convert floating-point double from octlets floor |
| E.FLOAT.F.64.N | Ensemble convert floating-point double from octlets nearest |
| E.FLOAT.F.64.X | Ensemble convert floating-point double from octlets exact |
| E.FLOAT.F.64.Z | Ensemble convert floating-point double from octlets zero |
| E.FLOAT.F.128 | Ensemble convert floating-point quad from hexlet |
| E.FLOAT.F.128.C | Ensemble convert floating-point quad from hexlet ceiling |
| E.FLOAT.F.128.F | Ensemble convert floating-point quad from hexlet floor |
| E.FLOAT.F.128.N | Ensemble convert floating-point quad from hexlet nearest |
| E.FLOAT.F.128.X | Ensemble convert floating-point quad from hexlet exact |
| E.FLOAT.F.128.Z | Ensemble convert floating-point quad from hexlet zero |
| E.INFLATE.F.16 | Ensemble convert floating-point single from half |
| E.INFLATE.F.16.X | Ensemble convert floating-point single from half exception |
| E.INFLATE.F.32 | Ensemble convert floating-point double from single |
| E.INFLATE.F.32.X | Ensemble convert floating-point double from single exception |
| E.INFLATE.F.64 | Ensemble convert floating-point quad from double |
| E.INFLATE.F.64.X | Ensemble convert floating-point quad from double exception |
| E.NEG.F.16 | Ensemble negate floating-point half |
| E.NEG.F.16.X | Ensemble negate floating-point half exception |
| E.NEG.F.32 | Ensemble negate floating-point single |
| E.NEG.F.32.X | Ensemble negate floating-point single exception |
| E.NEG.F.64 | Ensemble negate floating-point double |
| E.NEG.F.64.X | Ensemble negate floating-point double exception |
| E.NEG.F.128 | Ensemble negate floating-point quad |
| E.NEG.F.128.X | Ensemble negate floating-point quad exception |
| E.RECEST.F.16 | Ensemble reciprocal estimate floating-point half |
| E.RECEST.F.16.X | Ensemble reciprocal estimate floating-point half exception |
| E.RECEST.F.32 | Ensemble reciprocal estimate floating-point single |
| E.RECEST.F.32.X | Ensemble reciprocal estimate floating-point single exception |
| E.RECEST.F.64 | Ensemble reciprocal estimate floating-point double |
| E.RECEST.F.64.X | Ensemble reciprocal estimate floating-point double exception |
| E.RECEST.F.128 | Ensemble reciprocal estimate floating-point quad |
| E.RECEST.F.128.X | Ensemble reciprocal estimate floating-point quad exception |

Fig. 41A (cont'd)

| | |
|---|---|
| E.RSQREST.F.16 | Ensemble floating-point reciprocal square root estimate half |
| E.RSQREST.F.16.X | Ensemble floating-point reciprocal square root estimat half exact |
| E.RSQREST.F.32 | Ensemble floating-point reciprocal square root estimate single |
| E.RSQREST.F.32.X | Ensemble floating-point reciprocal square root estimate single exact |
| E.RSQREST.F.64 | Ensemble floating-point reciprocal square root estimate double |
| E.RSQREST.F.64.X | Ensemble floating-point reciprocal square root estimate double exact |
| E.RSQREST.F.128 | Ensemble floating-point reciprocal square root estimate quad |
| E.RSQREST.F.128.X | Ensemble floating-point reciprocal square root estimate quad exact |
| E.SINK.F.16 | Ensemble convert floating-point doublets from half nearest default |
| E.SINK.F.16.C | Ensemble convert floating-point doublets from half ceiling |
| E.SINK.F.16.C.D | Ensemble convert floating-point doublets from half ceiling default |
| E.SINK.F.16.F | Ensemble convert floating-point doublets from half floor |
| E.SINK.F.16.F.D | Ensemble convert floating-point doublets from half floor default |
| E.SINK.F.16.N | Ensemble convert floating-point doublets from half nearest |
| E.SINK.F.16.X | Ensemble convert floating-point doublets from half exact |
| E.SINK.F.16.Z | Ensemble convert floating-point doublets from half zero |
| E.SINK.F.16.Z.D | Ensemble convert floating-point doublets from half zero default |
| E.SINK.F.32 | Ensemble convert floating-point quadlets from single nearest default |
| E.SINK.F.32.C | Ensemble convert floating-point quadlets from single ceiling |
| E.SINK.F.32.C.D | Ensemble convert floating-point quadlets from single ceiling default |
| E.SINK.F.32.F | Ensemble convert floating-point quadlets from single floor |
| E.SINK.F.32.F.D | Ensemble convert floating-point quadlets from single floor default |
| E.SINK.F.32.N | Ensemble convert floating-point quadlets from single nearest |
| E.SINK.F.32.X | Ensemble convert floating-point quadlets from single exact |
| E.SINK.F.32.Z | Ensemble convert floating-point quadlets from single zero |
| E.SINK.F.32.Z.D | Ensemble convert floating-point quadlets from single zero default |
| E.SINK.F.64 | Ensemble convert floating-point octlets from double nearest default |
| E.SINK.F.64.C | Ensemble convert floating-point octlets from double ceiling |
| E.SINK.F.64.C.D | Ensemble convert floating-point octlets from double ceiling default |
| E.SINK.F.64.F | Ensemble convert floating-point octlets from double floor |
| E.SINK.F.64.F.D | Ensemble convert floating-point octlets from double floor default |
| E.SINK.F.64.N | Ensemble convert floating-point octlets from double nearest |
| E.SINK.F.64.X | Ensemble convert floating-point octlets from double exact |
| E.SINK.F.64.Z | Ensemble convert floating-point octlets from double zero |
| E.SINK.F.64.Z.D | Ensemble convert floating-point octlets from double zero default |
| E.SINK.F.128 | Ensemble convert floating-point hexlet from quad nearest default |
| E.SINK.F.128.C | Ensemble convert floating-point hexlet from quad ceiling |
| E.SINK.F.128.C.D | Ensemble convert floating-point hexlet from quad ceiling default |
| E.SINK.F.128.F | Ensemble convert floating-point hexlet from quad floor |
| E.SINK.F.128.F.D | Ensemble convert floating-point hexlet from quad floor default |

Fig. 41A (cont'd)

| | |
|---|---|
| E.SINK.F.128.N | Ensemble convert floating-point hexlet from quad nearest |
| E.SINK.F.128.X | Ensemble convert floating-point hexlet from quad exact |
| E.SINK.F.128.Z | Ensemble convert floating-point hexlet from quad zero |
| E.SINK.F.128.Z.D | Ensemble convert floating-point hexlet from quad zero default |
| E.SQR.F.16 | Ensemble square root floating-point half |
| E.SQR.F.16.C | Ensemble square root floating-point half ceiling |
| E.SQR.F.16.F | Ensemble square root floating-point half floor |
| E.SQR.F.16.N | Ensemble square root floating-point half nearest |
| E.SQR.F.16.X | Ensemble square root floating-point half exact |
| E.SQR.F.16.Z | Ensemble square root floating-point half zero |
| E.SQR.F.32 | Ensemble square root floating-point single |
| E.SQR.F.32.C | Ensemble square root floating-point single ceiling |
| E.SQR.F.32.F | Ensemble square root floating-point single floor |
| E.SQR.F.32.N | Ensemble square root floating-point single nearest |
| E.SQR.F.32.X | Ensemble square root floating-point single exact |
| E.SQR.F.32.Z | Ensemble square root floating-point single zero |
| E.SQR.F.64 | Ensemble square root floating-point double |
| E.SQR.F.64.C | Ensemble square root floating-point double ceiling |
| E.SQR.F.64.F | Ensemble square root floating-point double floor |
| E.SQR.F.64.N | Ensemble square root floating-point double nearest |
| E.SQR.F.64.X | Ensemble square root floating-point double exact |
| E.SQR.F.64.Z | Ensemble square root floating-point double zero |
| E.SQR.F.128 | Ensemble square root floating-point quad |
| E.SQR.F.128.C | Ensemble square root floating-point quad ceiling |
| E.SQR.F.128.F | Ensemble square root floating-point quad floor |
| E.SQR.F.128.N | Ensemble square root floating-point quad nearest |
| E.SQR.F.128.X | Ensemble square root floating-point quad exact |
| E.SQR.F.128.Z | Ensemble square root floating-point quad zero |
| E.SUM.F.16 | Ensemble sum floating-point half |
| E.SUM.F.16.C | Ensemble sum floating-point half ceiling |
| E.SUM.F.16.F | Ensemble sum floating-point half floor |
| E.SUM.F.16.N | Ensemble sum floating-point half nearest |
| E.SUM.F.16.X | Ensemble sum floating-point half exact |
| E.SUM.F.16.Z | Ensemble sum floating-point half zero |
| E.SUM.F.32 | Ensemble sum floating-point single |
| E.SUM.F.32.C | Ensemble sum floating-point single ceiling |
| E.SUM.F.32.F | Ensemble sum floating-point single floor |
| E.SUM.F.32.N | Ensemble sum floating-point single nearest |
| E.SUM.F.32.X | Ensemble sum floating-point single exact |
| E.SUM.F.32.Z | Ensemble sum floating-point single zero |

Fig. 41A (cont'd)

| | |
|---|---|
| E.SUM.F.64 | Ensemble sum floating-point double |
| E.SUM.F.64.C | Ensemble sum floating-point double ceiling |
| E.SUM.F.64.F | Ensemble sum floating-point double floor |
| E.SUM.F.64.N | Ensemble sum floating-point double nearest |
| E.SUM.F.64.X | Ensemble sum floating-point double exact |
| E.SUM.F.64.Z | Ensemble sum floating-point double zero |
| E.SUM.F.128 | Ensemble sum floating-point quad |
| E.SUM.F.128.C | Ensemble sum floating-point quad ceiling |
| E.SUM.F.128.F | Ensemble sum floating-point quad floor |
| E.SUM.F.128.N | Ensemble sum floating-point quad nearest |
| E.SUM.F.128.X | Ensemble sum floating-point quad exact |
| E.SUM.F.128.Z | Ensemble sum floating-point quad zero |

Selection

| | op | prec | | | | round/trap |
|---|---|---|---|---|---|---|
| copy | COPY | 16 | 32 | 64 | 128 | NONE X |
| absolute value | ABS | 16 | 32 | 64 | 128 | NONE X |
| float from integer | FLOAT | 16 | 32 | 64 | 128 | NONE C F N X Z |
| integer from float | SINK | 16 | 32 | 64 | 128 | NONE C F N X Z C.D F.D Z.D |
| increase format precision | INFLATE | 16 | 32 | 64 | | NONE X |
| decrease format precision | DEFLATE | | 32 | 64 | 128 | NONE C F N X Z |
| negate | NEG | 16 | 32 | 64 | 128 | NONE X |
| reciprocal estimate | RECEST | 16 | 32 | 64 | 128 | NONE X |
| reciprocal square root estimate | RSQREST | 16 | 32 | 64 | 128 | NONE X |
| square root | SQR | 16 | 32 | 64 | 128 | NONE C F N X Z |
| sum | SUM | 16 | 32 | 64 | 128 | NONE C F N X Z |

Fig. 41A (cont'd)

Format

E.op.prec.round     rd=rc rd=eopprecround(rc)

Definition

```
def EnsembleUnaryFloatingPoint(op,prec,round,rd,rc) as
    c ← RegRead(rc, 128)
    case op of
        E.ABS.F, E.NEG.F, E.SQR.F:
            for i ← 0 to 128-prec by prec
                ci ← F(prec,c_{i+prec-1..i})
                case op of
                    E.ABS.F:
                        ai.t ← ci.t
                        ai.s ← 0
                        ai.e ← ci.e
                        ai.f ← ci.f
                    E.COPY.F:
                        ai ← ci
                    E.NEG.F:
                        ai.t ← ci.t
                        ai.s ← ~ci.s
                        ai.e ← ci.e
                        ai.f ← ci.f
                    E.RECEST.F:
                        ai ← frecest(ci)
                    E.RSQREST.F:
                        ai ← frsqrest(ci)
                    E.SQR.F:
                        ai ← fsqr(ci)
                endcase
                a_{i+prec-1..i} ← PackF(prec, ai, round)
            endfor
        E.SUM.F:
            p[0].t ← NULL
            for i ← 0 to 128-prec by prec
                p[i+prec] ← fadd(p[i], F(prec,c_{i+prec-1..i}))
            endfor
            a ← PackF(prec, p[128], round)
        E.SINK.F:
            for i ← 0 to 128-prec by prec
                ci ← F(prec,c_{i+prec-1..i})
                a_{i+prec-1..i} ← fsinkr(prec, ci, round)
            endfor
        E.FLOAT.F:
            for i ← 0 to 128-prec by prec
                ci.t ← NORM
                ci.e ← 0
                ci.s ← c_{i+prec-1}
                ci.f ← ci.s ? 1+~c_{i+prec-2..i} : c_{i+prec-2..i}
                a_{i+prec-1..i} ← PackF(prec, ci, round)
            endfor
```

Fig. 41C

```
E.INFLATE.F:
        for i ← 0 to 64-prec by prec
                ci ← F(prec,c_{i+prec-1..i})
                a_{i+i+prec+prec-1..i+i} ← PackF(prec+prec, ci, round)
        endfor
E.DEFLATE.F:
        for i ← 0 to 128-prec by prec
                ci ← F(prec,c_{i+prec-1..i})
                a_{i/2+prec/2-1..i/2} ← PackF(prec/2, ci, round)
        endfor
        a_{127..64} ← 0
    endcase
    RegWrite[rd, 128, a]
enddef
```

Exceptions
Floating-point arithmetic

Fig. 41C (cont'd)

| E.MUL.G.8 | Ensemble multiply Galois field byte |
|---|---|
| E.MUL.G.64 | Ensemble multiply Galois field octlet |

Fig. 42A

Format

E.MUL.G.size    ra=rd,rc,rb ra=emulgsize(rd,rc,rb)

| 31 | 24 23 | 18 17 | 12 11 | 6 5 | 0 |
|---|---|---|---|---|---|
| E.MUL.G.size | rd | rc | rb | ra | |
| 8 | 6 | 6 | 6 | 6 | |

Fig.42B

Definition def c ← PolyMultiply(size,a,b) as
    $p[0] \leftarrow 0^{2*size}$
    for k ← 0 to size-1
        $p[k+1] \leftarrow p[k]$ ^ $a_k$ ? $(0^{size-k} \parallel b \parallel 0^k) : 0^{2*size}$
    endfor
    c ← p[size]
enddef def c ← PolyResidue(size,a,b) as
    p[0] ← a
    for k ← size-1 to 0 by -1
        $p[k+1] \leftarrow p[k]$ ^ $p[0]_{size+k}$ ? $(0^{size-k} \parallel 1^1 \parallel b \parallel 0^k) : 0^{2*size}$
    endfor
    $c \leftarrow p[size]_{size-1..0}$
enddef def EnsembleTernary(op,size,rd,rc,rb,ra) as
    d ← RegRead(rd, 128)
    c ← RegRead(rc, 128)
    b ← RegRead(rb, 128)
    case op of
        E.MUL.G:
            for i ← 0 to 128-size by size
                $a_{size-1+i..i} \leftarrow$ PolyResidue(size,PolyMul(size,$c_{size-1+i..i}$,$b_{size-1+i..i}$),$d_{size-1+i..i}$)
            endfor
    endcase
    RegWrite(ra, 128, a)
enddef

Exceptions
none

Fig. 42C

| X.COMPRESS.2 | Crossbar compress signed pecks |
|---|---|
| X.COMPRESS.4 | Crossbar compress signed nibbles |
| X.COMPRESS.8 | Crossbar compress signed bytes |
| X.COMPRESS.16 | Crossbar compress signed doublets |
| X.COMPRESS.32 | Crossbar compress signed quadlets |
| X.COMPRESS.64 | Crossbar compress signed octlets |
| X.COMPRESS.128 | Crossbar compress signed hexlet |
| X.COMPRESS.U.2 | Crossbar compress unsigned pecks |
| X.COMPRESS.U.4 | Crossbar compress unsigned nibbles |
| X.COMPRESS.U.8 | Crossbar compress unsigned bytes |
| X.COMPRESS.U.16 | Crossbar compress unsigned doublets |
| X.COMPRESS.U.32 | Crossbar compress unsigned quadlets |
| X.COMPRESS.U.64 | Crossbar compress unsigned octlets |
| X.COMPRESS.U.128 | Crossbar compress unsigned hexlet |
| X.EXPAND.2 | Crossbar expand signed pecks |
| X.EXPAND.4 | Crossbar expand signed nibbles |
| X.EXPAND.8 | Crossbar expand signed bytes |
| X.EXPAND.16 | Crossbar expand signed doublets |
| X.EXPAND.32 | Crossbar expand signed quadlets |
| X.EXPAND.64 | Crossbar expand signed octlets |
| X.EXPAND.128 | Crossbar expand signed hexlet |
| X.EXPAND.U.2 | Crossbar expand unsigned pecks |
| X.EXPAND.U.4 | Crossbar expand unsigned nibbles |
| X.EXPAND.U.8 | Crossbar expand unsigned bytes |
| X.EXPAND.U.16 | Crossbar expand unsigned doublets |
| X.EXPAND.U.32 | Crossbar expand unsigned quadlets |
| X.EXPAND.U.64 | Crossbar expand unsigned octlets |
| X.EXPAND.U.128 | Crossbar expand unsigned hexlet |
| X.ROTL.2 | Crossbar rotate left pecks |
| X.ROTL.4 | Crossbar rotate left nibbles |
| X.ROTL.8 | Crossbar rotate left bytes |
| X.ROTL.16 | Crossbar rotate left doublets |
| X.ROTL.32 | Crossbar rotate left quadlets |
| X.ROTL.64 | Crossbar rotate left octlets |
| X.ROTL.128 | Crossbar rotate left hexlet |
| X.ROTR.2 | Crossbar rotate right pecks |
| X.ROTR.4 | Crossbar rotate right nibbles |
| X.ROTR.8 | Crossbar rotate right bytes |
| X.ROTR.16 | Crossbar rotate right doublets |

Fig. 43A

| X.ROTR.32 | Crossbar rotate right quadlets |
|---|---|
| X.ROTR.64 | Crossbar rotate right octlets |
| X.ROTR.128 | Crossbar rotate right hexlet |
| X.SHL.2 | Crossbar shift left pecks |
| X.SHL.2.O | Crossbar shift left signed pecks check overflow |
| X.SHL.4 | Crossbar shift left nibbles |
| X.SHL.4.O | Crossbar shift left signed nibbles check overflow |
| X.SHL.8 | Crossbar shift left bytes |
| X.SHL.8.O | Crossbar shift left signed bytes check overflow |
| X.SHL.16 | Crossbar shift left doublets |
| X.SHL.16.O | Crossbar shift left signed doublets check overflow |
| X.SHL.32 | Crossbar shift left quadlets |
| X.SHL.32.O | Crossbar shift left signed quadlets check overflow |
| X.SHL.64 | Crossbar shift left octlets |
| X.SHL.64.O | Crossbar shift left signed octlets check overflow |
| X.SHL.128 | Crossbar shift left hexlet |
| X.SHL.128.O | Crossbar shift left signed hexlet check overflow |
| X.SHL.U.2.O | Crossbar shift left unsigned pecks check overflow |
| X.SHL.U.4.O | Crossbar shift left unsigned nibbles check overflow |
| X.SHL.U.8.O | Crossbar shift left unsigned bytes check overflow |
| X.SHL.U.16.O | Crossbar shift left unsigned doublets check overflow |
| X.SHL.U.32.O | Crossbar shift left unsigned quadlets check overflow |
| X.SHL.U.64.O | Crossbar shift left unsigned octlets check overflow |
| X.SHL.U.128.O | Crossbar shift left unsigned hexlet check overflow |
| X.SHR.2 | Crossbar signed shift right pecks |
| X.SHR.4 | Crossbar signed shift right nibbles |
| X.SHR.8 | Crossbar signed shift right bytes |
| X.SHR.16 | Crossbar signed shift right doublets |
| X.SHR.32 | Crossbar signed shift right quadlets |
| X.SHR.64 | Crossbar signed shift right octlets |
| X.SHR.128 | Crossbar signed shift right hexlet |
| X.SHR.U.2 | Crossbar shift right unsigned pecks |
| X.SHR.U.4 | Crossbar shift right unsigned nibbles |
| X.SHR.U.8 | Crossbar shift right unsigned bytes |
| X.SHR.U.16 | Crossbar shift right unsigned doublets |
| X.SHR.U.32 | Crossbar shift right unsigned quadlets |
| X.SHR.U.64 | Crossbar shift right unsigned octlets |
| X.SHR.U.128 | Crossbar shift right unsigned hexlet |

Fig. 43A (cont'd)

Selection

| class | op | size |
|---|---|---|
| precision | EXPAND    EXPAND.U COMPRESS           COMPRESS.U | 2 4 8 16 32 64 128 |
| shift | ROTR  ROTL  SHR  SHL SHL.O  SHL.U.O         SHR.U | 2 4 8 16 32 64 128 |

Format

X.op.size    rd=rc,rb rd=xopsize(rc,rb)

lsize ← log(size)
s ← lsize$_2$
sz ← lsize$_{1..0}$

Definition

```
def Crossbar(op,size,rd,rc,rb)
    c ← RegRead(rc, 128)
    b ← RegRead(rb, 128)
    shift ← b and (size-1)
    case op₅..₂ || 0² of
```
$\quad\quad$ case $op_{5..2} \| 0^2$ of
$\quad\quad\quad$ X.COMPRESS:
$\quad\quad\quad\quad$ hsize ← size/2
$\quad\quad\quad\quad$ for i ← 0 to 64-hsize by hsize
$\quad\quad\quad\quad\quad$ if shift ≤ hsize then
$\quad\quad\quad\quad\quad\quad a_{i+hsize-1..i} \leftarrow c_{i+i+shift+hsize-1..i+i+shift}$
$\quad\quad\quad\quad\quad$ else
$\quad\quad\quad\quad\quad\quad a_{i+hsize-1..i} \leftarrow c_{i+i+size-1}^{shift-hsize} \| c_{i+i+size-1..i+i+shift}$
$\quad\quad\quad\quad\quad$ endif
$\quad\quad\quad\quad$ endfor
$\quad\quad\quad\quad a_{127..64} \leftarrow 0$
$\quad\quad\quad$ X.COMPRESS.U:
$\quad\quad\quad\quad$ hsize ← size/2
$\quad\quad\quad\quad$ for i ← 0 to 64-hsize by hsize
$\quad\quad\quad\quad\quad$ if shift ≤ hsize then
$\quad\quad\quad\quad\quad\quad a_{i+hsize-1..i} \leftarrow c_{i+i+shift+hsize-1..i+i+shift}$
$\quad\quad\quad\quad\quad$ else
$\quad\quad\quad\quad\quad\quad a_{i+hsize-1..i} \leftarrow 0^{shift-hsize} \| c_{i+i+size-1..i+i+shift}$
$\quad\quad\quad\quad\quad$ endif
$\quad\quad\quad\quad$ endfor
$\quad\quad\quad\quad a_{127..64} \leftarrow 0$
$\quad\quad\quad$ X.EXPAND:
$\quad\quad\quad\quad$ hsize ← size/2
$\quad\quad\quad\quad$ for i ← 0 to 64-hsize by hsize
$\quad\quad\quad\quad\quad$ if shift ≤ hsize then
$\quad\quad\quad\quad\quad\quad a_{i+i+size-1..i+i} \leftarrow c_{i+hsize-1}^{hsize-shift} \| c_{i+hsize-1..i} \| 0^{shift}$
$\quad\quad\quad\quad\quad$ else
$\quad\quad\quad\quad\quad\quad a_{i+i+size-1..i+i} \leftarrow c_{i+size-shift-1..i} \| 0^{shift}$
$\quad\quad\quad\quad\quad$ endif
$\quad\quad\quad\quad$ endfor
$\quad\quad\quad$ X.EXPAND.U:
$\quad\quad\quad\quad$ hsize ← size/2
$\quad\quad\quad\quad$ for i ← 0 to 64-hsize by hsize
$\quad\quad\quad\quad\quad$ if shift ≤ hsize then
$\quad\quad\quad\quad\quad\quad a_{i+i+size-1..i+i} \leftarrow 0^{hsize-shift} \| c_{i+hsize-1..i} \| 0^{shift}$
$\quad\quad\quad\quad\quad$ else
$\quad\quad\quad\quad\quad\quad a_{i+i+size-1..i+i} \leftarrow c_{i+size-shift-1..i} \| 0^{shift}$
$\quad\quad\quad\quad\quad$ endif
$\quad\quad\quad\quad$ endfor
$\quad\quad\quad$ X.ROTL:
$\quad\quad\quad\quad$ for i ← 0 to 128-size by size
$\quad\quad\quad\quad\quad a_{i+size-1..i} \leftarrow c_{i+size-1-shift..i} \| c_{i+size-1..i+size-1-shift}$
$\quad\quad\quad\quad$ endfor

Fig. 43C

X.ROTR:
    for i ← 0 to 128-size by size
        $a_{i+size-1..i}$ ← $c_{i+shift-1..i}$ ∥ $c_{i+size-1..i+shift}$
    endfor X.SHL:
    for i ← 0 to 128-size by size
        $a_{i+size-1..i}$ ← $c_{i+size-1-shift..i}$ ∥ $0^{shift}$
    endfor X.SHL.O:
    for i ← 0 to 128-size by size
        if $c_{i+size-1..i+size-1-shift}$ ≠ $c_{i+size-1-shift}^{shift+1}$ then
            raise FixedPointArithmetic
        endif
        $a_{i+size-1..i}$ ← $c_{i+size-1-shift..i}$∥ $0^{shift}$
    endfor X.SHL.U.O:
    for i ← 0 to 128-size by size
        if $c_{i+size-1..i+size-shift}$ ≠ $0^{shift}$ then
            raise FixedPointArithmetic
        endif
        $a_{i+size-1..i}$ ← $c_{i+size-1-shift..i}$∥ $0^{shift}$
    endfor X.SHR:
    for i ← 0 to 128-size by size
        $a_{i+size-1..i}$ ← $c_{i+size-1}^{shift}$ ∥ $c_{i+size-1..i+shift}$
    endfor X.SHR.U:
    for i ← 0 to 128-size by size
        $a_{i+size-1..i}$ ← $0^{shift}$ ∥ $c_{i+size-1..i+shift}$
    endfor endcase
    RegWrite(rd, 128, a)
enddef

Exceptions
Fixed-point arithmetic

Fig. 43C (cont'd)

Compress 32 bits to 16, with 4-bit right shift

Operation codes

| | |
|---|---|
| X.SHL.M.2 | Crossbar shift left merge pecks |
| X.SHL.M.4 | Crossbar shift left merge nibbles |
| X.SHL.M.8 | Crossbar shift left merge bytes |
| X.SHL.M.16 | Crossbar shift left merge doublets |
| X.SHL.M.32 | Crossbar shift left merge quadlets |
| X.SHL.M.64 | Crossbar shift left merge octlets |
| X.SHL.M.128 | Crossbar shift left merge hexlet |
| X.SHR.M.2 | Crossbar shift right merge pecks |
| X.SHR.M.4 | Crossbar shift right merge nibbles |
| X.SHR.M.8 | Crossbar shift right merge bytes |
| X.SHR.M.16 | Crossbar shift right merge doublets |
| X.SHR.M.32 | Crossbar shift right merge quadlets |
| X.SHR.M.64 | Crossbar shift right merge octlets |
| X.SHR.M.128 | Crossbar shift right merge hexlet |

Fig. 43E

Format

X.op.size    rd@rc,rb rd=xopsize(rd,rc,rb)

$lsize \leftarrow \log(size)$
$s \leftarrow lsize_2$
$sz \leftarrow lsize_{1..0}$

Definition def CrossbarInplace(op,size,rd,rc,rb) as
    d ← RegRead(rd, 128)
    c ← RegRead(rc, 128)
    b ← RegRead(rb, 128)
    shift ← b and (size-1)
    for i ← 0 to 128-size by size
        case op of
            X.SHR.M:
                $a_{i+size-1..i} \leftarrow c_{i+shift-1..i} \parallel d_{i+size-1..i+shift}$
            X.SHL.M:
                $a_{i+size-1..i} \leftarrow d_{i+size-1-shift..i} \parallel c_{i+shift-1..i}$
    endfor
    RegWrite(rd, 128, a)
enddef

Exceptions none

Fig 43G

Operation codes

| | |
|---|---|
| X.COMPRESS.I.2 | Crossbar compress immediate signed pecks |
| X.COMPRESS.I.4 | Crossbar compress immediate signed nibbles |
| X.COMPRESS.I.8 | Crossbar compress immediate signed bytes |
| X.COMPRESS.I.16 | Crossbar compress immediate signed doublets |
| X.COMPRESS.I.32 | Crossbar compress immediate signed quadlets |
| X.COMPRESS.I.64 | Crossbar compress immediate signed octlets |
| X.COMPRESS.I.128 | Crossbar compress immediate signed hexlet |
| X.COMPRESS.I.U.2 | Crossbar compress immediate unsigned pecks |
| X.COMPRESS.I.U.4 | Crossbar compress immediate unsigned nibbles |
| X.COMPRESS.I.U.8 | Crossbar compress immediate unsigned bytes |
| X.COMPRESS.I.U.16 | Crossbar compress immediate unsigned doublets |
| X.COMPRESS.I.U.32 | Crossbar compress immediate unsigned quadlets |
| X.COMPRESS.I.U.64 | Crossbar compress immediate unsigned octlets |
| X.COMPRESS.I.U.128 | Crossbar compress immediate unsigned hexlet |
| X.EXPAND.I.2 | Crossbar expand immediate signed pecks |
| X.EXPAND.I.4 | Crossbar expand immediate signed nibbles |
| X.EXPAND.I.8 | Crossbar expand immediate signed bytes |
| X.EXPAND.I.16 | Crossbar expand immediate signed doublets |
| X.EXPAND.I.32 | Crossbar expand immediate signed quadlets |
| X.EXPAND.I.64 | Crossbar expand immediate signed octlets |
| X.EXPAND.I.128 | Crossbar expand immediate signed hexlet |
| X.EXPAND.I.U.2 | Crossbar expand immediate unsigned pecks |
| X.EXPAND.I.U.4 | Crossbar expand immediate unsigned nibbles |
| X.EXPAND.I.U.8 | Crossbar expand immediate unsigned bytes |
| X.EXPAND.I.U.16 | Crossbar expand immediate unsigned doublets |
| X.EXPAND.I.U.32 | Crossbar expand immediate unsigned quadlets |
| X.EXPAND.I.U.64 | Crossbar expand immediate unsigned octlets |
| X.EXPAND.I.U.128 | Crossbar expand immediate unsigned hexlet |
| X.ROTL.I.2 | Crossbar rotate left immediate pecks |
| X.ROTL.I.4 | Crossbar rotate left immediate nibbles |
| X.ROTL.I.8 | Crossbar rotate left immediate bytes |
| X.ROTL.I.16 | Crossbar rotate left immediate doublets |
| X.ROTL.I.32 | Crossbar rotate left immediate quadlets |
| X.ROTL.I.64 | Crossbar rotate left immediate octlets |
| X.ROTL.I.128 | Crossbar rotate left immediate hexlet |
| X.ROTR.I.2 | Crossbar rotate right immediate pecks |
| X.ROTR.I.4 | Crossbar rotate right immediate nibbles |
| X.ROTR.I.8 | Crossbar rotate right immediate bytes |
| X.ROTR.I.16 | Crossbar rotate right immediate doublets |
| X.ROTR.I.32 | Crossbar rotate right immediate quadlets |
| X.ROTR.I.64 | Crossbar rotate right immediate octlets |
| X.ROTR.I.128 | Crossbar rotate right immediate hexlet |

Fig. 43H

| | |
|---|---|
| X.SHL.I.2 | Crossbar shift left immediate pecks |
| X.SHL.I.2.O | Crossbar shift left immediate signed pecks check overflow |
| X.SHL.I.4 | Crossbar shift left immediate nibbles |
| X.SHL.I.4.O | Crossbar shift left immediate signed nibbles check overflow |
| X.SHL.I.8 | Crossbar shift left immediate bytes |
| X.SHL.I.8.O | Crossbar shift left immediate signed bytes check overflow |
| X.SHL.I.16 | Crossbar shift left immediate doublets |
| X.SHL.I.16.O | Crossbar shift left immediate signed doublets check overflow |
| X.SHL.I.32 | Crossbar shift left immediate quadlets |
| X.SHL.I.32.O | Crossbar shift left immediate signed quadlets check overflow |
| X.SHL.I.64 | Crossbar shift left immediate octlets |
| X.SHL.I.64.O | Crossbar shift left immediate signed octlets check overflow |
| X.SHL.I.128 | Crossbar shift left immediate hexlet |
| X.SHL.I.128.O | Crossbar shift left immediate signed hexlet check overflow |
| X.SHL.I.U.2.O | Crossbar shift left immediate unsigned pecks check overflow |
| X.SHL.I.U.4.O | Crossbar shift left immediate unsigned nibbles check overflow |
| X.SHL.I.U.8.O | Crossbar shift left immediate unsigned bytes check overflow |
| X.SHL.I.U.16.O | Crossbar shift left immediate unsigned doublets check overflow |
| X.SHL.I.U.32.O | Crossbar shift left immediate unsigned quadlets check overflow |
| X.SHL.I.U.64.O | Crossbar shift left immediate unsigned octlets check overflow |
| X.SHL.I.U.128.O | Crossbar shift left immediate unsigned hexlet check overflow |
| X.SHR.I.2 | Crossbar signed shift right immediate pecks |
| X.SHR.I.4 | Crossbar signed shift right immediate nibbles |
| X.SHR.I.8 | Crossbar signed shift right immediate bytes |
| X.SHR.I.16 | Crossbar signed shift right immediate doublets |
| X.SHR.I.32 | Crossbar signed shift right immediate quadlets |
| X.SHR.I.64 | Crossbar signed shift right immediate octlets |
| X.SHR.I.128 | Crossbar signed shift right immediate hexlet |
| X.SHR.I.U.2 | Crossbar shift right immediate unsigned pecks |
| X.SHR.I.U.4 | Crossbar shift right immediate unsigned nibbles |
| X.SHR.I.U.8 | Crossbar shift right immediate unsigned bytes |
| X.SHR.I.U.16 | Crossbar shift right immediate unsigned doublets |
| X.SHR.I.U.32 | Crossbar shift right immediate unsigned quadlets |
| X.SHR.I.U.64 | Crossbar shift right immediate unsigned octlets |
| X.SHR.I.U.128 | Crossbar shift right immediate unsigned hexlet |

Fig. 43H (cont)

Selection

| class | op | size |
|---|---|---|
| precision | COMPRESS.I<br>COMPRESS.I.U  EXPAND.I<br>EXPAND.I.U | 2 4 8 16 32 64 128 |
| shift | ROTL.I  ROTR.I<br>SHL.I  SHL.I.O<br>SHL.I.U.O<br>SHR.I  SHR.I.U | 2 4 8 16 32 64 128 |
| copy | COPY | |

Format

X.op.size    rd=rc,shift rd=xopsize(rc,shift)

$t \leftarrow 256 - 2 \cdot size + shift$ $op_{1..0} \leftarrow t_{7..6}$ $simm \leftarrow t_{5..0}$

Definition

```
def CrossbarShortImmediate(op,rd,rc,simm)
    case (op_{1..0} || simm) of
        0..127:
                size ← 128
        128..191:
                size ← 64
        192..223:
                size ← 32
        224..239:
                size ← 16
        240..247:
                size ← 8
        248..251:
                size ← 4
        252..253:
                size ← 2
        254..255:
                raise ReservedInstruction
    endcase
    shift ← (op_0 || simm) and (size-1)
    c ← RegRead(rc, 128)
    case (op_{5..2} || 0^2) of
        X.COMPRESS.I:
                hsize ← size/2
                for i ← 0 to 64-hsize by hsize
                    if shift ≤ hsize then
                            a_{i+hsize-1..i} ← c_{i+i+shift+hsize-1..i+i+shift}
                    else
                            a_{i+hsize-1..i} ← c_{i+i+size-1}^{shift-hsize} || c_{i+i+size-1..i+i+shift}
                    endif
                endfor
                a_{127..64} ← 0
        X.COMPRESS.I.U:
                hsize ← size/2
                for i ← 0 to 64-hsize by hsize
                    if shift ≤ hsize then
                            a_{i+hsize-1..i} ← c_{i+i+shift+hsize-1..i+i+shift}
                    else
                            a_{i+hsize-1..i} ← 0^{shift-hsize} || c_{i+i+size-1..i+i+shift}
                    endif
                endfor
                a_{127..64} ← 0
```

Fig. 43J

X.EXPAND.I:
    hsize ← size/2
    for i ← 0 to 64-hsize by hsize
        if shift ≤ hsize then
            $a_{i+i+size-1..i+i} \leftarrow c_{i+hsize-1}^{hsize-shift} \| c_{i+hsize-1..i} \| 0^{shift}$
        else
            $a_{i+i+size-1..i+i} \leftarrow c_{i+size-shift-1..i} \| 0^{shift}$
        endif
    endfor X.EXPAND.I.U:
    hsize ← size/2
    for i ← 0 to 64-hsize by hsize
        if shift ≤ hsize then
            $a_{i+i+size-1..i+i} \leftarrow 0^{hsize-shift} \| c_{i+hsize-1..i} \| 0^{shift}$
        else
            $a_{i+i+size-1..i+i} \leftarrow c_{i+size-shift-1..i} \| 0^{shift}$
        endif
    endfor X.SHL.I:
    for i ← 0 to 128-size by size
        $a_{i+size-1..i} \leftarrow c_{i+size-1-shift..i} \| 0^{shift}$
    endfor X.SHL.I.O:
    for i ← 0 to 128-size by size
        if $c_{i+size-1..i+size-1-shift} \neq c_{i+size-1-shift}^{shift+1}$ then
            raise FixedPointArithmetic
        endif
        $a_{i+size-1..i} \leftarrow c_{i+size-1-shift..i} \| 0^{shift}$
    endfor X.SHL.I.U.O:
    for i ← 0 to 128-size by size
        if $c_{i+size-1..i+size-shift} \neq 0^{shift}$ then
            raise FixedPointArithmetic
        endif
        $a_{i+size-1..i} \leftarrow c_{i+size-1-shift..i} \| 0^{shift}$
    endfor

Fig. 43J (cont)

X.ROTR.I:
    for i ← 0 to 128-size by size
        $a_{i+size-1..i} \leftarrow c_{i+shift-1..i} \parallel c_{i+size-1..i+shift}$
    endfor
X.SHR.I:
    for i ← 0 to 128-size by size
        $a_{i+size-1..i} \leftarrow c_{i+size-1}^{shift} \parallel c_{i+size-1..i+shift}$
    endfor
X.SHR.I.U:
    for i ← 0 to 128-size by size
        $a_{i+size-1..i} \leftarrow 0^{shift} \parallel c_{i+size-1..i+shift}$
    endfor
  endcase
  RegWrite(rd, 128, a)
enddef

Exceptions

Fixed-point arithmetic
Reserved Instruction

Fig. 43J (cont)

Operation codes

| | |
|---|---|
| X.SHL.M.I.2 | Crossbar shift left merge immediate pecks |
| X.SHL.M.I.4 | Crossbar shift left merge immediate nibbles |
| X.SHL.M.I.8 | Crossbar shift left merge immediate bytes |
| X.SHL.M.I.16 | Crossbar shift left merge immediate doublets |
| X.SHL.M.I.32 | Crossbar shift left merge immediate quadlets |
| X.SHL.M.I.64 | Crossbar shift left merge immediate octlets |
| X.SHL.M.I.128 | Crossbar shift left merge immediate hexlet |
| X.SHR.M.I.2 | Crossbar shift right merge immediate pecks |
| X.SHR.M.I.4 | Crossbar shift right merge immediate nibbles |
| X.SHR.M.I.8 | Crossbar shift right merge immediate bytes |
| X.SHR.M.I.16 | Crossbar shift right merge immediate doublets |
| X.SHR.M.I.32 | Crossbar shift right merge immediate quadlets |
| X.SHR.M.I.64 | Crossbar shift right merge immediate octlets |
| X.SHR.M.I.128 | Crossbar shift right merge immediate hexlet |

Fig 43K

Format

X.op.size     rd@rc,shift rd=xopsize(rc,shift)

$t \leftarrow 256-2*size+shift$
$op_{1..0} \leftarrow t_{7..6}$
$simm \leftarrow t_{5..0}$

Definition def CrossbarShortImmediateInplace(op,rd,rc,simm)
    case ($op_{1..0}$ || simm) of
        0..127:
            size ← 128
        128..191:
            size ← 64
        192..223:
            size ← 32
        224..239:
            size ← 16
        240..247:
            size ← 8
        248..251:
            size ← 4
        252..253:
            size ← 2
        254..255:
            raise ReservedInstruction
    endcase
    shift ← ($op_0$ || simm) and (size-1)
    c ← RegRead(rc, 128)
    d ← RegRead(rd, 128)
    for i ← 0 to 128-size by size
        case ($op_{5..2}$ || $0^2$) of
            X.SHR.M.I:
                $a_{i+size-1..i}$ ← $c_{i+shift-1..i}$ || $d_{i+size-1..i+shift}$
            X.SHL.M.I:
                $a_{i+size-1..i}$ ← $d_{i+size-1-shift..i}$ || $c_{i+shift-1..i}$
        endcase
    endfor
    RegWrite(rd, 128, a)
enddef

Exceptions

Reserved Instruction

Fig 43M

Format

X.EXTRACT ra=rd,rc,rb ra=xextract(rd,rc,rb)

Definition

```
def CrossbarExtract(op,ra,rb,rc,rd) as
        d ← RegRead(rd, 128)
        c ← RegRead(rc, 128)
        b ← RegRead(rb, 128)
        case b8..0 of
                0..255:
                        gsize ← 128
                256..383:
                        gsize ← 64
                384..447:
                        gsize ← 32
                448..479:
                        gsize ← 16
                480..495:
                        gsize ← 8
                496..503:
                        gsize ← 4
                504..507:
                        gsize ← 2
                508..511:
                        gsize ← 1
        endcase
        m ← b12
        as ← signed ← b14
        h ← (2-m)*gsize
        spos ← (b8..0) and ((2-m)*gsize-1)
        dpos ← (0 || b23..16) and (gsize-1)
        sfsize ← (0 || b31..24) and (gsize-1)
        tfsize ← (sfsize = 0) or ((sfsize+dpos) > gsize) ? gsize-dpos : sfsize
        fsize ← (tfsize + spos > h) ? h - spos : tfsize
        for i ← 0 to 128-gsize by gsize
                case op of
                        X.EXTRACT:
                                if m then
                                        p ← d_{gsize+i-1..i}
                                else
                                        p ← (d || c)_{2*(gsize+i)-1..2*i}
                                endif
                endcase
                v ← (as & p_{h-1})||p
                w ← (as & v_{spos+fsize-1})^{gsize-fsize-dpos} || v_{fsize-1+spos..spos} || 0^{dpos}
                if m then
                        a_{size-1+i..i} ← c_{gsize-1+i..dpos+fsize+i} || w_{dpos+fsize-1..dpos} || c_{dpos-1+1..i}
                else
                        a_{size-1+i..i} ← w
                endif
        endfor
        RegWrite(ra, 128, a)
enddef
```

Exceptions
none

Fig. 44B

Crossbar extract

Crossbar merge extract

Operation codes

| E.MUL.X | Ensemble multiply extract |
|---|---|
| E.EXTRACT | Ensemble extract |
| E.SCAL.ADD.X | Ensemble scale add extract |

Format

E.op   ra=rd,rc,rb ra=eop(rd,rc,rb)

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef def EnsembleExtract(op,ra,rb,rc,rd) as
    d ← RegRead(rd, 128)
    c ← RegRead(rc, 128)
    b ← RegRead(rb, 128)
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← b_{11}
    m ← b_{12}
    n ← b_{13}
    signed ← b_{14}
    case op of
        E.EXTRACT:
            gsize ← sgsize
            h ← (2-m)*gsize
            as ← signed
            spos ← (b_{8..0}) and ((2-m)*gsize-1)
        E.SCAL.ADD.X:
            if (sgsize < 8) then
                gsize ← 8
            elseif (sgsize*(n+1) > 32) then
                gsize ← 32/(n+1)
            else
                gsize ← sgsize
            endif
            ds ← cs ← signed
            ls ← signed ^ m
            as ← signed or m or n
            h ← (2*gsize) + 1 + n
            spos ← (b_{8..0}) and (2*gsize-1)
```

Fig. 44G

```
E.MUL.X:
    if (sgsize < 8) then
        gsize ← 8
    elseif (sgsize*(n+1) > 128) then
        gsize ← 128/(n+1)
    else
        gsize ← sgsize
    endif
    ds ← signed
    cs ← signed ^ m
    as ← signed or m or n
    h ← (2*gsize) + n
    spos ← (b_{8..0}) and (2*gsize-1)
endcase
dpos ← (0 || b_{23..16}) and (gsize-1)
r ← spos
sfsize ← (0 || b_{31..24}) and (gsize-1)
tfsize ← (sfsize = 0) or ((sfsize+dpos) > gsize) ? gsize-dpos : sfsize
fsize ← (tfsize + spos > h) ? h - spos : tfsize
if (b_{10..9} = Z) and not as then
    rnd ← F
else
    rnd ← b_{10..9}
endif
for i ← 0 to 128-gsize by gsize
    case op of
        E.EXTRACT:
            if m then
                p ← d_{gsize+i-1..i}
            else
                p ← (d || c)_{2*(gsize+i)-1..2*i}
            endif
        E.MUL.X:
            if n then
                if (i and gsize) = 0 then
                    p ← mul(gsize,h,ds,d,i,cs,c,i) - mul(gsize,h,ds,d,i+size,cs,c,i+size)
                else
                    p ← mul(gsize,h,ds,d,i,cs,c,i+size) + mul(gsize,h,ds,d,i,cs,c,i+size)
                endif
            else
                p ← mul(gsize,h,ds,d,i,cs,c,i)
            endif
```

Fig. 44G (cont)

```
            E.SCAL.ADD.X:
                if n then
                    if (i and gsize) = 0 then
                        p ← mul(gsize,h,ds,d,i,bs,b,64+2*gsize)
                            + mul(gsize,h,cs,c,i,bs,b,64)
                            - mul(gsize,h,ds,d,i+gsize,bs,b,64+3*gsize)
                            - mul(gsize,h,cs,c,i+gsize,bs,b,64+gsize)
                    else
                        p ← mul(gsize,h,ds,d,i,bs,b,64+3*gsize)
                            + mul(gsize,h,cs,c,i,bs,b,64+gsize)
                            + mul(gsize,h,ds,d,i+gsize,bs,b,64+2*gsize)
                            + mul(gsize,h,cs,c,i+gsize,bs,b,64)
                    endif
                else
                    p ← mul(gsize,h,ds,d,i,bs,b,64+gsize) + mul(gsize,h,cs,c,i,bs,b,64)
                endif
        endcase
        case rnd of
            N:
                s ← $0^{h-r}$ || $\neg p_r$ || $p_r^{r-1}$
            Z:
                s ← $0^{h-r}$ || $p_{h-1}^r$
            F:
                s ← $0^h$
            C:
                s ← $0^{h-r}$ || $1^r$
        endcase
        v ← ((as & $p_{h-1}$)||p) + (0||s)
        if ($v_{h..r+fsize}$ = (as & $v_{r+fsize-1}$)$^{h+1-r-fsize}$) or not (l and (op = E.EXTRACT)) then
            w ← (as & $v_{r+fsize-1}$)$^{gsize-fsize-dpos}$ || $v_{fsize-1+r..r}$ || $0^{dpos}$
        else
            w ← (s ? ($v_h$ || $\neg v_h^{size-dpos-1}$) : $1^{gsize-dpos}$) || $0^{dpos}$
        endif
        if m and (op = E.EXTRACT) then
            $a_{size-1+i..i}$ ← $c_{gsize-1+i..dpos+fsize+i}$ || $w_{dpos+fsize-1..dpos}$ || $c_{dpos-1+1..i}$
        else
            $a_{size-1+i..i}$ ← w
        endif
    endfor
    RegWrite(ra, 128, a)
enddef
```

Exceptions none

| | |
|---|---|
| X.DEPOSIT.2 | Crossbar deposit signed pecks |
| X.DEPOSIT.4 | Crossbar deposit signed nibbles |
| X.DEPOSIT.8 | Crossbar deposit signed bytes |
| X.DEPOSIT.16 | Crossbar deposit signed doublets |
| X.DEPOSIT.32 | Crossbar deposit signed quadlets |
| X.DEPOSIT.64 | Crossbar deposit signed octlets |
| X.DEPOSIT.128 | Crossbar deposit signed hexlet |
| X.DEPOSIT.U.2 | Crossbar deposit unsigned pecks |
| X.DEPOSIT.U.4 | Crossbar deposit unsigned nibbles |
| X.DEPOSIT.U.8 | Crossbar deposit unsigned bytes |
| X.DEPOSIT.U.16 | Crossbar deposit unsigned doublets |
| X.DEPOSIT.U.32 | Crossbar deposit unsigned quadlets |
| X.DEPOSIT.U.64 | Crossbar deposit unsigned octlets |
| X.DEPOSIT.U.128 | Crossbar deposit unsigned hexlet |
| X.WITHDRAW.U.2 | Crossbar withdraw unsigned pecks |
| X.WITHDRAW.U.4 | Crossbar withdraw unsigned nibbles |
| X.WITHDRAW.U.8 | Crossbar withdraw unsigned bytes |
| X.WITHDRAW.U.16 | Crossbar withdraw unsigned doublets |
| X.WITHDRAW.U.32 | Crossbar withdraw unsigned quadlets |
| X.WITHDRAW.U.64 | Crossbar withdraw unsigned octlets |
| X.WITHDRAW.U.128 | Crossbar withdraw unsigned hexlet |
| X.WITHDRAW.2 | Crossbar withdraw pecks |
| X.WITHDRAW.4 | Crossbar withdraw nibbles |
| X.WITHDRAW.8 | Crossbar withdraw bytes |
| X.WITHDRAW.16 | Crossbar withdraw doublets |
| X.WITHDRAW.32 | Crossbar withdraw quadlets |
| X.WITHDRAW.64 | Crossbar withdraw octlets |
| X.WITHDRAW.128 | Crossbar withdraw hexlet |

Fig. 45A

Equivalencies

| | |
|---|---|
| X.SEX.I.2 | Crossbar extend immediate signed pecks |
| X.SEX.I.4 | Crossbar extend immediate signed nibbles |
| X.SEX.I.8 | Crossbar extend immediate signed bytes |
| X.SEX.I.16 | Crossbar extend immediate signed doublets |
| X.SEX.I.32 | Crossbar extend immediate signed quadlets |
| X.SEX.I.64 | Crossbar extend immediate signed octlets |
| X.SEX.I.128 | Crossbar extend immediate signed hexlet |
| X.ZEX.I.2 | Crossbar extend immediate unsigned pecks |
| X.ZEX.I.4 | Crossbar extend immediate unsigned nibbles |
| X.ZEX.I.8 | Crossbar extend immediate unsigned bytes |
| X.ZEX.I.16 | Crossbar extend immediate unsigned doublets |
| X.ZEX.I.32 | Crossbar extend immediate unsigned quadlets |
| X.ZEX.I.64 | Crossbar extend immediate unsigned octlets |
| X.ZEX.I.128 | Crossbar extend immediate unsigned hexlet |

| | | |
|---|---|---|
| X.SHL.I.gsize rd=rc,i | → | X.DEPOSIT.gsize rd=rc,size-i,i |
| X.SHR.I.gsize rd=rc,i | → | X.WITHDRAW.gsize rd=rc,size-i,i |
| X.SHRU.I.gsize rd=rc,i | → | X.WITHDRAW.U.gsize rd=rc,size-i,i |
| X.SEX.I.gsize rd=rc,i | → | X.DEPOSIT.gsize rd=rc,i,0 |
| X.ZEX.I.gsize rd=rc,i | → | X.DEPOSIT.U.gsize rd=rc,i,0 |

Redundancies

| | | |
|---|---|---|
| X.DEPOSIT.gsize rd=rc,gsize,0 | ⇔ | X.COPY rd=rc |
| X.DEPOSIT.U.gsize rd=rc,gsize,0 | ⇔ | X.COPY rd=rc |
| X.WITHDRAW.gsize rd=rc,gsize,0 | ⇔ | X.COPY rd=rc |
| X.WITHDRAW.U.gsize rd=rc,gsize,0 | ⇔ | X.COPY rd=rc |

Fig. 45A (cont'd)

Format

X.op.gsize          rd=rc,isize,ishift rd=xopgsize(rc,isize,ishift)

| 31 | 26 25 | 24 23 | 18 17 | 12 11 | 6 5 | 0 |
|----|-------|-------|-------|-------|-----|---|
| op | ih | rd | rc | gsfp | gsfs |
| 6 | 2 | 6 | 6 | 6 | 6 | assert isize+ishift ≤ gsize
assert isize≥1
$ih_0$ || gsfs ← 128-gsize+isize-1
$ih_1$ || gsfp ← 128-gsize+ishift

Fig. 45B

Definition

```
def CrossbarField(op,rd,rc,gsfp,gsfs) as
    c ← RegRead(rc, 128)
    case ((op₁ || gsfp) and (op₀ || gsfs)) of
        0..63:
            gsize ← 128
        64..95:
            gsize ← 64
        96..111:
            gsize ← 32
        112..119:
            gsize ← 16
        120..123:
            gsize ← 8
        124..125:
            gsize ← 4
        126:
            gsize ← 2
        127:
            raise ReservedInstruction
    endcase
    ishift ← (op₁ || gsfp) and (gsize-1)
    isize ← ((op₀ || gsfs) and (gsize-1))+1
    if (ishift+isize>gsize)
        raise ReservedInstruction
    endif
    case op of
        X.DEPOSIT:
            for i ← 0 to 128-gsize by gsize
                a_{i+gsize-1..i} ← $c^{gsize-isize-ishift}_{i+isize-1}$ || $c_{i+isize-1..i}$ || $0^{ishift}$
            endfor
        X.DEPOSIT.U:
            for i ← 0 to 128-gsize by gsize
                a_{i+gsize-1..i} ← $0^{gsize-isize-ishift}$ || $c_{i+isize-1..i}$ || $0^{ishift}$
            endfor
        X.WITHDRAW:
            for i ← 0 to 128-gsize by gsize
                a_{i+gsize-1..i} ← $c^{size-isize}_{i+isize+ishift-1}$ || $c_{i+isize+ishift-1..i+ishift}$
            endfor
        X.WITHDRAW.U:
            for i ← 0 to 128-gsize by gsize
                a_{i+gsize-1..i} ← $0^{gsize-isize}$ || $c_{i+isize+ishift-1..i+ishift}$
            endfor
    endcase
    RegWrite(rd, 128, a)
enddef
```

Exceptions
Reserved instruction

Fig. 45C

Operation codes

| | |
|---|---|
| X.DEPOSIT.M.2 | Crossbar deposit merge pecks |
| X.DEPOSIT.M.4 | Crossbar deposit merge nibbles |
| X.DEPOSIT.M.8 | Crossbar deposit merge bytes |
| X.DEPOSIT.M.16 | Crossbar deposit merge doublets |
| X.DEPOSIT.M.32 | Crossbar deposit merge quadlets |
| X.DEPOSIT.M.64 | Crossbar deposit merge octlets |
| X.DEPOSIT.M.128 | Crossbar deposit merge hexlet |

Fig 45G

Format

X.op.gsize              rd@rc,isize,ishift rd=xopgsize(rd,rc,isize,ishift)

| 31 | 26 25 | 24 23 | 18 17 | 12 11 | 6 5 | 0 |
|---|---|---|---|---|---|---|
| op | ih | rd | rc | gsfp | gsfs | |
| 6 | 2 | 6 | 6 | 6 | 6 | | assert isize+ishift ≤ gsize
assert isize≥1
$ih_0$ || gsfs ← 128-gsize+isize-1
$ih_1$ || gsfp ← 128-gsize+ishift

Fig 45H

Definition

```
def CrossbarFieldInplace(op,rd,rc,gsfp,gsfs) as
    c ← RegRead(rc, 128)
    d ← RegRead(rd, 128)
    case ((op₁ || gsfp) and (op₀ || gsfs)) of
        0..63:
            gsize ← 128
        64..95:
            gsize ← 64
        96..111:
            gsize ← 32
        112..119:
            gsize ← 16
        120..123:
            gsize ← 8
        124..125:
            gsize ← 4
        126:
            gsize ← 2
        127:
            raise ReservedInstruction
    endcase
    ishift ← (op₁ || gsfp) and (gsize-1)
    isize ← ((op₀ || gsfs) and (gsize-1))+1
    if (ishift+isize>gsize)
        raise ReservedInstruction
    endif
    for i ← 0 to 128-gsize by gsize
        a_{i+gsize-1..i} ← d_{i+gsize-1..i+isize+ishift} || c_{i+isize-1..i} || d_{i+ishift-1..i}
    endfor
    RegWrite(rd, 128, a)
enddef
```

Exceptions

Reserved instruction

Fig 45I

| | |
|---|---|
| X.SHUFFLE.4 | Crossbar shuffle within pecks |
| X.SHUFFLE.8 | Crossbar shuffle within bytes |
| X.SHUFFLE.16 | Crossbar shuffle within doublets |
| X.SHUFFLE.32 | Crossbar shuffle within quadlets |
| X.SHUFFLE.64 | Crossbar shuffle within octlets |
| X.SHUFFLE.128 | Crossbar shuffle within hexlet |
| X.SHUFFLE.256 | Crossbar shuffle within triclet |

Fig. 46A

Format

X.SHUFFLE.256   rd=rc,rb,v,w,h
X.SHUFFLE.size rd=rcb,v,w rd=xshuffle256(rc,rb,v,w,h)
rd=xshufflesize(rcb,v,w)

| 31 | 24 | 23 | 18 | 17 | 12 | 11 | 6 | 5 | 0 |
|---|---|---|---|---|---|---|---|---|---|
| X.SHUFFLE | | rd | | rc | | rb | | op | |
| 8 | | 6 | | 6 | | 6 | | 6 | | rc ← rb ← rcb
x←log$_2$(size)
y←log$_2$(v)
z←log$_2$(w)
op ← ((x*x*x-3*x*x-4*x)/6-(z*z-z)/2+x*z+y) + (size=256)*(h*32-56)

Fig. 46B

Definition

```
def CrossbarShuffle(major,rd,rc,rb,op)
    c ← RegRead(rc, 128)
    b ← RegRead(rb, 128)
    if rc=rb then
        case op of
            0..55:
                for x ← 2 to 7; for y ← 0 to x-2; for z ← 1 to x-y-1
                    if op = ((x*x*x-3*x*x-4*x)/6-(z*z-z)/2+x*z+y) then
                        for i ← 0 to 127
```
$$a_i \leftarrow c_{(i_{6..x} \parallel i_{y+z-1..y} \parallel i_{x-1..y+z} \parallel i_{y-1..0})}$$
```
                        end
                    endif
                endfor; endfor; endfor
            56..63:
                raise ReservedInstruction
        endcase
    elseif
        case op_{4..0} of
            0..27:
                cb ← c ∥ b
                x ← 8
                h ← op_5
                for y ← 0 to x-2; for z ← 1 to x-y-1
                    if op_{4..0} = ((17*z-z*z)/2-8+y) then
                        for i ← h*128 to 127+h*128
```
$$a_{i-h*128} \leftarrow cb_{(i_{y+z-1..y} \parallel i_{x-1..y+z} \parallel i_{y-1..0})}$$
```
                        end
                    endif
                endfor; endfor
            28..31:
                raise ReservedInstruction
        endcase
    endif
    RegWrite(rd, 128, a)
enddef
```

Exceptions
Reserved Instruction

Fig. 46C 4-way shuffle bytes within hexlet 4-way shuffle bytes within triclet

Format

X.SWIZZLE  rd=rc,icopy,iswap rd=xswizzle(rc,icopy,iswap)

| 31 26 | 25 24 | 23 18 | 17 12 | 11 6 | 5 0 |
|---|---|---|---|---|---|
| X.SWIZZLE | ih | rd | rc | icopya | iswapa |
| 6 | 2 | 6 | 6 | 6 | 6 | icopya ← icopy$_{5..0}$
iswapa ← iswap$_{5..0}$
ih ← icopy$_6$ || iswap$_6$

Fig. 47A

Definition

```
def GroupSwizzleImmediate(ih,rd,rc,icopya,iswapa) as
    icopy ← ih₁ || icopya
    iswap ← ih₀ || iswapa
    c ← RegRead(rc, 128)
    for i ← 0 to 127
        aᵢ ← c(i & icopy) ^ iswap
    endfor
    RegWrite(rd, 128, a)
enddef
```

Exceptions
none

Fig. 47B

| X.SELECT.8 | Crossbar select bytes |

Format op    ra=rd,rc,rb ra=op(rd,rc,rb)

| 31 | 24 23 | 18 17 | 12 11 | 6 5 | 0 |
|---|---|---|---|---|---|
| op | rd | rc | rb | ra |
| 8 | 6 | 6 | 6 | 6 |

Definition

```
def CrossbarTernary(op,rd,rc,rb,ra) as
    d ← RegRead(rd, 128)
    c ← RegRead(rc, 128)
    b ← RegRead(rb, 128)
    dc ← d || c
    for i ← 0 to 15
        j ← b_{8*i+4..8*i}
        a_{8*i+7..8*i} ← dc_{8*j+7..8*j}
    endfor
    RegWrite(ra, 128, a)
enddef
```

Exceptions none

Pin summary

| Signal | I/O | Description |
|---|---|---|
| A20M# | I | Address bit 20 Mask is an emulator signal. |
| A31..A3 | IO | Address, in combination with byte enable, indicate the physical addresses of memory or device that is the target of a bus transaction. This signal is an output, when the processor is initiating the bus transaction, and an input when the processor is receiving an inquire transaction or snooping another processor's bus transaction. |
| ADS# | IO | ADdress Strobe, when asserted, indicates new bus transaction by the processor, with valid address and byte enable simultaneously driven. |
| ADSC# | O | Address Strobe Copy is driven identically to address strobe |
| AHOLD | I | Address HOLD, when asserted, causes the processor to cease driving address and address parity in the next bus clock cycle. |
| AP | IO | Address Parity contains even parity on the same cycle as address. Address parity is generated by the processor when address is an output, and is checked when address is an input. A parity error causes a bus error machine check. |
| APCHK# | O | Address Parity CHecK is asserted two bus clocks after EADS# if address parity is not even parity of address. |
| APICEN | I | Advanced Programmable Interrupt Controller ENable is not implemented. |
| BE7#..BE0# | IO | Byte Enable indicates which bytes are the subject of a read or write transaction and are driven on the same cycle as address. |
| BF1..BF0 | I | Bus Frequency is sampled to permit software to select the ratio of the processor clock to the bus clock. |
| BOFF# | I | BackOFF is sampled on the rising edge of each bus clock, and when asserted, the processor floats bus signals on the next bus clock and aborts the current bus cycle, until the backoff signal is sampled negated. |
| BP3..BP0 | O | BreakPoint is an emulator signal. |
| BRDY# | I | Bus ReaDY indicates that valid data is present on data on a read transaction, or that data has been accepted on a write transaction. |
| BRDYC# | I | Bus ReaDY Copy is identical to BRDY#; asserting either signal has the same effect. |
| BREQ | O | Bus REQuest indicates a processor initiated bus request. |

Fig. 48

| | | |
|---|---|---|
| BUSCHK# | I | BUS CHecK is sampled on the rising edge of the bus clock, and when asserted, causes a bus error machine check. |
| CACHE# | O | CACHE, when asserted, indicates a cacheable read transaction or a burst write transaction. |
| CLK | I | bus CLocK provides the bus clock timing edge and the frequency reference for the processor clock. |
| CPUTYP | I | CPU TYPe, if low indicates the primary processor, if high, the dual processor. |
| D/C# | I | Data/Code is driven with the address signal to indicate data, code, or special cycles. |
| D63..D0 | IO | Data communicates 64 bits of data per bus clock. |
| D/P# | O | Dual/Primary is driven (asserted, low) with address on the primary processor |
| DP7..DP0 | IO | Data Parity contains even parity on the same cycle as data. A parity error causes a bus error machine check. |
| DPEN# | IO | Dual Processing Enable is asserted (driven low) by a Dual processor at reset and sampled by a Primary processor at the falling edge of reset. |
| EADS# | I | External Address Strobe indicates that an external device has driven address for an inquire cycle. |
| EWBE# | I | External Write Buffer Empty indicates that the external system has no pending write. |
| FERR# | O | Floating point ERRor is an emulator signal. |
| FLUSH# | I | cache FLUSH is an emulator signal. |
| FRCMC# | I | Functional Redundancy Checking Master/Checker is not implemented. |
| HIT# | IO | HIT indicates that an inquire cycle or cache snoop hits a valid line. |
| HITM# | IO | HIT to a Modfied line indicates that an inquire cycle or cache snoop hits a sub-block in the M cache state. |
| HLDA | O | bus HoLD Acknowlege is asserted (driven high) to acknowlege a bus hold request |
| HOLD | I | bus HOLD request causes the processor to float most of its pins and assert bus hold acknowlege after completing all outstanding bus transactions, or during reset. |
| IERR# | O | Internal ERRor is an emulator signal. |
| IGNNE# | I | IGNore Numeric Error is an emulator signal. |
| INIT | I | INITialization is an emulator signal. |
| INTR | I | maskable INTeRrupt is an emulator signal. |
| INV | I | INValidation controls whether to invalidate the addressed cache sub-block on an inqure transaction. |

Fig. 48 (cont'd)

| KEN# | I | Cache ENable is driven with address to indicate that the read or write transaction is cacheable. |
|---|---|---|
| LINT1..LINT0 | I | Local INTerrupt is not implemented. |
| LOCK# | O | bus LOCK is driven starting with address and ending after bus ready to indicate a locked series of bus transactions. |
| M/IO# | O | Memory/Input Output is driven with address to indicate a memory or I/O transaction. |
| NA# | I | Next Address indicates that the external system will accept an address for a new bus cycle in two bus clocks. |
| NMI | I | Non Maskable Interrupt is an emulator signal. |
| PBGNT# | IO | Private Bus GraNT is driven between Primary and Dual processors to indicate that bus arbitration has completed, granting a new master access to the bus. |
| PBREQ# | IO | Private Bus REQuest is driven between Primary and Dual processors to request a new master access to the bus. |
| PCD | O | Page Cache Disable is driven with address to indicate a not cacheable transaction. |
| PCHK# | O | Parity CHecK is asserted (driven low) two bus clocks after data appears with odd parity on enabled bytes. |
| PHIT# | IO | Private HIT is driven between Primary and Dual processors to indicate that the current read or write transaction addresses a valid cache sub-block in the slave processor. |
| PHITM# | IO | Private HIT Modified is driven between Primary and Dual processors to indicate that the current read or write transaction addresses a modified cache sub-block in the slave processor. |
| PICCLK | I | Programmable Interrupt Controller CLocK is not implemented. |
| PICD1..PICD0 | IO | Programmable Interrupt Controller Data is not implemented. |
| PEN# | I | Parity Enable, if active on the data cycle, allows a parity error to cause a bus error machine check. |
| PM1..PM0 | O | Performance Monitoring is an emulator signal. |
| PRDY | O | Probe ReaDY is not implemented. |
| PWT | O | Page Write Through is driven with address to indicate a not write allocate transaction. |
| R/S# | I | Run/Stop is not implemented. |
| RESET | I | RESET causes a processor reset. |
| SCYC | O | Split CYCle is asserted during bus lock to indicate that more than two transactions are in the series of bus transactions. |

Fig. 48 (cont'd)

| | | |
|---|---|---|
| SMI# | I | System Managment Interrupt is an emulator signal. |
| SMIACT# | O | System Management Interrupt ACTive is an emulator signal. |
| STPCLK# | I | SToP CLocK is an emulator signal. |
| TCK | I | Test CLocK follows IEEE 1149.1. |
| TDI | I | Test Data Input follows IEEE 1149.1. |
| TDO | O | Test Data Output follows IEEE 1149.1. |
| TMS | I | Test Mode Select follows IEEE 1149.1. |
| TRST# | I | Test ReSeT follows IEEE 1149.1. |
| VCC2 | I | VCC of 2.8V at 25 pins |
| VCC3 | I | VCC of 3.3V at 28 pins |
| VCC2DET# | O | VCC2 DETect sets appropriate VCC2 voltage level. |
| VSS | I | VSS supplied at 53 pins |
| W/R# | O | Write/Read is driven with address to indicate write vs. read transaction. |
| WB/WT# | I | Write Back/Write Through is returned to indicate that data is permitted to be cached as write back. |

Fig. 48 (cont'd)

Electrical Specifications

| Clock rate | 66 MHz | | 75 MHz | | 100 MHz | | 133 MHz | | |
|---|---|---|---|---|---|---|---|---|---|
| Parameter | min | max | min | max | min | max | min | max | unit |
| CLK frequency | 33.3 | 66.7 | 37.5 | 75 | 50 | 100 | | 133 | MHz |
| CLK period | 15.0 | 30.0 | 13.3 | 26.3 | 10.0 | 20.0 | | | ns |
| CLK high time (≥2v) | 4.0 | | 4.0 | | 3.0 | | | | ns |
| CLK low time (≤0.8V) | 4.0 | | 4.0 | | 3.0 | | | | ns |
| CLK rise time (0.8V->2V) | 0.15 | 1.5 | 0.15 | 1.5 | 0.15 | 1.5 | | | ns |
| CLK fall time (2V->0.8V) | 0.15 | 1.5 | 0.15 | 1.5 | 0.15 | 1.5 | | | ns |
| CLK period stability | | 250 | | 250 | | 250 | | | ps |

Fig. 49A

| | | | | | | | | | |
|---|---|---|---|---|---|---|---|---|---|
| A31..3 valid delay | 1.1 | 6.3 | 1.1 | 4.5 | 1.1 | 4.0 | | | ns |
| A31..3 float delay | | 10.0 | | 7.0 | | 7.0 | | | ns |
| ADS# valid delay | 1.0 | 6.0 | 1.0 | 4.5 | 1.0 | 4.0 | | | ns |
| ADS# float delay | | 10.0 | | 7.0 | | 7.0 | | | ns |
| ADSC# valid delay | 1.0 | 7.0 | 1.0 | 4.5 | 1.0 | 4.0 | | | ns |
| ADSC# float delay | | 10.0 | | 7.0 | | 7.0 | | | ns |
| AP valid delay | 1.0 | 8.5 | 1.0 | 5.5 | 1.0 | 5.5 | | | ns |
| AP float delay | | 10.0 | | 7.0 | | 7.0 | | | ns |
| APCHK# valid delay | 1.0 | 8.3 | 1.0 | 4.5 | 1.0 | 4.5 | | | ns |
| BE7..0# valid delay | 1.0 | 7.0 | 1.0 | 4.5 | 1.0 | 4.0 | | | ns |
| BE7..0# float delay | | 10.0 | | 7.0 | | 7.0 | | | ns |
| BP3..0 valid delay | 1.0 | 10.0 | | | | | | | ns |
| BREQ valid delay | 1.0 | 8.0 | 1.0 | 4.5 | 1.0 | 4.0 | | | ns |
| CACHE# valid delay | 1.0 | 7.0 | 1.0 | 4.5 | 1.0 | 4.0 | | | ns |
| CACHE# float delay | | 10.0 | | 7.0 | | 7.0 | | | ns |
| D/C# valid delay | 1.0 | 7.0 | 1.0 | 4.5 | 1.0 | 4.0 | | | ns |
| D/C# float delay | | 10.0 | | 7.0 | | 7.0 | | | ns |
| D63..0 write data valid delay | 1.3 | 7.5 | 1.3 | 4.5 | 1.3 | 4.5 | | | ns |
| D63..0 write data float delay | | 10.0 | | 7.0 | | 7.0 | | | ns |
| DP7..0 write data valid delay | 1.3 | 7.5 | 1.3 | 4.5 | 1.3 | 4.5 | | | ns |
| DP7..0 write data float delay | | 10.0 | | 7.0 | | 7.0 | | | ns |
| FERR# valid delay | 1.0 | 8.3 | 1.0 | 4.5 | 1.0 | 4.5 | | | ns |
| HIT# valid delay | 1.0 | 6.8 | 1.0 | 4.5 | 1.0 | 4.0 | | | ns |
| HITM# valid delay | 1.1 | 6.0 | 1.1 | 4.5 | 1.1 | 4.0 | | | ns |
| HLDA valid delay | 1.0 | 6.8 | 1.0 | 4.5 | 1.0 | 4.0 | | | ns |
| IERR# valid delay | 1.0 | 8.3 | | | | | | | ns |
| LOCK# valid delay | 1.1 | 7.0 | 1.1 | 4.5 | 1.1 | 4.0 | | | ns |
| LOCK# float delay | | 10.0 | | 7.0 | | 7.0 | | | ns |
| M/IO# valid delay | 1.0 | 5.9 | 1.0 | 4.5 | 1.0 | 4.0 | | | ns |
| M/IO# float delay | | 10.0 | | 7.0 | | 7.0 | | | ns |
| PCD valid delay | 1.0 | 7.0 | 1.0 | 4.5 | 1.0 | 4.0 | | | ns |
| PCD float delay | | 10.0 | | 7.0 | | 7.0 | | | ns |
| PCHK# valid delay | 1.0 | 7.0 | 1.0 | 4.5 | 1.0 | 4.5 | | | ns |
| PM1..0 valid delay | 1.0 | 10.0 | | | | | | | ns |
| PRDY valid delay | 1.0 | 8.0 | | | | | | | ns |
| PWT valid delay | 1.0 | 7.0 | 1.0 | 4.5 | 1.0 | 4.0 | | | ns |
| PWT float delay | | 10.0 | | 7.0 | | 7.0 | | | ns |
| SCYC valid delay | 1.0 | 7.0 | 1.0 | 4.5 | 1.0 | 4.0 | | | ns |
| SCYC float delay | | 10.0 | | 7.0 | | 7.0 | | | ns |
| SMIACT# valid delay | 1.0 | 7.3 | 1.0 | 4.5 | 1.0 | 4.0 | | | ns |
| W/R# valid delay | 1.0 | 7.0 | 1.0 | 4.5 | 1.0 | 4.0 | | | ns |
| W/R# float delay | | 10.0 | | 7.0 | | 7.0 | | | ns |

Fig. 49B

| | | | | | | | |
|---|---|---|---|---|---|---|---|
| A31..5 setup time | 6.0 | | 3.0 | | 3.0 | | ns |
| A31..5 hold time | 1.0 | | 1.0 | | 1.0 | | ns |
| A20M# setup time | 5.0 | | 3.0 | | 3.0 | | ns |
| A20M# hold time | 1.0 | | 1.0 | | 1.0 | | ns |
| AHOLD setup time | 5.5 | | 3.5 | | 3.5 | | ns |
| AHOLD hold time | 1.0 | | 1.0 | | 1.0 | | ns |
| AP setup time | 5.0 | | 1.7 | | 1.7 | | ns |
| AP hold time | 1.0 | | 1.0 | | 1.0 | | ns |
| BOFF# setup time | 5.5 | | 3.5 | | 3.5 | | ns |
| BOFF# hold time | 1.0 | | 1.0 | | 1.0 | | ns |
| BRDY# setup time | 5.0 | | 3.0 | | 3.0 | | ns |
| BRDY# hold time | 1.0 | | 1.0 | | 1.0 | | ns |
| BRDYC# setup time | 5.0 | | 3.0 | | 3.0 | | ns |
| BRDYC# hold time | 1.0 | | 1.0 | | 1.0 | | ns |
| BUSCHK# setup time | 5.0 | | 3.0 | | 3.0 | | ns |
| BUSCHK# hold time | 1.0 | | 1.0 | | 1.0 | | ns |
| D63..0 read data setup time | 2.8 | | 1.7 | | 1.7 | | ns |
| D63..0 read data hold time | 1.5 | | 1.5 | | 1.5 | | ns |
| DP7..0 read data setup time | 2.8 | | 1.7 | | 1.7 | | ns |
| DP7..0 read data hold time | 1.5 | | 1.5 | | 1.5 | | ns |
| EADS# setup time | 5.0 | | 3.0 | | 3.0 | | ns |
| EADS# hold time | 1.0 | | 1.0 | | 1.0 | | ns |
| EWBE# setup time | 5.0 | | 1.7 | | 1.7 | | ns |
| EWBE# hold time | 1.0 | | 1.0 | | 1.0 | | ns |
| FLUSH# setup time | 5.0 | | 1.7 | | 1.7 | | ns |
| FLUSH# hold time | 1.0 | | 1.0 | | 1.0 | | ns |
| FLUSH# async pulse width | 2 | | 2 | | 2 | | CLK |
| HOLD setup time | 5.0 | | 1.7 | | 1.7 | | ns |
| HOLD hold time | 1.5 | | 1.5 | | 1.5 | | ns |
| IGNNE# setup time | 5.0 | | 1.7 | | 1.7 | | ns |
| IGNNE# hold time | 1.0 | | 1.0 | | 1.0 | | ns |
| IGNNE# async pulse width | 2 | | 2 | | 2 | | CLK |
| INIT setup time | 5.0 | | 1.7 | | 1.7 | | ns |
| INIT hold time | 1.0 | | 1.0 | | 1.0 | | ns |
| INIT async pulse width | 2 | | 2 | | 2 | | CLK |
| INTR setup time | 5.0 | | 1.7 | | 1.7 | | ns |
| INTR hold time | 1.0 | | 1.0 | | 1.0 | | ns |
| INV setup time | 5.0 | | 1.7 | | 1.7 | | ns |
| INV hold time | 1.0 | | 1.0 | | 1.0 | | ns |
| KEN# setup time | 5.0 | | 3.0 | | 3.0 | | ns |
| KEN# hold time | 1.0 | | 1.0 | | 1.0 | | ns |
| NA# setup time | 4.5 | | 1.7 | | 1.7 | | ns |

Fig. 49C

| | | | | | | | |
|---|---|---|---|---|---|---|---|
| NA# hold time | 1.0 | | 1.0 | | 1.0 | | ns |
| NMI setup time | 5.0 | | 1.7 | | 1.7 | | ns |
| NMI hold time | 1.0 | | 1.0 | | 1.0 | | ns |
| NMI async pulse width | 2 | | 2 | | 2 | | CLK |
| PEN# setup time | 4.8 | | 1.7 | | 1.7 | | ns |
| PEN# hold time | 1.0 | | 1.0 | | 1.0 | | ns |
| R/S# setup time | 5.0 | | 1.7 | | 1.7 | | ns |
| R/S# hold time | 1.0 | | 1.0 | | 1.0 | | ns |
| R/S# async pulse width | 2 | | 2 | | 2 | | CLK |
| SMI# setup time | 5.0 | | 1.7 | | 1.7 | | ns |
| SMI# hold time | 1.0 | | 1.0 | | 1.0 | | ns |
| SMI# async pulse width | 2 | | 2 | | 2 | | CLK |
| STPCLK# setup time | 5.0 | | 1.7 | | 1.7 | | ns |
| STPCLK# hold time | 1.0 | | 1.0 | | 1.0 | | ns |
| WB/WT# setup time | 4.5 | | 1.7 | | 1.7 | | ns |
| WB/WT# hold time | 1.0 | | 1.0 | | 1.0 | | ns |

Fig. 49C (cont'd)

| | | | | | | | |
|---|---|---|---|---|---|---|---|
| RESET setup time | 5.0 | | 1.7 | | 1.7 | | ns |
| RESET hold time | 1.0 | | 1.0 | | 1.0 | | ns |
| RESET pulse width | 15 | | 15 | | 15 | | CLK |
| RESET active | 1.0 | | 1.0 | | 1.0 | | ms |
| BF2..0 setup time | 1.0 | | 1.0 | | 1.0 | | ms |
| BF2..0 hold time | 2 | | 2 | | 2 | | CLK |
| BRDYC# hold time | 1.0 | | 1.0 | | 1.0 | | ns |
| BRDYC# setup time | 2 | | 2 | | 2 | | CLK |
| BRDYC# hold time | 2 | | 2 | | 2 | | CLK |
| FLUSH# setup time | 5.0 | | 1.7 | | 1.7 | | ns |
| FLUSH# hold time | 1.0 | | 1.0 | | 1.0 | | ns |
| FLUSH# setup time | 2 | | 2 | | 2 | | CLK |
| FLUSH# hold time | 2 | | 2 | | 2 | | CLK |

Fig. 49D

| | | | | | | | | | |
|---|---|---|---|---|---|---|---|---|---|
| PBREQ# flight time | 0 | 2.0 | | | | | | | ns |
| PBGNT# flight time | 0 | 2.0 | | | | | | | ns |
| PHIT# flight time | 0 | 2.0 | | | | | | | ns |
| PHITM# flight time | 0 | 1.8 | | | | | | | ns |
| A31..5 setup time | 3.7 | | | | | | | | ns |
| A31..5 hold time | 0.8 | | | | | | | | ns |
| D/C# setup time | 4.0 | | | | | | | | ns |
| D/C# hold time | 0.8 | | | | | | | | ns |
| W/R# setup time | 4.0 | | | | | | | | ns |
| W/R# hold time | 0.8 | | | | | | | | ns |
| CACHE# setup time | 4.0 | | | | | | | | ns |
| CACHE# hold time | 1.0 | | | | | | | | ns |
| LOCK# setup time | 4.0 | | | | | | | | ns |
| LOCK# hold time | 0.8 | | | | | | | | ns |
| SCYC setup time | 4.0 | | | | | | | | ns |
| SCYC hold time | 0.8 | | | | | | | | ns |
| ADS# setup time | 5.8 | | | | | | | | ns |
| ADS# hold time | 0.8 | | | | | | | | ns |
| M/IO# setup time | 5.8 | | | | | | | | ns |
| M/IO# hold time | 0.8 | | | | | | | | ns |
| HIT# setup time | 6.0 | | | | | | | | ns |
| HIT# hold time | 1.0 | | | | | | | | ns |
| HITM# setup time | 6.0 | | | | | | | | ns |
| HITM# hold time | 0.7 | | | | | | | | ns |
| HLDA setup time | 6.0 | | | | | | | | ns |
| HLDA hold time | 0.8 | | | | | | | | ns |
| DPEN# valid time | | 10.0 | | | | | | | CLK |
| DPEN# hold time | 2.0 | | | | | | | | CLK |
| D/P# valid delay (primary) | 1.0 | 8.0 | | | | | | | ns |

Fig. 49E

| TCK frequency | | 25 | | | | 25 | | | MHz |
|---|---|---|---|---|---|---|---|---|---|
| TCK period | 40.0 | | | | 40.0 | | | | ns |
| TCK high time (≥2v) | 14.0 | | | | 14.0 | | | | ns |
| TCK low time (≤0.8V) | 14.0 | | | | 14.0 | | | | ns |
| TCK rise time (0.8V->2V) | | 5.0 | | | | 5.0 | | | ns |
| TCK fall time (2V->0.8V) | | 5.0 | | | | 5.0 | | | ns |
| TRST# pulse width | 30.0 | | | | 30.0 | | | | ns |

Fig. 49F

| TDI setup time | 5.0 | | | | 5.0 | | | | ns |
|---|---|---|---|---|---|---|---|---|---|
| TDI hold time | 9.0 | | | | 9.0 | | | | ns |
| TMS setup time | 5.0 | | | | 5.0 | | | | ns |
| TMS hold time | 9.0 | | | | 9.0 | | | | ns |
| TDO valid delay | 3.0 | 13.0 | | | 3.0 | 13.0 | | | ns |
| TDO float delay | | 16.0 | | | | 16.0 | | | ns |
| all outputs valid delay | 3.0 | 13.0 | | | 3.0 | 13.0 | | | ns |
| all outputs float delay | | 16.0 | | | | 16.0 | | | ns |
| all inputs setup time | 5.0 | | | | 5.0 | | | | ns |
| all inputs hold time | 9.0 | | | | 9.0 | | | | ns |

Fig. 49G

Operation codes

| | |
|---|---|
| L.8 | Load signed byte |
| L.16.B | Load signed doublet big-endian |
| L.16.A.B | Load signed doublet aligned big-endian |
| L.16.L | Load signed doublet little-endian |
| L.16.A.L | Load signed doublet aligned little-endian |
| L.32.B | Load signed quadlet big-endian |
| L.32.A.B | Load signed quadlet aligned big-endian |
| L.32.L | Load signed quadlet little-endian |
| L.32.A.L | Load signed quadlet aligned little-endian |
| L.64.B | Load signed octlet big-endian |
| L.64.A.B | Load signed octlet aligned big-endian |
| L.64.L | Load signed octlet little-endian |
| L.64.A.L | Load signed octlet aligned little-endian |
| L.128.B | Load hexlet big-endian |
| L.128.A.B | Load hexlet aligned big-endian |
| L.128.L | Load hexlet little-endian |
| L.128.A.L | Load hexlet aligned little-endian |
| L.U.8 | Load unsigned byte |
| L.U.16.B | Load unsigned doublet big-endian |
| L.U.16.A.B | Load unsigned doublet aligned big-endian |
| L.U.16.L | Load unsigned doublet little-endian |
| L.U.16.A.L | Load unsigned doublet aligned little-endian |
| L.U.32.B | Load unsigned quadlet big-endian |
| L.U.32.A.B | Load unsigned quadlet aligned big-endian |
| L.U.32.L | Load unsigned quadlet little-endian |
| L.U.32.A.L | Load unsigned quadlet aligned little-endian |
| L.U.64.B | Load unsigned octlet big-endian |
| L.U.64.A.B | Load unsigned octlet aligned big-endian |
| L.U.64.L | Load unsigned octlet little-endian |
| L.U.64.A.L | Load unsigned octlet aligned little-endian |

Fig. 50A

Selection

| number format | type | size | alignment | ordering |
|---|---|---|---|---|
| signed byte | | 8 | | |
| unsigned byte | U | 8 | | |
| signed integer | | 16 32 64 | | L B |
| signed integer aligned | | 16 32 64 | A | L B |
| unsigned integer | U | 16 32 64 | | L B |
| unsigned integer aligned | U | 16 32 64 | A | L B |
| register | | 128 | | L B |
| register aligned | | 128 | A | L B |

Format op    rd=rc,rb rd=op(rc,rb)

Definition

```
def Load(op,rd,rc,rb) as
    case op of
        L16L, L32L, L8, L16AL, L32AL, L16B, L32B, L16AB, L32AB,
        L64L, L64AL, L64B, L64AB:
            signed ← true
        LU16L, LU32L, LU8, LU16AL, LU32AL, LU16B, LU32B, LU16AB, LU32AB,
        LU64L, LU64AL, LU64B, LU64AB:
            signed ← false
        L128L, L128AL, L128B, L128AB:
            signed ← undefined
    endcase
    case op of
        L8, LU8:
            size ← 8
        L16L, LU16L, L16AL, LU16AL, L16B, LU16B, L16AB, LU16AB:
            size ← 16
        L32L, LU32L, L32AL, LU32AL, L32B, LU32B, L32AB, LU32AB:
            size ← 32
        L64L, LU64L, L64AL, LU64AL, L64B, LU64B, L64AB, LU64AB:
            size ← 64
        L128L, L128AL, L128B, L128AB:
            size ← 128
    endcase
    lsize ← log(size)
    case op of
        L16L, LU16L, L32L, LU32L, L64L, LU64L, L128L,
        L16AL, LU16AL, L32AL, LU32AL, L64AL, LU64AL, L128AL:
            order ← L
        L16B, LU16B, L32B, LU32B, L64B, LU64B, L128B,
        L16AB, LU16AB, L32AB, LU32AB, L64AB, LU64AB, L128AB:
            order ← B
        L8, LU8:
            order ← undefined
    endcase
```

Fig. 50C c ← RegRead(rc, 64)
b ← RegRead(rb, 64)
VirtAddr ← c + ($b_{66-lsize..0}$ || $0^{lsize-3}$)
case op of
    L16AL, LU16AL, L32AL, LU32AL, L64AL, LU64AL, L128AL,
    L16AB, LU16AB, L32AB, LU32AB, L64AB, LU64AB, L128AB:
       if ($c_{lsize-4..0}$ ≠ 0) then
          raise AccessDisallowedByVirtualAddress
       endif
    L16L, LU16L, L32L, LU32L, L64L, LU64L, L128L,
    L16B, LU16B, L32B, LU32B, L64B, LU64B, L128B:
    L8, LU8:
endcase
m ← LoadMemory(c,VirtAddr,size,order)
a ← $(m_{size-1}$ and signed$)^{128-size}$ || m
RegWrite(rd, 128, a)
enddef

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

Fig. 50C (cont)

Operation codes

| | |
|---|---|
| L.I.8 | Load immediate signed byte |
| L.I.16.A.B | Load immediate signed doublet aligned big-endian |
| L.I.16.B | Load immediate signed doublet big-endian |
| L.I.16.A.L | Load immediate signed doublet aligned little-endian |
| L.I.16.L | Load immediate signed doublet little-endian |
| L.I.32.A.B | Load immediate signed quadlet aligned big-endian |
| L.I.32.B | Load immediate signed quadlet big-endian |
| L.I.32.A.L | Load immediate signed quadlet aligned little-endian |
| L.I.32.L | Load immediate signed quadlet little-endian |
| L.I.64.A.B | Load immediate signed octlet aligned big-endian |
| L.I.64.B | Load immediate signed octlet big-endian |
| L.I.64.A.L | Load immediate signed octlet aligned little-endian |
| L.I.64.L | Load immediate signed octlet little-endian |
| L.I.128.A.B | Load immediate hexlet aligned big-endian |
| L.I.128.B | Load immediate hexlet big-endian |
| L.I.128.A.L | Load immediate hexlet aligned little-endian |
| L.I.128.L | Load immediate hexlet little-endian |
| L.I.U.8 | Load immediate unsigned byte |
| L.I.U.16.A.B | Load immediate unsigned doublet aligned big-endian |
| L.I.U.16.B | Load immediate unsigned doublet big-endian |
| L.I.U.16.A.L | Load immediate unsigned doublet aligned little-endian |
| L.I.U.16.L | Load immediate unsigned doublet little-endian |
| L.I.U.32.A.B | Load immediate unsigned quadlet aligned big-endian |
| L.I.U.32.B | Load immediate unsigned quadlet big-endian |
| L.I.U.32.A.L | Load immediate unsigned quadlet aligned little-endian |
| L.I.U.32.L | Load immediate unsigned quadlet little-endian |
| L.I.U.64.A.B | Load immediate unsigned octlet aligned big-endian |
| L.I.U.64.B | Load immediate unsigned octlet big-endian |
| L.I.U.64.A.L | Load immediate unsigned octlet aligned little-endian |
| L.I.U.64.L | Load immediate unsigned octlet little-endian |

Fig. 51A

Selection

| number format | type | size | | | alignment | ordering | |
|---|---|---|---|---|---|---|---|
| signed byte | | 8 | | | | | |
| unsigned byte | U | 8 | | | | | |
| signed integer | | 16 | 32 | 64 | | L | B |
| signed integer aligned | | 16 | 32 | 64 | A | L | B |
| unsigned integer | U | 16 | 32 | 64 | | L | B |
| unsigned integer aligned | U | 16 | 32 | 64 | A | L | B |
| register | | 128 | | | | L | B |
| register aligned | | 128 | | | A | L | B |

Format op    rd=rc,offset rd=op(rc,offset)

Definition

```
def LoadImmediate(op,rd,rc,offset) as
    case op of
        LI16L, LI32L, LI8, LI16AL, LI32AL, LI16B, LI32B, LI16AB, LI32AB:
        LI64L, LI64AL, LI64B, LI64AB:
            signed ← true
        LIU16L, LIU32L, LIU8, LIU16AL, LIU32AL,
        LIU16B, LIU32B, LIU16AB, LIU32AB:
        LIU64L, LIU64AL, LIU64B, LIU64AB:
            signed ← false
        LI128L, LI128AL, LI128B, LI128AB:
            signed ← undefined
    endcase
    case op of
        LI8, LIU8:
            size ← 8
        LI16L, LIU16L, LI16AL, LIU16AL, LI16B, LIU16B, LI16AB, LIU16AB:
            size ← 16
        LI32L, LIU32L, LI32AL, LIU32AL, LI32B, LIU32B, LI32AB, LIU32AB:
            size ← 32
        LI64L, LIU64L, LI64AL, LIU64AL, LI64B, LIU64B, LI64AB, LIU64AB:
            size ← 64
        LI128L, LI128AL, LI128B, LI128AB:
            size ← 128
    endcase
    lsize ← log(size)
    case op of
        LI16L, LIU16L, LI32L, LIU32L, LI64L, LIU64L, LI128L,
        LI16AL, LIU16AL, LI32AL, LIU32AL, LI64AL, LIU64AL, LI128AL:
            order ← LI
        LI16B, LIU16B, LI32B, LIU32B, LI64B, LIU64B, LI128B,
        LI16AB, LIU16AB, LI32AB, LIU32AB, LI64AB, LIU64AB, LI128AB:
            order ← B
        LI8, LIU8:
            order ← undefined
    endcase
```

Fig. 51C c ← RegRead(rc, 64)
VirtAddr ← c + (offset$_{11}^{55-lsize}$ || offset || $0^{lsize-3}$)
case op of
    LI16AL, LIU16AL, LI32AL, LIU32AL, LI64AL, LIU64AL, LI128AL,
    LI16AB, LIU16AB, LI32AB, LIU32AB, LI64AB, LIU64AB, LI128AB:
        if ($c_{lsize-4..0}$ ≠ 0) then
            raise AccessDisallowedByVirtualAddress
        endif
    LI16L, LIU16L, LI32L, LIU32L, LI64L, LIU64L, LI128L,
    LI16B, LIU16B, LI32B, LIU32B, LI64B, LIU64B, LI128B:
    LI8, LIU8:
endcase
m ← LoadMemory(c,VirtAddr,size,order)
a ← ($m_{size-1}$ and signed)$^{128-size}$ || m
RegWrite(rd, 128, a)
enddef

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

Fig. 51C (cont)

Operation codes

| | |
|---|---|
| S.8 | Store byte |
| S.16.B | Store double big-endian |
| S.16.A.B | Store double aligned big-endian |
| S.16.L | Store double little-endian |
| S.16.A.L | Store double aligned little-endian |
| S.32.B | Store quadlet big-endian |
| S.32.A.B | Store quadlet aligned big-endian |
| S.32.L | Store quadlet little-endian |
| S.32.A.L | Store quadlet aligned little-endian |
| S.64.B | Store octlet big-endian |
| S.64.A.B | Store octlet aligned big-endian |
| S.64.L | Store octlet little-endian |
| S.64.A.L | Store octlet aligned little-endian |
| S.128.B | Store hexlet big-endian |
| S.128.A.B | Store hexlet aligned big-endian |
| S.128.L | Store hexlet little-endian |
| S.128.A.L | Store hexlet aligned little-endian |
| S.MUX.64.A.B | Store multiplex octlet aligned big-endian |
| S.MUX.64.A.L | Store multiplex octlet aligned little-endian |

Fig. 52A

Selection

| number format | op | size | | | | alignment | ordering | |
|---|---|---|---|---|---|---|---|---|
| byte | | 8 | | | | | | |
| integer | | 16 | 32 | 64 | 128 | | L | B |
| integer aligned | | 16 | 32 | 64 | 128 | A | L | B |
| multiplex | MUX | 64 | | | | A | L | B |

Format op    rd,rc,rb op(rd,rc,rb)

| 31 | 24 23 | 18 17 | 12 11 | 6 5 | 0 |
|---|---|---|---|---|---|
| S.MINOR | rd | rc | rb | op | |
| 8 | 6 | 6 | 6 | 6 | |

Definition

```
def Store(op,rd,rc,rb) as
    case op of
        S8:
            size ← 8
        S16L, S16AL, S16B, S16AB:
            size ← 16
        S32L, S32AL, S32B, S32AB:
            size ← 32
        S64L, S64AL, S64B, S64AB,
        SMUX64AB, SMUX64AL:
            size ← 64
        S128L, S128AL, S128B, S128AB:
            size ← 128
    endcase
    lsize ← log(size)
    case op of
        S8:
            order ← undefined
        S16L, S32L, S64L, S128L,
        S16AL, S32AL, S64AL, S128AL, SMUX64ALl:
            order ← L
        S16B, S32B, S64B, S128B,
        S16AB, S32AB, S64AB, S128AB, SMUX64ABl:
            order ← B
    endcase
    c ← RegRead(rc, 64)
    b ← RegRead(rb, 64)
```

$\text{VirtAddr} \leftarrow c + (b_{66-\text{lsize}..0} \parallel 0^{\text{lsize}-3})$

```
    case op of
        S16AL, S32AL, S64AL, S128AL,
        S16AB, S32AB, S64AB, S128AB,
        SMUX64AB, SMUX64AL:
```
if $(c_{\text{lsize}-4..0} \neq 0)$ then
```
                raise AccessDisallowedByVirtualAddress
            endif
        S16L, S32L, S64L, S128L,
        S16B, S32B, S64B, S128B:
        S8:
    endcase
```

Fig. 52C

```
d ← RegRead(rd, 128)
case op of
    S8,
    S16L, S16AL, S16B, S16AB,
    S32L, S32AL, S32B, S32AB,
    S64L, S64AL, S64B, S64AB,
    S128L, S128AL, S128B, S128AB:
        StoreMemory(c,VirtAddr,size,order,d_{size-1..0})
    SMUX64AB, SMUX64AL:
        lock
            a ← LoadMemoryW(c,VirtAddr,size,order)
            m ← (d_{127..64} & d_{63..0}) | (a & ~d_{63..0})
            StoreMemory(c,VirtAddr,size,order,m)
        endlock
endcase
enddef
```

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

Fig. 52C (cont)

Operation codes

| | |
|---|---|
| S.I.8 | Store immediate byte |
| S.I.16.A.B | Store immediate double aligned big-endian |
| S.I.16.B | Store immediate double big-endian |
| S.I.16.A.L | Store immediate double aligned little-endian |
| S.I.16.L | Store immediate double little-endian |
| S.I.32.A.B | Store immediate quadlet aligned big-endian |
| S.I.32.B | Store immediate quadlet big-endian |
| S.I.32.A.L | Store immediate quadlet aligned little-endian |
| S.I.32.L | Store immediate quadlet little-endian |
| S.I.64.A.B | Store immediate octlet aligned big-endian |
| S.I.64.B | Store immediate octlet big-endian |
| S.I.64.A.L | Store immediate octlet aligned little-endian |
| S.I.64.L | Store immediate octlet little-endian |
| S.I.128.A.B | Store immediate hexlet aligned big-endian |
| S.I.128.B | Store immediate hexlet big-endian |
| S.I.128.A.L | Store immediate hexlet aligned little-endian |
| S.I.128.L | Store immediate hexlet little-endian |
| S.MUXI.64.A.B | Store multiplex immediate octlet aligned big-endian |
| S.MUXI.64.A.L | Store multiplex immediate octlet aligned little-endian |

Fig. 53A

Selection

| number format | op | size | alignment | ordering |
|---|---|---|---|---|
| byte | | 8 | | |
| integer | | 16  32  64  128 | | L      B |
| integer aligned | | 16  32  64  128 | A | L      B |
| multiplex | MUX | 64 | A | L      B |

Format

S.op.l.size.align.order      rd,rc,offset sopisizealignorder(rd,rc,offset)

Definition

```
def StoreImmediate(op,rd,rc,offset) as
    case op of
        SI8:
            size ← 8
        SI16L, SI16AL, SI16B, SI16AB:
            size ← 16
        SI32L, SI32AL, SI32B, SI32AB:
            size ← 32
        SI64L, SI64AL, SI64B, SI64AB, SMUXI64AB, SMUXI64AL:
            size ← 64
        SI128L, SI128AL, SI128B, SI128AB:
            size ← 128
    endcase
    lsize ← log(size)
    case op of
        SI8:
            order ← undefined
        SI16L, SI32L, SI64L, SI128L,
        SI16AL, SI32AL, SI64AL, SI128AL, SMUXI64AL:
            order ← L
        SI16B, SI32B, SI64B, SI128B,
        SI16AB, SI32AB, SI64AB, SI128AB, SMUXI64AB:
            order ← B
    endcase
    c ← RegRead(rc, 64)
```

$VirtAddr \leftarrow c + (offset_{11}^{55-lsize} \parallel offset \parallel 0^{lsize-3})$

```
    case op of
        SI16AL, SI32AL, SI64AL, SI128AL,
        SI16AB, SI32AB, SI64AB, SI128AB,
        SMUXI64AB, SMUXI64AL:
            if (c_{lsize-4..0} ≠ 0) then
                raise AccessDisallowedByVirtualAddress
            endif
        SI16L, SI32L, SI64L, SI128L,
        SI16B, SI32B, SI64B, SI128B:
        SI8:
    endcase
```

Fig. 53C

```
d ← RegRead(rd, 128)
case op of
    SI8,
    SI16L, SI16AL, SI16B, SI16AB,
    SI32L, SI32AL, SI32B, SI32AB,
    SI64L, SI64AL, SI64B, SI64AB,
    SI128L, SI128AL, SI128B, SI128AB:
        StoreMemory(c,VirtAddr,size,order,d_{size-1..0})
    SMUXI64AB, SMUXI64AL:
        lock
            a ← LoadMemoryW(c,VirtAddr,size,order)
            m ← (d_{127..64} & d_{63..0}) | (a & ~d_{63..0})
            StoreMemory(c,VirtAddr,size,order,m)
        endlock
    endcase
enddef
```

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

SYSTEM AND SOFTWARE FOR MATCHED ALIGNED AND UNALIGNED STORAGE INSTRUCTIONS

RELATED APPLICATIONS

This application is a continuation of application Ser. No. 10/436,340 filed May 13, 2003, which is a continuation of U.S. patent application Ser. No. 09/534,745, filed Mar. 24, 2000, now U.S. Pat. No. 6,643,765, which is a continuation of U.S. patent application Ser. No. 09/382,402, filed Aug. 24, 1999, now U.S. Pat. No. 6,295,599, which claims the benefit of priority to Provisional Application No. 60/097,635 filed Aug. 24, 1998, and is a continuation-in-part of U.S. patent application Ser. No. 09/169,963, filed Oct. 13, 1998, now U.S. Pat. No. 6,006,318, which is a continuation of U.S. patent application Ser. No. 08/754,827, filed Nov. 22, 1996, now U.S. Pat. No. 5,822,603, which is a divisional of U.S. patent application Ser. No. 08/516,036, filed Aug. 16, 1995, now U.S. Pat. No. 5,742,840, and this application is a continuation of U.S. patent application Ser. No. 09/922,319, filed Aug. 2, 2001 now U.S. Pat. No. 6,725,356, which is a continuation of U.S. patent application Ser. No. 09/382,402, filed Aug. 24, 1999, now U.S. Pat. No. 6,295,599, which claims the benefit of priority to Provisional Application No. 60/097,635 filed Aug. 24, 1998, and is a continuation-in-part of U.S. patent application Ser. No. 09/169,963, filed Oct. 13, 1998, now U.S. Pat. No. 6,006,318, which is a continuation of U.S. patent application Ser. No. 08/754,827, filed Nov. 22, 1996 now U.S. Pat. No. 5,822,603, which is a divisional of U.S. patent application Ser. No. 08/516,036, filed Aug. 16, 1995 now U.S. Pat. No. 5,742,840.

REFERENCE TO PARENT APPLICATIONS

The contents of U.S. patent application Ser. Nos. 09/382,402 and 09/922,319 are hereby incorporated by reference including their appendices in their entirety.

REFERENCE TO AN APPENDIX

This application includes an appendix, submitted herewith The contents of the appendix are hereby incorporated by reference.

FIELD OF THE INVENTION

The present invention relates to general purpose processor architectures, and particularly relates to general purpose processor architectures capable of executing group operations.

BACKGROUND OF THE INVENTION

The performance level of a processor, and particularly a general purpose processor, can be estimated from the multiple of a plurality of interdependent factors: clock rate, gates per clock, number of operands, operand and data path width, and operand and data path partitioning. Clock rate is largely influenced by the choice of circuit and logic technology, but is also influenced by the number of gates per clock. Gates per clock is how many gates in a pipeline may change state in a single clock cycle. This can be reduced by inserting latches into the data path: when the number of gates between latches is reduced, a higher clock is possible. However, the additional latches produce a longer pipeline length, and thus come at a cost of increased instruction latency. The number of operands is straightforward; for example, by adding with carry-save techniques, three values may be added together with little more delay than is required for adding two values. Operand and data path width defines how much data can be processed at once; wider data paths can perform more complex functions, but generally this comes at a higher implementation cost. Operand and data path partitioning refers to the efficient use of the data path as width is increased, with the objective of maintaining substantially peak usage.

SUMMARY OF THE INVENTION

Embodiments of the invention pertain to systems and methods for enhancing the utilization of a general purpose processor by adding classes of instructions. These classes of instructions use the contents of general purpose registers as data path sources, partition the operands into symbols of a specified size, perform operations in parallel, catenate the results and place the catenated results into a general-purpose register. Some embodiments of the invention relate to a general purpose microprocessor which has been optimized for processing and transmitting media data streams through significant parallelism.

Some embodiments of the present invention provide a system and method for improving the performance of general purpose processors by including the capability to execute group operations involving multiple floating-point operands. In one embodiment, a programmable media processor comprises a virtual memory addressing unit, a data path, a register file comprising a plurality of registers coupled to the data path, and an execution unit coupled to the data path capable of executing group-floating point operations in which multiple floating-point operations stored in partitioned fields of one or more of the plurality of registers are operated on to produce catenated results. The group floating-point operations may involve operating on at least two of the multiple floating-point operands in parallel. The catenated results may be returned to a register, and general purpose registers may used as operand and result registers for the floating-point operations. In some embodiments the execution unit may also be capable of performing group floating-point operations on floating-point data of more than one precision. In some embodiments the group floating-point operations may include group add, group subtract, group compare, group multiply and group divide arithmetic operations that operate on catenated floating-point data. In some embodiments, the group floating-point operations may include group multiply-add, group scale-add, and group set operations that operate on catenated floating-point data.

In one embodiment, the execution unit is also capable of executing group integer instructions involving multiple integer operands stored in partitioned fields of registers. The group integer operations may involve operating on at least two of the multiple integer operands in parallel. The group integer operations may include group add, group subtract, group compare, and group multiply arithmetic operations that operate on catenated integer data.

In one embodiment, the execution unit is capable of performing group data handling operations, including operations that copy, operations that shift, operations that rearrange and operations that resize catenated integer data stored in a register and return catenated results. The execution unit may also be configurable to perform group data handling operations on integer data having a symbol width of 8 bits, group data handling operations on integer data having a symbol width of 16 bits, and group data handling operations on integer data having a symbol width of 32 bits. In one embodiment, the operations are controlled by values in a register operand. In one embodiment, the operations are controlled by values in the instruction.

In one embodiment, the multi-precision execution unit is capable of executing a Galois field instruction operation.

In one embodiment, the multi-precision execution unit is configurable to execute a plurality of instruction streams in parallel from a plurality of threads, and the programmable media processor further comprises a register file associated with each thread executing in parallel on the multi-precision execution unit to support processing of the plurality of threads. In some embodiments, the multi-precision execution unit executes instructions from the plurality of instruction streams in a round-robin manner. In some embodiments, the processor ensures only one thread from the plurality of threads can handle an exception at any given time.

Some embodiments of the present invention provide a multiplier array that is fully used for high precision arithmetic, but is only partly used for other, lower precision operations. This can be accomplished by extracting the high-order portion of the multiplier product or sum of products, adjusted by a dynamic shift amount from a general register or an adjustment specified as part of the instruction, and rounded by a control value from a register or instruction portion. The rounding may be any of several types, including round-to-nearest/even; toward zero, floor, or ceiling. Overflows are typically handled by limiting the result to the largest and smallest values that can be accurately represented in the output result.

When an extract is controlled by a register, the size of the result can be specified, allowing rounding and limiting to a smaller number of bits than can fit in the result. This permits the result to be scaled for use in subsequent operations without concern of overflow or rounding. As a result, performance is enhanced. In those instances where the extract is controlled by a register, a single register value defines the size of the operands, the shift amount and size of the result, and the rounding control. By placing such control information in a single register, the size of the instruction is reduced over the number of bits that such an instruction would otherwise require, again improving performance and enhancing processor flexibility. Exemplary instructions are Ensemble Convolve Extract, Ensemble Multiply Extract, Ensemble Multiply Add Extract, and Ensemble Scale Add Extract. With particular regard to the Ensemble Scale Add Extract Instruction, the extract control information is combined in a register with two values used as scalar multipliers to the contents of two vector multiplicands. This combination reduces the number of registers otherwise required, thus reducing the number of bits required for the instruction.

In one embodiment, the processor performs load and store instructions operable to move values between registers and memory. In one embodiment, the processor performs both instructions that verify alignment of memory operands and instructions that permit memory operands to be unaligned. In one embodiment, the processor performs store multiplex instructions operable to move to memory a portion of data contents controlled by a corresponding mask contents. In one embodiment, this masked storage operation is performed by indivisibly reading-modifying-writing a memory operand.

In one embodiment, all processor, memory and interface resources are directly accessible to high-level language programs. In one embodiment, assembler codes and high-level language formats are specified to access enhanced instructions. In one embodiment interface and system state is memory mapped, so that it can be manipulated by compiled code. In one embodiment, software libraries provide other operations required by the ANSI/IEEE floating-point standard. In one embodiment, software conventions are employed at software module boundaries, in order to permit the combination of separately compiled code and to provide standard interfaces between application, library and system software. In one embodiment, instruction scheduling is performed by a compiler.

THE FIGURES

FIG. 9 illustrates Wide Microcache data structures.

Figure 12:
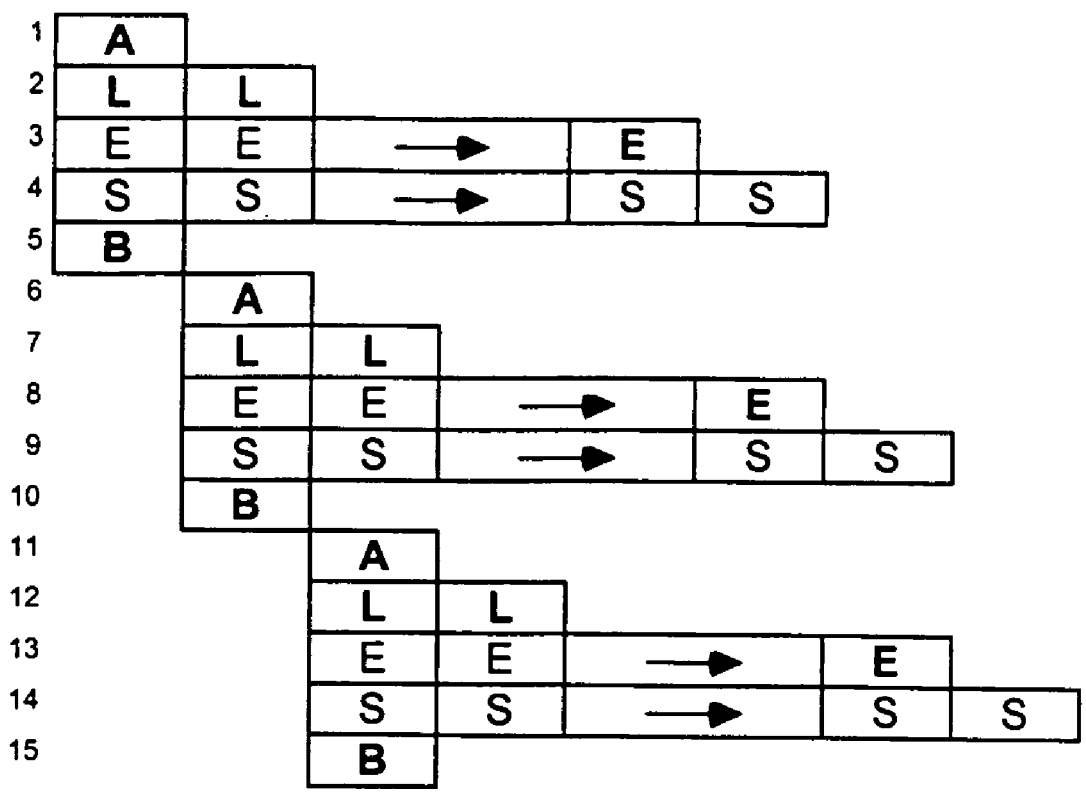
FIG. 12 is a timing diagram of a decoupled pipeline structure in accordance with one embodiment of the present invention.
Figure 13:
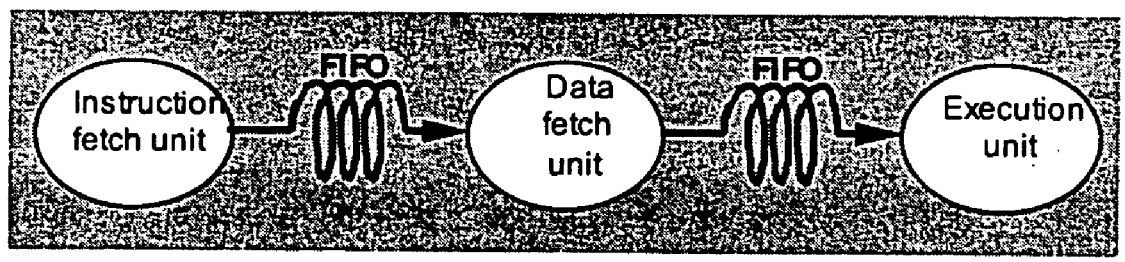

FIG. 13 further illustrates the pipeline organization of FIG. 12.

FIG. 14 is a diagram illustrating the basic organization of the memory management system according to the present embodiment of the invention.

FIG. 15 illustrates the physical address of an LTB entry for thread th, entry en, byte b.

FIG. 16 illustrates a definition for AccessPhysicalLTB.

FIG. 17 illustrates how various 16-bit values are packed together into a 64-bit LTB entry.

FIG. 18 illustrates global access as fields of a control register.

FIG. 19 shows how a single-set LTB context may be further simplified by reserving the implementation of the lm and la registers.

FIG. 20 shows the partitioning of the virtual address space if the largest possible space is reserved for an address space identifier.

FIG. 21 shows how the LTB protect field controls the minimum privilege level required for each memory action of read (r), write (w), execute (x), and gateway (g), as well as memory and cache attributes of write allocate (wa), detail access (da), strong ordering (so), cache disable (cd), and write through (wt).

FIG. 22 illustrates a definition for LocalTranslation.

FIG. 23 shows how the low-order GT bits of the th value are ignored, reflecting that 2GT threads share a single GTB.

FIG. 24 illustrates a definition for AccessPhysicalGTB.

FIG. 25 illustrates the format of a GTB entry.

FIG. 26 illustrates a definition for GlobalAddressTranslation.

FIG. 27 illustrates a definition for GTBUpdateWrite.

FIG. 28 shows how the low-order GT bits of the th value are ignored, reflecting that 2GT threads share single GTB registers.

FIG. 29 illustrates the registers GTBLast, GTBFirst, and GTBBump.

FIG. 30 illustrates a definition for AccessPhysicalGT-BRegisters.

FIGS. 31A-31C illustrate Group Boolean instructions in accordance with an exemplary embodiment of the present invention.

FIGS. 31D-31E illustrate Group Multiplex instructions in accordance with an exemplary embodiment of the present invention.

Figure 32B:
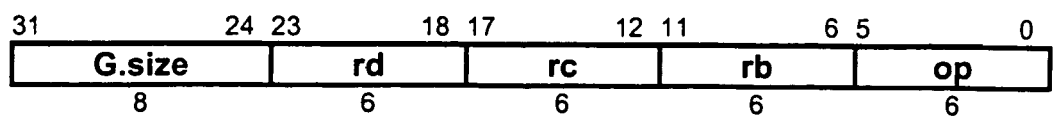

FIGS. 32A-32C illustrate Group Add instructions in accordance with an exemplary embodiment of the present invention.

Figure 33B:
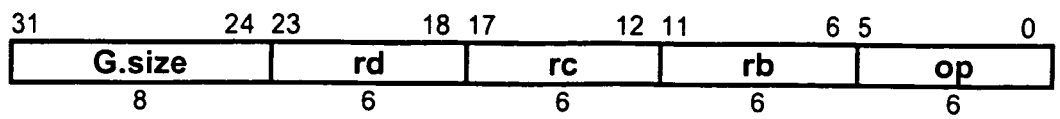

FIGS. 33A-33C illustrate Group Subtract and Group Set instructions in accordance with an exemplary embodiment of the present invention.

Figure 34B:
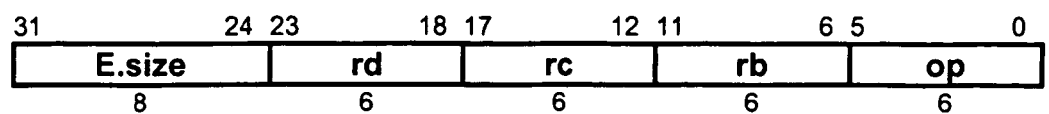

FIGS. 34A-34C illustrate Ensemble Divide and Ensemble Multiply instructions in accordance with an exemplary embodiment of the present invention.

Figure 35B:
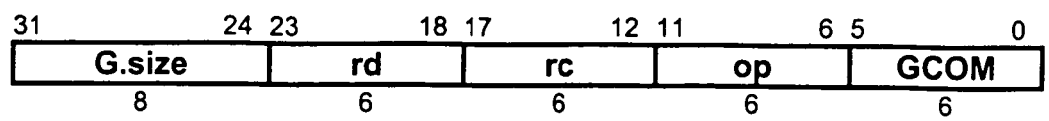

FIGS. 35A-35C illustrate Group Compare instructions in accordance with an exemplary embodiment of the present invention.

Figure 36B:
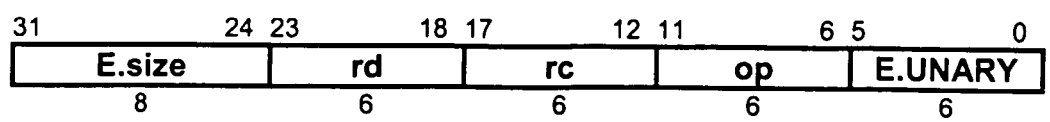

FIGS. 36A-36C illustrate Ensemble Unary instructions in accordance with an exemplary embodiment of the present invention.

FIG. 37 illustrates exemplary functions that are defined for use within the detailed instruction definitions in other sections.

Figure 38B:
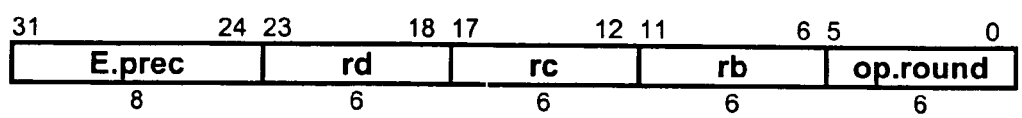

FIGS. 38A-38C illustrate Ensemble Floating-Point Add, Ensemble Floating-Point Divide, and Ensemble Floating-Point Multiply instructions in accordance with an exemplary embodiment of the present invention.

Figure 38E:
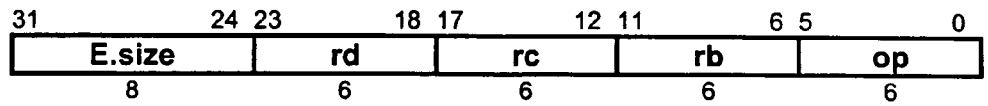

FIGS. 38D-38F illustrate Ensemble Floating-Point Multiply Add instructions in accordance with an exemplary embodiment of the present invention.

Figure 38H:
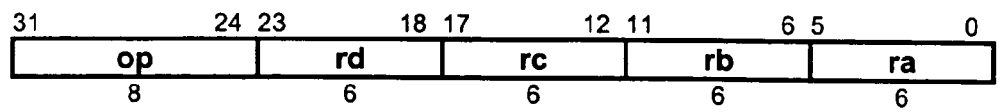

FIGS. 38G-38I illustrate Ensemble Floating-Point Scale Add instructions in accordance with an exemplary embodiment of the present invention.

Figure 39B:
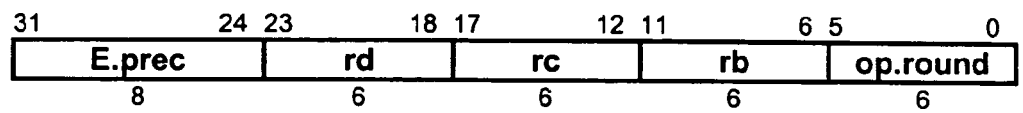

FIGS. 39A-39C illustrate Ensemble Floating-Point Subtract instructions in accordance with an exemplary embodiment of the present invention.

FIGS. 39D-39G illustrate Group Set Floating-point instructions in accordance with an exemplary embodiment of the present invention.

Figure 40B:
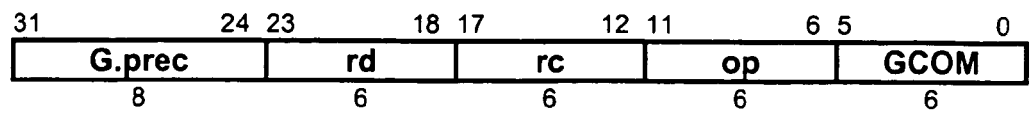

FIGS. 40A-40C illustrate Group Compare Floating-point instructions in accordance with an exemplary embodiment of the present invention.

Figure 41B:
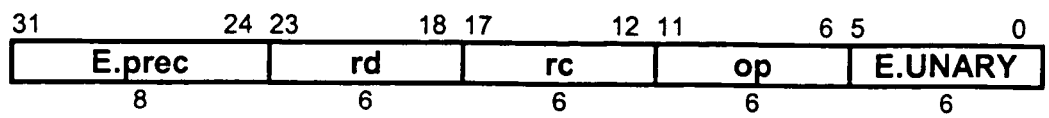

FIGS. 41A-41C illustrate Ensemble Unary Floating-point instructions in accordance with an exemplary embodiment of the present invention.

FIGS. 42A-42D illustrate Ensemble Multiply Galois Field instructions in accordance with an exemplary embodiment of the present invention.

FIGS. 43A-43D illustrate Compress, Expand, Rotate, and Shift instructions in accordance with an exemplary embodiment of the present invention.

Figure 43B:
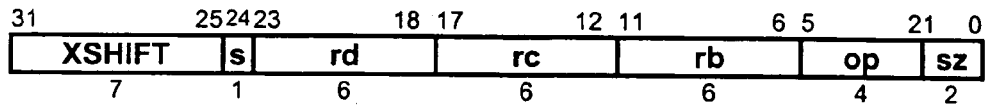
Figure 43D:
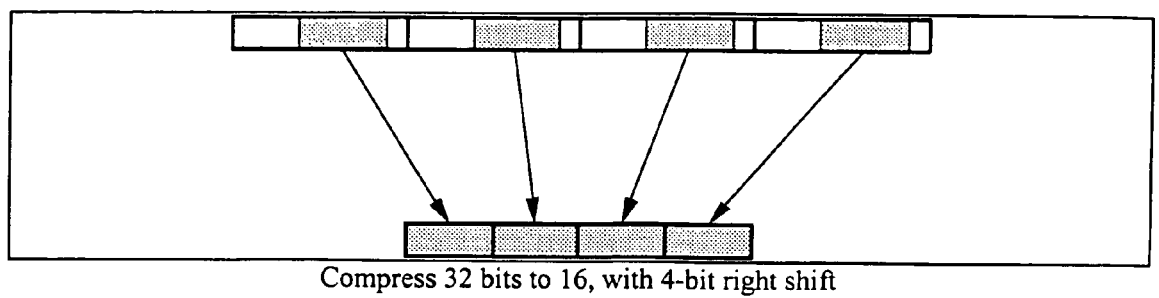
Figure 43F:
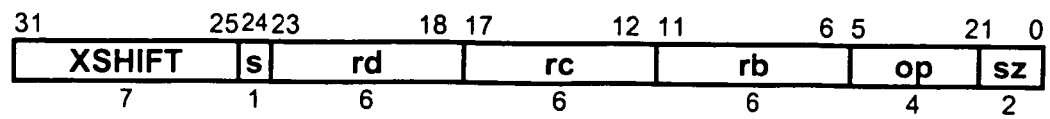
Figure 431:
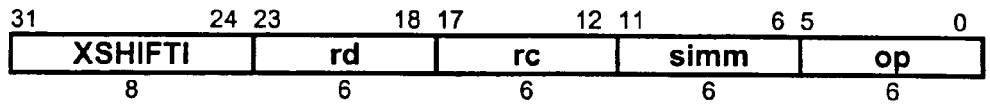

FIGS. 43E-43G illustrate Shift Merge instructions in accordance with an exemplary embodiment of the present invention.

FIGS. 43H-43J illustrate Compress Immediate, Expand Immediate, Rotate Immediate, and Shift Immediate instructions in accordance with an exemplary embodiment of the present invention.

Figure 43L:
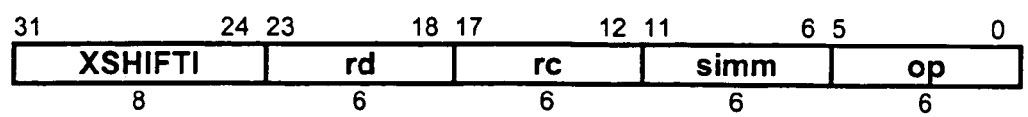

FIGS. 43K-43M illustrate Shift Merge Immediate instructions in accordance with an exemplary embodiment of the present invention.

FIGS. 44A-44D illustrate Extract instructions in accordance with an exemplary embodiment of the present invention.

Figure 44A:
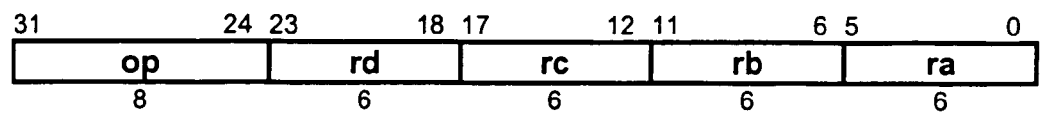
Figure 44C:
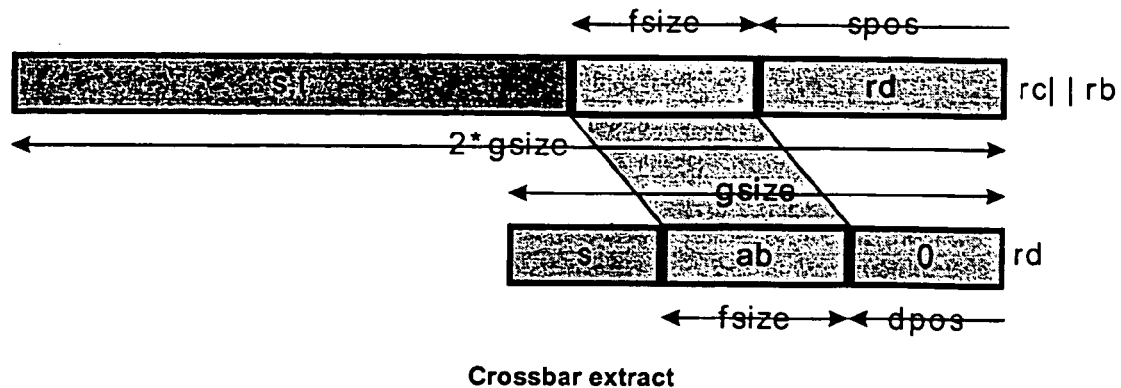
Figure 44D:
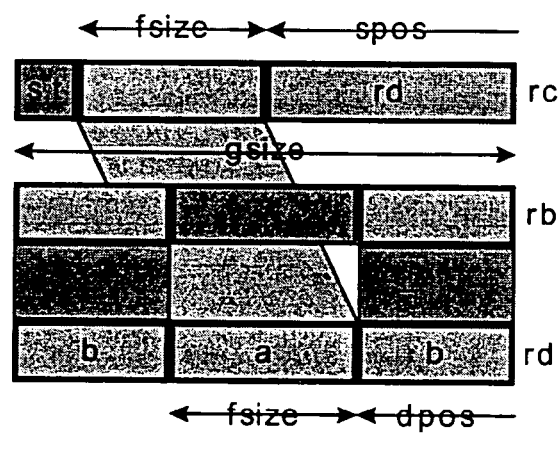
Figures 44E, 44F:
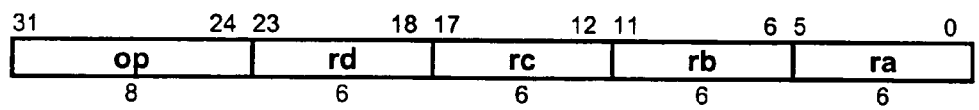

FIGS. 44E-44G illustrate Ensemble Extract instructions in accordance with an exemplary embodiment of the present invention.

FIGS. 45A-45F illustrate Deposit and Withdraw instructions in accordance with an exemplary embodiment of the present invention.

FIGS. 45G-45J illustrate Deposit Merge instructions in accordance with an exemplary embodiment of the present invention.

FIGS. 46A-46E illustrate Shuffle instructions in accordance with an exemplary embodiment of the present invention.

Figure 47C:
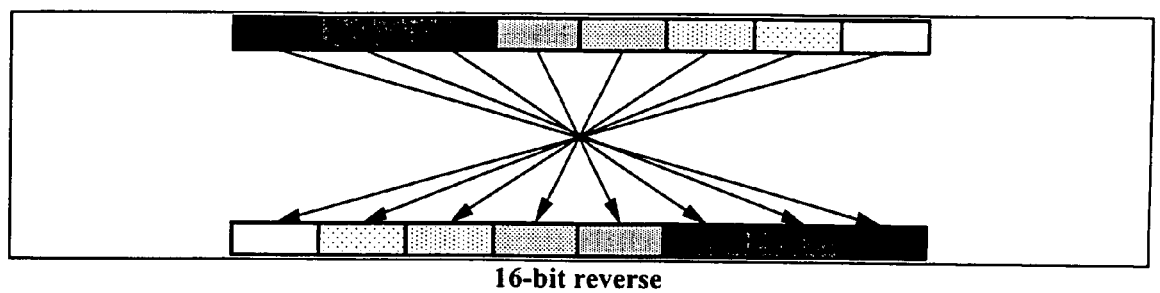

FIGS. 47A-47C illustrate Swizzle instructions in accordance with an exemplary embodiment of the present invention.

Figures 47D, 47E:
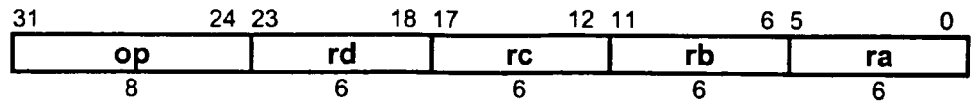

FIGS. 47D-47E illustrate Select instructions in accordance with an exemplary embodiment of the present invention.

FIG. 48 is a pin summary describing the functions of various pins in accordance with the one embodiment of the present invention.

FIGS. 49A-49G present electrical specifications describing AC and DC parameters in accordance with one embodiment of the present invention.

Figure 50B:
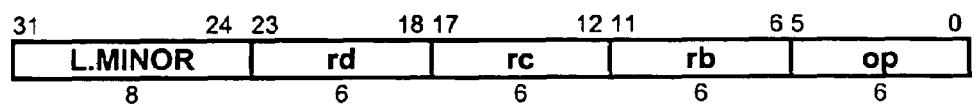

FIGS. 50A-50C illustrate Load instructions in accordance with an exemplary embodiment of the present invention.

Figure 51B:
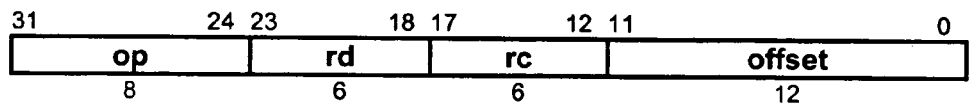

FIGS. 51A-51C illustrate Load Immediate instructions in accordance with an exemplary embodiment of the present invention.

Figure 52B:
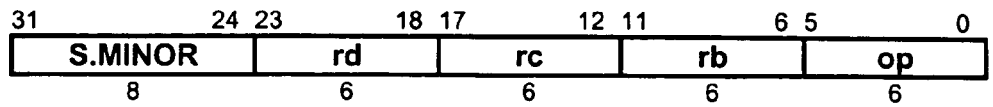

FIGS. 52A-52C illustrate Store and Store Multiplex instructions in accordance with an exemplary embodiment of the present invention.

Figure 53B:
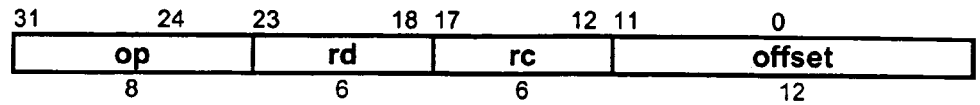

FIGS. 53A-53C illustrate Store Immediate and Store Multiplex Immediate instructions in accordance with an exemplary embodiment of the present invention.

DETAILED DESCRIPTION OF THE INVENTION

Figure 1:
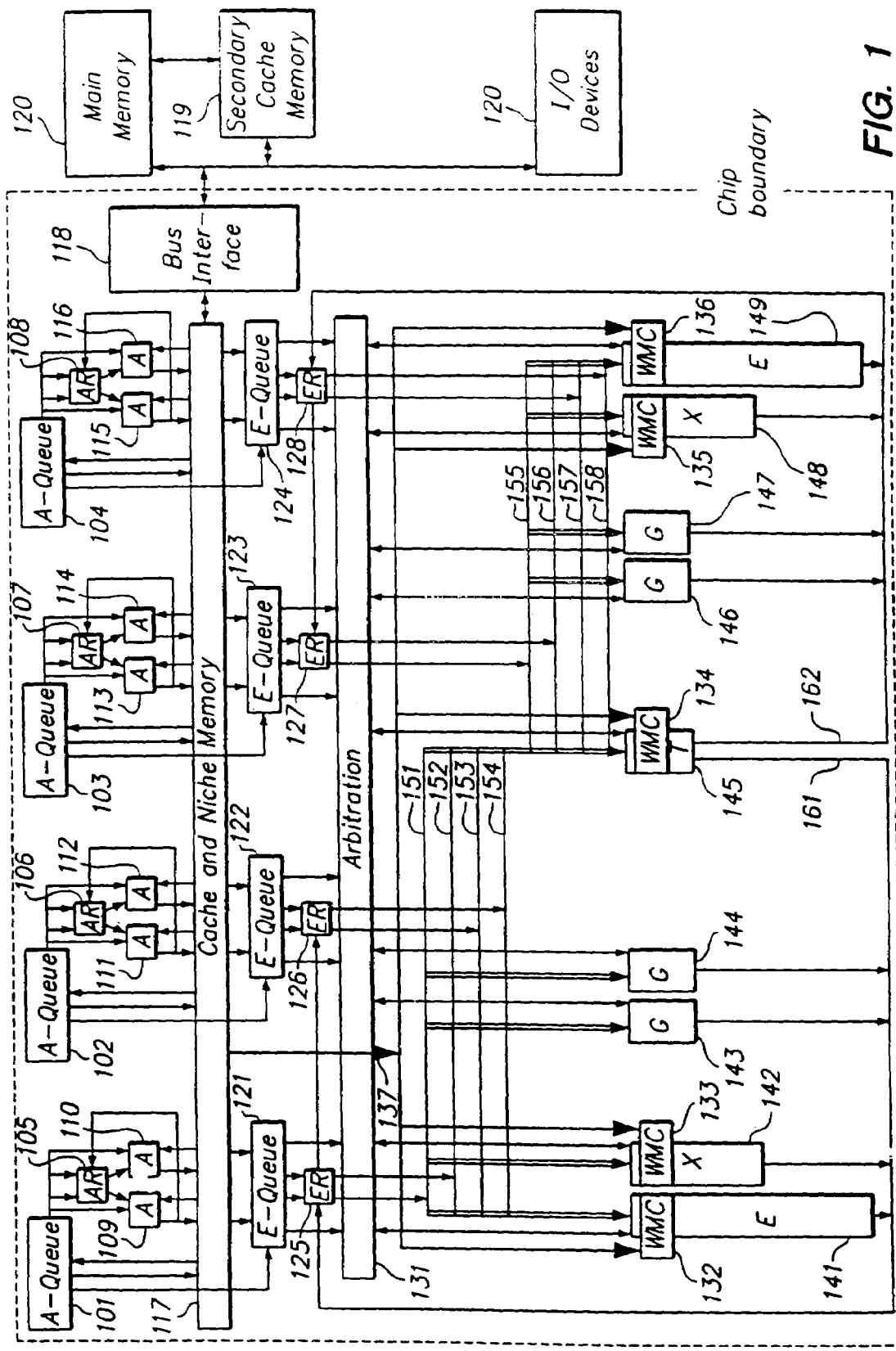
FIG. 1 is a system level diagram showing the functional blocks of a system according to the present invention.

Referring first to FIG. 1, a general purpose processor is illustrated therein in block diagram form. In FIG. 1, four copies of an access unit are shown, each with an access instruction fetch queue A-Queue 101-104. Each access instruction fetch queue A-Queue 101104 is coupled to an access register file AR 105-108, which are each coupled to two access functional units A 109-116. In a typical embodiment, each thread of the processor may have on the order of sixty-four general purpose registers (e.g., the AR's 105-108 and ER's 125-128). The access units function independently for four simultaneous threads of execution, and each compute program control flow by performing arithmetic and branch instructions and access memory by performing load and store instructions. These access units also provide wide operand specifiers for wide operand instructions. These eight access functional units A 109-116 produce results for access register files AR 105-108 and memory addresses to a shared memory system 117-120.

In one embodiment, the memory hierarchy includes on-chip instruction and data memories, instruction and data caches, a virtual memory facility, and interfaces to external devices. In FIG. 1, the memory system is comprised of a combined cache and niche memory 117, an external bus interface 118, and, externally to the device, a secondary cache 119 and main memory system with I/O devices 120. The memory contents fetched from memory system 117-120 are combined with execute instructions not performed by the access unit, and entered into the four execute instruction queues E-Queue 121-124. In accordance with one embodiment of the present invention, from the software perspective, the machine state includes a linear byte-addressed shared memory space. For wide instructions, memory contents fetched from memory system 117-120 are also provided to wide operand microcaches 132-136 by bus 137. Instructions and memory data from E-queue 121-124 are presented to execution register files 125-128, which fetch execution register file source operands. The instructions are coupled to the execution unit arbitration unit Arbitration 131, that selects which instructions from the four threads are to be routed to the available execution functional units E 141 and 149, X 142 and 148, G 143-144 and 146-147, and T 145. The execution functional units E 141 and 149, the execution functional units X 142 and 148, and the execution functional unit T 145 each contain a wide operand microcache 132-136, which are each coupled to the memory system 117 by bus 137.

The execution functional units G 143-144 and 146-147 are group arithmetic and logical units that perform simple arithmetic and logical instructions, including group operations wherein the source and result operands represent a group of values of a specified symbol size, which are partitioned and operated on separately, with results catenated together. In a presently preferred embodiment the data path is 128 bits wide, although the present invention is not intended to be limited to any specific size of data path.

The execution functional units X 142 and 148 are crossbar switch units that perform crossbar switch instructions. The crossbar switch units 142 and 148 perform data handling operations on the data stream provided over the data path source operand buses 151-158, including deal, shuffles, shifts, expands, compresses, swizzles, permutes and reverses, plus the wide operations discussed hereinafter. In a key element of a first aspect of the invention, at least one such operation will be expanded to a width greater than the general register and data path width. Examples of the data manipulation operations are described in the Appendix included herewith.

The execution functional units E 141 and 149 are ensemble units that perform ensemble instructions using a large array multiplier, including group or vector multiply and matrix multiply of operands partitioned from data path source operand buses 151-158 and treated as integer, floating-point, polynomial or Galois field values. According to the present embodiment of the invention, a general software solution is provided to the most common operations required for Galois Field arithmetic. The instructions provided include a polynomial multiply, with the polynomial specified as one register operand. This instruction can be used to perform CRC generation and checking, Reed-Solomon code generation and checking, and spread-spectrum encoding and decoding. Also, matrix multiply instructions and other operations described in the Appendix included herewith utilize a wide operand loaded into the wide operand microcache 132 and 136.

The execution functional unit T 145 is a translate unit that performs table-look-up operations on a group of operands partitioned from a register operand, and catenates the result. The Wide Translate instruction described in the Appendix included herewith utilizes a wide operand loaded into the wide operand microcache 134.

The execution functional units E 141, 149, execution functional units X-142 148, and execution functional unit T each contain dedicated storage to permit storage of source operands including wide operands as discussed hereinafter. The dedicated storage 132-136, which may be thought of as a wide microcache, typically has a width which is a multiple of the width of the data path operands related to the data path source operand buses 151-158. Thus, if the width of the data path 151-158 is 128 bits, the dedicated storage 132-136 may have a width of 256, 512, 1024 or 2048 bits. Operands which utilize the full width of the dedicated storage are referred to herein as wide operands, although it is not necessary in all instances that a wide operand use the entirety of the width of the dedicated storage; it is sufficient that the wide operand use a portion greater than the width of the memory data path of the output of the memory system 117-120 and the functional unit data path of the input of the execution functional units 141-149, though not necessarily greater than the width of the two combined. Because the width of the dedicated storage 132-136 is greater than the width of the memory operand bus 137, portions of wide operands are loaded sequentially into the dedicated storage 132-136. However, once loaded, the wide operands may then be used at substantially the same time. It can be seen that functional units 141-149 and associated execution registers 125-128 form a data functional unit, the exact elements of which may vary with implementation.

The execution register file ER 125-128 source operands are coupled to the execution units 141-145 using source operand buses 151-154 and to the execution units 145-149 using source operand buses 155-158. The function unit result operands from execution units 141145 are coupled to the execution register file ER 125-128 using result bus 161 and the function units result operands from execution units 145-149 are coupled to the execution register file using result bus 162.

Figure 2:
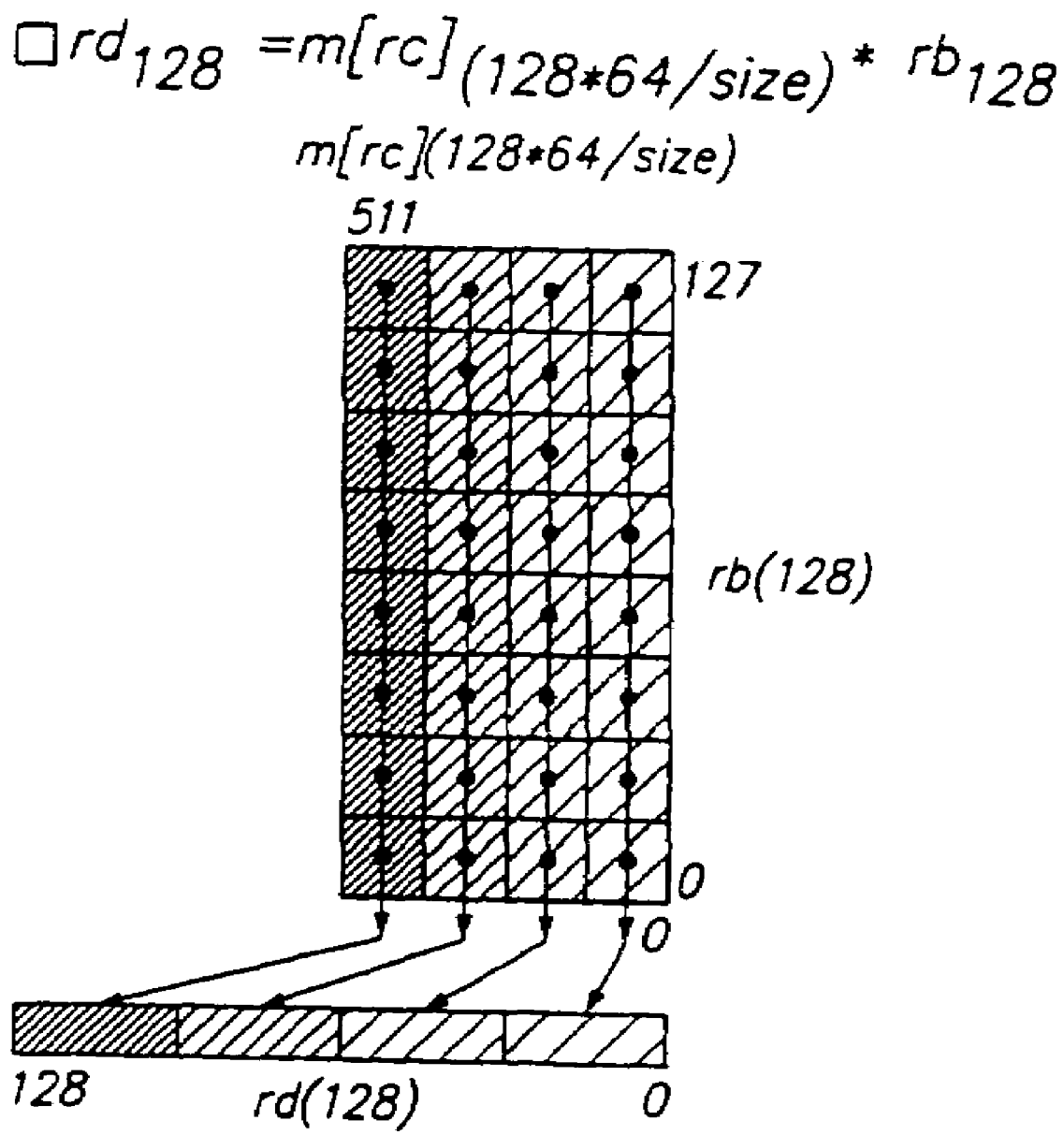
FIG. 2 is a matrix representation of a wide matrix multiply in accordance with one embodiment of the present invention.
Figure 3:
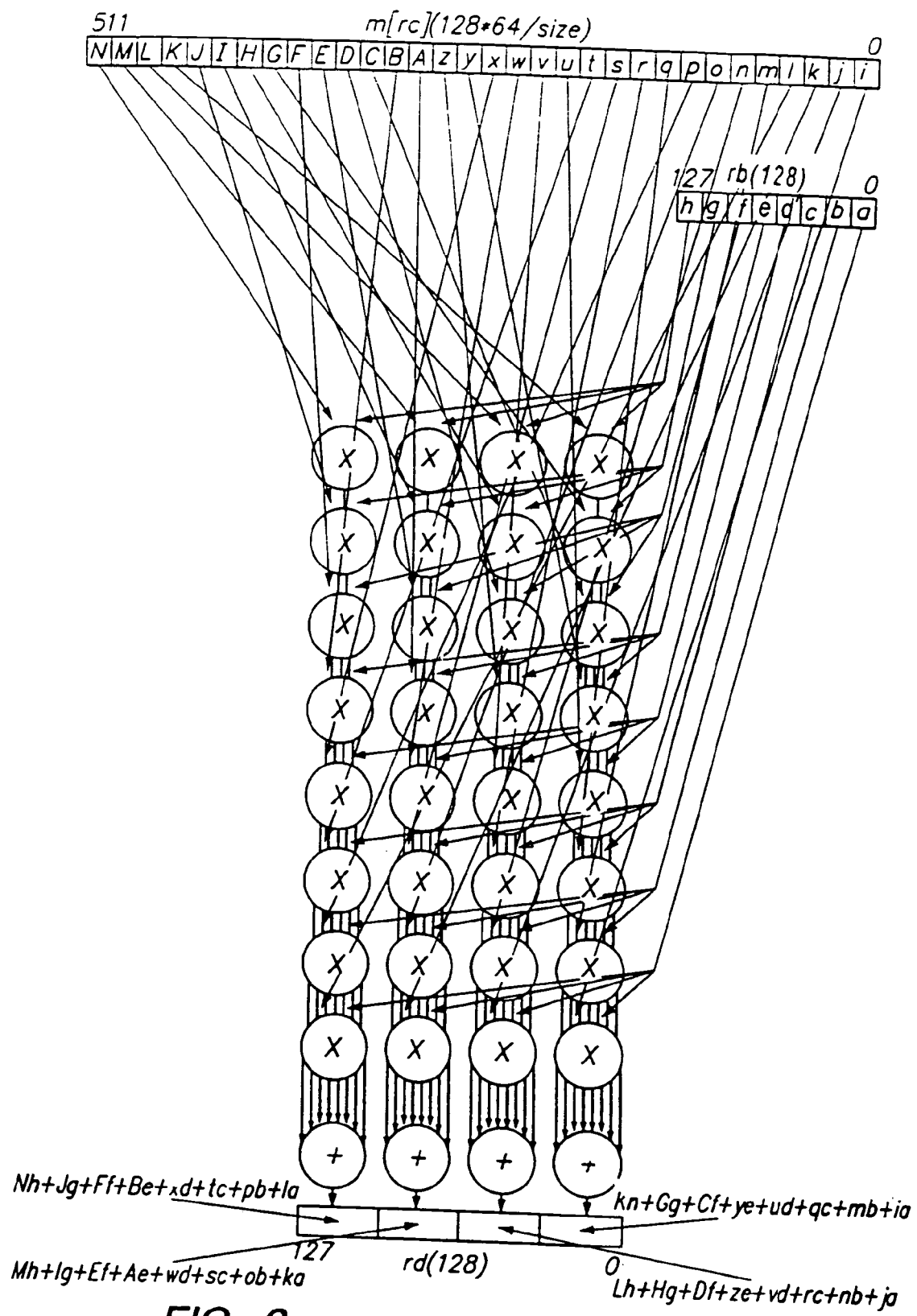
FIG. 3 is a further representation of a wide matrix multiple in accordance with one embodiment of the present invention.

The wide operands used in some embodiments of the present invention provide the ability to execute complex instructions such as the wide multiply matrix instruction shown in FIG. 2, which can be appreciated in an alternative form, as well, from FIG. 3. As can be appreciated from FIGS. 2 and 3, a wide operand permits, for example, the matrix multiplication of various sizes and shapes which exceed the data path width. The example of FIG. 2 involves a matrix specified by register rc having a 128*64/size multiplied by a vector contained in register rb having a 128 size, to yield a result, placed in register rd, of 128 bits.

Figure 5:
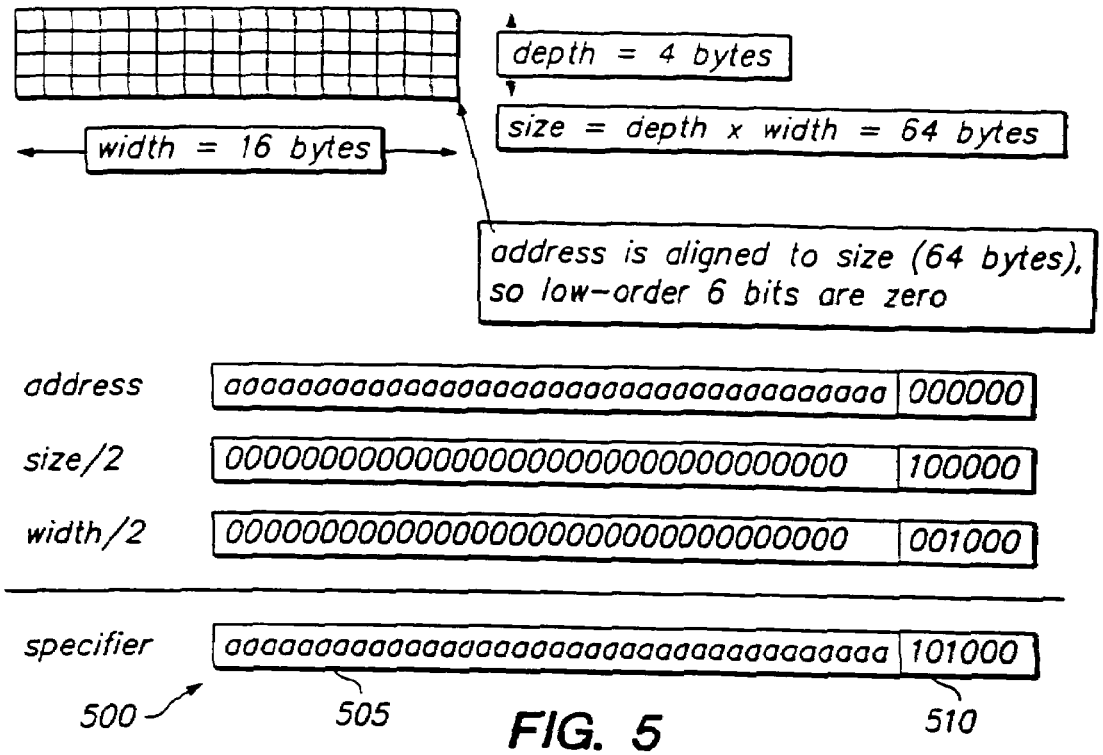
FIG. 5 illustrates a wide operand in accordance with one embodiment of the present invention.

The operands that are substantially larger than the data path width of the processor are provided by using a general-purpose register to specify a memory specifier from which more than one but in some embodiments several data path widths of data can be read into the dedicated storage. The memory specifier typically includes the memory address together with the size and shape of the matrix of data being operated on. The memory specifier or wide operand specifier can be better appreciated from FIG. 5, in which a specifier 500 is seen to be an address, plus a field representative of the size/2 and a further field representative of width/2, where size is the product of the depth and width of the data. The address is aligned to a specified size, for example sixty-four bytes, so that a plurality of low order bits (for example, six bits) are zero. The specifier 500 can thus be seen to comprise a first field 505 for the address, plus two field indicia 510 within the low order six bits to indicate size and width.

Figure 6:
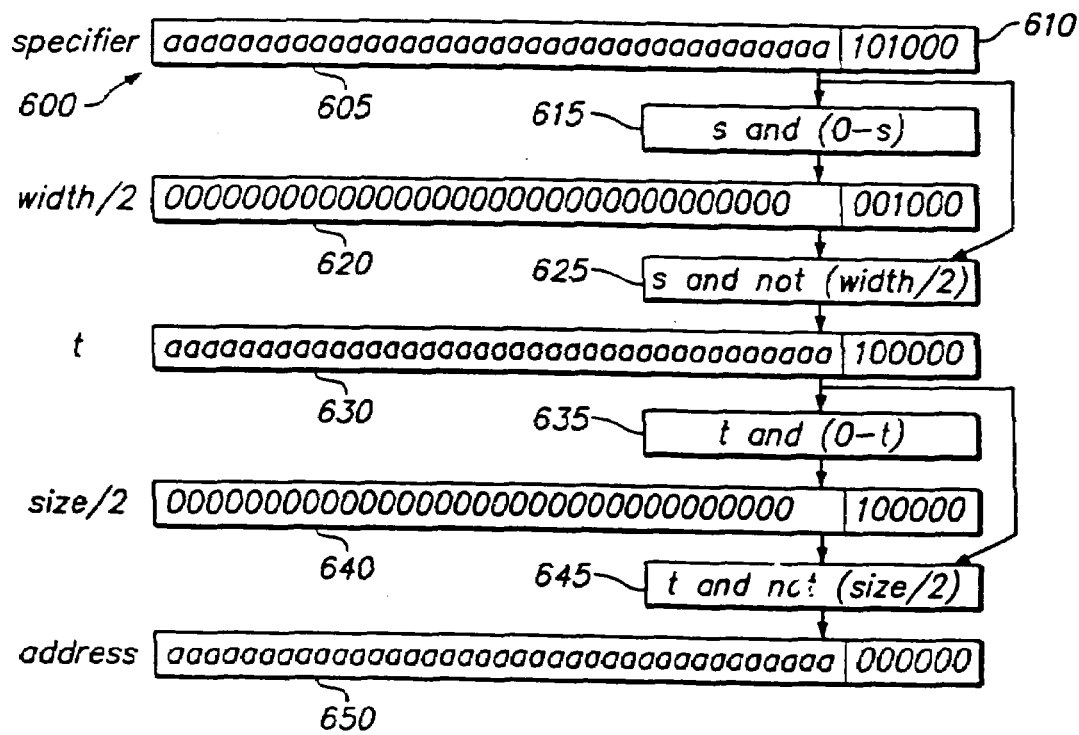
FIG. 6 illustrates an approach to specifier decoding in accordance with one embodiment of the present invention.

The decoding of the specifier 500 may be further appreciated from FIG. 6 where, for a given specifier 600 made up of an address field 605 together with a field 610 comprising plurality of low order bits. By a series of arithmetic operations shown at steps 615 and 620, the portion of the field 610 representative of width/2 is developed. In a similar series of steps shown at 625 and 630, the value of t is decoded, which can then be used to decode both size and address. The portion of the field 610 representative of size/2 is decoded as shown at steps 635 and 640, while the address is decoded in a similar way at steps 645 and 650.

Figure 7:
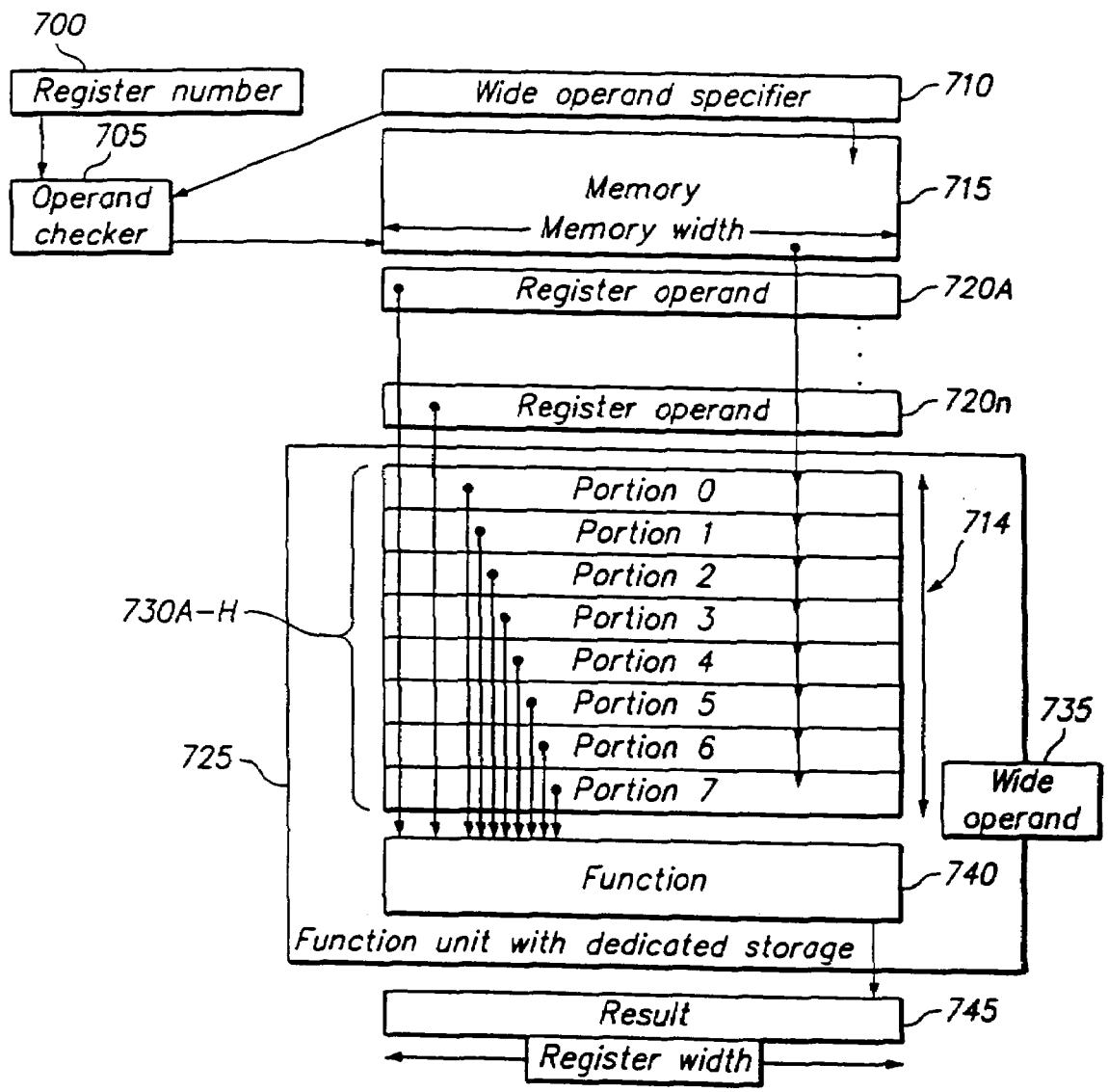
FIG. 7 illustrates in operational block form a Wide Function Unit in accordance with one embodiment of the present invention.

The wide function unit may be better appreciated from FIG. 7, in which a register number 700 is provided to an operand checker 705. Wide operand, specifier 710 communicates with the operand checker 705 and also addresses memory 715 having a defined memory width. The memory address includes a plurality of register operands 720A-$n$, which are accumulated in a dedicated storage portion 714 of a data functional unit 725. In the exemplary embodiment shown in FIG. 7, the dedicated storage 714 can be seen to have a width equal to eight data path widths, such that eight wide operand portions 730A-H are sequentially loaded into the dedicated storage to form the wide operand. Although eight portions are shown in FIG. 7, the present invention is not limited to eight or any other specific multiple of data path widths. Once the wide operand portions 730A-H are sequentially loaded, they may be used as a single wide operand 735 by the functional element 740, which may be any element(s) from FIG. 1 connected thereto. The result of the wide operand is then provided. to a result register 745, which in a presently preferred embodiment is of the same width as the memory width.

Once the wide operand is successfully loaded into the dedicated storage 714, a second aspect of the present invention may be appreciated. Further execution of this instruction or other similar instructions that specify the same memory address can read the dedicated storage to obtain the operand value under specific conditions that determine whether the memory operand has been altered by intervening instructions. Assuming that these conditions are met, the memory operand fetch from the dedicated storage is combined with one or more register operands in the functional unit, producing a result. In some embodiments, the size of the result is limited to that of a general register, so that no similar dedicated storage is required for the result. However, in some different embodiments, the result may be a wide operand, to further enhance performance.

To permit the wide operand value to be addressed by subsequent instructions specifying the same memory address, various conditions must be checked and confirmed: Those conditions include:

1. Each memory store instruction checks the memory address against the memory addresses recorded for the dedicated storage. Any match causes the storage to be marked invalid, since a memory store instruction directed to any of the memory addresses stored in dedicated storage 714 means that data has been overwritten.
2. The register number used to address the storage is recorded. If no intervening instructions have written to the register, and the same register is used on the subsequent instruction, the storage is valid (unless marked invalid by rule #1).
3. If the register has been modified or a different register number is used, the value of the register is read and compared against the address recorded for the dedicated storage. This uses more resources than #1 because of the need to fetch the register contents and because the width of the register is greater than that of the register number itself. If the address matches, the storage is valid. The new register number is recorded for the dedicated storage.

If conditions #2 or #3 are not met, the register contents are used to address the general-purpose processor's memory and load the dedicated storage. If dedicated storage is already fully loaded, a portion of the dedicated storage must be discarded (victimized) to make room for the new value. The instruction is then performed using the newly updated dedicated storage. The address and register number is recorded for the dedicated storage.

By checking the above conditions, the need for saving and restoring the dedicated storage is eliminated. In addition, if the context of the processor is changed and the new context does not employ Wide instructions that reference the same dedicated storage, when the original context is restored, the contents of the dedicated storage are allowed to be used without refreshing the value from memory, using checking rule #3. Because the values in the dedicated storage are read from memory and not modified directly by performing wide operations, the values can be discarded at any time without saving the results into general memory. This property simplifies the implementation of rule #4 above.

An alternate embodiment of the present invention can replace rule #1 above with the following rule:

1a. Each memory store instruction checks the memory address against the memory addresses recorded for the dedicated storage. Any match causes the dedicated storage to be updated, as well as the general memory.

By use of the above rule 1.a, memory store instructions can modify the dedicated storage, updating just the piece of the dedicated storage that has been changed, leaving the remainder intact. By continuing to update the general memory, it is still true that the contents of the dedicated memory can be discarded at any time without saving the results into general memory. Thus rule #4 is not made more complicated by this choice. The advantage of this alternate embodiment is that the dedicated storage need not be discarded (invalidated) by memory store operations.

Referring next to FIG. 9, an exemplary arrangement of the data structures of the wide microcache or dedicated storage 114 may be better appreciated. The wide microcache contents, wmc.c, can be seen to form a plurality of data path widths 900A-$n$, although in the example shown the number is eight. The physical address, wmc.pa, is shown as 64 bits in the example shown, although the invention is not limited to a specific width. The size of the contents, wmc.size, is also provided in a field which is shown as 10 bits in an exemplary embodiment. A "contents valid" flag, wmc.cv, of one bit is also included in the data structure, together with a two bit field for thread last used, or wmc.th. In addition, a six bit field for register last used, wmc.reg, is provided in an exemplary embodiment. Further, a one bit flag for register and thread valid, or wmc.rtv, may be provided.

Figure 8:
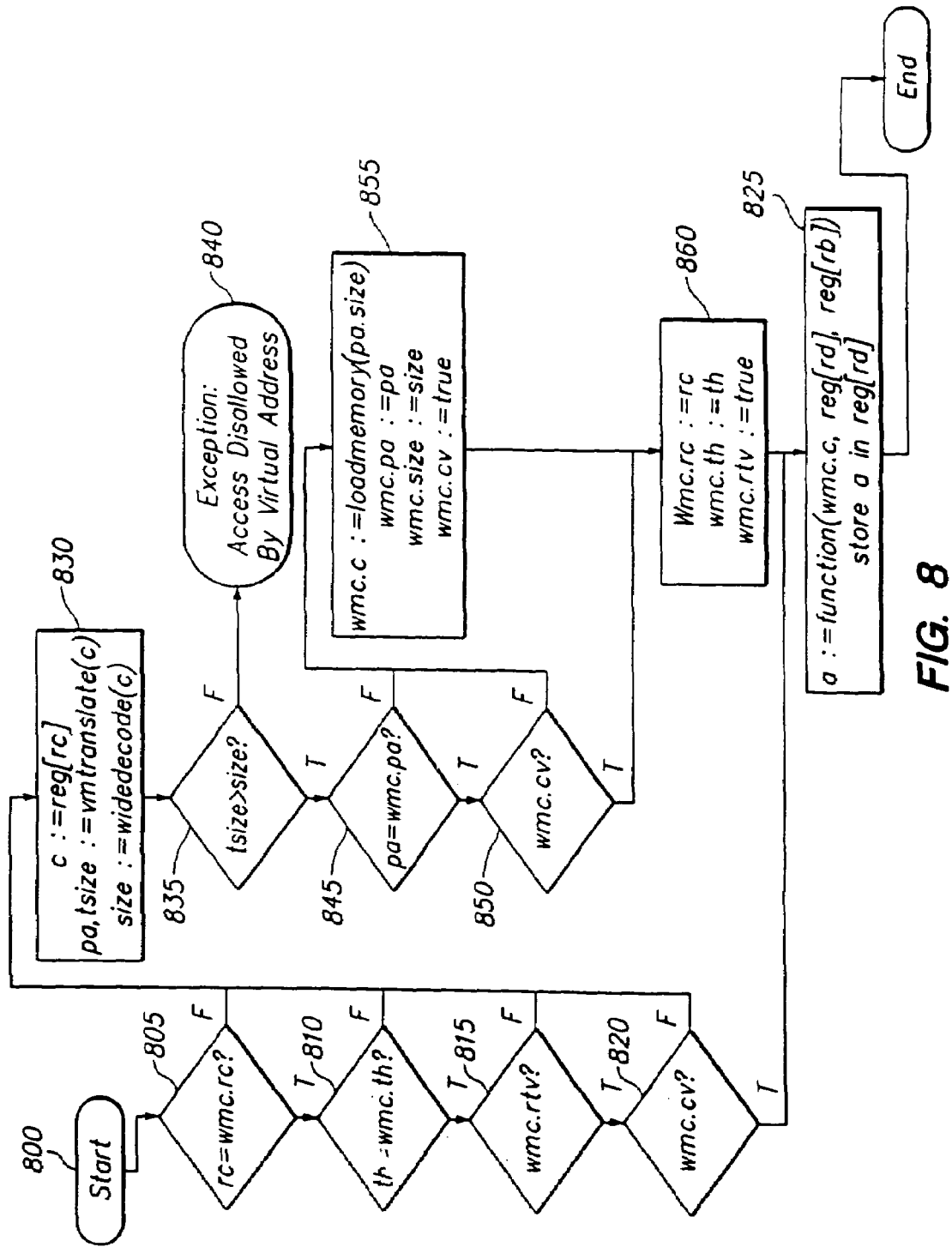
FIG. 8 illustrates in flow diagram form the Wide Microcache control function.

The process by which the microcache is initially written with a wide operand, and thereafter verified as valid for fast subsequent operations, may be better appreciated from FIG. 8. The process begins at 800, and progresses to step 805 where a check of the register contents is made against the stored value wmc.rc. If true, a check is made at step 810 to verify the thread. If true, the process then advances to step 815 to verify whether the register and thread are valid. If step 815 reports as true, a check is made at step 820 to verify whether the contents are valid. If all of steps 805 through 820 return as true, the subsequent instruction is able to utilize the existing wide operand as shown at step 825, after which the process ends. However, if any of steps 805 through 820 return as false, the process branches to step 830, where content, physical address and size are set. Because steps 805 through 820 all lead to either step 825 or 830, steps 805 through 820 may be performed in any order or simultaneously without altering the process. The process then advances to step 835 where size is checked. This check basically ensures that the size of the translation unit is greater than or equal to the size of the wide operand, so that a physical address can directly replace the use of a virtual address. The concern is that, in some embodiments, the wide operands may be larger than the minimum region that the virtual memory system is capable of mapping. As a result, it would be possible for a single contiguous virtual address range to be mapped into multiple, disjoint physical address ranges, complicating the task of comparing physical addresses. By determining the size of the wide operand and comparing that size against the size of the virtual address mapping region which is referenced, the instruction is aborted with an exception trap if the wide operand is larger than the mapping region. This ensures secure operation of the processor. Software can then re-map the region using a larger size map to continue execution if desired. Thus, if size is reported as unacceptable at step 835, an exception is generated at step 840. If size is acceptable, the process advances to step 845 where physical address is checked. If the check reports as met, the process advances to step 850, where a check of the contents valid flag is made. If either check at step 845 or 850 reports as false, the process branches and new content is written into the dedicated storage 114, with the fields thereof being set accordingly. Whether the check at step 850 reported true, or whether new content was written at step 855, the process advances to step 860 where appropriate fields are set to indicate the validity of the data, after which the requested function can be performed at step 825. The process then ends.

Figure 10:
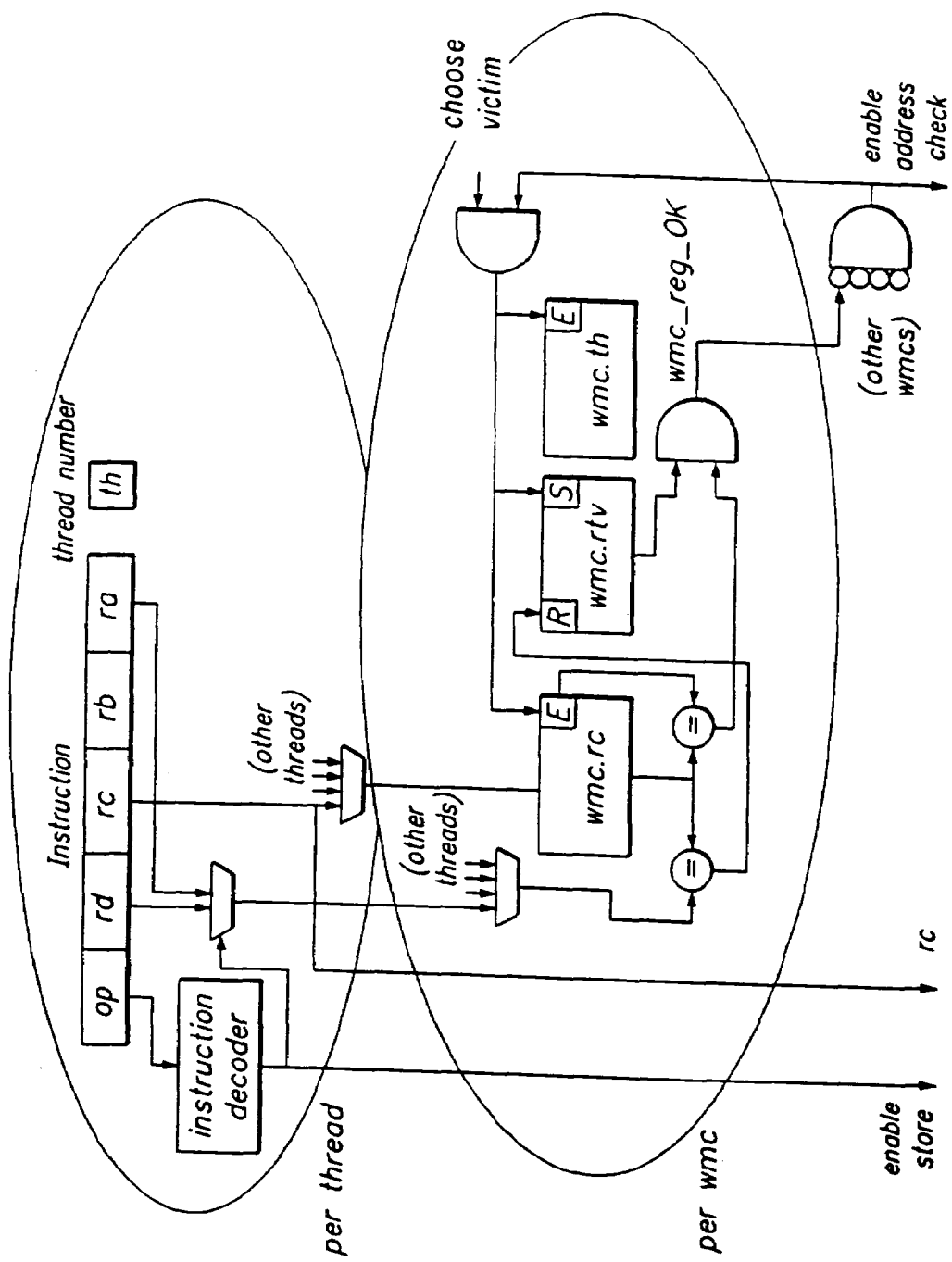
FIGS. 10 and 11 illustrate a Wide Microcache control.
Figure 11:
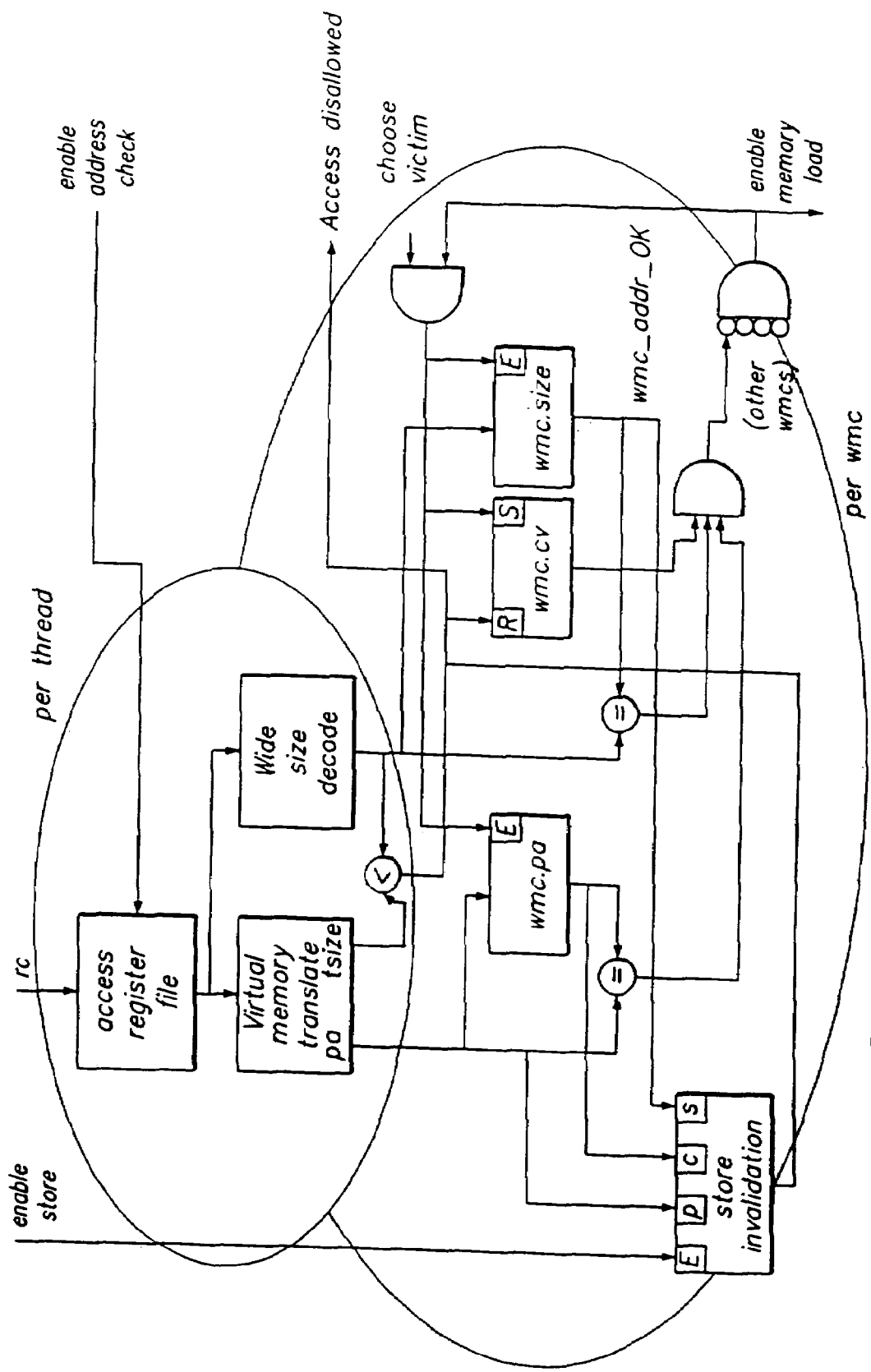

Referring next to FIGS. 10 and 11, which together show the operation of the microcache controller from a hardware standpoint, the operation of the microcache controller may be better understood. In the hardware implementation, it is clear that conditions which are indicated as sequential steps in FIGS. 8 and 9 above can be performed in parallel, reducing the delay for such wide operand checking. Further, a copy of the indicated hardware may be included for each wide microcache, and thereby all such microcaches as may be alternatively referenced by an instruction can be tested in parallel. It is believed that no further discussion of FIGS. 10 and 11 is required in view of the extensive discussion of FIGS. 8 and 9, above.

Various alternatives to the foregoing approach do exist for the use of wide operands, including an implementation in which a single instruction can accept two wide operands, partition the operands into symbols, multiply corresponding symbols together, and add the products to produce a single scalar value or a vector of partitioned values of width of the register file, possibly after extraction of a portion of the sums. Such an instruction can be valuable for detection of motion or estimation of motion in video compression. A further enhancement of such an instruction can incrementally update the dedicated storage if the address of one wide operand is within the range of previously specified wide operands in the dedicated storage, by loading only the portion not already within the range and shifting the in-range portion as required. Such an enhancement allows the operation to be performed over a "sliding window" of possible values. In such an instruction, one wide operand is aligned and supplies the size and shape information, while the second wide operand, updated incrementally, is not aligned.

Another alternative embodiment of the present invention can define additional instructions where the result operand is a wide operand. Such an enhancement removes the limit that a result can be no larger than the size of a general register, further enhancing performance. These wide results can be cached locally to the functional unit that created them, but must be copied to the general memory system before the storage can be reused and before the virtual memory system alters the mapping of the address of the wide result. Data paths must be added so that load operations and other wide operations can read these wide results—forwarding of a wide result from the output of a functional unit back to its input is relatively easy, but additional data paths may have to be introduced if it is desired to forward wide results back to other functional units as wide operands.

As previously discussed, a specification of the size and shape of the memory operand is included in the low-order bits of the address. In a presently preferred implementation, such memory operands are typically a power of two in size and aligned to that size. Generally, one-half the total size is added (or inclusively or'ed, or exclusively or'ed) to the memory address, and one half of the data width is added (or inclusively or'ed, or exclusively or'ed) to the memory address. These bits can be decoded and stripped from the memory address, so that the controller is made to step through all the required addresses. This decreases the number of distinct operands required for these instructions, as the size, shape and address of the memory operand are combined into a single register operand value.

Particular examples of wide operations which are defined by the present invention include the Wide Switch instruction that performs bit-level switching; the Wide Translate instruction which performs byte (or larger) table-lookup; Wide Multiply Matrix, Wide Multiply Matrix Extract and Wide Multiply Matrix Extract Immediate (discussed below), Wide Multiply Matrix Floating-point, and Wide Multiply Matrix Galois (also discussed below). While the discussion below focuses on particular sizes for the exemplary instructions, it will be appreciated that the invention is not limited to a particular width.

The Wide Switch instruction rearranges the contents of up to two registers (256 bits) at the bit level, producing a full-width (128 bits) register result. To control the rearrangement, a wide operand specified by a single register, consisting of eight bits per bit position is used. For each result bit position, eight wide operand bits for each bit position select which of the 256 possible source register bits to place in the result. When a wide operand size smaller than 128 bytes, the high order bits of the memory operand are replaced with values corresponding to the result bit position, so that the memory operand specifies a bit selection within symbols of the operand size, performing the same operation on each symbol.

The Wide Translate instructions use a wide operand to specify a table of depth up to 256 entries and width of up to 128 bits. The contents of a register is partitioned into operands of one, two, four, or eight bytes, and the partitions are used to select values from the table in parallel. The depth and width of the table can be selected by specifying the size and shape of the wide operand as described above.

The Wide Multiply Matrix instructions use a wide operand to specify a matrix of values of width up to 64 bits (one half of register file and data path width) and depth of up to 128 bits/symbol size. The contents of a general register (128 bits) is used as a source operand, partitioned into a vector of symbols, and multiplied with the matrix, producing a vector of width up to 128 bits of symbols of twice the size of the source operand symbols. The width and depth of the matrix can be selected by specifying the size and shape of the wide operand as described above. Controls within the instruction allow specification of signed, mixed-signed, unsigned, complex, or polynomial operands.

The Wide Multiply Matrix Extract instructions use a wide operand to specify a matrix of value of width up to 128 bits (full width of register file and data path) and depth of up to 128 bits/symbol size. The contents of a general register (128 bits) is used as a source operand, partitioned into a vector of symbols, and multiplied with the matrix, producing a vector of width up to 256 bits of symbols of twice the size of the source operand symbols plus additional bits to represent the sums of products without overflow. The results are then extracted in a manner described below (Enhanced Multiply Bandwidth by Result Extraction), as controlled by the contents of a general register specified by the instruction. The general register also specifies the format of the operands: signed, mixed-signed, unsigned, and complex as well as the size of the operands, byte (8 bit), doublet (16 bit), quadlet (32 bit), or hexlet (64 bit).

The Wide Multiply Matrix Extract Immediate instructions perform the same function as above, except that the extraction, operand format and size is controlled by fields in the instruction. This form encodes common forms of the above instruction without the need to initialize a register with the required control information. Controls within the instruction allow specification of signed, mixed-signed, unsigned, and complex operands.

The Wide Multiply Matrix Floating-point instructions perform a matrix multiply in the same form as above, except that the multiplies and additions are performed in floating-point arithmetic. Sizes of half (16-bit), single (32-bit), double (64-bit), and complex sizes of half, single and double can be specified within the instruction.

Wide Multiply Matrix Galois instructions perform a matrix multiply in the same form as above, except that the multiples and additions are performed in Galois field arithmetic. A size of 8 bits can be specified within the instruction. The contents of a general register specify the polynomial with which to perform the Galois field remainder operation. The nature of the matrix multiplication is novel and described in detail below.

In another aspect of the invention, memory operands of either little-endian or big-endian conventional byte ordering are facilitated. Consequently, all Wide operand instructions are specified in two forms, one for little-endian byte ordering and one for big-endian byte ordering, as specified by a portion of the instruction. The byte order specifies to the memory system the order in which to deliver the bytes within units of the data path width (128 bits), as well as the order to place multiple memory words (128 bits) within a larger Wide operand. Each of these instructions is described in greater detail in the Appendix filed herewith.

Some embodiments of the present invention address extraction of a high order portion of a multiplier product or sum of products, as a way of efficiently utilizing a large multiplier array. Parent U.S. Pat. No. 5,742,840 and U.S. Pat. No. 5,953,241 describe a system and method for enhancing the utilization of a multiplier array by adding specific classes of instructions to a general-purpose processor. This addresses the problem of making the most use of a large multiplier array that is fully used for high-precision arithmetic—for example a 64×64 bit multiplier is fully used by a 64-bit by 64-bit multiply, but only one quarter used for a 32-bit by 32-bit multiply) for (relative to the multiplier data width and registers) low-precision arithmetic operations. In particular, operations that perform a great many low-precision multiplies which are combined (added) together in various ways are specified. One of the overriding considerations in selecting the set of operations is a limitation on the size of the result operand. In an exemplary embodiment, for example, this size might be limited to on the order of 128 bits, or a single register, although no specific size limitation need exist.

The size of a multiply result, a product, is generally the sum of the sizes of the operands, multiplicands and multiplier. Consequently, multiply instructions specify operations in which the size of the result is twice the size of identically-sized input operands. For our prior art design, for example, a multiply instruction accepted two 64-bit register sources and produces a single 128-bit register-pair result, using an entire 64×64 multiplier array for 64-bit symbols, or half the multiplier array for pairs of 32-bit symbols, or one-quarter the multiplier array for quads of 16-bit symbols. For all of these cases, note that two register sources of 64 bits are combined, yielding a 128-bit result.

In several of the operations, including complex multiplies, convolve, and matrix multiplication, low-precision multiplier products are added together. The additions further increase the required precision. The sum of two products requires one additional bit of precision; adding four products requires two, adding eight products requires three, adding sixteen products requires four. In some prior designs, some of this precision is lost, requiring scaling of the multiplier operands to avoid overflow, further reducing accuracy of the result.

The use of register pairs creates an undesirable complexity, in that both the register pair and individual register values must be bypassed to subsequent instructions. As a result, with prior art techniques only half of the source operand 128-bit register values could be employed toward producing a single-register 128-bit result.

In some embodiments of the present invention, a high-order portion of the multiplier product or sum of products is extracted, adjusted by a dynamic shift amount from a general register or an adjustment specified as part of the instruction, and, rounded by a control value from a register or instruction portion as round-to-nearest/even, toward zero, floor, or ceiling. Overflows are handled by limiting the result to the largest and smallest values that can be accurately represented in the output result. This operation is more fully described in the attached Appendix.

In the present invention, when the extract is controlled by a register, the size of the result can be specified, allowing rounding and limiting to a smaller number of bits than can fit in the result. This permits the result to be scaled to be used in subsequent operations without concern of overflow or rounding, enhancing performance.

Also in the present invention, when the extract is controlled by a register, a single register value defines the size of the operands, the shift amount and size of the result, and the rounding control. By placing all this control information in a single register, the size of the instruction is reduced over the number of bits that such a instruction would otherwise require, improving performance and enhancing flexibility of the processor.

The particular instructions included in this aspect of the present invention are Ensemble Convolve Extract, Ensemble Multiply Extract, Ensemble Multiply Add Extract and Ensemble Scale Add Extract, each of which is more thoroughly treated in the appendix.

An aspect of the present invention defines the Ensemble Scale Add Extract instruction, that combines the extract control information in a register along with two values that are used as scalar multipliers to the contents of two vector multiplicands. This combination reduces the number of registers that would otherwise be required, or the number of bits that the instruction would otherwise require, improving performance.

Several of these instructions (Ensemble Convolve Extract, Ensemble Multiply Add Extract) are typically available only in forms where the extract is specified as part of the instruction. An alternative embodiment can incorporate forms of the operations in which the size of the operand, the shift amount and the rounding can be controlled by the contents of a general register (as they are in the Ensemble Multiply Extract instruction). The definition of this kind of instruction for Ensemble Convolve Extract, and Ensemble Multiply Add Extract would require four source registers, which increases complexity by requiring additional general-register read ports.

Another alternative embodiment can reduce the number of register read-ports required for implementation of instructions in which the size, shift and rounding of operands is controlled by a register. The value of the extract control register can be fetched using an additional cycle on an initial execution and retained within or near the functional unit for subsequent executions, thus reducing the amount of hardware required for implementation with a small additional performance penalty. The value retained would be marked invalid, causing a re-fetch of the extract control register, by instructions that modify the register, or alternatively, the retained value can be updated by such an operation. A re-fetch of the extract control register would also be required if a different register number were specified on a subsequent execution. It should be clear that the properties of the above two alternative embodiments can be combined.

Another embodiment of the invention includes Galois field arithmetic, where multiplies are performed by an initial binary polynomial multiplication (unsigned binary multiplication with carries suppressed), followed by a polynomial modulo/remainder operation (unsigned binary division with carries suppressed). The remainder operation is relatively expensive in area and delay. In Galois field arithmetic, additions are performed by binary addition with carries suppressed, or equivalently, a bitwise exclusive-or operation. In this aspect of the present invention, a matrix multiplication is performed using Galois field arithmetic, where the multiplies and additions are Galois field multiples and additions.

Using prior art methods, a 16 byte vector multiplied by a 16×16 byte matrix can be performed as 256 8-bit Galois field multiplies and 16*15=240 8-bit Galois field additions. Included in the 256 Galois field multiplies are 256 polynomial multiplies and 256 polynomial remainder operations. But by use of the present invention, the total computation can be reduced significantly by performing 256 polynomial multiplies, 240 16-bit polynomial additions, and 16 polynomial remainder operations. Note that the cost of the polynomial additions has been doubled, as these are now 16-bit operations, but the cost of the polynomial remainder functions has been reduced by a factor of 16. Overall, this is a favorable tradeoff, as the cost of addition is much lower than the cost of remainder.

In a still further aspect of the present invention, a technique is provided for incorporating floating point information into processor instructions. In U.S. Pat. No. 5,812,439, a system and method are described for incorporating control of rounding and exceptions for floating-point instructions into the instruction itself. The present invention extends this invention to include separate instructions in which rounding is specified, but default handling of exceptions is also specified, for a particular class of floating-point instructions. Specifically, the SINK instruction (which converts floating-point values to integral values) is available with control in the instruction that include all previously specified combinations (default-near rounding and default exceptions, Z—round-toward-zero and trap on exceptions, N—round to nearest and trap on exceptions, F—floor rounding (toward minus infinity) and trap on exceptions, C—ceiling rounding (toward plus infinity) and trap on exceptions, and X—trap on inexact and other exceptions), as well as three new combinations (Z.D—round toward zero and default exception handling, F.D—floor rounding and default exception handling, and C.D—ceiling rounding and default exception handling). (The other combinations: N.D is equivalent to the default, and X.D—trap on inexact but default handling for other exceptions is possible but not particularly valuable).

Pipelining and Multithreading

Figure 4:
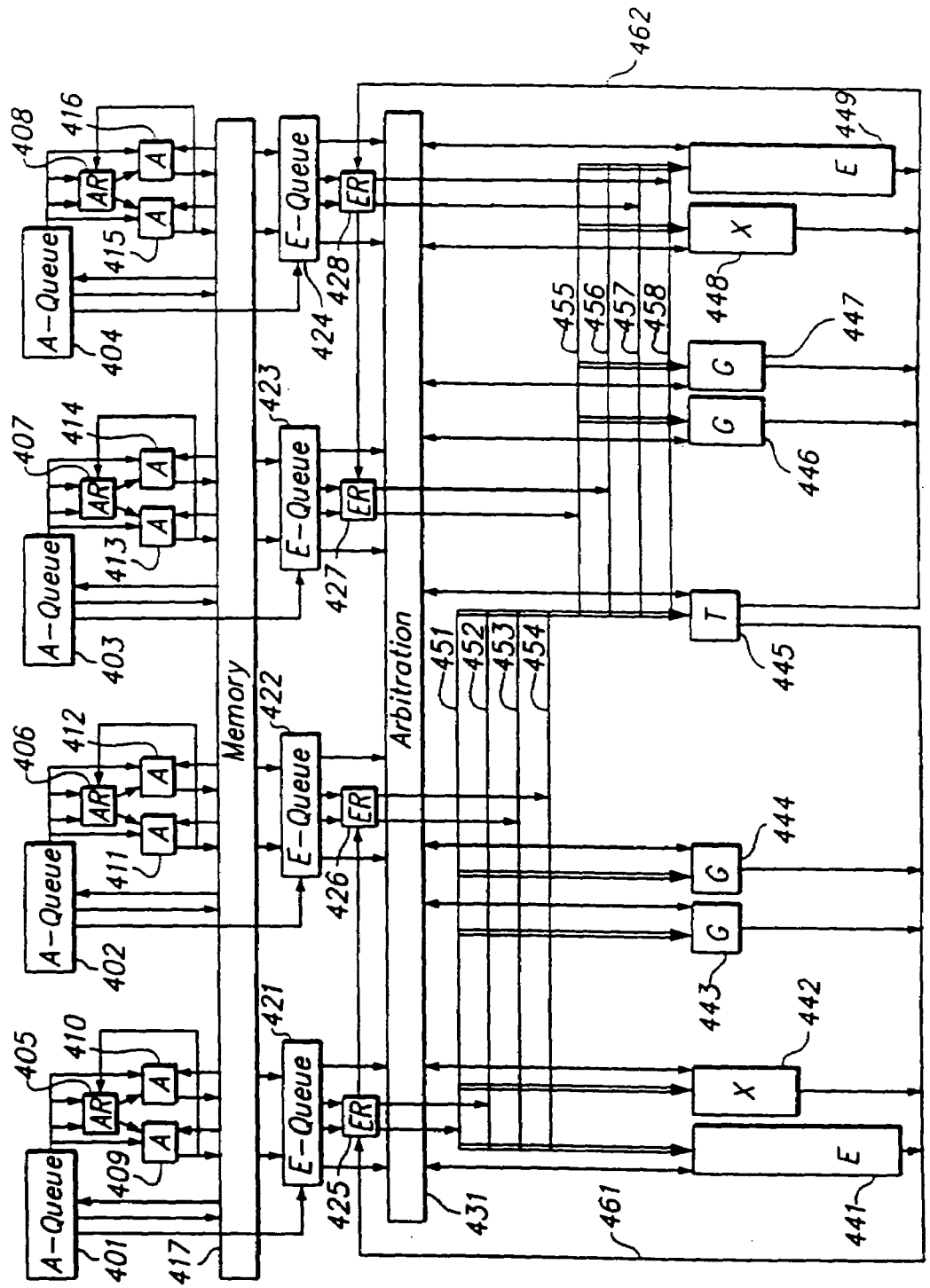
FIG. 4 is a system level diagram showing the functional blocks of a system incorporating a combined Simultaneous Multi Threading and Decoupled Access from Execution processor in accordance with one embodiment of the present invention.

As shown in FIG. 4, some embodiments of the present invention employ both decoupled access from execution pipelines and simultaneous multithreading in a unique way. Simultaneous Multithreaded pipelines have been employed in prior art to enhance the utilization of data path units by allowing instructions to be issued from one of several execution threads to each functional unit (e.g., Susan Eggers, University of Wash, papers on Simultaneous Multithreading).

Decoupled access from execution pipelines have been employed in prior art to enhance the utilization of execution data path units by buffering results from an access unit, which computes addresses to a memory unit that in turn fetches the requested items from memory, and then presenting them to an execution unit (e.g., James E. Smith, paper on Decoupled Access from Execution).

Compared to conventional pipelines, Eggers prior art used an additional pipeline cycle before instructions could be issued to functional units, the additional cycle needed to determine which threads should be permitted to issue instructions. Consequently, relative to conventional pipelines, the prior art design had additional delay, including dependent branch delay.

The embodiment shown in FIG. 4 contains individual access data path units, with associated register files, for each execution thread. These access units produce addresses, which are aggregated together to a common memory unit, which fetches all the addresses and places the memory contents in one or more buffers. Instructions for execution units, which are shared to varying degrees among the threads are also buffered for later execution. The execution units then perform operations from all active threads using functional data path units that are shared.

For instructions performed by the execution units, the extra cycle required for prior art simultaneous multithreading designs is overlapped with the memory data access time from prior art decoupled access from execution cycles, so that no additional delay is incurred by the execution functional units for scheduling resources. For instructions performed by the access units, by employing individual access units for each thread the additional cycle for scheduling shared resources is also eliminated.

This is a favorable tradeoff because, while threads do not share the access functional units, these units are relatively small compared to the execution functional units, which are shared by threads.

FIG. 12 is a timing diagram of a decoupled pipeline structure in accordance with one embodiment of the present invention. As illustrated in FIG. 12, the time permitted by a pipeline to service load operations may be flexibly extended. Here, various types of instructions are abbreviated as A, L, B, E, and S, representing a register-to-register address calculation, a memory load, a branch, a register-to-register data calculation, and a memory store, respectively. According to the present embodiment, the front of the pipeline, in which A, L and B type instructions are handled, is decoupled from the back of the pipeline, in which E, and S type instructions are handled. This decoupling occurs at the point at which the data cache and its backing memory is referenced; similarly, a FIFO that is filled by the instruction fetch unit decouples instruction cache references from the front of the pipeline shown above. The depth of the FIFO structures is implementation-dependent, i.e. not fixed by the architecture. FIG. 13 further illustrates this pipeline organization. Accordingly, the latency of load instructions can be hidden, as execute instructions are deferred until the results of the load are available. Nevertheless, the execution unit still processes instructions in normal order, and provides precise exceptions. More details relating to this pipeline structure is explained in the "Superspring Pipeline" section of the Appendix.

A difficulty in particular pipeline structures is that dependent operations must be separated by the latency of the pipeline, and for highly pipelined machines, the latency of simple operations can be quite significant. According to one embodiment of the present invention, very highly pipelined implementations are provided by alternating execution of two or more independent threads. In an embodiment, a thread is the state required to maintain an independent execution; the architectural state required is that of the register file contents, program counter, privilege level, local TB, and when required, exception status. In an embodiment, ensuring that only one thread may handle an exception at one time may minimize the latter state, exception status. In order to ensure that all threads make reasonable forward progress, several of the machine resources must be scheduled fairly.

An example of a resource that is critical that it be fairly shared is the data memory/cache subsystem. In one embodiment, the processor may be able to perform a load operation only on every second cycle, and a store operation only on every fourth cycle. The processor schedules these fixed timing resources fairly by using a round-robin schedule for a number of threads that is relatively prime to the resource reuse rates. In one embodiment, five simultaneous threads of execution ensure that resources which may be used every two or four cycles are fairly shared by allowing the instructions which use those resources to be issued only on every second or fourth issue slot for that thread. More details relating to this pipeline structure are explained in the "Superthread Pipeline" section of the Appendix.

Referring back to FIG. 4, with regard to the sharing of execution units, one embodiment of the present invention employs several different classics of functional units for the execution unit, with varying cost, utilization, and performance. In particular, the G units, which perform simple addition and bitwise operations is relatively inexpensive (in area and power) compared to the other units, and its utilization is relatively high. Consequently, the design employs four such units, where each unit can be shared between two threads. The X unit, which performs a broad class of data switching functions is more expensive and less used, so two units are provided that are each shared among two threads. The T unit, which performs the Wide Translate instruction, is expensive and utilization is low, so the single unit is shared among all four threads. The E unit, which performs the class of Ensemble instructions, is very expensive in area and power compared to the other functional units, but utilization is relatively high, so we provide two such units, each unit shared by two threads.

In FIG. 4, four copies of an access unit are shown, each with an access instruction fetch queue A-Queue 401-404, coupled to an access register file AR 405-408, each of which is, in turn, coupled to two access functional units A 409-416. The access units function independently for four simultaneous threads of execution. These eight access functional units A 409-416 produce results for access register files AR 405-408 and addresses to a shared memory system 417. The memory contents fetched from memory system 417 are combined with execute instructions not performed by the access unit and entered into the four execute instruction queues E-Queue 421-424. Instructions and memory data from E-queue 421-424 are presented to execution register files 425-428, which fetches execution register file source operands. The instructions are coupled to the execution unit arbitration unit Arbitration 431, that selects which instructions from the four threads are to be routed to the available execution units E 441 and 449, X 442 and 448, G 443-444 and 446-447, and T 445. The execution register file source operands ER 425-428 are coupled to the execution units 441-445 using source operand buses 451-454 and to the execution units 445-449 using source operand buses 455-458. The function unit result operands from execution units 441-445 are coupled to the execution register file using result bus 461 and the function units result operands from execution units 445-449 are coupled to the execution register file using result bus 462.

The foregoing elements of the present invention may be better understood with reference to the attached Appendix.

In a still further aspect of the present invention, an improved interprivilege gateway is described which involves increased parallelism and leads to enhanced performance. In U.S. application Ser. No. 08/541,416, now U.S. Pat. No. 6,101,590, a system and method is described for implementing an instruction that, in a controlled fashion, allows the transfer of control (branch) from a lower-privilege level to a higher-privilege level. Embodiment of the present invention provides an improved system and method for a modified instruction that accomplishes the same purpose but with specific advantages.

Many processor resources, such as control of the virtual memory system itself, input and output operations, and system control functions are protected from accidental or malicious misuse by enclosing them in a protective, privileged region. Entry to this region must be established only though particular entry points, called gateways, to maintain the integrity of these protected regions.

Prior art versions of this operation generally load an address from a region of memory using a protected virtual memory attribute that is only set for data regions that contain valid gateway entry points, then perform a branch to an address contained in the contents of memory. Basically, three steps were involved: load, branch, then check. Compared to other instructions, such as register-to-register computation instructions and memory loads and stores, and register-based branches, this is a substantially longer operation, which introduces delays and complexity to a pipelined implementation.

In the present invention, the branch-gateway instruction performs two operations in parallel: 1) a branch is performed to the contents of register 0 and 2) a load is performed using the contents of register 1, using a specified byte order (little-endian) and a specified size (64 bits). If the value loaded from memory does not equal the contents of register 0, the instruction is aborted due to an exception. In addition, 3) a return address (the next sequential instruction address following the branch-gateway instruction) is written into register 0, provided the instruction is not aborted. This approach essentially uses a first instruction to establish the requisite permission to allow user code to access privileged code, and then a second instruction is permitted to branch directly to the privileged code because of the permissions issued for the first instruction.

In the present invention, the new privilege level is also contained in register 0, and the second parallel operation does not need to be performed if the new privilege level is not greater than the old privilege level. When this second operation is suppressed, the remainder of the instruction performs an identical function to a branch-link instruction, which is used for invoking procedures that do not require an increase in privilege. The advantage that this feature brings is that the branch-gateway instruction can be used to call a procedure that may or may not require an increase in privilege.

The memory load operation verifies with the virtual memory system that the region that is loaded has been tagged as containing valid gateway data. A further advantage of the present invention is that the called procedure may rely on the fact that register 1 contains the address that the gateway data was loaded from, and can use the contents of register 1 to locate additional data or addresses that the procedure may require. Prior art versions of this instruction required that an additional address be loaded from the gateway region of memory in order to initialize that address in a protected manner—the present invention allows the address itself to be loaded with a "normal" load operation that does not require special protection.

The present invention allows a "normal" load operation to also load the contents of register 0 prior to issuing the branch-gateway instruction. The value may be loaded from the same memory address that is loaded by the branch-gateway instruction, because the present invention contains a virtual memory system in which the region may be enabled for normal load operations as well as the special "gateway" load operation performed by the branch-gateway instruction.

In a further aspect of the present invention, a system and method is provided for performing a three-input bitwise Boolean operation in a single instruction. A novel method described in detail in appendix is used to encode the eight possible output states of such an operation into only seven bits, and decoding these seven bits back into the eight states.

In yet a further aspect to the present invention, a system and method is described for improving the branch prediction of simple repetitive loops of code. The method includes providing a count field for indicating how many times a branch is likely to be taken before it is not taken, which enhances the ability to properly predict both the initial and final branches of simple loops when a compiler can determine the number of iterations that the loop will be performed. This improves performance by avoiding misprediction of the branch at the end of a loop.

Memory Management

This section discusses the caches, the translation mechanisms, the memory interfaces, and how the multiprocessor interface is used to maintain cache coherence.

a. Overview

FIG. 14 is a diagram illustrating the basic organization of the memory management system according to one embodiment of the invention. In accordance with this embodiment, the processor provides for both local and global virtual addressing, arbitrary page sizes, and coherent-cache multi-processing. The memory management system is designed to provide the requirements for implementation of virtual machines as well as virtual memory. All facilities of the memory management system are themselves memory mapped, in order to provide for the manipulation of these facilities by high-level language, compiled code. The translation mechanism is designed to allow full byte-at-a-time control of access to the virtual address space, with the assistance of fast exception handlers. Privilege levels provide for the secure transition between insecure user code and secure system facilities. Instructions execute at a privilege, specified by a two-bit field in the access information. Zero is the least-privileged level, and three is the most-privileged level.

In general terms, the memory management starts from a local virtual address. The local virtual address is translated to a global virtual address by an LTB (Local Translation Buffer). In turn, the global virtual address is translated to a physical address by a GTB (Global Translation Buffer). One of the addresses, a local virtual address, a global virtual address, or a physical address, is used to index the cache data and cache tag arrays, and one of the addresses is used to check the cache tag array for cache presence. Protection information is assembled from the LTB, GTB, and optionally the cache tag, to determine if the access is legal.

This form varies somewhat, depending on implementation choices made. Because the LTB leaves the lower 48 bits of the address alone, indexing of the cache arrays with the local virtual address is usually identical to cache arrays indexed by the global virtual address. However, indexing cache arrays by the global virtual address rather than the physical address produces a coherence issue if the mapping from global virtual address to physical is many-to-one.

Starting from a local virtual address, the memory management system performs three actions in parallel: the low-order bits of the virtual address are used to directly access the data in the cache, a low-order bit field is used to access the cache tag, and the high-order bits of the virtual address are translated from a local address space to a global virtual address space.

Following these three actions, operations vary depending upon the cache implementation. The cache tag may contain either a physical address and access control information (a physically-tagged cache), or may contain a global virtual address and global protection information (a virtually-tagged cache).

For a physically-tagged cache, the global virtual address is translated to a physical address by the GTB, which generates global protection information. The cache tag is checked against the physical address, to determine a cache hit. In parallel, the local and global protection information is checked.

For a virtually-tagged cache, the cache tag is checked against the global virtual address, to determine a cache hit, and the local and global protection information is checked. If the cache misses, the global virtual address is translated to a physical address by the GTB, which also generates the global protection information.

b. Local Translation Buffer

The 64-bit global virtual address space is global among all tasks. In a multitask environment, requirements for a task-local address space arise from operations such as the UNIX "fork" function, in which a task is duplicated into parent and child tasks, each now having a unique virtual address space. In addition, when switching tasks, access to one task's address space must be disabled and another task's access enabled.

The processor provides for portions of the address space to be made local to individual tasks, with a translation to the global virtual space specified by four 16-bit registers for each local virtual space. The registers specify a mask selecting which of the high-order 16 address bits are checked to match a particular value, and if they match, a value with which to modify the virtual address. The processor avoids setting a fixed page size or local address size; these can be set by software conventions.

A local virtual address space is specified by the following:

| field name | size | local virtual address space specifiers description |
|---|---|---|
| lm | 16 | mask to select fields of local virtual address to perform match over |
| la | 16 | value to perform match with masked local virtual address |
| lx | 16 | value to xor with local virtual address if matched |
| lp | 16 | local protection field (detailed later) |

There are as many LTB as threads, and up to 23 (8) entries per LTB. Each entry is 128 bits, with the high order 64 bits reserved. FIG. 15 illustrates the physical address of an LTB entry for thread th, entry en, byte b.

FIG. 16 illustrates a definition for AccessPhysicalLTB. FIG. 17 illustrates how various 16-bit values are packed together into a 64-bit LTB entry. The LTB contains a separate context of register sets for each thread, indicated by the th index above. A context consists of one or more sets of lm/la/lx/lp registers, one set for each simultaneously accessible local virtual address range, indicated by the en index above. This set of registers is called the "Local TB context," or LTB (Local Translation Buffer) context. The effect of this mechanism is to provide the facilities normally attributed to segmentation. However, in this system there is no extension of the address range, instead, segments are local nicknames for portions of the global virtual address space.

A failure to match an LTB entry results either in an exception or an access to the global virtual address space, depending on privilege level. A single bit, selected by the privilege level active for the access from a four bit control register field, global access, ga determines the result. If gaPL is zero (0), the failure causes an exception, if it is one (1), the failure causes the address to be directly used as a global virtual address without modification.

FIG. 18 illustrates global access as fields of a control register. Usually, global access is a right conferred to highly privilege levels, so a typical system may be configured with ga0 and ga1 clear (0), but ga2 and ga3 set (1). A single low-privilege (0) task can be safely permitted to have global access, as accesses are further limited by the rwxg privilege fields. A concrete example of this is an emulation task, which may use global addresses to simulate segmentation, such as an x86 emulation. The emulation task then runs as privilege 0, with ga0 set, while most user tasks run as privilege 1, with ga1 clear. Operating system tasks then use privilege 2 and 3 to communicate with and control the user tasks, with ga2 and ga3 set.

For tasks that have global access disabled at their current privilege level, failure to match an LTB entry causes an exception. The exception handler may load an LTB entry and continue execution, thus providing access to an arbitrary number of local virtual address ranges.

When failure to match an LTB entry does not cause an exception, instructions may access any region in the local virtual address space, when an LTB entry matches, and may access regions in the global virtual address space when no LTB entry matches. This mechanism permits privileged code to make judicious use of local virtual address ranges, which simplifies the manner in which privileged code may manipulate the contents of a local virtual address range on behalf of a less-privileged client. Note, however, that under this model, an LTB miss does not cause an exception directly, so the use of more local virtual address ranges than LTB entries requires more care: the local virtual address ranges should be selected so as not to overlap with the global virtual address ranges, and GTB misses to LVA regions must be detected and cause the handler to load an LTB entry.

Each thread has an independent LTB, so that threads may independently define local translation. The size of the LTB for each thread is implementation dependent and defined as the LE parameter in the architecture description register. LE is the log of the number of entries in the local TB per thread; an implementation may define LE to be a minimum of 0, meaning one LTB entry per thread, or a maximum of 3, meaning eight LTB entries per thread. For the initial Zeus implementation, each thread has two entries and LE=1.

A minimum implementation of an LTB context is a single set of lm/la/lx/lp registers per thread. However, the need for the LTB to translate both code addresses and data addresses imposes some limits on the use of the LTB in such systems. We need to be able to guarantee forward progress. With a single LTB set per thread, either the code or the data must use global addresses, or both must use the same local address range, as must the LTB and GTB exception handler. To avoid this restriction, the implementation must be raised to two sets per thread, at least one for code and one for data, to guarantee forward progress for arbitrary use of local addresses in the user code (but still be limited to using global addresses for exception handlers).

As shown in FIG. 19, a single-set LTB context may be further simplified by reserving the implementation of the lm and la registers, setting them to a read-only zero value: Note that in such a configuration, only a single LA region can be implemented.

If the largest possible space is reserved for an address space identifier, the virtual address is partitioned as shown in FIG. 20. Any of the bits marked as "local" below may be used as "offset" as desired.

To improve performance, an implementation may perform the LTB translation on the value of the base register (rc) or unincremented program counter, provided that a check is performed which prohibits changing the unmasked upper 16 bits by the add or increment. If this optimization is provided and the check fails, an AccessDisallowedByVirtualAddress should be signaled. If this optimization is provided, the architecture description parameter LB=1. Otherwise LTB translation is performed on the local address, la, no checking is required, and LB=0.

As shown in FIG. 21, the LTB protect field controls the minimum privilege level required for each memory action of read (r), write (w), execute (x), and gateway (g), as well as memory and cache attributes of write allocate (wa), detail access (da), strong ordering (so), cache disable (cd), and write through (wt). These fields are combined with corresponding bits in the GTB protect field to control these attributes for the mapped memory region.

The meaning of the fields are given by the following table:

| name | size | meaning |
|------|------|---------|
| g    | 2    | minimum privilege required for gateway access |
| x    | 2    | minimum privilege required for execute access |
| w    | 2    | minimum privilege required for write access |
| r    | 2    | minimum privilege required for read access |
| 0    | 1    | reserved |
| da   | 1    | detail access |
| so   | 1    | strong ordering |
| cc   | 3    | cache control |

FIG. 22 illustrates a definition for LocalTranslation.

c. Global Translation Buffer

Global virtual addresses which fail to be accessed in either the LZC, the MTB, the BTB, or PTB are translated to physical references in a table, here named the "Global Translation Buffer," (GTB).

Each processor may have one or more GTB's, with each GTB shared by one or more threads. The parameter GT, the base-two log of the number of threads which share a GTB, and the parameter T, the number of threads, allow computation of the number of GTBs (T/2GT), and the number of threads which share each GTB (2GT).

If there are two GTBs and four threads (GT=1, T=4), GTB 0 services references from threads 0 and 1, and GTB 1 services references from threads 2 and 3. In the first implementation, there is one GTB, shared by all four threads. (GT=2, =4).The GTB has 128 entries (G=7).

Per clock cycle, each GTB can translate one global virtual address to a physical address, yielding protection information as a side effect.

A GTB miss causes a software trap. This trap is designed to permit a fast handler for GlobalTBMiss to be written in software, by permitting a second GTB miss to occur as an exception, rather than a machine check.

There may be as many GTB as threads, and up to 215 entries per GTB. FIG. 23 illustrates the physical address of a GTB entry for thread th, entry en, byte b. Note that in FIG. 23, the low-order GT bits of the th value are ignored, reflecting that 2GT threads share a single GTB. A single GTB shared between threads appears multiple times in the address space. GTB entries are packed together so that entries in a GTB are consecutive:

FIG. 24 illustrates a definition for AccessPhysicalGTB. FIG. 25 illustrates the format of a GTB entry. As shown, each GTB entry is 128 bits.gs=ga+size/2: 256≦size≦264, ga, global address, is aligned (a multiple of) size. px=pa^ga. pa, ga, and px are all aligned (a multiple of) size.

The meaning of the fields are given by the following table:

| name | size | meaning |
|------|------|---------|
| gs   | 57   | global address with size |
| px   | 56   | physical xor |
| g    | 2    | minimum privilege required for gateway access |

-continued

| name | size | meaning |
|------|------|---------|
| x    | 2    | minimum privilege required for execute access |
| w    | 2    | minimum privilege required for write access |
| r    | 2    | minimum privilege required for read access |
| 0    | 1    | reserved |
| da   | 1    | detail access |
| so   | 1    | strong ordering |
| cc   | 3    | cache control |

If the entire contents of the GTB entry is zero (0), the entry will not match any global address at all. If a zero value is written, a zero value is read for the GTB entry. Software must not write a zero value for the gs field unless the entire entry is a zero value.

It is an error to write GTB entries that multiply match any global address; all GTB entries must have unique, non-overlapping coverage of the global address space. Hardware may produce a machine check if such overlapping coverage is detected, or may produce any physical address and protection information and continue execution.

Limiting the GTB entry size to 128 bits allows up to replace entries atomically (with a single store operation), which is less complex than the previous design, in which the mask portion was first reduced, then other entries changed, then the mask is expanded. However, it is limiting the amount of attribute information or physical address range we can specify. Consequently, we are encoding the size as a single additional bit to the global address in order to allow for attribute information. FIG. 26 illustrates a definition for GlobalAddressTranslation.

d. GTB Registers

Because the processor contains multiple threads of execution, even when taking virtual memory exceptions, it is possible for two threads to nearly simultaneously invoke software GTB miss exception handlers for the same memory region. In order to avoid producing improper GTB state in such cases, the GTB includes access facilities for indivisibly checking and then updating the contents of the GTB as a result of a memory write to specific addresses.

A 128-bit write to the address GTBUpdateFill (fill=1), as a side effect, causes first a check of the global address specified in the data against the GTB. If the global address check results in a match, the data is directed to write on the matching entry. If there is no match, the address specified by GTBLast is used, and GTBLast is incremented. If incrementing GTBLast results in a zero value, GTBLast is reset to GTBFirst, and GTBBump is set. Note that if the size of the updated value is not equal to the size of the matching entry, the global address check may not adequately ensure that no other entries also cover the address range of the updated value. The operation is unpredictable if multiple entries match the global address.

The GTBUpdateFill register is a 128-bit memory-mapped location, to which a write operation performs the operation defined above. A read operation returns a zero value. The format of the GTBUpdateFill register is identical to that of a GTB entry.

An alternative write address, GTBUpdate, (fill=0) updates a matching entry, but makes no change to the GTB if no entry matches. This operation can be used to indivisibly update a GTB entry as to protection or physical address information. FIG. 27 illustrates a definition for GTBUpdate-Write.

There may be as many GTB as threads, and up to 211 registers per GTB (5 registers are implemented). FIG. 28 illustrates the physical address of a GTB control register for thread th, register rn, byte b. Note that in FIG. 28, the low-order GT bits of the th value are ignored, reflecting that 2GT threads share single GTB registers. A single set of GTB registers shared between threads appears multiple times in the address space, and manipulates the GTB of the threads with which the registers are associated.

The GTBUpdate register is a 128-bit memory-mapped location, to which a write operation performs the operation defined above. A read operation returns a zero value. The format of the GTBUpdateFill register is identical to that of a GTB entry. FIG. 29 illustrates the registers GTBLast, GTBFirst, and GTBBump. The registers GTBLast, GTBFirst, and GTBBump are memory mapped. As shown in FIG. 29, the GTBLast and GTBFirst registers are G bits wide, and the GTBBump register is one bit.

FIG. 30 illustrates a definition for AccessPhysicalGTBRegisters.

e. Address Generation

The address units of each of the four threads provide up to two global virtual addresses of load, store, or memory instructions, for a total of eight addresses. LTB units associated with each thread translate the local addresses into global addresses. The LZC operates on global addresses. MTB, BTB, and PTB units associated with each thread translate the global addresses into physical addresses and cache addresses. (A PTB unit associated with each thread produces physical addresses and cache addresses for program counter references.—this is optional, as by limiting address generation to two per thread, the MTB can be used for program references.) Cache addresses are presented to the LOC as required, and physical addresses are checked against cache tags as required.

Rounding and Exceptions

In accordance with one embodiment of the invention, rounding is specified within the instructions explicitly, to avoid explicit state registers for a rounding mode. Similarly, the instructions explicitly specify how standard exceptions (invalid operation, division by zero, overflow, underflow and inexact) are to be handled.

In this embodiment, when no rounding is explicitly named by the instruction (default), round to nearest rounding is performed, and all floating-point exception signals cause the standard-specified default result, rather than a trap. When rounding is explicitly named by the instruction (N: nearest, Z: zero, F: floor, C: ceiling), the specified rounding is performed, and floating-point exception signals other than inexact cause a floating-point exception trap. When X (exact, or exception) is specified, all floating-point exception signals cause a floating-point exception trap, including inexact. More details regarding rounding and exceptions are described in the "Rounding and Exceptions" section of the Appendix.

Group Boolean

In accordance with one embodiment of the invention, the processor handles a variety Group Boolean operations. For example, FIG. 31A presents various Group Boolean instructions. FIGS. 31B and 31C illustrate an exemplary embodiment of a format and operation codes that can be used to perform the Boolean instructions shown in FIG. 31A. As shown in FIGS. 31B and 31C, in this exemplary embodiment, three values are taken from the contents of registers rd, rc and rb. The ih and il fields specify a function of three bits, producing a single bit result. The specified function is evaluated for each bit position, and the results are catenated and placed in register rd. Register rd is both a source and destination of this instruction.

The function is specified by eight bits, which give the result for each possible value of the three source bits in each bit position:

| d | 1 | 1 | 1 | 1 | 0 | 0 | 0 | 0 |
|---|---|---|---|---|---|---|---|---|
| c | 1 | 1 | 0 | 0 | 1 | 1 | 0 | 0 |
| b | 1 | 0 | 1 | 0 | 1 | 0 | 1 | 0 |
| f(d, c, b) | $f_7$ | $f_6$ | $f_5$ | $f_4$ | $f_3$ | $f_2$ | $f_1$ | $f_0$ |

A function can be modified by rearranging the bits of the immediate value. The table below shows how rearrangement of immediate value $f_{7\ldots0}$ can reorder the operands d,c,b for the same function.

| operation | immediate |
|---|---|
| f(d, c, b) | $f_7\ f_6\ f_5\ f_4\ f_3\ f_2\ f_1\ f_0$ |
| f(c, d, b) | $f_7\ f_6\ f_3\ f_2\ f_5\ f_4\ f_1\ f_0$ |
| f(d, b, c) | $f_7\ f_5\ f_6\ f_4\ f_3\ f_1\ f_2\ f_0$ |
| f(b, c, d) | $f_7\ f_3\ f_5\ f_1\ f_6\ f_2\ f_4\ f_0$ |
| f(c, b, d) | $f_7\ f_5\ f_3\ f_1\ f_6\ f_4\ f_2\ f_0$ |
| f(b, d, c) | $f_7\ f_3\ f_6\ f_2\ f_5\ f_1\ f_4\ f_0$ |

By using such a rearrangement, an operation of the form: b=ƒ(d,c,b) can be recoded into a legal form: b=ƒ(b,d,c). For example, the function: b=ƒ(d,c,b)=d?c:b cannot be coded, but the equivalent function: d=c?b:d can be determined by rearranging the code for d=ƒ(d,c,b)=d?c:b, which is 11001010, according to the rule for ƒ(d,c,b)→ƒ(c,b,d), to the code 11011000.

Encoding—Some special characteristics of this rearrangement is the basis of the manner in which the eight function specification bits are compressed to seven immediate bits in this instruction. As seen in the table above, in the general case, a rearrangement of operands from ƒ(d,c,b) to ƒ(d,b,c) (interchanging rc and rb) requires interchanging the values of $f_6$ and $f_5$ and the values of $f_2$ and $f_1$.

Among the 256 possible functions which this instruction can perform, one quarter of them (64 functions) are unchanged by this rearrangement. These functions have the property that $f_6=f_5$ and $f_2=f_1$. The values of rc and rb can be freely interchanged, and so are sorted into rising or falling order to indicate the value of $f_2$. These functions are encoded by the values of $f_7$, $f_6$, $f_4$, $f_3$, and $f_0$ in the immediate field and $f_2$ by whether rc>rb, thus using 32 immediate values for 64 functions.

Another quarter of the functions have $f_6=1$ and $f_5=0$. These functions are recoded by interchanging rc and rb, $f_6$ and $f_5$, $f_2$ and $f_1$. They then share the same encoding as the quarter of the functions where $f_6=0$ and $f_5=1$, and are encoded by the values of $f_7$, $f_4$, $f_3$, $f_2$, $f_1$, and $f_0$ in the immediate field, thus using 64 immediate values for 128 functions.

The remaining quarter of the functions have $f_6=f_5$ and $f_2 \neq f_1$. The half of these in which $f_2=1$ and $f_1=0$ are recoded by interchanging rc and rb, $f_6$ and $f_5$, $f_2$ and $f_1$. They then share the same encoding as the eighth of the functions where $f_2=0$ and $f_1=1$, and are encoded by the values of $f_7$, $f_6$, $f_4$, $f_3$, and $f_0$ in the immediate field, thus using 32 immediate values for 64 functions.

The function encoding is summarized by the table:

| $f_7$ | $f_6$ | $f_5$ | $f_4$ | $f_3$ | $f_2$ | $f_1$ | $f_0$ | trc > trb | ih | $il_5$ | $il_4$ | $il_3$ | $il_2$ | $il_1$ | $il_0$ | rc | rb |
|---|---|---|---|---|---|---|---|---|---|---|---|---|---|---|---|---|---|
| | $f_6$ | | | | $f_2$ | | | $f_2$ | 0 | 0 | $f_6$ | $f_7$ | $f_4$ | $f_3$ | $f_0$ | trc | trb |
| | $f_6$ | | | | $f_2$ | | | $\sim f_2$ | 0 | 0 | $f_6$ | $f_7$ | $f_4$ | $f_3$ | $f_0$ | trb | trc |
| | $f_6$ | | | 0 | 1 | | | | 0 | 1 | $f_6$ | $f_7$ | $f_4$ | $f_3$ | $f_0$ | trc | trb |
| | $f_6$ | | | 1 | 0 | | | | 0 | 1 | $f_6$ | $f_7$ | $f_4$ | $f_3$ | $f_0$ | trb | trc |
| 0 | 1 | | | | | | | | 1 | $f_2$ | $f_1$ | $f_7$ | $f_4$ | $f_3$ | $f_0$ | trc | trb |
| 1 | 0 | | | | | | | | 1 | $f_1$ | $f_2$ | $f_7$ | $f_4$ | $f_3$ | $f_0$ | trb | trc |

The function decoding is summarized by the table:

| ih | $il_5$ | $il_4$ | $il_3$ | $il_2$ | $il_1$ | $il_0$ | rc > rb | $f_7$ | $f_6$ | $f_5$ | $f_4$ | $f_3$ | $f_2$ | $f_1$ | $f_0$ |
|---|---|---|---|---|---|---|---|---|---|---|---|---|---|---|---|
| 0 | 0 | | | | | | 0 | $il_3$ | $il_4$ | $il_4$ | $il_2$ | $il_1$ | 0 | 0 | $il_0$ |
| 0 | 0 | | | | | | 1 | $il_3$ | $il_4$ | $il_4$ | $il_2$ | $il_1$ | 1 | 1 | $il_0$ |
| 0 | 1 | | | | | | | $il_3$ | $il_4$ | $il_4$ | $il_2$ | $il_1$ | 0 | 1 | $il_0$ |
| 1 | | | | | | | | $il_3$ | 0 | 1 | $il_2$ | $il_1$ | $il_5$ | $il_4$ | $il_0$ |

Group Multiplex

In accordance with one embodiment of the invention, the processor handles group multiplex operations. FIGS. 31D and 31E illustrate an exemplary embodiment of a format and operation codes that can be used to perform the various Group Multiplex instructions. As shown in FIGS. 31D and 31E, in this exemplary embodiment, the contents of registers rd, rc and rb are fetched. Each bit of the result is equal to the corresponding bit of rc, if the corresponding bit of rd is set, otherwise it is the corresponding bit of rb. The result is placed into register ra. While the use of three operand registers and a different result register is described here and elsewhere in the present specification, other arrangements, such as the use of immediate values, may also be implemented.

The table marked Redundancies in FIG. 31D illustrates that for particular values of the register specifiers, the Group Multplex operation performs operations otherwise available within the Group Boolean instructions. More specifically, when the result register ra is also present as a source register in the first, second or third source operand position of the operation, the operation is equivalent to the Group Boolean instruction with arguments of 0×11001010, 0×11100010, or 0×11011000 respectively. When the first source operand is the same as the second or third source operand, the Group Multiplex operation is equivalent to a bitwise OR or AND operation respectively.

Group Add

In accordance with one embodiment of the invention, the processor handles a variety of fixed-point, or integer, group operations. For example, FIG. 32A presents various examples of Group Add instructions accommodating different operand sizes, such as a byte (8 bits), doublet (16 bits), quadlet (32 bits), octlet (64 bits), and hexlet (128 bits). FIGS. 32B and 32C illustrate an exemplary embodiment of a format and operation codes that can be used to perform the various Group Add instructions shown in FIG. 32A. As shown in FIGS. 32B and 32C, in this exemplary embodiment, the contents of registers rc and rb are partitioned into groups of operands of the size specified and added, and if specified, checked for overflow or limited, yielding a group of results, each of which is the size specified. The group of results is catenated and placed in register rd. While the use of two operand registers and a different result register is described here and elsewhere in the present specification, other arrangements, such as the use of immediate values, may also be implemented.

In the present embodiment, for example, if the operand size specified is a byte (8 bits), and each register is 128-bit wide, then the content of each register may be partitioned into 16 individual operands, and 16 different individual add operations may take place as the result of a single Group Add instruction. Other instructions involving groups of operands may perform group operations in a similar fashion.

Group Subtract

Similarly, FIG. 33A presents various examples of Group Subtract instructions accommodating different operand sizes. FIGS. 33B and 33C illustrate an exemplary embodiment of a format and operation codes that can be used to perform the various Group Subtract instructions. As shown in FIGS. 33B and 33C, in this exemplary embodiment, the contents of registers rc and rb are partitioned into groups of operands of the size specified and subtracted, and if specified, checked for overflow or limited, yielding a group of results, each of which is the size specified. The group of results is catenated and placed in register rd.

Group Set

FIG. 33A also presents various examples of Group Set instructions accommodating different operand sizes. FIG. 33A also presents additional pseudo-instructions which are equivalent to other Group Set instructions according to the mapping rules further presented in FIG. 33A. FIGS. 33B and 33C illustrate an exemplary embodiment of a format and operation codes that can be used to perform the various Group Set instructions. As shown in FIGS. 33B and 33C, in this exemplary embodiment, the contents of registers rc and rb are partitioned into groups of operands of the size specified and the specified comparisons are performed, each producing a Boolean result repeated to the size specified, yielding a group of results, each of which is the size specified. The group of results is catenated and placed in register rd. In the present embodiment, certain comparisons between two identically specified registers, for which the result of such comparisons would be predictable no matter what the contents of the register, are used to encode comparisons against a zero value.

Combination of Group Set and Boolean Operations

In an embodiment of the invention, conditional operations are provided in the sense that the set on condition operations can be used to construct bit masks that can select between alternate vector expressions, using the bitwise Boolean operations.

Ensemble Divide/Multiply

Embodiments of the invention provide for other fixed-point group operations also. FIG. 34A presents various examples of Ensemble Divide and Ensemble Multiply instructions accommodating different operand sizes. FIGS. 34B and 34C illustrate an exemplary embodiment of a format and operation codes that can be used to perform the various Ensemble Divide and Ensemble Multiply instructions. As shown in FIGS. 34B and 34C, in this exemplary embodiment, the contents of registers rc and rb are partitioned into groups of operands of the size specified and divided or multiplied, yielding a group of results. The group of results is catenated and placed in register rd.

Group Compare

FIG. 35A present various examples of Group Compare instructions accommodating different operand sizes. FIGS. 35B and 35C illustrate an exemplary embodiment of a format and operational codes that can be used to perform the various Group Compare instructions. As shown in FIGS. 35B and 35C, in this exemplary embodiment, these operations perform calculations on partitions of bits in two general register values, and generate a fixed-point arithmetic exception if the condition specified is met. Two values are taken from the contents of registers rd and rc. The specified condition is calculated on partitions of the operands. If the specified condition is true for any partition, a fixed-point arithmetic exception is generated.

Ensemble Unary

FIG. 36A present various examples of Ensemble Unary instructions accommodating different operand sizes. FIGS. 36B and 36C illustrate an exemplary embodiment of a format and operational codes that can be used to perform the various Ensemble Unary instructions. As shown in FIGS. 36B and 36C, in this exemplary embodiment, these operations take operands from a register, perform operations on partitions of bits in the operand, and place the concatenated results in a second register. Values are taken from the contents of register rc. The specified operation is performed, and the result is placed in register rd. The code E.SUM.U.1 in FIG. 36A is preferably encoded as E.SUM.U.128.

Ensemble Floating-Point Add, Divide, Multiply, and Subtract

In accordance with one embodiment of the invention, the processor also handles a variety floating-point group operations accommodating different operand sizes. Here, the different operand sizes may represent floating-point operands of different precisions, such as half-precision (16 bits), single-precision (32 bits), double-precision (64 bits), and quad-precision (128 bits). FIG. 37 illustrates exemplary functions that are defined for use within the detailed instruction definitions in other sections and figures. In the functions set forth in FIG. 37, an internal format represents infinite-precision floating-point values as a four-element structure consisting of (1) s (sign bit): 0 for positive, 1 for negative, (2) t (type): NORM, ZERO, SNAN, QNAN, INFINITY, (3) e (exponent), and (4) f: (fraction). The mathematical interpretation of a normal value places the binary point at the units of the fraction, adjusted by the exponent: $(-1)^s*(2^e)*f$. The function F converts a packed IEEE floating-point value into internal format. The function PackF converts an internal format back into IEEE floating-point format, with rounding and exception control.

FIGS. 38A and 39A present various examples of Ensemble Floating Point Add, Divide, Multiply, and Subtract instructions. FIGS. 38B-C and 39B-C illustrate an exemplary embodiment of formats and operation codes that can be used to perform the various Ensemble Floating Point Add, Divide, Multiply, and Subtract instructions. In these examples, Ensemble Floating Point Add, Divide, and Multiply instructions have been labeled as "EnsembleFloatingPoint." Also, Ensemble Floating-Point Subtract instructions have been labeled as "EnsembleReversedFloatingPoint." As shown in FIGS. 38B-C and 39B-C, in this exemplary embodiment, the contents of registers rc and rb are partitioned into groups of operands of the size specified, and the specified group operation is performed, yielding a group of results. The group of results is catenated and placed in register rd.

In the present embodiment, the operation is rounded using the specified rounding option or using round-to-nearest if not specified. If a rounding option is specified, the operation raises a floating-point exception if a floating-point invalid operation, divide by zero, overflow, or underflow occurs, or when specified, if the result is inexact. If a rounding option is not specified, floating-point exceptions are not raised, and are handled according to the default rules of IEEE 754.

Ensemble Multiply-Add Floating-Point

FIG. 38D present various examples of Ensemble Floating Point Multiply Add instructions. FIGS. 38E-F illustrate an exemplary embodiment of formats and operation codes that can be used to perform the various Ensemble Floating Point Multiply Add instructions. In these examples, Ensemble Floating Point Multiply Add instructions have been labeled as "EnsembleInplaceFloatingPoint." As shown in FIGS. 38E-F, in this exemplary embodiment, operations take operands from three registers, perform operations on partitions of bits in the operands, and place the concatenated results in the third register. Specifically, the contents of registers rd, rc and rb are partitioned into groups of operands of the size specified, and for each partitioned element, the contents of registers rc and rb are multiplied and added to the contents of register rd, yielding a group of results. The group of results is catenated and placed in register rd. Register rd is both a source and destination of this instruction.

In the present embodiment, the operation is rounded using the specified rounding option or using round-to-nearest if not specified. If a rounding option is specified, the operation raises a floating-point exception if a floating-point invalid operation, divide by zero, overflow, or underflow occurs, or when specified, if the result is inexact. If a rounding option is not specified, floating-point exceptions are not raised, and are handled according to the default rules of IEEE 754.

Group Scale-Add Floating-Point

FIG. 38G present various examples of Ensemble Floating Point Scale Add instructions. FIGS. 38H-I illustrate an exemplary embodiment of formats and operation codes that can be used to perform the various Ensemble Floating Point Scale Add instructions. In these examples, Ensemble Floating Point Scale Add instructions have been labeled as "EnsembleTernaryFloatingPoint." As shown in FIGS. 38E-F, in this exemplary embodiment, the contents of registers rd and rc are taken to represent a group of floating-point operands. Operands from register rd are multiplied with a floating-point operand taken from the least-significant bits of the contents of register rb and added to operands from register rc multiplied with a floating-point operand taken from the next least-significant bits of the contents of register rb. The results are concatenated and placed in register ra. In an exemplary embodiment, the results are rounded to the nearest representable floating-point value in a single floating-point operation. In an exemplary embodiment, floating-point exceptions are not raised, and are handled according to the default rules of IEEE 754. In an exemplary embodiment, these instructions cannot select a directed rounding mode or trap on inexact.

Group Set Floating-Point

Figure 39F:
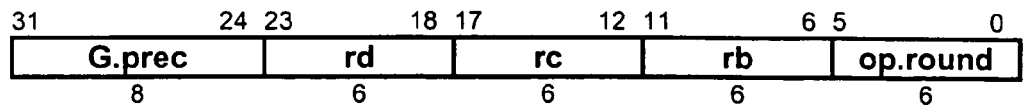

FIG. 39D also presents various examples of Group Set Floating-point instructions accommodating different operand sizes. FIG. 39E also presents additional pseudo-instructions which are equivalent to other Group Set Floating-Point instructions according to the mapping rules further presented in FIG. 39E. FIGS. 39F and 39G illustrate an exemplary embodiment of a format and operation codes that can be used to perform the various Group Set instructions. As shown in FIG. 39G, in this exemplary embodiment, the contents of registers rc and rb are partitioned into groups of operands of the size specified and the specified comparisons are performed, each producing a Boolean result repeated to the size specified, yielding a group of results, each of which is the size specified. The group of results is catenated and placed in register rd. If a rounding mode is specified a floating-point exception is raised if any operand is a SNAN, or when performing a Less or Greater Equal comparison, any operand is a QNAN. If a rounding option is not specified, floating-point exceptions are not raised, and are handled according to the default rules of IEEE 754.

Group Compare Floating-point

FIG. 40A present various examples of Group Compare Floating-point instructions accommodating different operand sizes. FIGS. 40B and 40C illustrate an exemplary embodiment of a format and operational codes that can be used to perform the various Group Compare Floating-point instructions. As shown in FIGS. 40B and 40C, in this exemplary embodiment, these operations perform calculations on partitions of bits in two general register values, and generate a floating-point arithmetic exception if the condition specified is met. The contents of registers rd and rc are compared using the specified floating-point condition. If the result of the comparison is true for any corresponding pair of elements, a floating-point exception is raised. If a rounding option is specified, the operation raises a floating-point exception if a floating-point invalid operation occurs. If a rounding option is not specified, floating-point exceptions are not raised, and are handled according to the default rules of IEEE 754.

Ensemble Unary Floating-point

FIG. 41A present various examples of Ensemble Unary Floating-point instructions accommodating different operand sizes. FIGS. 41B and 41C illustrate an exemplary embodiment of a format and operational codes that can be used to perform the various Ensemble Unary Floating-point instructions. As shown in FIGS. 41B and 41C, in this exemplary embodiment, these operations take one value from a register, perform a group of floating-point arithmetic operations on partitions of bits in the operands, and place the concatenated results in a register. The contents of register rc is used as the operand of the specified floating-point operation. The result is placed in register rd. The operation is rounded using the specified rounding option or using round-to-nearest if not specified. If a rounding option is specified, unless default exception handling is specified, the operation raises a floating-point exception if a floating-point invalid operation, divide by zero, overflow, or underflow occurs, or when specified, if the result is inexact. If a rounding option is not specified or if default exception handling is specified, floating-point exceptions are not raised, and are handled according to the default rules of IEEE 754. The reciprocal estimate and reciprocal square root estimate instructions compute an exact result for half precision, and a result with at least 12 bits of significant precision for larger formats.

Ensemble Multiply Galois Field

In accordance with one embodiment of the invention, the processor handles different Galois filed operations. For example, FIG. 42A presents various examples of Ensemble Multiply Gaois Field instructions accommodating different operand sizes. FIGS. 42B and 42C illustrate an exemplary embodiment of a format and operation codes that can be used to perform the Ensemble Multiply Gaois Field instructions shown in FIG. 42A. As shown in FIGS. 42B and 32C, in this exemplary embodiment, the contents of registers rd, rc, and rb are fetched. The specified operation is performed on these operands. The result is placed into register ra.

The contents of registers rd and rc are partitioned into groups of operands of the size specified and multiplied in the manner of polynomials. The group of values is reduced modulo the polynomial specified by the contents of register rb, yielding a group of results, each of which is the size specified. The group of results is catenated and placed in register ra.

Figure 42D:
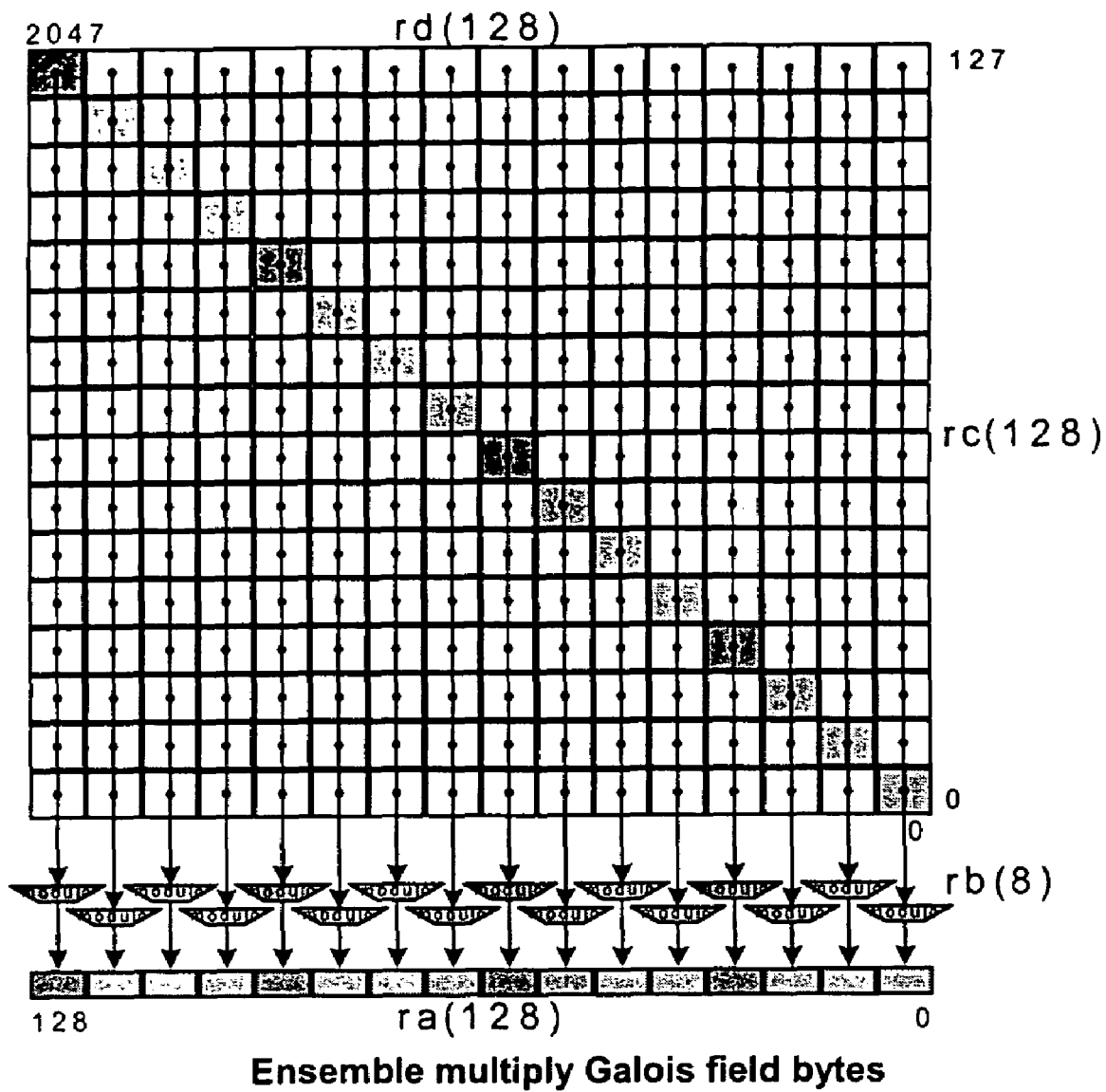

An ensemble multiply Galois field bytes instruction (E.MULG.8) multiplies operand [d15 d14 d13 d12 d11 d10 d9 d8 d7 d6 d5 d4 d3 d2 d1 d0] by operand [c15 c14 c13 c12 c11 c10 c9 c8 c7 c6 c5 c4 c3 c2 c1 c0], modulo polynomial [q], yielding the results [(d15c15 mod q) (d14c14 mod q) . . . (d0c0 mod q), as illustrated in FIG. 42D.

Compress, Expand, Rotate and Shift

In one embodiment of the invention, crossbar switch units such as units 142 and 148 perform data handling operations, as previously discussed. As shown in FIG. 43A, such data handling operations may include various examples of Crossbar Compress, Crossbar Expand, Crossbar Rotate, and Crossbar Shift operations. FIGS. 43B and 43C illustrate an exemplary embodiment of a format and operation codes that can be used to perform the various Crossbar Compress, Crossbar Expand, Crossbar Rotate, and Crossbar Shift instructions. As shown in FIGS. 43B and 43C, in this exemplary embodiment, the contents of registers rc and rb are obtained and the contents of register rc is partitioned into groups of operands of the size specified and the specified operation is performed using a shift amount obtained from the contents of register rb masked to values from zero to one less than the size specified, yielding a group of results. The group of results is catenated and placed in register rd.

Various Group Compress operations may convert groups of operands from higher precision data to lower precision data. An arbitrary half-sized sub-field of each bit field can be selected to appear in the result. For example, FIG. 43D shows an X.COMPRESS.16 rd=rc, 4 operation, which performs a selection of bits 19 . . . 4 of each quadlet in a hexlet. Various Group Shift operations may allow shifting of groups of operands by a specified number of bits, in a specified direction, such as shift right or shift left. As can be seen in FIG. 43C, certain Group Shift Left instructions may also involve clearing (to zero) empty low order bits associated with the shift, for each operand. Certain Group Shift Right instructions may involve clearing (to zero) empty high order bits associated with the shift, for each operand. Further, certain Group Shift Right instructions may involve filling empty high order bits associated with the shift with copies of the sign bit, for each operand.

Shift Merge

In one embodiment of the invention, as shown in FIG. 43E, such data handling operations may also include various examples of Shift Merge operations. FIGS. 43F and 43G illustrate an exemplary embodiment of a format and operation codes that can be used to perform the various Shift Merge instructions. As shown in FIGS. 43F and 43G, in this exemplary embodiment, the contents of registers rd, and rc are obtained and the contents of register rd and rc are partitioned into groups of operands of the size specified, and the specified operation is performed using a shift amount obtained from the contents of register rb masked to values from zero to one less than the size specified, yielding a group of results. The group of results is catenated and placed in register rd. Register rd is both a source and destination of this instruction.

Shift Merge operations may allow shifting of groups of operands by a specified number of bits, in a specified direction, such as shift right or shift left. As can be seen in FIG. 43G, certain Shift Merge operations may involve filling empty bits associated with the shift with copies of corresponding bits from the contents of register rd, for each operand.

Compress, Expand, Rotate and Shift Immediate

In one embodiment of the invention, crossbar switch units such as units 142 and 148 perform data handling operations, as previously discussed. As shown in FIG. 43H, such data handling operations may include various examples of Crossbar Compress Immediate, Crossbar Expand Immediate, Crossbar Rotate Immediate, and Crossbar Shift Immediate operations. FIGS. 43I and 43J illustrate an exemplary embodiment of a format and operation codes that can be used to perform the various Crossbar Compress Immediate, Crossbar Expand Immediate, Crossbar Rotate Immediate, and Crossbar Shift Immediate instructions. As shown in FIGS. 43I and 43J, in this exemplary embodiment, the contents of register rc is obtained and is partitioned into groups of operands of the size specified and the specified operation is performed using a shift amount obtained from the instruction masked to values from zero to one less than the size specified, yielding a group of results. The group of results is catenated and placed in register rd.

Various Group Compress Immediate operations may convert groups of operands from higher precision data to lower precision data. An arbitrary half-sized sub-field of each bit field can be selected to appear in the result. For example, FIG. 43D shows an X.COMPRESS.16 rd=rc,4 operation, which performs a selection of bits 19 . . . 4 of each quadlet in a hexlet. Various Group Shift Immediate operations may allow shifting of groups of operands by a specified number of bits, in a specified direction, such as shift right or shift left. As can be seen in FIG. 43J, certain Group Shift Left Immediate instructions may also involve clearing (to zero) empty low order bits associated with the shift, for each operand. Certain Group Shift Right Immediate instructions may involve clearing (to zero) empty high order bits associated with the shift, for each operand. Further, certain Group Shift Right Immediate instructions may involve filling empty high order bits associated with the shift with copies of the sign bit, for each operand.

Shift Merge Immediate

In one embodiment of the invention, as shown in FIG. 43K, such data handling operations may also include various examples of Shift Merge Immediate operations. FIGS. 43L and 43M illustrate an exemplary embodiment of a format and operation codes that can be used to perform the various Shift Merge Immediate instructions. As shown in FIGS. 43L and 43M, in this exemplary embodiment, the contents of registers rd and rc are obtained and are partitioned into groups of operands of the size specified, and the specified operation is performed using a shift amount obtained from the instruction masked to values from zero to one less than the size specified, yielding a group of results. The group of results is catenated and placed in register rd. Register rd is both a source and destination of this instruction.

Shift Merge operations may allow shifting of groups of operands by a specified number of bits, in a specified direction, such as shift right or shift left. As can be seen in FIG. 43G, certain Shift Merge operations may involve filling empty bits associated with the shift with copies of corresponding bits from the contents of register rd, for each operand.

Crossbar Extract

In one embodiment of the invention, data handling operations may also include a Crossbar Extract instruction. FIGS. 44A and 44B illustrate an exemplary embodiment of a format and operation codes that can be used to perform the Crossbar Extract instruction. As shown in FIGS. 44A and 44B, in this exemplary embodiment, the contents of registers rd, rc, and rb are fetched. The specified operation is performed on these operands. The result is placed into register ra.

The Crossbar Extract instruction allows bits to be extracted from different operands in various ways. Specifically, bits 31 . . . 0 of the contents of register rb specifies several parameters which control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction (see the Appendix). The control fields are further arranged so that if only the low order 8 bits are non-zero, a 128-bit extraction with truncation and no rounding is performed:

| 31 | 24 23 | 16 | 15 | 14 | 13 | 12 | 11 | 10 9 | 8 | 0 |
|---|---|---|---|---|---|---|---|---|---|---|
| fsize | dpos | | x | s | n | m | l | rnd | gssp | |
| 8 | 8 | | 1 | 1 | 1 | 1 | 1 | 2 | 9 | |

The table below describes the meaning of each label:

| label | bits | meaning |
|---|---|---|
| fsize | 8 | field size |
| dpos | 8 | destination position |
| x | 1 | reserved |
| s | 1 | signed vs. unsigned |
| n | 1 | reserved |
| m | 1 | merge vs. extract |
| l | 1 | reserved |

-continued

| label | bits | meaning |
|---|---|---|
| rnd | 2 | reserved |
| gssp | 9 | group size and source position |

The 9-bit gssp field encodes both the group size, gsize, and source position, spos, according to the formula gssp=512−4*gsize+spos. The group size, gsize, is a power of two in the range 1 . . . 128. The source position, spos, is in the range 0 . . . (2*gsize)−1.

The values in the s, n, m, l, and rnd fields have the following meaning:

| values | s | n | m | l | rnd |
|---|---|---|---|---|---|
| 0 | unsigned | | extract | | |
| 1 | signed | | merge | | |
| 2 | | | | | |
| 3 | | | | | |

As shown in FIG. 44C, for the X.EXTRACT instruction, when m=0, the parameters are interpreted to select a fields from the catenated contents of registers rd and rc, extracting values which are catenated and placed in register ra. As shown in FIG. 44D, for a crossbar-merge-extract (X.EXTRACT when m=1), the parameters are interpreted to merge fields from the contents of register rd with the contents of register rc. The results are catenated and placed in register ra.

Ensemble Extract

In one embodiment of the invention, data handling operations may also include an Ensemble Extract instruction. FIGS. 44E, 44F and 44G illustrate an exemplary embodiment of a format and operation codes that can be used to perform the Ensemble Extract instruction. As shown in FIGS. 44F and 44G, in this exemplary embodiment, the contents of registers rd, rc, and rb are fetched. The specified operation is performed on these operands. The result is placed into register ra.

The Crossbar Extract instruction allows bits to be extracted from different operands in various ways. Specifically, bits 31 . . . 0 of the contents of register rb specifies several parameters which control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction (see the Appendix). The control fields are further arranged so that if only the low order 8 bits are non-zero, a 128-bit extraction with truncation and no rounding is performed:

| 31 | 24 23 | 16 15 | 14 | 13 | 12 | 11 | 10 9 | 8 | 0 |
|---|---|---|---|---|---|---|---|---|---|
| fsize | dpos | x | s | n | m | l | rnd | gssp | |
| 8 | 8 | 1 | 1 | 1 | 1 | 1 | 2 | 9 | |

The table below describes the meaning of each label:

| label | bits | meaning |
|---|---|---|
| fsize | 8 | field size |
| dpos | 8 | destination position |
| x | 1 | reserved |
| s | 1 | signed vs. unsigned |
| n | 1 | complex vs. real multiplication |
| m | 1 | merge vs. extract or mixed-sign vs. same-sign multiplication |
| l | 1 | limit: saturation vs. truncation |
| rnd | 2 | rounding |
| gssp | 9 | group size and source position |

The 9-bit gssp field encodes both the group size, gsize, and source position, spos, according to the formula gssp=512−4*gsize+spos. The group size, gsize, is a power of two in the range 1 . . . 128. The source position, spos, is in the range 0 . . . (2*gsize)−1.

The values in the s, n, m, l, and rnd fields have the following meaning:

| values | s | n | m | l | rnd |
|---|---|---|---|---|---|
| 0 | unsigned | real | extract/same-sign | truncate | F |
| 1 | signed | complex | merge/mixed-sign | saturate | Z |
| 2 | | | | | N |
| 3 | | | | | C |

As shown in FIG. 44C, for the E.EXTRACT instruction, when m=0, the parameters are interpreted to select a fields from the catenated contents of registers rd and rc, extracting values which are catenated and placed in register ra. As shown in FIG. 44D, for an ensemble-merge-extract (E.EXTRACT when m=1), the parameters are interpreted to merge fields from the contents of register rd with the contents of register rc. The results are catenated and placed in register ra. As can be seen from FIG. 44G, the operand portion to the left of the selected field is treated as signed or unsigned as controlled by the s field, and truncated or saturated as controlled by the t field, while the operand portion to the right of the selected field is rounded as controlled by the rnd field.

Deposit and Withdraw

As shown in FIG. 45A, in one embodiment of the invention, data handling operations include various Deposit and Withdraw instructions. FIGS. 45B and 45C illustrate an exemplary embodiment of a format and operation codes that can be used to perform the various Deposit and Withdraw instructions. As shown in FIGS. 45B and 45C, in this exemplary embodiment, these operations take operands from a register and two immediate values, perform operations on partitions of bits in the operands, and place the concatenated results in the second register. Specifically, the contents of register rc is fetched, and 7-bit immediate values are taken from the 2-bit ih and the 6-bit gsfp and gsfs fields. The specified operation is performed on these operands. The result is placed into register rd.

Figure 45D:
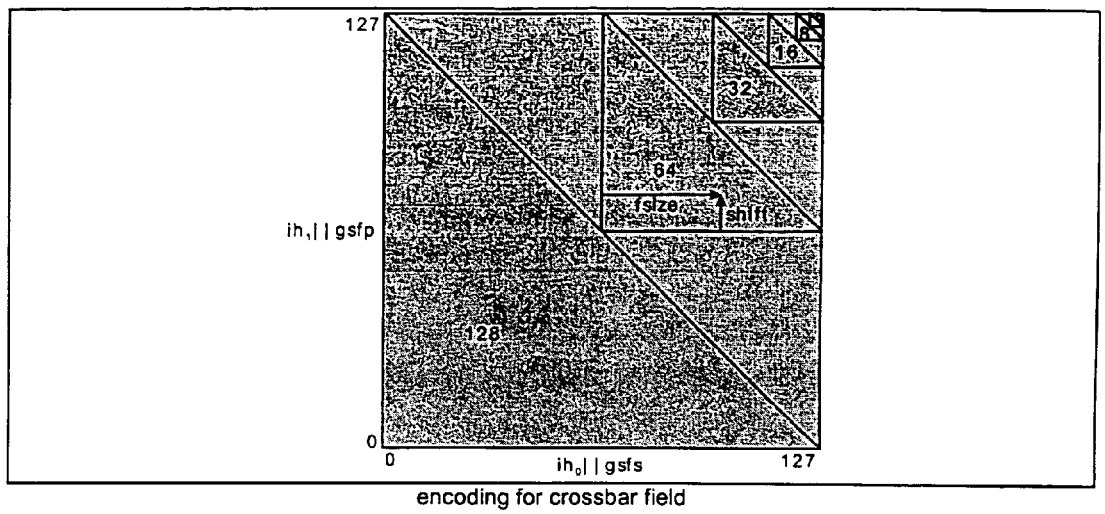

FIG. 45D shows legal values for the ih, gsfp and gsfs fields, indicating the group size to which they apply. The ih, gsfp and gsfs fields encode three values: the group size, the field size, and a shift amount. The shift amount can also be considered to be the source bit field position for group-withdraw instructions or the destination bit field position for group-deposit instructions. The encoding is designed so that combining the gsfp and gsfs fields with a bitwise-and produces a result which can be decoded to the group size, and so the field size and shift amount can be easily decoded once the group size has been determined.

Figure 45E:
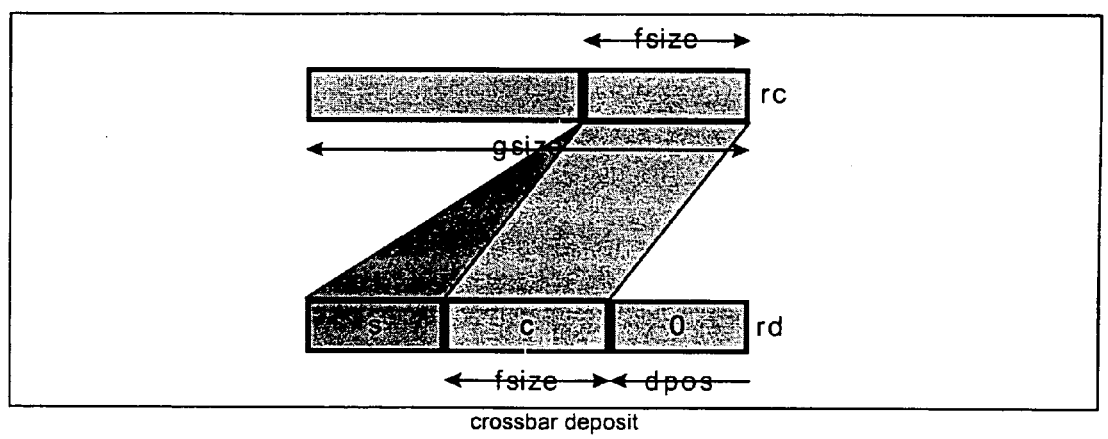
Figure 45F:
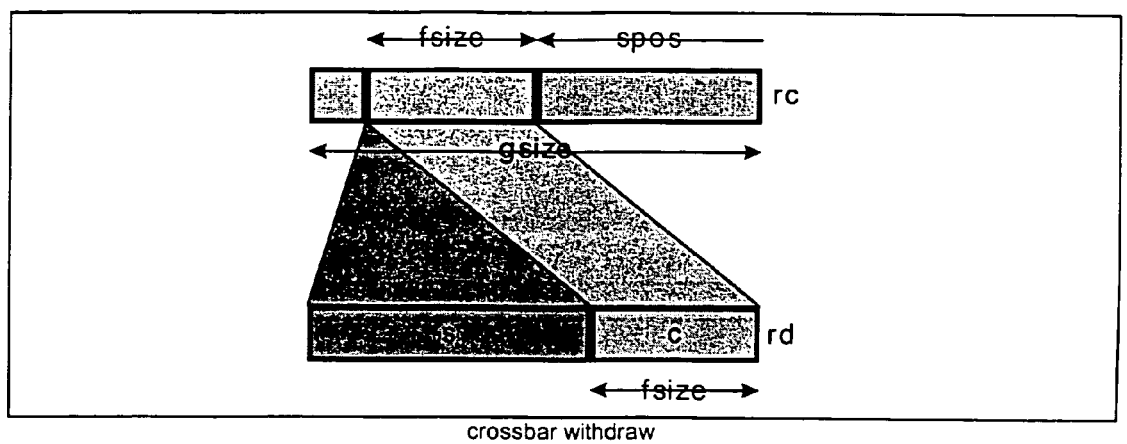

As shown in FIG. 45E, the crossbar-deposit instructions deposit a bit field from the lower bits of each group partition of the source to a specified bit position in the result. The value is either sign-extended or zero-extended, as specified. As shown in FIG. 45F, the crossbar-withdraw instructions withdraw a bit field from a specified bit position in the each group partition of the source and place it in the lower bits in the result. The value is either sign-extended or zero-extended, as specified.

Deposit Merge

As shown in FIG. 45G, in one embodiment of the invention, data handling operations include various Deposit Merge instructions. FIGS. 45H and 45I illustrate an exemplary embodiment of a format and operation codes that can be used to perform the various Deposit Merge instructions. As shown in FIGS. 45H and 45I, in this exemplary embodiment, these operations take operands from two registers and two immediate values, perform operations on partitions of bits in the operands, and place the concatenated results in the second register. Specifically, the contents of registers rc and rd are fetched, and 7-bit immediate values are taken from the 2-bit ih and the 6-bit gsfp and gsfs fields. The specified operation is performed on these operands. The result is placed into register rd.

FIG. 45D shows legal values for the ih, gsfp and gsfs fields, indicating the group size to which they apply. The ih, gsfp and gsfs fields encode three values: the group size, the field size, and a shift amount. The shift amount can also be considered to be the source bit field position for group-withdraw instructions or the destination bit field position for group-deposit instructions. The encoding is designed so that combining the gsfp and gsfs fields with a bitwise-and produces a result which can be decoded to the group size, and so the field size and shift amount can be easily decoded once the group size has been determined.

Figure 45J:
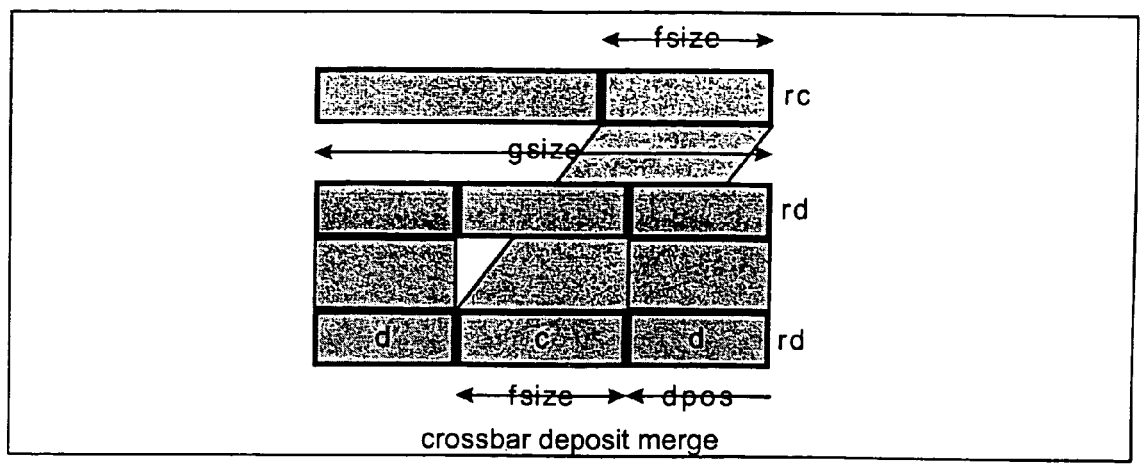

As shown in FIG. 45J, the crossbar-deposit-merge instructions deposit a bit field from the lower bits of each group partition of the source to a specified bit position in the result. The value is merged with the contents of register rd at bit positions above and below the deposited bit field. No sign- or zero-extension is performed by this instruction.

Shuffle

As shown in FIG. 46A, in one embodiment of the invention, data handling operations may also include various Shuffle instructions, which allow the contents of registers to be partitioned into groups of operands and interleaved in a variety of ways. FIGS. 46B and 46C illustrate an exemplary embodiment of a format and operation codes that can be used to perform the various Shuffle instructions. As shown in FIGS. 46B and 46C, in this exemplary embodiment, one of two operations is performed, depending on whether the rc and rb fields are equal. Also, FIG. 46B and the description below illustrate the format of and relationship of the rd, rc, rb, op, v, w, h, and size fields.

In the present embodiment, if the rc and rb fields are equal, a 128-bit operand is taken from the contents of register rc. Items of size v are divided into w piles and shuffled together, within groups of size bits, according to the value of op. The result is placed in register rd.

FIG. 46C illustrates that for this operation, values of three parameters x, y, and z are computed depending on the value of op, and in each result bit position i, a source bit position within the contents of register rc is selected, wherein the source bit position is the catenation of four fields, the first and fourth fields containing fields of i which are unchanged: 6 . . . x and y−1 . . . 0, and the second and third fields containing a subfield of i, bits x−1 . . . y which is rotated by an amount z: y+z−1 . . . y and x−1 . . . y+z.

Further, if the rc and rb fields are not equal, the contents of registers rc and rb are catenated into a 256-bit operand. Items of size v are divided into w piles and shuffled together, according to the value of op. Depending on the value of h, a sub-field of op, the low 128 bits (h=0), or the high 128 bits (h=1) of the 256-bit shuffled contents are selected as the result. The result is placed in register rd.

FIG. 46C illustrates that for this operation, the value of x is fixed, and values of two parameters y and z are computed depending on the value of op, and in each result bit position i, a source bit position within the contents of register rc is selected, wherein the source bit position is the catenation of three fields, the first field containing a fields of i which is unchanged: y−1 . . . 0, and the second and third fields containing a subfield of i, bits x−1 . . . y which is rotated by an amount z: y+z−1 . . . y and x−1 . . . y+z.

Figure 46D:
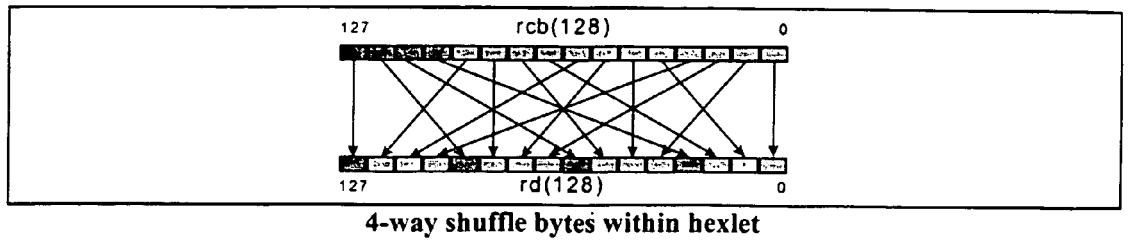
Figure 46E:
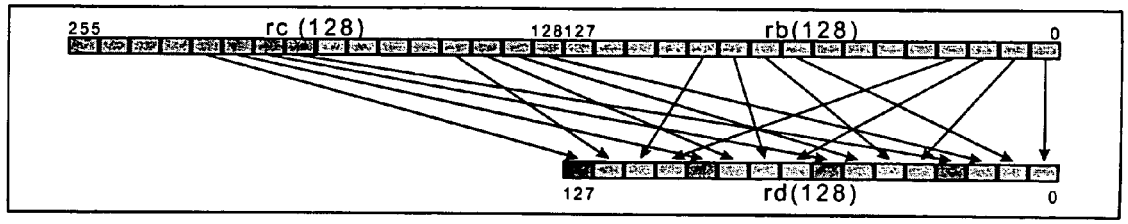

As shown in FIG. 46D, an example of a crossbar 4-way shuffle of bytes within hexlet instruction (X.SHUFFLE.128 rd=rcb,8,4) may divide the 128-bit operand into 16 bytes and partitions the bytes 4 ways (indicated by varying shade in the diagram below). The 4 partitions are perfectly shuffled, producing a 128-bit result. As shown in FIG. 46E, an example of a crossbar 4-way shuffle of bytes within triclet instruction (X.SHUFFLE.256 rd=rc,rb,8,4,0) may catenate the contents of rc and rb, then divides the 256-bit content into 32 bytes and partitions the bytes 4 ways (indicated by varying shade in the diagram below). The low-order halves of the 4 partitions are perfectly shuffled, producing a 128-bit result.

Changing the last immediate value h to 1 (X.SHUFFLE.256 rd=rc,rb,8,4,1) may modify the operation to perform the same function on the high-order halves of the 4 partitions. When rc and rb are equal, the table below shows the value of the op field and associated values for size, v, and w.

| op | size | v | w |
|---|---|---|---|
| 0 | 4 | 1 | 2 |
| 1 | 8 | 1 | 2 |
| 2 | 8 | 2 | 2 |
| 3 | 8 | 1 | 4 |
| 4 | 16 | 1 | 2 |
| 5 | 16 | 2 | 2 |
| 6 | 16 | 4 | 2 |
| 7 | 16 | 1 | 4 |
| 8 | 16 | 2 | 4 |
| 9 | 16 | 1 | 8 |
| 10 | 32 | 1 | 2 |
| 11 | 32 | 2 | 2 |
| 12 | 32 | 4 | 2 |
| 13 | 32 | 8 | 2 |
| 14 | 32 | 1 | 4 |
| 15 | 32 | 2 | 4 |
| 16 | 32 | 4 | 4 |
| 17 | 32 | 1 | 8 |
| 18 | 32 | 2 | 8 |
| 19 | 32 | 1 | 16 |
| 20 | 64 | 1 | 2 |
| 21 | 64 | 2 | 2 |
| 22 | 64 | 4 | 2 |
| 23 | 64 | 8 | 2 |

-continued

| op | size | v | w |
|---|---|---|---|
| 24 | 64 | 16 | 2 |
| 25 | 64 | 1 | 4 |
| 26 | 64 | 2 | 4 |
| 27 | 64 | 4 | 4 |
| 28 | 64 | 8 | 4 |
| 29 | 64 | 1 | 8 |
| 30 | 64 | 2 | 8 |
| 31 | 64 | 4 | 8 |
| 32 | 64 | 1 | 16 |
| 33 | 64 | 2 | 16 |
| 34 | 64 | 1 | 32 |
| 35 | 128 | 1 | 2 |
| 36 | 128 | 2 | 2 |
| 37 | 128 | 4 | 2 |
| 38 | 128 | 8 | 2 |
| 39 | 128 | 16 | 2 |
| 40 | 128 | 32 | 2 |
| 41 | 128 | 1 | 4 |
| 42 | 128 | 2 | 4 |
| 43 | 128 | 4 | 4 |
| 44 | 128 | 8 | 4 |
| 45 | 128 | 16 | 4 |
| 46 | 128 | 1 | 8 |
| 47 | 128 | 2 | 8 |
| 48 | 128 | 4 | 8 |
| 49 | 128 | 8 | 8 |
| 50 | 128 | 1 | 16 |
| 51 | 128 | 2 | 16 |
| 52 | 128 | 4 | 16 |
| 53 | 128 | 1 | 32 |
| 54 | 128 | 2 | 32 |
| 55 | 128 | 1 | 64 |

When rc and rb are not equal, the table below shows the value of the $op_{4\ldots0}$ field and associated values for size, v, and w: $Op_5$ is the value of h, which controls whether the low-order or high-order half of each partition is shuffled into the result.

| op4 . . . 0 | size | v | w |
|---|---|---|---|
| 0 | 256 | 1 | 2 |
| 1 | 256 | 2 | 2 |
| 2 | 256 | 4 | 2 |
| 3 | 256 | 8 | 2 |
| 4 | 256 | 16 | 2 |
| 5 | 256 | 32 | 2 |
| 6 | 256 | 64 | 2 |
| 7 | 256 | 1 | 4 |
| 8 | 256 | 2 | 4 |
| 9 | 256 | 4 | 4 |
| 10 | 256 | 8 | 4 |
| 11 | 256 | 16 | 4 |
| 12 | 256 | 32 | 4 |
| 13 | 256 | 1 | 8 |
| 14 | 256 | 2 | 8 |
| 15 | 256 | 4 | 8 |
| 16 | 256 | 8 | 8 |
| 17 | 256 | 16 | 8 |
| 18 | 256 | 1 | 16 |
| 19 | 256 | 2 | 16 |
| 20 | 256 | 4 | 16 |
| 21 | 256 | 8 | 16 |
| 22 | 256 | 1 | 32 |
| 23 | 256 | 2 | 32 |
| 24 | 256 | 4 | 32 |
| 25 | 256 | 1 | 64 |
| 26 | 256 | 2 | 64 |
| 27 | 256 | 1 | 128 |

Swizzle

In one embodiment of the invention, data handling operations may also include various Crossbar Swizzle instruction. FIGS. 47A and 47B illustrate an exemplary embodiment of a format and operation codes that can be used to perform Crossbar Swizzle intructions. As shown in FIGS. 47A and 47B, in this exemplary embodiment, the contents of register rc are fetched, and 7-bit immediate values, icopy and iswap, are constructed from the 2-bit ih field and from the 6-bit icopya and iswapa fields. The specified operation is performed on these operands. The result is placed into register rd.

The "swizzle" operation can reverse the order of the bit fields in a hexlet. For example, a X.SWIZZLE rd=rc,127,112 operation reverses the doublets within a hexlet, as shown in FIG. 47C. In some cases, it is desirable to use a group instruction in which one or more operands is a single value, not an array. The "swizzle" operation can also copy operands to multiple locations within a hexlet. For example, a X.SWIZZLE 15,0 operation copies the low-order 16 bits to each double within a hexlet.

Select

In one embodiment of the invention, data handling operations may also include various Crossbar Select instruction. FIGS. 47D and 47E illustrate an exemplary embodiment of a format and operation codes that can be used to perform Crossbar Select instructions. As shown in FIGS. 47D and 47E, in this exemplary embodiment, the contents of registers rd, rc and rb are fetched, and the contents of registers rd and rc are catenated, producing catenated data dc. The contents of register rb is partitioned into elements, and the value expressed in each partition is employed to select one partitioned element of the catenated data dc. The selected elements are catenated together, and result is placed into register ra.

Bus Interface

According to one embodiment of the invention, an initial implementation of the processor uses a "Super Socket 7 compatible" (SS7) bus interface, which is generally similar to and compatible with other "Socket 7" and "Super Socket 7" processors. FIG. 48 is a pin summary describing the functions of various pins in accordance with the present embodiment. FIGS. 49A-G contain electrical specifications describing AC and DC parameters in accordance with the present embodiment. Further details are provided in the "Bus Interface" section of the Appendix.

Load and Load Immediate

As shown in FIGS. 50A and 51A, in one embodiment of the invention, memory access operations may also include various Load and Load Immediate instructions. These figures and FIGS. 50B and 51B show that the various Load and Load Immediate instructions specify a type of operand, either signed, or unsigned, represented by omitting or including a U, respectively. The instructions further specify a size of memory operand, byte, double, quadlet, octlet, or hexlet, representing 8, 16, 32, 64, and 128 bits respectively. The instructions further specify aligned memory operands, or not, represented by including a A, or with the A omitted, respectively. The instructions further specify a byte-ordering of the memory operand, either big-endian, or little-endian, represented by B, and L respectively.

Each instruction specifies the above items with the following exceptions: L.8, L.U8, L.I.8, L.I.U8 need not distinguish between little-endian and big-endian ordering, nor between aligned and unaligned, as only a single byte is loaded. L.128.B, L.128.AB, L.128.L, L.128AL, LI.128.B, LI.128.AB, LI.128.L, and LI.128AL need not distinguish between signed and unsigned, as the hexlet fills the destination register.

FIGS. 50B and 50C illustrate an exemplary embodiment of formats and operation codes that can be used to perform Load instructions. As shown in FIGS. 50B and 50C, in this exemplary embodiment, an operand size, expressed in bytes, is specified by the instruction. A virtual address is computed from the sum of the contents of register rc and the sign-extended value of the offset field, multiplied by the operand size.

FIGS. 51B and 51C illustrate an exemplary embodiment of formats and operation codes that can be used to perform Load Immediate instructions. As shown in FIGS. 51B and 51C, in this exemplary embodiment, an operand size, expressed in bytes, is specified by the instruction. A virtual address is computed from the sum of the contents of register rc and the sign-extended value of the offset field, multiplied by the operand size.

In an exemplary embodiment, for both Load and Load Immediate instructions, the contents of memory using the specified byte order are read, treated as the size specified, zero-extended or sign-extended as specified, and placed into register rd. If alignment is specified, the computed virtual address must be aligned, that is, it must be an exact multiple of the size expressed in bytes. If the address is not aligned an "access disallowed by virtual address" exception occurs.

Store and Store Immediate

As shown in FIGS. 52A and 53A, in one embodiment of the invention, memory access operations may also include various Store and Store Immediate instructions. These figures and FIGS. 52B and 53B show that the various Store and Store Immediate instructions specify a size of memory operand, byte, double, quadlet, octlet, or hexlet, representing 8, 16, 32, 64, and 128 bits respectively. The instructions further specify aligned memory operands, or not, represented by including a A, or with the A omitted, respectively. The instructions further specify a byte-ordering of the memory operand, either big-endian, or little-endian, represented by B, and L respectively.

Each instruction specifies the above items with the following exceptions: L.8 and LI.8 need not distinguish between little-endian and big-endian ordering, nor between aligned and unaligned, as only a single byte is stored.

FIGS. 52B and 52C illustrate an exemplary embodiment of formats and operation codes that can be used to perform Store instructions. As shown in FIGS. 52B and 52C, in this exemplary embodiment, an operand size, expressed in bytes, is specified by the instruction. A virtual address is computed from the sum of the contents of register rc and the contents of register rb multiplied by operand size.

FIGS. 53B and 53C illustrate an exemplary embodiment of formats and operation codes that can be used to perform Store Immediate instructions. As shown in FIGS. 53B and 53C, in this exemplary embodiment, an operand size, expressed in bytes, is specified by the instruction. A virtual address is computed from the sum of the contents of register rc and the sign-extended value of the offset field, multiplied by the operand size.

In an exemplary embodiment, for both Store and Store Immediate instructions, the contents of register rd, treated as the size specified, is stored in memory using the specified byte order. If alignment is specified, the computed virtual address must be aligned, that is, it must be an exact multiple of the size expressed in bytes. If the address is not aligned an "access disallowed by virtual address" exception occurs.

Store Multiplex and Store Multiplex Immediate

As shown in FIGS. 52A and 53A, in one embodiment of the invention, memory access operations may also include various Store Multiplex and Store Multiplex Immediate instructions. These figures and FIGS. 52B and 53B show that the various Store Multiplex and Store Multiplex Immediate instructions specify a size of memory operand, octlet, representing 64 bits. The instructions further specify aligned memory operands, represented by including a A. The instructions further specify a byte-ordering of the memory operand, either big-endian, or little-endian, represented by B, and L respectively.

FIGS. 52B and 52C illustrate an exemplary embodiment of formats and operation codes that can be used to perform Store Multiplex instructions. As shown in FIGS. 52B and 52C, in this exemplary embodiment, an operand size, expressed in bytes, is specified by the instruction. A virtual address is computed from the sum of the contents of register rc and the contents of register rb multiplied by operand size.

FIGS. 53B and 53C illustrate an exemplary embodiment of formats and operation codes that can be used to perform Store Multiplex Immediate instructions. As shown in FIGS. 53B and 53C, in this exemplary embodiment, an operand size, expressed in bytes, is specified by the instruction. A virtual address is computed from the sum of the contents of register rc and the sign-extended value of the offset field, multiplied by the operand size.

In an exemplary embodiment, for both Store Multiplex and Store Multiplex Immediate instructions, data contents and mask contents of the contents of register rd are identified. The data contents are stored in memory using the specified byte order for values in which the corresponding mask contents are set. In an exemplary embodiment, it can be understood that masked writing of data can be accomplished by indivisibly reading the original contents of the addressed memory operand, modifying the value, and writing the modified value back to the addressed memory operand. In an exemplary embodiment, the modification of the value is accomplished using an operation previously identified as a Multiplex operation in the section titled Group Multiplex, above, and in FIG. 31E.

In an exemplary embodiment, for both Store Multiplex and Store Multiplex Immediate instructions, the computed virtual address must be aligned, that is, it must be an exact multiple of the size expressed in bytes. If the address is not aligned an "access disallowed by virtual address" exception occurs.

Additional Load and Execute Resources

In an exemplary embodiment, studies of the dynamic distribution of instructions on various benchmark suites indicate that the most frequently-issued instruction classes are load instructions and execute instructions. In an exemplary embodiment, it is advantageous to consider execution pipelines in which the ability to target the machine resources toward issuing load and execute instructions is increased.

In an exemplary embodiment, one of the means to increase the ability to issue execute-class instructions is to provide the means to issue two execute instructions in a single-issue string. The execution unit actually requires several distinct resources, so by partitioning these resources, the issue capability can be increased without increasing the number of functional units, other than the increased register file read and write ports. In an exemplary embodiment, the partitioning favored places all instructions that involve shifting and shuffling in one execution unit, and all instructions that involve multiplication, including fixed-point and floating-point multiply and add in another unit. In an exemplary embodiment, resources used for implementing add, subtract, and bitwise logical operations may be duplicated, being modest in size compared to the shift and multiply units. In another exemplary embodiment, resources used are shared between the two units, as the operations have low-enough latency that two operations might be pipelined within a single issue cycle. These instructions must generally be independent, except in another exemplary embodiment that two simple add, subtract, or bitwise logical instructions may be performed dependently, if the resources for executing simple instructions are shared between the execution units.

In an exemplary embodiment, one of the means to increase the ability to issue load-class instructions is to provide the means to issue two load instructions in a single-issue string. This would generally increase the resources required of the data fetch unit and the data cache, but a compensating solution is to steal the resources for the store instruction to execute the second load instruction. Thus, in an exemplary embodiment, a single-issue string can then contain either two load instructions, or one load instruction and one store instruction, which uses the same register read ports and address computation resources as the basic 5-instruction string in another exemplary embodiment.

In an exemplary embodiment, this capability also may be employed to provide support for unaligned load and store instructions, where a single-issue string may contain as an alternative a single unaligned load or store instruction which uses the resources of the two load-class units in concert to accomplish the unaligned memory operation.

High-Level Language Accessibility

In one embodiment of the invention, all processor, memory, and interface resources directly accessible to high-level language programs. In one embodiment, memory is byte-addressed, using either little-endian or big-endian byte ordering. In one embodiment, for consistency with the bit ordering, and for compatibility with x86 processors, little-endian byte ordering is used when an ordering must be selected. In one embodiment, load and store instructions are available for both little-endian and big-endian byte ordering. In one embodiment, interface resources are accessible as memory-mapped registers. In one embodiment, system state is memory mapped, so that it can be manipulated by compiled code.

In one embodiment, instructions are specified to assemblers and other code tools in the syntax of an instruction mnemonic (operation code), then optionally white space followed by a list of operands. In one embodiment, instruction mnemonics listed in this specification are in upper case (capital) letters, assemblers accept either upper case or lower case letters in the instruction mnemonics. In this specification, instruction mnemonics contain periods (".") to separate elements to make them easier to understand; assemblers ignore periods within instruction mnemonics.

In FIGS. 31B, 31D, 32B, 33B, 34B, 35B, 36B, 38B, 38E, 38H, 39B, 39F, 40B, 41B, 42B, 43B, 43F, 43I, 43L, 44A, 44F, 45B, 45H, 46B, 47A, 47D, 50B, 51B, 52B, and 53B, the format of instructions to be presented to an assembler is illustrated. Following the assembler format, the format for inclusion of instructions into high-level compiled languages is indicated. Finally, the detailed structure of the instruction fields, including pseudo code used to connect the assembler and compiled formats to the instruction fields is shown.

Further detailed explanation of the formats and instruction decoding is provided in the Appendix, in the section titled "Instruction Set."

In one embodiment, an instruction is specifically defined as a four-byte structure with the little-endian ordering. In one embodiment, instructions must be aligned on four-byte boundaries. In one embodiment, basic floating-point operations supported in hardware are floating-point add, subtract, multiply, divide, square root and conversions among floating-point formats and between floating-point and binary integer formats. Software libraries provide other operations required by the ANSI/IEEE floating-point standard.

In one embodiment, software conventions are employed at software module boundaries, in order to permit the combination of separately compiled code and to provide standard interfaces between application, library and system software. In one embodiment, register usage and procedure call conventions may be modified, simplified or optimized when a single compilation encloses procedures within a compilation unit so that the procedures have no external interfaces. For example, internal procedures may permit a greater number of register-passed parameters, or have registers allocated to avoid the need to save registers at procedure boundaries, or may use a single stack or data pointer allocation to suffice for more than one level of procedure call.

In one embodiment, at a procedure call boundary, registers are saved either by the caller or callee procedure, which provides a mechanism for leaf procedures to avoid needing to save registers. Compilers may choose to allocate variables into caller or callee saved registers depending on how their lifetimes overlap with procedure calls.

In one embodiment, procedure parameters are normally allocated in registers, starting from register 2 up to register 9. These registers hold up to 8 parameters, which may each be of any size from one byte to sixteen bytes (hexlet), including floating-point and small structure parameters. Additional parameters are passed in memory, allocated on the stack. For C procedures which use varargs.h or stdarg.h and pass parameters to further procedures, the compilers must leave room in the stack memory allocation to save registers 2 through 9 into memory contiguously with the additional stack memory parameters, so that procedures such as _doprnt can refer to the parameters as an array. Procedure return values are also allocated in registers, starting from register 2 up to register 9. Larger values are passed in memory, allocated on the stack.

In one embodiment, instruction scheduling is performed by a compiler. In the manner of software pipelineing, instructions should generally be scheduled so that previous operations can be completed at the time of issue. When this is not possible, the processor inserts sufficient empty cycles to perform the instructions precisely—explicit no-operation instructions are not required

CONCLUSION

Having fully described various embodiments of the invention, those skilled in the art will recognize, given the teachings herein, that numerous alternatives and equivalents exist which do not depart from the invention. It is therefore intended that the invention not be limited by the foregoing description, but only by the appended claims.

We claim:

1. A data processing system comprising:
   (a) a bus coupling components in the data processing system;

(b) an external memory coupled to the bus;
(c) a programmable microprocessor coupled to the bus and capable of operation independent of another host processor, the microprocessor comprising:
a data path;
an external interface operable to receive data from an external source and communicate the received data over the data path;
a cache operable to retain data communicated between the external interface and the data path;
a register file coupled to the data path and containing a plurality of registers; and
an execution unit coupled to the data path, the execution unit configurable to perform a group instruction that operates on a plurality of data elements in partitioned fields of a register to produce a catenated result, the execution unit further configurable to execute:
  (i) an aligned instruction operable to copy first data according to an aligned memory address, the first data having a data width, the data width specified as a fixed value by the aligned instruction, the aligned memory address being one of a plurality of memory addresses regularly spaced at alignment boundaries separated by the data width; and
  (ii) an unaligned instruction operable to copy second data according to an unaligned memory address, the second data having the data width, the data width specified as a fixed value by the unaligned instruction, the second data being permitted to cross an alignment boundary of the data width, the unaligned memory address being a memory address that is not constrained to be one of the plurality of memory addresses regularly spaced at alignment boundaries separated by the data width.

2. The system of claim 1 wherein the aligned instruction comprises a load instruction operable to copy the first data from memory at the aligned memory address to a register, and the unaligned instruction comprises a load instruction operable to copy the second data from memory at the unaligned memory address to a register.

3. The system of claim 1 wherein the aligned instruction comprises a store instruction operable to copy the first data from a register to memory at the aligned memory address, and the unaligned instruction comprises a store instruction operable to copy the second data from a register to memory at the unaligned memory address.

4. The system of claim 1 wherein the group instruction is capable of operating on data having a data width of 128 bits.

5. The system of claim 1 wherein the group instruction is a group floating-point instruction.

6. The system of claim 1 wherein the group instruction is a group integer instruction.

7. The system of claim 1 wherein the aligned instruction and the unaligned instruction are capable of accessing the first data and the second data, each having the data width of 128 bits.

8. The system of claim 1 wherein the aligned instruction and the unaligned instruction are capable of accessing the first data and the second data, each having the data width of 64 bits.

9. The system of claim 1 wherein the plurality of regularly spaced memory addresses are separated by intervals of 128 bits.

10. The system of claim 1 wherein the plurality of regularly spaced memory addresses are separated by intervals of 64 bits.

11. The system of claim 1 wherein the aligned instruction responds by generating an exception if the aligned memory address is not one of a plurality of memory addresses regularly spaced at alignment boundaries separated by the data width.

12. The system of claim 1 wherein the execution unit is further configurable to execute two aligned instructions in parallel using hardware capable of executing a single unaligned instruction.

13. The system of claim 1 wherein the aligned instruction corresponds to a first binary code and the unaligned instruction corresponds to a second binary code, the first binary code matching the second binary code in all but one bit position.

14. A computer-readable storage medium having instructions that cause a computer to perform operations, the instructions comprising:
an instruction that operates on a plurality of data elements in partitioned fields of at least one register to produce a catenated result;
an aligned instruction operable to copy first data according to an aligned memory address, the first data having a data width, the data width specified as a fixed value by the aligned instruction, the aligned memory address being one of a plurality of memory addresses regularly spaced by the data width; and
an unaligned instruction operable to copy second data according to an unaligned memory address, the second data having the data width, the data width specified as a fixed value by the unaligned instruction, the unaligned memory address being a memory address that is not constrained to be one of the plurality of memory addresses regularly spaced by the data width.

15. The computer-readable storage medium of claim 14 wherein the aligned instruction comprises a load instruction operable to copy the first data from memory at the aligned memory address to a register, and the unaligned instruction comprises a load instruction operable to copy the second data from memory at the unaligned memory address to a register.

16. The computer-readable storage medium of claim 14 wherein the aligned instruction comprises a store instruction operable to copy the first data from a register to memory at the aligned memory address, and the unaligned instruction comprises a store instruction operable to copy the second data from a register to memory at the unaligned memory address.

17. The computer-readable storage medium of claim 14 wherein the group instruction is capable of operating on data having a data width of 128 bits.

18. The computer-readable storage medium of claim 14 wherein the group instruction is a group floating-point instruction.

19. The computer-readable storage medium of claim 14 wherein the group instruction is a group integer instruction.

20. The computer-readable storage medium of claim 14 wherein the aligned instruction and the unaligned instruction are capable of accessing the first data and the second data, each having the data width of 128 bits.

21. The computer-readable storage medium of claim 14 wherein the aligned instruction and the unaligned instruction are capable of accessing the first data and the second data, each having the data width of 64 bits.

22. The computer-readable storage medium of claim 14 wherein the plurality of regularly spaced memory addresses are separated by intervals of 128 bits.

23. The computer-readable storage medium of claim 14 wherein the plurality of regularly spaced memory addresses are separated by intervals of 64 bits.

24. The computer-readable storage medium of claim 14 wherein the aligned instruction responds by generating an exception if the aligned memory address is not one of a plurality of memory addresses regularly spaced at alignment boundaries separated by the data width.

25. The computer-readable storage medium of claim 14 wherein two aligned instructions are capable of parallel execution.

26. The computer-readable storage medium of claim 14 wherein the aligned instruction corresponds to a first binary code and the unaligned instruction corresponds to a second binary code, the first binary code matching the second binary code in all but one bit position.

* * * * *